US005559995A

United States Patent [19]

Browning et al.

[11] Patent Number: 5,559,995

[45] Date of Patent: Sep. 24, 1996

[54] METHOD AND APPARATUS FOR CREATING A WIREFRAME AND POLYGON VIRTUAL WORLD

[75] Inventors: Dan D. Browning, San Francisco; Ethan D. Joffe, Menlo Park; Jaron Z. Lanier, Palo Alto, all of Calif.

[73] Assignee: VPL Research, Inc., Redwood City, Calif.

[21] Appl. No.: 939,834

[22] Filed: Sep. 2, 1992

Related U.S. Application Data

[63] Continuation of Ser. No. 621,474, Nov. 30, 1990, abandoned.

[51] Int. Cl.[6] .......... G06F 9/455

[52] U.S. Cl. .......... 395/500; 395/119; 395/133

[58] Field of Search .......... 395/500, 600, 395/700, 100, 119, 133

[56] References Cited

U.S. PATENT DOCUMENTS

| | | | |
|---|---|---|---|
| 4,463,380 | 7/1984 | Hooks, Jr. | 348/580 |
| 4,645,459 | 2/1987 | Graf et al. | 434/43 |
| 4,807,158 | 2/1989 | Blanton et al. | 395/125 |
| 4,952,922 | 8/1990 | Griffin et al. | 395/121 |
| 5,021,976 | 6/1991 | Wexelblat et al. | 395/159 |
| 5,159,687 | 10/1992 | Richburg | 395/700 |
| 5,237,647 | 8/1993 | Roberts et al. | 395/119 |

OTHER PUBLICATIONS

Fisher et al., "Virtual Environment Display System", ACM 1986 Workshop on Interactive 3D Graphics, Oct. 23–24, 1986, Chapel Hill, North Carolina, pp. 1–11.

*Primary Examiner*—William M. Treat
*Attorney, Agent, or Firm*—Oblon, Spivak, McClelland, Maier, & Neustadt, P.C.

[57] ABSTRACT

A method and apparatus for creating virtual worlds wherein a user may begin with a database containing a limited pictorial representation of a desired virtual world and then edit the database to specify the remaining data needed to create the actual virtual world. In one embodiment of the present invention, a database containing a limited pictorial representation of a virtual world is communicated to a receiving unit, and a grouping unit collects various descriptions of the pictorial representation into selected groups. An attribute assigning unit then assigns attributes to the groups. The attributes may include group hierarchy, constraints of motion, color, texture or other features. The modified database is then communicated to a data coupling unit which couples real world data to the groups. Finally, a rendering unit renders the virtual world which looks and functions according to the specified attributes and the real world data.

9 Claims, 2 Drawing Sheets

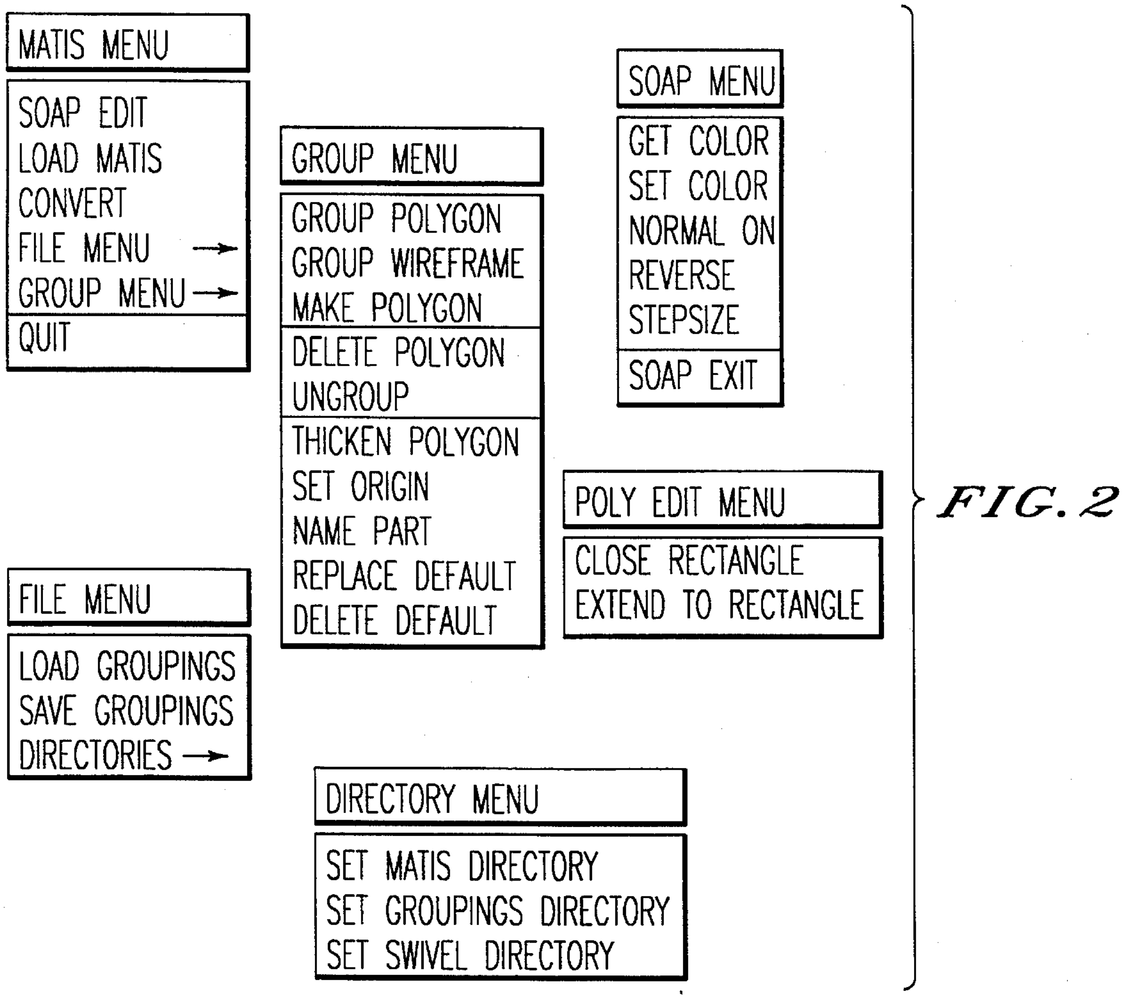
*FIG. 2*
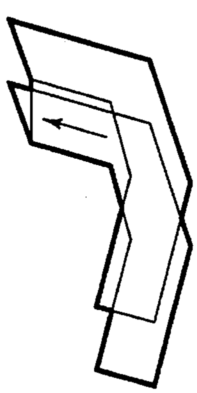
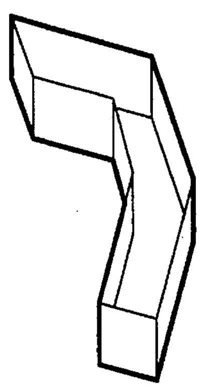
*FIG. 3A* *FIG. 3B*

METHOD AND APPARATUS FOR CREATING A WIREFRAME AND POLYGON VIRTUAL WORLD

This is a continuation of application Ser. No. 07/621,474 filed Nov. 30, 1990, now abandoned.

BACKGROUND OF THE INVENTION

This invention relates to virtual reality systems and, more particularly, to a method and apparatus for creating a virtual world from a database containing a limited pictorial representation of the virtual world.

Users of computer systems are now able to create virtual realities which they may view and interact with. One type of virtual reality system is disclosed in U.S. patent application Ser. No. 08/133,802, filed Oct. 8, 1993, which is a continuation of U.S. patent application Ser. No. 07/535,253, filed Jun. 7, 1990, now abandoned, entitled "Virtual Reality Network," the disclosure of which is incorporated herein by reference. One task which must be performed is the creation of the virtual worlds within which the users interact. This can be a very tedious task, since a complete description of all virtual objects in the virtual world, including their constraints of motion, hierarchy, color, texture and other attributes must be made and entered into the virtual reality computer. Thus, it would be desirable to make virtual world creation as simple as possible.

SUMMARY OF THE INVENTION

The present invention is a method and apparatus for creating virtual worlds wherein a user may begin with a database containing a limited pictorial representation of a desired virtual world and then edit the database to specify the remaining data needed to create the actual virtual world. In one embodiment of the present invention, a database containing a limited pictorial representation of a virtual world is communicated to a receiving unit, and a grouping unit collects various descriptions of the pictorial representation into selected groups. An attribute assigning unit then assigns attributes to the groups. The attributes may include group hierarchy, constraints of motion, color, texture or other features. The modified database is then communicated to a data coupling unit which couples real world data to the groups. Finally, a rendering unit renders the virtual world which looks and functions according to the specified attributes and the real world data.

BRIEF DESCRIPTION OF THE DRAWINGS

FIG. 2 is a series of menus used in a computer implementation of the present invention to control receiving pictorial representations of objects, grouping objects and assigning attributes to objects in a virtual world;

FIG. 3A is a pictorial representation of two objects and a single connecting edge (indicated by the arrow) that connects the two objects; and FIG. 3B is a grouped, sweep polygon object created from the pictorial representation of FIG. 3A after being grouped.

BRIEF DESCRIPTION OF THE APPENDICES

Figure 1:
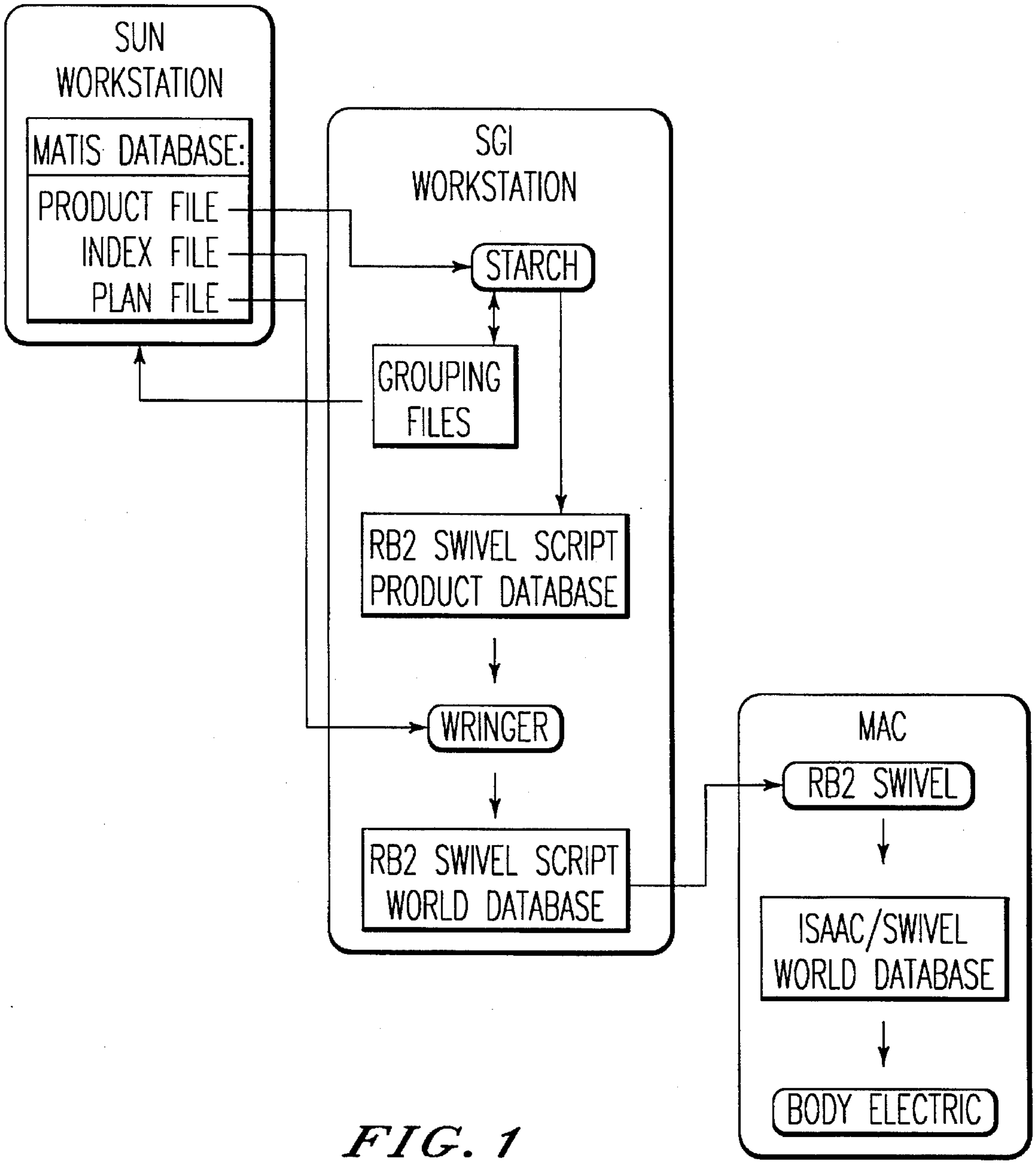
FIG. 1 is a block diagram of a particular embodiment of an apparatus for creating a virtual world according to the present invention.

Appendix 1 is a source code listing of a program used for creating a virtual world database according to the present invention;

Appendix 2 is a text description of the operation of the operation of the program entitled "Starch" listed in appendix 1;

Appendix 3 is a text description of the operation of the program entitled "Wringer" listed in Appendix 1; and Appendix 4 is a text description of the overall steps used to create a virtual world according to the present invention.

DESCRIPTION OF SPECIFIC EMBODIMENTS

1. Project Description

The Matis database conversion project enables the use of the Matis kitchen database in a virtual reality environment. To accomplish this, the Matis kitchen files are converted into the Isaac file format via RB2Swivel.

This conversion process has several steps. First, the Matis product files are edited, using the STARCH editor. The added editing information is stored in a GROUPING file which can be reloaded into the editor. Once the editing is complete, the product is converted into an RB2Swivel Script file. Once the products needed to construct a kitchen are in dm RB2Swivel format, the WRINGER program builds an RB2Swivel Script file containing the information necessary to make a virtual world. The RB2Swivel worlds are then loaded into Body Electric, along with the Body Electric Data Massagers (DMs) necessary to animate the word.

FIG. 1 shows a general outline of the conversion process. The GROUPING of the Matis database will be available for use on Sun Microsystems computers.

2. The STARCH Editor

This program runs on the SGI and enables the user to convert Matis product data into the GROUPING file data format. The final output format of the editor is RB2Swivel Script files. The GROUPING data file contains all the information necessary to edit a product from its last saved state. This information can also be used to speed the editing of similar products. Once editing is completed, the grouped Matis product data is converted temporarily to the SOAP data format. It is then converted to a Swivel Script file. There is one Swivel script file per product.

The editor provides file tools necessary for the grouping of matis graphic primitives into polygons or sweeps. Additional information such as constraints, thickness, and color can then be added.

2.1 Product Selection

The user needs to select which product to edit. This is accomplished by entering either the product number or name, or by cycling through the list of products of a kitchen as contained in the Matis planfile.

There is one GROUPING file per product. If a product which has already been edited is reselected for editing, the user is asked to confirm his intentions.

2.2 Default Parameter Addition

When a product is initially selected for conversion editing, default values for color, grouping, constraints, and thickness are added whenever possible.

Grouping defaults are a non-trivial problem. Currently, grouping is accomplished interactively. Future project phases may automate this process.

On completion of the grouping of graphic primitives into a part, a part name can be supplied by the user, or default to a predetermined value in order to establish constraint and thickness defaults.

Color, Thickness, and Constraint defaults are determined upon entry of a part name, such as door.

2.3 Product Editing

The grouping view also supports hierarchy editing. It displays an indented notation tree structure which specifies the Swivel linking constraints of the parts. The default relationship of the parts is a fiat tree structure where every part is a child of the root (the product).

COLOR VIEW

This view displays the RGB color value of the current part.

The four functions which the editor must provide are the ability to group Matis graphic primitives and subprimitives into parts, edit product color information, determine physical constraints, and add part thickness. This is accomplished in a one screen editing environment consisting of 8 views:

MATIS GRAPHIC VIEW

This view displays the original Matis data as a 3-D rotatable wireframe object. This view is used for selection and feedback, but is not modifiable, except for the addition of user polygons and constraint origins.

MATIS TEXT VIEW

All of the graphic primitives which compose the product are displayed in this view in a text list format. The association of text to graphics is accomplished through the use of color and highlighting. Primitives which can be subdivided into subprimitives have menu entries representing rite subprimitives.

Grouping Process

One or more primitives and subprimitives are selected. They are then grouped using the appropriate grouping menu item, at which time a part name can be supplied. This name then appears in the Grouping text view. When the one or more primitives and subprimitives are grouped, either a polygon or a wireframe part is generated as the result. If the definition of the polygon is not planar, it will be grouped as a sweep polygon automatically. A sweep polygon is defined by two sets of lines and arcs, each element in one set is parallel to a mirror image element in the other set, and the sets are connected by a single edge describing the thickness. Sweeps may also be created implicitly, as part of a thickened polygon.

Two objects in a virtual reality world may be assigned as connected hierarchically. The hierarchy is created by selecting an object and designating it as a child object of another object.

Objects additionally can be assigned as rotatable about a portion of another object. This is necessary only if the part is unconstrained in some way. For instance, a door needs to rotate about one of its edges. To define a rotational constraint of motion for an object, the edge about which an object will rotate is selected. The origin will be set to the center of the edge if a line segment is selected, or the origin will be set to the center point of the defining endcap of a column if a column is selected. For example, to allow a faucet arm to swing side to side, an origin must be specified, and then the minimum and maximum constraint values must be set. Once an object or a grouped object has been designated as rotatable about an origin, a change in an angle of rotation will cause the selected object to rotate about the origin by the specified amount.

GROUPING TEXT VIEW

This view contains a list of the part names of the currently grouped parts. When one of the names is selected, the primitives which compose the part will become selected.

THICKNESS VIEW

This view consists of editable text items which enable thickness to be added to the currently selected part. The editable items are height and height type. The height is the measurement by which to thicken the selected part in the direction of its normal vector. The height type specifies whether the thickness is added to the positive direction, negative direction, or equally distributed.

CONSTRAINTS VIEW

This view displays positional and rotational constraints of the currently selected part. It displays the current, minimum, and maximum constraint values, as well as lock status.

CONVERSION (SOAP) VIEW

This view displays the most recently convened state of the product. The product is displayed in shaded, polygonal format.

COLOR GRID VIEW

This view displays a color grid from which to interactively specify a grouping's color. This view only appears in Soap Edit mode, as described in the Starch User's Manual, Section 4.4, and replaces the Matis Graphic View.

3. The WRINGER World Constructor

This module constructs a kitchen as determined by the Matis index and plan files. Its one interaction with the user is to select a particular kitchen to build. A master Swivel script file is output by this module and is ported to the Macintosh, and loaded into RB2Swivel.

3.1 Kitchen Selection

The user can input the index file entry number or the managing number as a command line argument when running the module. Wall, floor, and ceiling colors may also be specified by creating a "wringer.color" file. See the Wringer User's Manual for more details.

3.2 Making a World

The plan file referenced by the index fie entry is loaded.

A new RB2Swivel script file is then written. As each wall is created, its products are located upon it as specified by the plan file. The file includes a head and hand, and initial world orientation information.

4. Body Electric Interaction

DMs are defined for each type of movement that might be needed. They are then loaded by BE by indexing off the key part names in each product. This loading process occurs automatically when a world is loaded into BE.

APPENDIX
1

| | |
|---|---|
| User: | MICRORENTMind |
| Application: | PrintMonitor |
| Document: | breeze.c |
| Date: | Wednesday, November 14, 1990 |
| Time: | 6:23:40 PM |
| Printer: | Peace of Mind |

```
/*
** BREEZE.C
**
** Subdivision, Etc. (a.k.a, the NIGHTMARE MODULE!)
**
** Copyright 1990, VPL Research
**
$Header: /usr/starch/source/starch/RCS/breeze.c,v 2.7 90/10/31 18:01:44 dan Exp $
**
*/

#include <stdio.h>
#include <string.h>
#include <malloc.h>
#include <memory.h>
#include <math.h>
#include <gl/gl.h>
#include "soap.h"
#include "soapxtrn.h"

/*
#define DEBUG
#define EDGEOUT
*/

typedef struct {
   float  x;
   float  y;
   float  z;
} vector;

/* IN CONVERT.C */
extern int    get_unique_num();
extern Boolean          convex_poly_p();

short       breeze_simulate();
void        set_relative_origins();
void        set_relative_point();
short       break_wind();
```

```
short      break_part();

/* For Convex Checks   */
Boolean    get_next_point();

short      subdivide_cylinder();

void       set_child_relative();
short      check_connect_kids();
void       do_connect_parents();
short      create_sweep();
short      subdivide_sweep();
short      get_arc_thang();
short      get_arc_thang_absolute();

short      create_connect();
short      subdivide_connect();

short      create_polygon();
short      subdivide_polygon();
void       do_arc_thang();

short      eq_epsilon_check();
short      ne_epsilon_check();
short      check_parallel();
short      eq_epsilon_accurate();
short      eq_epsilon_check_arg();
short      check_not_isolated();
void       check_half_and_swap();

void       order_edgelist();
void       fill_arc_start_stop();
void       test_line_next();
void       test_arc_next();
void       edge_order();
void       vertex_order();
void       delete_duplicates();
void       loop_check();
```

```
void print_edgelist();

/*-------------------------------------------------------------*/
Boolean get_next_point(npoint, edgeptr)
vector          *npoint;
Edgelist   *edgeptr;       /* VALID for first call only! */
{
   static Edgelist *curedge, *edgetop;
   static short   curoff;
   Soap_Line                *lineptr;
   Soap_Arc    *arcptr;


   if (edgeptr != EDGENULL) {
               curedge = edgeptr;          /* initial state */
               edgetop = edgeptr;
               curoff = 0;
   }

   if (*curedge != ELEMNULL) {
               if (curoff == LIST_SIZE - 1) {
                 curedge = (Edgelist *)*curedge;
                 curoff = 0;
               }

               if (((*curedge)->status & ELEMMASK) == SOAP_LINE) {
                  lineptr = (Soap_Line *)*curedge;
                  npoint->x = (float)lineptr->p1.x;
                  npoint->y = (float)lineptr->p1.y;
                  npoint->z = (float)lineptr->p1.z;
               } else if (((*curedge)->status & ELEMMASK) == SOAP_ARC) {
                  arcptr = (Soap_Arc *)*curedge;
                  fill_arc_start_stop(arcptr);
                  npoint->x = (float)arcptr->p1.x;
                  npoint->y = (float)arcptr->p1.y;
                  npoint->z = (float)arcptr->p1.z;
               } else {
                 return(FALSE);
               }
               ++curedge;
```

```
            ++curoff;
            return(TRUE);
    }

    /* Got to end of list. Reset to start. */
    curedge = edgetop;
    curoff = 0;

    return(FALSE);
}

/*-------------------------------------------------------------*/
/* CUT DOWN ON THE LINE COUNT BY DOING THIS...
*/
void transfer_fpoint(pt_dest, pt_source)
FPoint *pt_dest, *pt_source;
{
    pt_dest->x = pt_source->x;
    pt_dest->y = pt_source->y;
    pt_dest->z = pt_source->z;
}

/*-------------------------------------------------------------*/
/*
** GRANULATE SWEEPS AND CYLINDERS AND POLYGON ARCS...
** ALSO ORDER THE EDGELISTS...
*/

short breeze_simulate(object_index)
short       object_index;
{
    if (soap_object[object_index].root == PARTNULL)
            return(NO);

     set_relative_origins(soap_object[object_index].root);

     return(break_wind(soap_object[object_index].root, object_index));
}
```

```
/*--------------------------------------------------------------*/
void set_relative_origins(part)
Part         *part;
{
   Childlist  *childptr;
   short      offset;
   Part       *parent;


   if (part->parent == PARTNULL) {
             transfer_fpoint(&(part->relorigin), &(part->absorigin));
   } else {
             parent = part->parent;
             part->relorigin.x = part->absorigin.x - parent->absorigin.x;
             part->relorigin.y = part->absorigin.y - parent->absorigin.y;
             part->relorigin.z = part->absorigin.z - parent->absorigin.z;
   }

   childptr = part->child_top;

   if (childptr != CHILDNULL) {
             offset = 0;
             while (*childptr != PARTNULL) {
               if (offset == LIST_SIZE - 1) {
                         childptr = (Childlist *)*childptr;
                         offset = 0;
                         continue;
               }
                 set_relative_origins(*childptr);

               ++childptr;
               ++offset;
             }
 . }
}

/*--------------------------------------------------------------*/
/*
**
*/
```

```
short break_wind(part, object_index)
Part        *part;
short       object_index;
{
   Childlist  *childptr;
   short      offset, retstat;

   /* Creates children for SOAP_CYLINDER type! Beware!        */
   retstat = break_part(part, object_index);
   if (retstat != YES)
            return(retstat);

   childptr = part->child_top;

   if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
              }
              if (break_wind(*childptr, object_index) == NO)
                        return(NO);

              ++childptr;
              ++offset;
            }
  }
  return(YES);
}

/*-------------------------------------------------------------*/
/*
**
*/
short break_part(part, object_index)
Part        *part;
short       object_index;
```

```
{
  Polylist  *polyptr;
  short     offset, polycount, retstat;

  if (check_connect_kids(part)) {
            do_connect_parents(part);
            return(YES);
  }

   polycount = get_polylist_length(part);

  if (part->poly_top != POLYNULL) {
            offset = 0;
            polyptr = part->poly_top;

            while (*polyptr != EDGENULL && polycount) {
              if (offset == LIST_SIZE - 1) {
                        polyptr = (Polylist *)*polyptr;
                        offset = 0;
                        continue;
              }
              /* remember, a cylinder only has ONE EDGE!     */
              if (((**polyptr)->status & CYLMASK) == SOAP_CYLINDER) {
                        if (subdivide_cylinder(*polyptr, part, object_index) == NO)
                          return(NO);
              } else if (((**polyptr)->status & GEOMASK) == SOAP_ROTSWEEP) {
                        if (create_sweep(*polyptr, part) == NO)
                          return(NO);                    /* four edges              */
              } else if (((**polyptr)->status & GEOMASK) == SOAP_CONNECT
                          || ((**polyptr)->status & GEOMASK) == SOAP_SWEEP) {
                        if (create_connect(*polyptr, part) == NO)
                          return(NO);                    /* n edges...*/
              } else if (((**polyptr)->status & GEOMASK) != SOAP_ENDCAP) {
                        retstat = create_polygon(*polyptr, part);   /* n edges */
                        if (retstat != YES)
                          return(retstat);
              } /* else disregard SOAP_ENDCAP type... */

              ++polyptr;
              ++offset;
```

```
                --polycount;
            }
    }
    return(YES);
}

/*--------------------------------------------------------------*/
short check_connect_kids(part)
Part        *part;
{
    Polylist  *polyptr;
    Childlist *childptr;
    short     offset, childcount;

    if (part->poly_top != POLYNULL) {
            polyptr = part->poly_top;

            /* Special case check for children that are CONNECTS... */
            /* check children of POLYGON Types ONLY!                */
            if (*polyptr != EDGENULL) {
              if (((**polyptr)->status & CYLMASK) != SOAP_CYLINDER &&
                        ((**polyptr)->status & GEOMASK) != SOAP_SWEEP &&
                        ((**polyptr)->status & GEOMASK) != SOAP_ROTSWEEP &&
                        ((**polyptr)->status & GEOMASK) != SOAP_CONNECT &&
                        ((**polyptr)->status & GEOMASK) != SOAP_ENDCAP) {
                        /* check for first-level children parts that are CONNECTS */
                        if (part->child_top != CHILDNULL) {
                          childptr = part->child_top;
                          offset = 0;
                          while (*childptr != PARTNULL) {
                                  if (offset == LIST_SIZE - 1) {
                                    childptr = (Childlist *)*childptr;
                                    offset = 0;
                                    continue;
                                  }
                                  /* IS THIS CHILD A CONNECT??       */
                                  polyptr = (*childptr)->poly_top;
                                  if (*polyptr != EDGENULL) {
                                    if (((**polyptr)->status & GEOMASK)
```

```
                                        == SOAP_CONNECT)
                                    return(TRUE);
                            }
                            ++offset;
                            ++childptr;
                        }
                    }
                }
            }
    }
    return(FALSE);
}

/*--------------------------------------------------------------*/
/*
**
*/
short create_polygon(edgelist_pointer, part)
Edgelist    *edgelist_pointer;
Part            *part;
{

    order_edgelist(edgelist_pointer, part);

    if (((part->status) & REVMASK) == REVERSE)
            reverse_edgelist(edgelist_pointer);

    if (convex_poly_p(edgelist_pointer) == FALSE)
            return(-1);

    return(subdivide_polygon(edgelist_pointer, part));
}

/*--------------------------------------------------------------*/
/*
** Handle dual polygons that are parents of a CONNECT.
*/
void do_connect_parents(part)
Part            *part;
```

```
{
    Polylist   *polyptr1, *polyptr2;
    short      offset, polycount;

    polycount = get_polylist_length(part);

    if (polycount != 2)
            return;

    polyptr1 = part->poly_top;
    polyptr2 = polyptr1 + 1;

    if (*polyptr1 == EDGENULL || *polyptr2 == EDGENULL)
            return;

    order_edgelist(*polyptr1, part);
    order_edgelist(*polyptr2, part);

    /* always reverse one of the edgelists...          */
    /* BUT DO IT IN THIS ORDER!                               */
#ifdef DEBUG
printf("\n+++++++++++++++++++BEFORE REVERSE");
#endif
    if (((part->status) & REVMASK) == REVERSE)
            reverse_edgelist(*polyptr2);
    else
            reverse_edgelist(*polyptr1);
#ifdef DEBUG
printf("\n+++++++++++++++++++DONE");
#endif
    subdivide_polygon(*polyptr1, part);
    subdivide_polygon(*polyptr2, part);
}

/*------------------------------------------------------------*/
/*
**
*/
short subdivide_polygon(edgelist_pointer, part)
Edgelist    *edgelist_pointer;
```

```
Part              *part;
{
   short       i, offset, index, element_count;
   Element   *elptr;
   Soap_Line  *lineptr;
   Edgelist   *edge_top;


    element_count = get_edgelist_element_count(edgelist_pointer);

    edge_top = edgelist_pointer;
   offset = 0;

   /* since we're adding points to this edgelist, need to stop     */
   /* evaluating when we reach the start of the point data!!        */
   for (i=0; i<element_count; ++i) {
            if (*edgelist_pointer == ELEMNULL)
               break;

            if (offset == LIST_SIZE - 1) {
                edgelist_pointer = (Edgelist *)*edgelist_pointer;
               offset = 0;
               --i;          /* DDB FIX */
               continue;
            }
            /* remember, we've already done a garbage collection,              */
            /* so all data is ACTIVE and valid and beautiful...  */
            elptr = *edgelist_pointer;
            if ((elptr->status & NOGEOMASK) == SOAP_LINE) {
               lineptr = (Soap_Line *)elptr;
               index = find_free_point();
               soap_point[index].owner = part;
                transfer_fpoint(&(soap_point[index].x),&(lineptr->p1));

                set_relative_point(index,part);

               add_point(edge_top, index);
            } else if ((elptr->status & NOGEOMASK) == SOAP_ARC) {
               do_arc_thang(edge_top, (Soap_Arc *)elptr, part);
```

```
            } else {
              return(NO);
            }
            ++edgelist_pointer;
            ++offset;
  }
  return(YES);
}

/*-----------------------------------------------------------*/

void do_arc_thang(edgelist_pointer, arcptr, part)
Edgelist    *edgelist_pointer;
Soap_Arc    *arcptr;
Part              *part;
{
   short   loopcount, i, index;
   FPoint  circle[39];          /* 360 / 10 + 2 + 1 incs*/


   loopcount = get_arc_thang(arcptr, circle, part->stepsize);

   /* now, believe it or not, our arc is positioned in            */
   /* wide open space, and now we need to make our                */
   /* SWIVEL line segments....                                                   */
   /* since the last entry should be the first of the   */
   /* next edge, or the very first edge of the polygon            */
   /* we won't output the last value.....                         */
#ifdef ARCDEBUG
printf("\nARCTHAN %d: CEN: %f %f %f, RADIUS: %d, SO: %d %d",
get_arc_index(arcptr),
arcptr->center_world.x, arcptr->center_world.y, arcptr->center_world.z,
arcptr->radius, arcptr->start_angle, arcptr->offset_angle);
#endif
   for (i=0; i<loopcount; ++i) {
      index = find_free_point();
      soap_point[index].owner = part;
            transfer_fpoint(&(soap_point[index].x),&(circle[i]));

            set_relative_point(index,part);
```

```
    add_point(edgelist_pointer, index);

#ifdef ARCDEBUG
            if (get_arc_index(arcptr) == 0)
                printf("\nXYZ: %f %f %f",circle[i].x, circle[i].y,
                        circle[i].z);
#endif
  }
}

/*--------------------------------------------------------------*/
/*
**
*/
short subdivide_cylinder(edgelist_pointer, part, object_index)
Edgelist    *edgelist_pointer;
Part          *part;
short         object_index;
{
  Soap_Cylinder   *cylptr;
  /* Minimum stepsize is 1 degree. 360/1 = 360.   */
  FPoint        cap1[360 + 1], cap2[360 + 1];
  short         i, loopcount, index, offset, startend;
  double        tcos, tsin, tcosp, tsinp, tcosn, tsinn,
                      theta, length, newx, newy, newz, radius,
                      t2cosp, t2sinp, t2cosn, t2sinn, theta2;
  Edgelist      *curpoly, *newpoly;
  Part          *newpart;


  /* first, get a valid cylinder pointer */
  cylptr = (Soap_Cylinder *)*edgelist_pointer;

  /* next, draw the endcaps                           */
  /* cap2 is at length from cap1 which is at          */
  /* z = 0...                                         */
```

```
loopcount = 360 / part->stepsize;
startend = 360 % part->stepsize;
theta2 = (double)startend / 2.0;

theta = (double)part->stepsize;
tcosp = cos(theta * M_PI / 180.0);
tsinp = sin(theta * M_PI / 180.0);
theta = -(double)part->stepsize;
tcosn = cos(theta * M_PI / 180.0);
tsinn = sin(theta * M_PI / 180.0);

theta = theta2;
t2cosp = cos(theta * M_PI / 180.0);
t2sinp = sin(theta * M_PI / 180.0);
theta = -theta2;
t2cosn = cos(theta * M_PI / 180.0);
t2sinn = sin(theta * M_PI / 180.0);

if (((part->status) & REVMASK) == REVERSE) {
        tcos = tcosp;
        tcosp = tcosn;
        tcosn = tcos;

        tsin = tsinp;
        tsinp = tsinn;
        tsinn = tsin;

        tcos = t2cosp;
        t2cosp = t2cosn;
        t2cosn = tcos;

        tsin = t2sinp;
        t2sinp = t2sinn;
        t2sinn = tsin;
}

length = (double)cylptr->length;
radius = (double)cylptr->radius;

cap1[0].x = radius;
```

```
cap1[0].y = 0.0;
cap1[0].z = 0.0;
cap2[0].x = radius;
cap2[0].y = 0.0;
cap2[0].z = length;

if (theta2 != 0.0) {
        /* now draw the next increment */
        cap1[1].x = cap1[0].x * t2cosn - cap1[0].y * t2sinn;
        cap1[1].y = cap1[0].x * t2sinn + cap1[0].y * t2cosn;
        cap1[1].z = 0.0;

        cap2[1].x = cap2[0].x * t2cosp - cap2[0].y * t2sinp;
        cap2[1].y = cap2[0].x * t2sinp + cap2[0].y * t2cosp;
        cap2[1].z = length;
        /* don't need to draw last increment yet. Can       */
        /* simply connect the last iteration to endpt!      */
        offset = 1;
} else {
        offset = 0;
}

/* draw the bulk of the arc on the XY plane...      */

for (i=0; i<loopcount; ++i) {   /* n and n+1*/
        cap1[i+offset+1].x = cap1[i+offset].x * tcosn
                                - cap1[i+offset].y * tsinn;
        cap1[i+offset+1].y = cap1[i+offset].x * tsinn
                                + cap1[i+offset].y * tcosn;
        cap1[i+offset+1].z = 0.0;
        cap2[i+offset+1].x = cap2[i+offset].x * tcosp
                                - cap2[i+offset].y * tsinp;
        cap2[i+offset+1].y = cap2[i+offset].x * tsinp
                                + cap2[i+offset].y * tcosp;
        cap2[i+offset+1].z = length;
}

/* now add the last increment if necessary....      */
if (offset) {
```

```
            transfer_fpoint(&(cap1[i+offset+1]), &(cap1[0]));
            transfer_fpoint(&(cap2[i+offset+1]), &(cap2[0]));
            loopcount += 2;
}

/* rotate according to direction flag  */
if (cylptr->direction == 2) {  /* parallel to YZ    */
   /* rotate -90 about the Y axis */
   tsin = sin(-90.0 * M_PI / 180.0);
   tcos = cos(-90.0 * M_PI / 180.0);
            for (i=0; i<=loopcount; ++i) {  /* loopcount + 1 elements   */
               newx = cap1[i].x * tcos - cap1[i].z * tsin;
               newz = cap1[i].x * tsin + cap1[i].z * tcos;
               cap1[i].x = newx;
               cap1[i].z = newz;
               newx = cap2[i].x * tcos - cap2[i].z * tsin;
               newz = cap2[i].x * tsin + cap2[i].z * tcos;
               cap2[i].x = newx;
               cap2[i].z = newz;
            }
} else if (cylptr->direction == 3) {  /* to ZX       */
   /* rotate 90 about the X axis */
   tsin = sin(90.0 * M_PI / 180.0);
   tcos = cos(90.0 * M_PI / 180.0);
            for (i=0; i<=loopcount; ++i) {  /* loopcount + 1 elements   */
               newz = cap1[i].z * tcos - cap1[i].y * tsin;
               newy = cap1[i].z * tsin + cap1[i].y * tcos;
               cap1[i].y = newy;
               cap1[i].z = newz;
               newz = cap2[i].z * tcos - cap2[i].y * tsin;
               newy = cap2[i].z * tsin + cap2[i].y * tcos;
               cap2[i].y = newy;
               cap2[i].z = newz;
            }
}

/* finally, translate by original centerpoint  */
for (i=0; i<=loopcount; ++i) {
            cap1[i].x += cylptr->center_world.x;
```

```
		cap1[i].y += cylptr->center_world.y;
		cap1[i].z += cylptr->center_world.z;
		cap2[i].x += cylptr->center_world.x;
		cap2[i].y += cylptr->center_world.y;
		cap2[i].z += cylptr->center_world.z;
	}

	/* now we have the right coordinates. make into */
	/* a mesh for same polygon that the cylinder is */
	/* a part of....                                */
	/* two rows, thirty-six + 1 columns             */

	for (i=0; i<=loopcount; ++i) {
		index = find_free_point();
		soap_point[index].owner = part;
		transfer_fpoint(&(soap_point[index].x),&(cap1[i]));

		set_relative_point(index,part);

		add_point(edgelist_pointer, index);
	}

	for (i=0; i<=loopcount; ++i) {
		index = find_free_point();
		soap_point[index].owner = part;
		transfer_fpoint(&(soap_point[index].x),&(cap2[i]));

		set_relative_point(index,part);

		add_point(edgelist_pointer, index);
	}

	/* Set this for decoding by SOAP2* modules...  */
	cylptr->stepsize = loopcount;

	/* Add child parts for the endcaps, since the cylinder */
	/* is a sweep, and there can only be one sweep and     */
	/* nothing else in a Swivel Object....                 */
```

```
    newpart = add_part(part, object_index);
    set_child_relative(part, newpart);
    sprintf(newpart->nodename, "Object%d.c1",get_unique_num());
    newpoly = add_poly(newpart);
    add_line(newpoly, (index = find_free_line()));
    soap_line[index].status |= SOAP_ENDCAP;

    newpart = add_part(part, object_index);
    set_child_relative(part, newpart);
    sprintf(newpart->nodename, "Object%d.c2",get_unique_num());
    newpoly = add_poly(newpart);
    add_line(newpoly, (index = find_free_line()));
    soap_line[index].status |= SOAP_ENDCAP;

  return(YES);
}

/*-------------------------------------------------------------*/
void set_child_relative(part, newpart)
Part          *part, *newpart;
{

    memcpy(&(newpart->constraint), &(part->constraint), sizeof(Constraints));
   /* since these are RELATIVE, set child pos and att to ZERO! */
    newpart->constraint.xpos = 0.0;
    newpart->constraint.ypos = 0.0;
    newpart->constraint.zpos = 0.0;
    newpart->constraint.yaw_attitude = 0.0;
    newpart->constraint.pitch_attitude = 0.0;
    newpart->constraint.roll_attitude = 0.0;
   newpart->r = part->r;
   newpart->g = part->g;
   newpart->b = part->b;
    newpart->relorigin.x = 0.0;
    newpart->relorigin.y = 0.0;
    newpart->relorigin.z = 0.0;
    transfer_fpoint(&(newpart->absorigin), &(part->absorigin));

}
```

```
/*--------------------------------------------------------------*/
/*
**
*/
short create_sweep(edgeptr, part)
Edgelist   *edgeptr;
Part            *part;
{
   short   validflag, listsize;


   if (get_edgelist_line_count(edgeptr) > 0) {
            return(create_connect(edgeptr, part));
   }

   listsize = get_edgelist_element_count(edgeptr);

   /* < 3 arcs is not a valid configuration    */
   /* (might send it to connect if doubly open */
   /* case was handled by order_edgelist()..)          */
   if (listsize < 3)
            return(NO);

   order_edgelist(edgeptr, part);

   if (((part->status) & REVMASK) == REVERSE)
            reverse_edgelist(edgeptr);

   /* now we're ready to roll. */
   return(subdivide_sweep(edgeptr, part));
}


/*--------------------------------------------------------------*/
/*
**
*/

short subdivide_sweep(edgeptr, part)
```

```
Edgelist   *edgeptr;
Part             *part;
{
  Soap_Line              chord1, chord2;

  FPoint    mesh[10 + 1][10 + 1];
  FPoint    p1arc[10 + 1], p2arc[10 + 1];  /* path arcs        */
  FPoint    s1arc[10 + 1], s2arc[10 + 1];  /* shape arcs       */
  Soap_Arc *parc1, *parc2, *sarc1, *sarc2;
  double    theta, tcos, tsin;
  short     i, j, loopcount, index;

  /* work with a 10 X 10 mesh for now as default...                     */
  /* use an angular offset to determine where shape arc        */
  /* is to go.                                                                */

  /* if the shape is a line, just use mesh[0][0-10] and        */
  /* mesh[1][0 - 10]...                                                   */

  /* whereas the arc code makes arcs in 10 degree increments   */
  /* with split remainder at the beginning and end, this code  */
  /* simply divides the total arc angle by 10 to make the      */
  /* boundary points of the curved surface...                           */

  /* start with path arcs....                                                 */

  /* The PATH arcs will have chords which are parallel...      */

  parc1 = (Soap_Arc *)*(edgeptr);
  parc2 = (Soap_Arc *)*(edgeptr + 2);
   transfer_fpoint(&(chord1.p1), &(parc1->p1));
   transfer_fpoint(&(chord1.p2), &(parc1->p2));

   transfer_fpoint(&(chord2.p1), &(parc2->p1));
   transfer_fpoint(&(chord2.p2), &(parc2->p2));

  if (check_parallel(&chord1, &chord2)) {
    sarc1 = (Soap_Arc *)*(edgeptr + 1);
    sarc2 = (Soap_Arc *)*(edgeptr + 3);
```

```
} else {   /* assume ! */
   parc1 = (Soap_Arc *)*(edgeptr + 1);
   parc2 = (Soap_Arc *)*(edgeptr + 3);
   sarc1 = (Soap_Arc *)*(edgeptr);
   sarc2 = (Soap_Arc *)*(edgeptr + 2);
}

parc1->stepsize = 10;
parc2->stepsize = 10;
sarc1->stepsize = 10;
sarc2->stepsize = 10;

/* DO THIS IN CASE SWEEP OR CONNECT SENT HERE INSTEAD */
parc1->status &= ZEROGEOMASK;
parc1->status |= SOAP_ROTSWEEP;
parc2->status &= ZEROGEOMASK;
parc2->status |= SOAP_ROTSWEEP;
sarc1->status &= ZEROGEOMASK;
sarc1->status |= SOAP_ROTSWEEP;
sarc2->status &= ZEROGEOMASK;
sarc2->status |= SOAP_ROTSWEEP;

 loopcount = get_arc_thang_absolute(parc1, p1arc);


/* reverse this list! */
index = get_arc_index(parc2);
swap_arc_start_end(index);

 get_arc_thang_absolute(parc2, p2arc);
swap_arc_start_end(index);          /* restore */

/* now subdivide shape arc...                                      */
sarc1->stepsize = 10;
sarc2->stepsize = 10;

/* arbitrarily choose sarc1 */
 get_arc_thang_absolute(sarc1, s1arc);

/* mesh[row][column] -> shape iterated on column, path        */
```

```
/* iterated on row...                                          */
/* first translate by centerpoint to get to origin */
for (i=0; i<=loopcount; ++i) {
    mesh[0][i].x = s1arc[i].x - parc1->center_world.x;
    mesh[0][i].y = s1arc[i].y - parc1->center_world.y;
    mesh[0][i].z = s1arc[i].z - parc1->center_world.z;
}

/* now rotate shape arc around either path centerpoint.     */

theta = (double)-parc1->offset_angle / 10.0;
tcos = cos(theta * M_PI / 180.0);
tsin = sin(theta * M_PI / 180.0);

/* rotate by theta into mesh array...            */
/* but first, what axis are we rotating around??  */
if (parc1->direction == 1) {
  /* rotate around z */ /* XY */
  for (i=0; i<loopcount; ++i) { /* 1 to n + 1 */
            for (j=0; j<=loopcount; ++j) {
                mesh[i+1][j].x = mesh[i][j].x * tcos
                                        - mesh[i][j].y * tsin;
                    mesh[i+1][j].y = mesh[i][j].x * tsin
                                        + mesh[i][j].y * tcos;
                    mesh[i+1][j].z = mesh[i][j].z;
            }
        }
} else if (parc1->direction == 2) {
  /* rotate around x */ /* YZ */
  for (i=0; i<loopcount; ++i) { /* 1 to n + 1 */
            for (j=0; j<=loopcount; ++j) {
                mesh[i+1][j].y = mesh[i][j].y * tcos
                                        - mesh[i][j].z * tsin;
                mesh[i+1][j].z = mesh[i][j].y * tsin
                                        + mesh[i][j].z * tcos;
                mesh[i+1][j].x = mesh[i][j].x;
            }
        }
} else if (parc1->direction == 3) {
```

```
  /* rotate around y */ /* ZX */
  for (i=0; i<loopcount; ++i) { /* 1 to n + 1 */
      for (j=0; j<=loopcount; ++j) {
          mesh[i+1][j].z = mesh[i][j].z * tcos
                          - mesh[i][j].x * tsin;
          mesh[i+1][j].x = mesh[i][j].z * tsin
                          + mesh[i][j].x * tcos;
          mesh[i+1][j].y = mesh[i][j].y;
      }
  }
 }

 /* translate everything back! */
 for (i=0; i<=loopcount; ++i) {
      for (j=0; j<=loopcount; ++j) {
          mesh[i][j].x += parc1->center_world.x;
          mesh[i][j].y += parc1->center_world.y;
          mesh[i][j].z += parc1->center_world.z;
  }
 }
 /* now turn mesh into soap points */
 /* add points by rows...          */
 for (i=0; i<=loopcount; ++i) {
  for (j=0; j<=loopcount; ++j) {
          index = find_free_point();
          soap_point[index].owner = part;
          transfer_fpoint(&(soap_point[index].x), &(mesh[j][i]));

          set_relative_point(index, part);

          add_point(edgeptr, index);
  }
 }
 return(YES);
}

/*------------------------------------------------------------*/
/*
** Returns a count of the arc segments put in the passed FPoint
** buffer. Returns zero if error.
```

```
*/

short get_arc_thang(arc, circle, stepsize)
Soap_Arc    *arc;
FPoint              circle[];
short               stepsize;
{

    double  theta, theta2, theta3, tcos, tsin, t2cos, t2sin;
    double  rot1, rot2, newx, newy, newz;
    short   loopcount, startend, offset, i;
    FPoint  start, end;


    /* make arc into series of line segments          */
    /* first draw the arc in XY...                    */

    /* get the start point              */
    /* from point (radius, 0.0)                 */
    theta3 = (double)-arc->start_angle * M_PI / 180.0;
    start.x = (double)arc->radius * cos(theta3);
    start.y = (double)arc->radius * sin(theta3);
    start.z = 0.0;

    /* get the end point                */
    theta3 = (double)-(arc->start_angle + arc->offset_angle)
                * M_PI / 180.0;
    end.x = (double)arc->radius * cos(theta3);
    end.y = (double)arc->radius * sin(theta3);
    end.z = 0.0;

    theta = (double)stepsize;           /*10.0;  /* must be a whole number      */

    loopcount = -arc->offset_angle / (short)theta;
    startend = -arc->offset_angle % (short)theta;

    theta2 = (double)startend / 2.0;

    if (loopcount < 0) {
```

```
        loopcount = -loopcount;
        theta = -(double)stepsize;  /* -10; */
}

tcos = cos(theta * M_PI / 180.0);
tsin = sin(theta * M_PI / 180.0);

/* start at start point!  */
 transfer_fpoint(&(circle[0]), &start);

/* draw the first segments           */
if (theta2 != 0.0) {
        t2cos = cos(theta2 * M_PI / 180.0);
        t2sin = sin(theta2 * M_PI / 180.0);

        /* now draw the next increment */
        circle[1].x = circle[0].x * t2cos - circle[0].y * t2sin;
        circle[1].y = circle[0].x * t2sin + circle[0].y * t2cos;
        circle[1].z = 0.0;

        /* don't need to draw last increment yet. Can      */
        /* simply connect the last iteration to endpt!     */
        offset = 1;
} else {
        offset = 0;
}

/* draw the bulk of the arc on the XY plane...    */
 for (i=0; i<loopcount; ++i) {
        circle[i+offset+1].x = circle[i+offset].x * tcos
                    - circle[i+offset].y * tsin;
        circle[i+offset+1].y = circle[i+offset].x * tsin
                    + circle[i+offset].y * tcos;
        circle[i+offset+1].z = 0.0;
}


 /* now add the last increment if necessary....    */
if (offset) {
```

```
            transfer_fpoint(&(circle[i+offset+1]), &end);
            loopcount += 2;
}

/* now, rotate relative to the plane that the arc   */
/* resides upon.....                                */
if (arc->direction == 2) { /* parallel to YZ        */
    /* rotate -90 about the Y axis */
    tsin = sin(-90.0 * M_PI / 180.0);
    tcos = cos(-90.0 * M_PI / 180.0);
            for (i=0; i<=loopcount; ++i) { /* loopcount + 1 elements   */
                newx = circle[i].x * tcos - circle[i].z * tsin;
                newz = circle[i].x * tsin + circle[i].z * tcos;
                circle[i].z = newz;
                circle[i].x = newx;
            }
} else if (arc->direction == 3) { /* to ZX          */
    /* rotate 90 about the X axis */
    tsin = sin(90.0 * M_PI / 180.0);
    tcos = cos(90.0 * M_PI / 180.0);
            for (i=0; i<=loopcount; ++i) { /* loopcount + 1 elements   */
                newz = circle[i].z * tcos - circle[i].y * tsin;
                newy = circle[i].z * tsin + circle[i].y * tcos;
                circle[i].y = newy;
                circle[i].z = newz;
            }
}

/* now apply rotations rot1 and rot2 to circlepoints   */
/* These are stolen from the Starch code, so they   */
/* should work...                                       */
rot1 = -arc->rot1 * M_PI / 180.0;
rot2 = arc->rot2 * M_PI / 180.0;
tcos = cos(rot1);
tsin = sin(rot1);

/* around y */
for (i=0; i<=loopcount; ++i) {
            newx = circle[i].x * tcos - circle[i].z * tsin;
            newz = circle[i].x * tsin + circle[i].z * tcos;
```

```
            circle[i].x = newx;
            circle[i].z = newz;
  }

  tcos = cos(rot2);
  tsin = sin(rot2);
  /* around z */
  for (i=0; i<=loopcount; ++i) {
            newx = circle[i].x * tcos - circle[i].y * tsin;
            newy = circle[i].x * tsin + circle[i].y * tcos;
            circle[i].x = newx;
            circle[i].y = newy;
  }

  /* now translate back to unrotated centerpoint   */
  for (i=0; i<=loopcount; ++i) {
            circle[i].x += (double)arc->center_world.x;
            circle[i].y += (double)arc->center_world.y;
            circle[i].z += (double)arc->center_world.z;
  }

  arc->stepsize = loopcount;

  return(loopcount);
}

/*-------------------------------------------------------------*/
/*
** Returns the current default: (10)
** Returns zero if error.
** Integrate this with regular get_arc_thang() eventually.
*/

short get_arc_thang_absolute(arc, circle)
Soap_Arc   *arc;
FPoint          circle[];
{

   double  theta, theta2, theta3, tcos, tsin, t2cos, t2sin;
```

```
double  rot1, rot2, newx, newy, newz;
short   loopcount, startend, offset, i;
FPoint  start, end;


/* make arc into series of line segments         */
/* first draw the arc in XY...                   */

/* get the start point                */
/* from point (radius, 0.0)                     */
theta3 = (double)-arc->start_angle * M_PI / 180.0;
start.x = (double)arc->radius * cos(theta3);
start.y = (double)arc->radius * sin(theta3);
start.z = 0.0;

/* get the end point                 */
theta3 = (double)-(arc->start_angle + arc->offset_angle)
              * M_PI / 180.0;
end.x = (double)arc->radius * cos(theta3);
end.y = (double)arc->radius * sin(theta3);
end.z = 0.0;

loopcount = 10;
theta = (double)-(arc->offset_angle) / 10.0;

tcos = cos(theta * M_PI / 180.0);
tsin = sin(theta * M_PI / 180.0);

/* start at start point!  */
transfer_fpoint(&(circle[0]), &start);

/* draw the bulk of the arc on the XY plane...    */
for (i=0; i<loopcount; ++i) {
          circle[i+1].x = circle[i].x * tcos - circle[i].y * tsin;
          circle[i+1].y = circle[i].x * tsin + circle[i].y * tcos;
          circle[i+1].z = 0.0;
}

/* now, rotate relative to the plane that the arc   */
/* resides upon.....                                */
```

```
if (arc->direction == 2) {  /* parallel to YZ         */
   /* rotate -90 about the Y axis */
    tsin = sin(-90.0 * M_PI / 180.0);
    tcos = cos(-90.0 * M_PI / 180.0);
            for (i=0; i<=loopcount; ++i) {  /* loopcount + 1 elements   */
               newx = circle[i].x * tcos - circle[i].z * tsin;
               newz = circle[i].x * tsin + circle[i].z * tcos;
               circle[i].x = newx;
               circle[i].z = newz;
            }
} else if (arc->direction == 3) {  /* to ZX          */
   /* rotate 90 about the X axis */
    tsin = sin(90.0 * M_PI / 180.0);
    tcos = cos(90.0 * M_PI / 180.0);
            for (i=0; i<=loopcount; ++i) {  /* loopcount + 1 elements   */
               newz = circle[i].z * tcos - circle[i].y * tsin;
               newy = circle[i].z * tsin + circle[i].y * tcos;
               circle[i].y = newy;
               circle[i].z = newz;
            }
}

/* now apply rotations rot1 and rot2 to circlepoints   */
/* These are stolen from the Starch code, so they   */
/* should work...                                                  */
rot1 = -arc->rot1 * M_PI / 180.0;
rot2 = arc->rot2 * M_PI / 180.0;
tcos = cos(rot1);
tsin = sin(rot1);

/* around y */
for (i=0; i<=loopcount; ++i) {
            newx = circle[i].x * tcos - circle[i].z * tsin;
            newz = circle[i].x * tsin + circle[i].z * tcos;
            circle[i].x = newx;
            circle[i].z = newz;
}

tcos = cos(rot2);
```

```
   tsin = sin(rot2);
  /* around z */
  for (i=0; i<=loopcount; ++i) {
          newx = circle[i].x * tcos - circle[i].y * tsin;
          newy = circle[i].x * tsin + circle[i].y * tcos;
          circle[i].x = newx;
          circle[i].y = newy;
  }

   /* now translate back to unrotated centerpoint   */
   for (i=0; i<=loopcount; ++i) {
          circle[i].x += (double)arc->center_world.x;
          circle[i].y += (double)arc->center_world.y;
          circle[i].z += (double)arc->center_world.z;
  }

   return(loopcount);
}

/*-----------------------------------------------------------------*/
/*
**
*/
short check_parallel(line1, line2)
Soap_Line   *line1, *line2;
{
   FPoint vec1, vec2;
   double length;


    vec1.x = line1->p1.x - line1->p2.x;
    vec1.y = line1->p1.y - line1->p2.y;
    vec1.z = line1->p1.z - line1->p2.z;

    vec2.x = line2->p1.x - line2->p2.x;
    vec2.y = line2->p1.y - line2->p2.y;
    vec2.z = line2->p1.z - line2->p2.z;

    /* normalize these wonderful vectors... */
    length = sqrt(vec1.x * vec1.x + vec1.y * vec1.y + vec1.z * vec1.z);
```

```
    vec1.x = (vec1.x / length);
    vec1.y = (vec1.y / length);
    vec1.z = (vec1.z / length);

    length = sqrt(vec2.x * vec2.x + vec2.y * vec2.y + vec2.z * vec2.z);
    vec2.x = (vec2.x / length);
    vec2.y = (vec2.y / length);
    vec2.z = (vec2.z / length);

#ifdef DEBUG
printf("\n%f %f %f, %f %f %f",vec1.x,vec1.y,vec1.z,vec2.x,vec2.y,vec2.z);
#endif

    if (eq_epsilon_accurate(vec1.x, vec2.x)
                && eq_epsilon_accurate(vec1.y, vec2.y)
                && eq_epsilon_accurate(vec1.z, vec2.z))
            return(YES);/* these lines are parallel */

    if (eq_epsilon_accurate(vec1.x, -vec2.x)
                && eq_epsilon_accurate(vec1.y, -vec2.y)
                && eq_epsilon_accurate(vec1.z, -vec2.z))
            return(YES);/* these lines are parallel */

   return(NO);
}

/*-----------------------------------------------------------------*/
short ne_epsilon_check(num1, num2)
double       num1, num2;
{
   double diff;

   diff = num1 - num2;

   if (diff < 0.0) {
            if (diff > -EPSILON)
              return(NO);
            return(YES);
   } else if (diff > 0.0) {
```

```
            if (diff < EPSILON)
              return(NO);
            return(YES);
  } else {
            return(NO);
  }
}

/*-----------------------------------------------------------*/
short eq_epsilon_check(num1, num2)
double num1, num2;
{
  double diff;

  diff = num1 - num2;

  if (diff < 0.0) {
            if (diff > -EPSILON)
              return(YES);
            return(NO);
  } else if (diff > 0.0) {
            if (diff < EPSILON)
              return(YES);
            return(NO);
  } else {
            return(YES);
  }
}

/*-----------------------------------------------------------*/
short eq_epsilon_check_arg(num1, num2, epsilon)
double num1, num2, epsilon;
{
  double diff;

  diff = num1 - num2;

  if (diff < 0.0) {
            if (diff > -epsilon)
              return(YES);
```

```
        return(NO);
  } else if (diff > 0.0) {
        if (diff < epsilon)
          return(YES);
        return(NO);
  } else {
        return(YES);
  }
}

/*-----------------------------------------------------------------*/
#define     EPS_ACC    1.0e-4

short eq_epsilon_accurate(num1, num2)
double num1, num2;
{
  double diff;

  diff = num1 - num2;

  if (diff < 0.0) {
        if (diff > -EPS_ACC)
          return(YES);
        return(NO);
  } else if (diff > 0.0) {
        if (diff < EPS_ACC)
          return(YES);
        return(NO);
  } else {
        return(YES);
  }
}

/*-----------------------------------------------------------------*/
/*
**
*/
short create_connect(edgeptr, part)
Edgelist    *edgeptr;
```

```
Part            *part;
{
   short   listsize, arccount;


   /* if all arcs, do a rotational sweep...              */
   if (!get_edgelist_line_count(edgeptr)) {
            return(create_sweep(edgeptr, part));
   }

   /* check validity of edgelist   */
   listsize = get_edgelist_element_count(edgeptr);
   arccount = get_edgelist_arc_count(edgeptr);

   /* connect list can be odd sized if only one connecting */
   /* line is included. It can be even sized if both lines */
   /* are included. If arcs are included, minimum count is */
   /* be three, otherwise, five...                          */

   if (arccount > 0) {
            if (listsize < 3)
              return(NO);
   } else {
            if (listsize < 5)   /* i.e., simply polygon..   */
              return(NO);
   }

   /* order edgelist. open segment will be taken care of   */
   /* by backing up if it is reached before the EOL...      */
   /* Automatically reverses based on orientation of        */
   /* parent polygon pair...                                          */
   order_edgelist(edgeptr, part);

   /* now we're ready to roll. */
   return(subdivide_connect(edgeptr, part, listsize));
}

/*--------------------------------------------------------------*/
/*
```

```
**
*/

short subdivide_connect(edgeptr, part, listsize)
Edgelist    *edgeptr;
Part            *part;
short           listsize;
{
   Soap_Line              *lineptr;
   Soap_Arc *arcptr;
   short      i, j, k, loopcount, index, offset, elemcount,
                          arccount, forward_off, backward_off;
   Edgelist   *edge_top;
   Element   *elptr[MAX_CONNECT];
   FPoint    circle[39];  /* 360 / 10 + 2 + 1 */
   Soap_Line              linep[MAX_CONNECT];

#ifdef DEBUG
printf("\nENTERING SUBDIVIDE CONNECT");
SLAM;
#endif

#ifdef EDGEOUT
print_edgelist(edgeptr);
#endif

   edge_top = edgeptr;

   offset = 0;
   elemcount = 0;
   while (*edgeptr != ELEMNULL) {
              if (offset == LIST_SIZE - 1) {
                 edgeptr = (Edgelist *)*edgeptr;
                 offset = 0;
                 continue;
              }
              if (((*edgeptr)->status & ELEMMASK) == SOAP_LINE) {
                 lineptr = (Soap_Line *)*edgeptr;
```

```
if ((lineptr->status & GEOMASK) == SOAP_ROTSWEEP) {
            lineptr->status &= ZEROGEOMASK;
            lineptr->status |= SOAP_SWEEP;
}

  transfer_fpoint(&(linep[elemcount].p1), &(lineptr->p1));
  transfer_fpoint(&(linep[elemcount].p2), &(lineptr->p2));

 elptr[elemcount] = *edgeptr;
} else if (((*edgeptr)->status & ELEMMASK) == SOAP_ARC) {
 arcptr = (Soap_Arc *)*edgeptr;

 if ((arcptr->status & GEOMASK) == SOAP_ROTSWEEP) {
            arcptr->status &= ZEROGEOMASK;
            arcptr->status |= SOAP_SWEEP;
 }

 /* go from center to midway along arc                    */
 /* to handle full circle arc cases                        */
 /* Otherwise p1 to p2                                     */

  fill_arc_start_stop(arcptr);

 if ((arcptr->offset_angle % 360) == 0) {
            transfer_fpoint(&(linep[elemcount].p1), &(arcptr->p1));
            transfer_fpoint(&(linep[elemcount].p2),
                                   &(arcptr->center_world));
 } else {
            transfer_fpoint(&(linep[elemcount].p1), &(arcptr->p1));
            transfer_fpoint(&(linep[elemcount].p2), &(arcptr->p2));
 }

 elptr[elemcount] = *edgeptr;
} else {
 return(NO);
}

++edgeptr;
++elemcount;
```

```
            ++offset;
   }
#ifdef DEBUG
printf("\nMADE IT THROUGH THE FIRST LOOP");
SLAM;
#endif
#ifdef DEBUG
   for(i=0; i<elemcount; ++i) {
            printf("\nP1: %f %f %f, P2: %f %f %f",
                linep[i].p1.x, linep[i].p1.y, linep[i].p1.z,
                linep[i].p2.x, linep[i].p2.y, linep[i].p2.z);
   }
   SLAM;
#endif

   if (elemcount & 1) {
            k = (elemcount - 1) / 2;
   } else {
            k = (elemcount - 2) / 2;
   }
   /* ETHAN'S FAMOUS PARALLEL TEST...                          */
   for (i=0; i<elemcount; ++i) {
     backward_off = i;
     forward_off = (i + 2) % listsize;
     for (j=i; j < i + k; ++j) {
              if (!check_parallel(&(linep[backward_off]),
                                  &(linep[forward_off])) )
                break;
              forward_off = (j + 3)%listsize;
              backward_off = (i - (j - i) - 1) < 0 ?
                       (i - (j - i) - 1) + listsize : (i - (j - i) - 1);
            }
     if (j == (i + k)) {
              break;
     }
   }

#ifdef DEBUG
printf("\nMADE IT THROUGH PARALLEL LOOP");
SLAM;
```

```
#endif

 /* could not fit the restriction of parallelism...                    */
 if (i == elemcount)
         return(NO);

 if (elemcount & 1) {
         i = (i + 1)%listsize;
         --elemcount;                /* for odd-numbered elements       */
 } else {
         i = (i + 1)%listsize;
         elemcount -= 2;
 }


 /* now define the "PATH" edges....                                   */
 /* elemcount should be evened out at this point...                   */
 loopcount = elemcount >> 1;

 for (j=0; j<loopcount; ++j) {
         offset = (i + j + 1)%listsize;
         if ((elptr[offset]->status & ELEMMASK) == SOAP_LINE) {
            lineptr = (Soap_Line *)elptr[offset];

            index = find_free_point();
            soap_point[index].owner = part;
             transfer_fpoint(&(soap_point[index].x), &(lineptr->p1));

             set_relative_point(index, part);

            add_point(edge_top, index);
         } else if ((elptr[offset]->status & ELEMMASK) == SOAP_ARC) {
            arcptr = (Soap_Arc *)elptr[offset];

            /* interpolate this arc  */
            arccount = get_arc_thang(arcptr, circle, part->stepsize);

            for (k=0; k<arccount; ++k) {
                    index = find_free_point();
```

```
                    soap_point[index].owner = part;
                    transfer_fpoint(&(soap_point[index].x), &(circle[k]));

                    set_relative_point(index, part);

                    add_point(edge_top, index);
             }
          } else {
             return(NO);
          }
}

/* tack on final point... Must be p2 of final line, or */
/* p2 of final arc...                                  */
/* (p1 of final + 1 may be the omitted line segment!!!) */
offset = (i + j)%listsize;

if ((elptr[offset]->status & ELEMMASK) == SOAP_ARC) {
          arcptr = (Soap_Arc *)elptr[offset];
          index = find_free_point();
          soap_point[index].owner = part;
          transfer_fpoint(&(soap_point[index].x), &(arcptr->p2));

          set_relative_point(index, part);

          add_point(edge_top, index);
} else {
          lineptr = (Soap_Line *)elptr[offset];
          index = find_free_point();
          soap_point[index].owner = part;
          transfer_fpoint(&(soap_point[index].x), &(lineptr->p2));

          set_relative_point(index, part);
          add_point(edge_top, index);
}

/* NOW FOR THE NEXT ROW!!!                                          */

for (j=0; j<loopcount; ++j) {
          offset = (i - j - 1) < 0 ? ((i - j - 1) + listsize) : (i - j - 1);
```

```
            if ((elptr[offset]->status & ELEMMASK) == SOAP_LINE) {
                lineptr = (Soap_Line *)elptr[offset];

                index = find_free_point();
                soap_point[index].owner = part;
                transfer_fpoint(&(soap_point[index].x), &(lineptr->p2));

                set_relative_point(index, part);

                add_point(edge_top, index);
            } else if ((elptr[offset]->status & ELEMMASK) == SOAP_ARC) {
                arcptr = (Soap_Arc *)elptr[offset];

                /* interpolate this arc  */
                index = get_arc_index(arcptr);
                swap_arc_start_end(index);
                arccount = get_arc_thang(arcptr, circle, part->stepsize);
                swap_arc_start_end(index);

                for (k=0; k<arccount; ++k) {
                        index = find_free_point();
                        soap_point[index].owner = part;
                        transfer_fpoint(&(soap_point[index].x), &(circle[k]));

                        set_relative_point(index, part);

                        add_point(edge_top, index);
                }
            } else {
                return(NO);
            }
}

/* SAME RIGAMAROLE AS ABOVE...                                        */
offset = (i - j) < 0 ? ((i - j) + listsize) : (i - j);

if ((elptr[offset]->status & ELEMMASK) == SOAP_ARC) {
            arcptr = (Soap_Arc *)elptr[offset];
```

```
            index = find_free_point();
            soap_point[index].owner = part;
            transfer_fpoint(&(soap_point[index].x), &(arcptr->p1));

            set_relative_point(index, part);

            add_point(edge_top, index);
  } else {
            lineptr = (Soap_Line *)elptr[offset];
            index = find_free_point();
            soap_point[index].owner = part;
            transfer_fpoint(&(soap_point[index].x), &(lineptr->p1));

            set_relative_point(index, part);

            add_point(edge_top, index);
  }
#ifdef DEBUG
printf("\nLEAVING SUBDIVIDE CONNECT");
SLAM;
#endif
  return(YES);
}

/*----------------------------------------------------------------*/
void set_relative_point(index, part)
short        index;
Part         *part;
{
  Part  *uptree;
   double  relorgx, relorgy, relorgz;


  /* ABS has already been subtracted. Add it back in...  */
   soap_point[index].x += part->absorigin.x;
   soap_point[index].y += part->absorigin.y;
   soap_point[index].z += part->absorigin.z;

  /* ... and subtract the relative origin instead...      */
```

```
  relorgx = 0.0;
  relorgy = 0.0;
  relorgz = 0.0;

  uptree = part;
  while (uptree != PARTNULL) {
        if (uptree->parent == PARTNULL)
           break;  /* don't count the root! */
        relorgx += uptree->relorigin.x;
        relorgy += uptree->relorigin.y;
        relorgz += uptree->relorigin.z;

        uptree = uptree->parent;
  }
   soap_point[index].x -= relorgx;
   soap_point[index].y -= relorgy;
   soap_point[index].z -= relorgz;
}

/*---------------------------------------------------------------*/
void print_edgelist(edgeptr)
Edgelist *edgeptr;
{
  short count,i;
  short *ptlist;

  count = get_element_count_restricted(edgeptr);
  ptlist = get_point_sequence(edgeptr);

  printf("\nEDGELIST ---\n");
  for(i=0;i< count*8;i+= 8){
        printf("p1: %d %d %d, p2: %d %d %d\n",
             ptlist[i],ptlist[i+1],ptlist[i+2],
             ptlist[i+3],ptlist[i+4],ptlist[i+5]);
        SLAM;
  }
}

/*---------------------------------------------------------------*/
/*
```

```
** Put the edgelist in start/stop endpoint order...
*/
void order_edgelist(edgelist_pointer, part)
Edgelist    *edgelist_pointer;
Part        *part;
{

   /* This will delete duplicate entries...                         */
    delete_duplicates(edgelist_pointer, part);

   /* This will put edges in correct order...                       */
   /* permits an unclosed loop of edges...       07-30-90 ddb       */
    edge_order(edgelist_pointer, part);

#ifdef EDGEOUT
print_edgelist(edgelist_pointer);
#endif

    vertex_order(edgelist_pointer);

  /* BEFORE LEAVING, CHECK LOOPS FOR SWEEP TYPE!! */
  if (((*edgelist_pointer)->status & GEOMASK) == SOAP_CONNECT ||
            ((*edgelist_pointer)->status & GEOMASK) == SOAP_SWEEP ||
            ((*edgelist_pointer)->status & GEOMASK) == SOAP_ROTSWEEP) {
            if (get_edgelist_line_count(edgelist_pointer) &&
                (get_edgelist_element_count(edgelist_pointer) & 1)) {
                loop_check(edgelist_pointer, part);
                vertex_order(edgelist_pointer);
            }
  }
#ifdef EDGEOUT
print_edgelist(edgelist_pointer);
#endif

}

/*--------------------------------------------------------------*/
void vertex_order(edgelist_pointer)
Edgelist    *edgelist_pointer;
```

```
{
  Edgelist   *edge_top, *edgenext;
  short      offset, listsize, i;

  /* elements are in correct order, but start and stop points      */
  /* may need to be switched here and there or everywhere...       */

  edge_top = edgelist_pointer;

  /* get rid of ordering flags. Make room for vertex swap.   */
  offset = 0;
  edgelist_pointer = edge_top;
  while (*edgelist_pointer != ELEMNULL) {
          if (offset == LIST_SIZE - 1) {
              edgelist_pointer = (Edgelist *)*edgelist_pointer;
             offset = 0;
             continue;
          }

          (*edgelist_pointer)->status &= ZEROMATCHMASK;

          ++edgelist_pointer;
          ++offset;
  }

  offset = 0;
  edgelist_pointer = edge_top;
  listsize = get_edgelist_element_count(edgelist_pointer);

  for (i=0; i<listsize - 1; ++i) {

          if (offset == LIST_SIZE - 1) {
              edgelist_pointer = (Edgelist *)*edgelist_pointer;
             offset = 0;
             --i;
             continue;
          }

          if (*(edgelist_pointer + 1) == ELEMNULL)
             break;
```

```
            if (offset + 1 == LIST_SIZE - 1) {
                edgenext = (Edgelist *)*(edgelist_pointer + 1);
            } else {
                edgenext = edgelist_pointer + 1;
            }

            if (((*edgelist_pointer)->status & ELEMMASK) == SOAP_ARC) {
                test_arc_next(edgelist_pointer, edge_top, edgenext);
            } else if (((*edgelist_pointer)->status & ELEMMASK) == SOAP_LINE) {
                test_line_next(edgelist_pointer, edge_top, edgenext);
            }

            ++edgelist_pointer;
            ++offset;
  }
}

/*----------------------------------------------------------------*/
/*
** Test current SOAP_ARC against next element in edgelist for start/stop.
*/
void test_arc_next(edgelist_pointer, edge_top, edgenext)
Edgelist    *edgelist_pointer, *edge_top, *edgenext;
{
  Soap_Arc *arcptr, *arc2ptr;
  Soap_Line         *lineptr;
  short      index, eps, swapflag;
  double     epsx, epsy, epsz;


  /* get initial start/stop values for arc */
  arcptr = (Soap_Arc *)*edgelist_pointer;
  fill_arc_start_stop(arcptr);

  if (edgelist_pointer == edge_top) {
            if (((*(edgenext))->status & ELEMMASK) == SOAP_LINE) {
                /* find the common point */
                lineptr = (Soap_Line *)*(edgenext);
```

```
swapflag = NO;
for (eps = 0; eps < MAX_EPS_RANGE; ++eps) {
epsx = epsy = epsz = (double)eps;

if ((arcptr->offset_angle % 360) != 0
                && eq_epsilon_check_arg(arcptr->p1.x, lineptr->p1.x,
                                                    epsx)
                && eq_epsilon_check_arg(arcptr->p1.y, lineptr->p1.y,
                                                    epsy)
                && eq_epsilon_check_arg(arcptr->p1.z, lineptr->p1.z,
                                                    epsz)) {
            /* switch arc */
            index = get_arc_index(arcptr);
            swap_arc_start_end(index);
            arcptr->status &= ZEROSWAPMASK;
            arcptr->status |= EDGESWAP;
            swapflag = YES;
 } else if (eq_epsilon_check_arg(arcptr->p2.x, lineptr->p2.x,
                                                    epsx)
                && eq_epsilon_check_arg(arcptr->p2.y, lineptr->p2.y,
                                                    epsy)
                && eq_epsilon_check_arg(arcptr->p2.z, lineptr->p2.z,
                                                    epsz)) {
            /* switch line */
            index = get_line_index(lineptr);
            swap_line_start_end(index);
            lineptr->status &= ZEROSWAPMASK;
            lineptr->status |= EDGESWAP;
            swapflag = YES;
} else if ((arcptr->offset_angle % 360) != 0
                && eq_epsilon_check_arg(arcptr->p1.x, lineptr->p2.x,
                                                    epsx)
                && eq_epsilon_check_arg(arcptr->p1.y, lineptr->p2.y,
                                                    epsy)
                && eq_epsilon_check_arg(arcptr->p1.z, lineptr->p2.z,
                                                    epsz)) {
            /* switch both */
            index = get_line_index(lineptr);
            swap_line_start_end(index);
```

```
                lineptr->status &= ZEROSWAPMASK;
                lineptr->status |= EDGESWAP;
                index = get_arc_index(arcptr);
                swap_arc_start_end(index);
                arcptr->status &= ZEROSWAPMASK;
                arcptr->status |= EDGESWAP;
                swapflag = YES;
        } else if (eq_epsilon_check_arg(arcptr->p2.x, lineptr->p1.x,
                                                epsx)
                  && eq_epsilon_check_arg(arcptr->p2.y, lineptr->p1.y,
                                                epsy)
                  && eq_epsilon_check_arg(arcptr->p2.z, lineptr->p1.z,
                                                epsz)) {
                swapflag = YES;
        }
        if (swapflag)
                break;
        }
    } else if (((*(edgenext))->status & ELEMMASK) == SOAP_ARC) {
        arc2ptr = (Soap_Arc *)*(edgenext);
         fill_arc_start_stop(arc2ptr);

        swapflag = NO;
        for (eps = 0; eps < MAX_EPS_RANGE; ++eps) {
        epsx = epsy = epsz = (double)eps;

        if ((arcptr->offset_angle % 360) != 0
                  && eq_epsilon_check_arg(arcptr->p1.x, arc2ptr->p1.x,
                                                epsx)
                  && eq_epsilon_check_arg(arcptr->p1.y, arc2ptr->p1.y,
                                                epsy)
                  && eq_epsilon_check_arg(arcptr->p1.z, arc2ptr->p1.z,
                                                epsz)) {
                /* switch arc */
                index = get_arc_index(arcptr);
                swap_arc_start_end(index);
                arcptr->status &= ZEROSWAPMASK;
                arcptr->status |= EDGESWAP;
                swapflag = YES;
```

```
} else if ((arc2ptr->offset_angle % 360) != 0
            && eq_epsilon_check_arg(arcptr->p2.x, arc2ptr->p2.x,
                                    epsx)
            && eq_epsilon_check_arg(arcptr->p2.y, arc2ptr->p2.y,
                                    epsy)
            && eq_epsilon_check_arg(arcptr->p2.z, arc2ptr->p2.z,
                                    epsz)) {
        /* switch arc2 */
        index = get_arc_index(arc2ptr);
        swap_arc_start_end(index);
        arc2ptr->status &= ZEROSWAPMASK;
        arc2ptr->status |= EDGESWAP;
        swapflag = YES;
} else if ((arcptr->offset_angle % 360) != 0
            && (arc2ptr->offset_angle % 360) != 0
            && eq_epsilon_check_arg(arcptr->p1.x, arc2ptr->p2.x,
                                    epsx)
            && eq_epsilon_check_arg(arcptr->p1.y, arc2ptr->p2.y,
                                    epsy)
            && eq_epsilon_check_arg(arcptr->p1.z, arc2ptr->p2.z,
                                    epsz)) {
        /* switch both */
        index = get_arc_index(arc2ptr);
        swap_arc_start_end(index);
        arc2ptr->status &= ZEROSWAPMASK;
        arc2ptr->status |= EDGESWAP;
        index = get_arc_index(arcptr);
        swap_arc_start_end(index);
        arcptr->status &= ZEROSWAPMASK;
        arcptr->status |= EDGESWAP;
        swapflag = YES;
} else if (eq_epsilon_check_arg(arcptr->p2.x, arc2ptr->p1.x,
                                    epsx)
            && eq_epsilon_check_arg(arcptr->p2.y, arc2ptr->p1.y,
                                    epsy)
            && eq_epsilon_check_arg(arcptr->p2.z, arc2ptr->p1.z,
                                    epsz)) {
        swapflag = YES;
}
if (swapflag)
```

```
                break;
            }
        }
} else { /* NOT THE FIRST CALL */
        if (((*(edgenext))->status & ELEMMASK) == SOAP_LINE) {
            /* find the common point */
            lineptr = (Soap_Line *)*(edgenext);

            swapflag = NO;
            for (eps = 0; eps < MAX_EPS_RANGE; ++eps) {
            epsx = epsy = epsz = (double)eps;

              if (eq_epsilon_check_arg(arcptr->p2.x, lineptr->p2.x, epsx)
                        && eq_epsilon_check_arg(arcptr->p2.y, lineptr->p2.y,
                                                        epsy)
                        && eq_epsilon_check_arg(arcptr->p2.z, lineptr->p2.z,
                                                        epsz)) {
                    index = get_line_index(lineptr);
                    swap_line_start_end(index);
                    lineptr->status &= ZEROSWAPMASK;
                    lineptr->status |= EDGESWAP;
                    swapflag = YES;
              } else if (eq_epsilon_check_arg(arcptr->p2.x, lineptr->p1.x,
                                                        epsx)
                        && eq_epsilon_check_arg(arcptr->p2.y, lineptr->p1.y,
                                                        epsy)
                        && eq_epsilon_check_arg(arcptr->p2.z, lineptr->p1.z,
                                                        epsz)) {
                    swapflag = YES;
            }
            if (swapflag)
                    break;
            }
        } else if (((*(edgenext))->status & ELEMMASK) == SOAP_ARC) {
            arc2ptr = (Soap_Arc *)*(edgenext);
             fill_arc_start_stop(arc2ptr);

            swapflag = NO;
            for (eps = 0; eps < MAX_EPS_RANGE; ++eps) {
```

```
                epsx = epsy = epsz = (double)eps;

                if ((arc2ptr->offset_angle % 360) != 0
                        && eq_epsilon_check_arg(arcptr->p2.x, arc2ptr->p2.x,
                                                epsx)
                        && eq_epsilon_check_arg(arcptr->p2.y, arc2ptr->p2.y,
                                                epsy)
                        && eq_epsilon_check_arg(arcptr->p2.z, arc2ptr->p2.z,
                                                epsz)) {
                    index = get_arc_index(arc2ptr);
                    swap_arc_start_end(index);
                    arc2ptr->status &= ZEROSWAPMASK;
                    arc2ptr->status |= EDGESWAP;
                    swapflag = YES;
                } else if (eq_epsilon_check_arg(arcptr->p2.x, arc2ptr->p1.x,
                                                epsx)
                        && eq_epsilon_check_arg(arcptr->p2.y, arc2ptr->p1.y,
                                                epsy)
                        && eq_epsilon_check_arg(arcptr->p2.z, arc2ptr->p1.z,
                                                epsz)) {
                    swapflag = YES;
                }
                if (swapflag)
                    break;
            }
        }
    }
}

/*------------------------------------------------------------*/
/*
** Test current SOAP_LINE against next element in edgelist for start/stop.
*/
void test_line_next(edgelist_pointer, edge_top, edgenext)
Edgelist    *edgelist_pointer, *edge_top, *edgenext;
{
    Soap_Arc *arcptr;
    Soap_Line       *lineptr, *line2ptr;
    short     index, swapflag, eps;
```

```
double     epsx, epsy, epsz;

lineptr = (Soap_Line *)*edgelist_pointer;

if (edgelist_pointer == edge_top) {
        if (((*(edgenext))->status & ELEMMASK) == SOAP_LINE) {
            /* find the common point */
            line2ptr = (Soap_Line *)*(edgenext);

            swapflag = NO;
            for (eps = 0; eps < MAX_EPS_RANGE; ++eps) {
            epsx = epsy = epsz = (double)eps;
             if (eq_epsilon_check_arg(lineptr->p1.x, line2ptr->p1.x, epsx)
                     && eq_epsilon_check_arg(lineptr->p1.y, line2ptr->p1.y,
                                                         epsy)
                     && eq_epsilon_check_arg(lineptr->p1.z, line2ptr->p1.z,
                                                         epsz)) {
                   /* switch line1 */
                   index = get_line_index(lineptr);
                   swap_line_start_end(index);
                   lineptr->status &= ZEROSWAPMASK;
                   lineptr->status |= EDGESWAP;
                   swapflag = YES;
             } else if (eq_epsilon_check_arg(lineptr->p2.x, line2ptr->p2.x,
                                                         epsx)
                     && eq_epsilon_check_arg(lineptr->p2.y, line2ptr->p2.y,
                                                         epsy)
                     && eq_epsilon_check_arg(lineptr->p2.z, line2ptr->p2.z,
                                                         epsz)) {
                   /* switch line2 */
                   index = get_line_index(line2ptr);
                   swap_line_start_end(index);
                   line2ptr->status &= ZEROSWAPMASK;
                   line2ptr->status |= EDGESWAP;
                   swapflag = YES;
             } else if (eq_epsilon_check_arg(lineptr->p1.x, line2ptr->p2.x,
                                                         epsx)
                     && eq_epsilon_check_arg(lineptr->p1.y, line2ptr->p2.y,
                                                         epsy)
```

```
                && eq_epsilon_check_arg(lineptr->p1.z, line2ptr->p2.z,
                                                    epsz)) {
            /* switch both */
            index = get_line_index(lineptr);
            swap_line_start_end(index);
            lineptr->status &= ZEROSWAPMASK;
            lineptr->status |= EDGESWAP;
            index = get_line_index(line2ptr);
            swap_line_start_end(index);
            line2ptr->status &= ZEROSWAPMASK;
            line2ptr->status |= EDGESWAP;
            swapflag = YES;
    } else if (eq_epsilon_check_arg(lineptr->p2.x, line2ptr->p1.x,
                                                    epsx)
                && eq_epsilon_check_arg(lineptr->p2.y, line2ptr->p1.y,
                                                    epsy)
                && eq_epsilon_check_arg(lineptr->p2.z, line2ptr->p1.z,
                                                    epsz)) {
            swapflag = YES;
    }
    if (swapflag)
            break;
  }
} else if (((*(edgenext))->status & ELEMMASK) == SOAP_ARC) {
  arcptr = (Soap_Arc *)*(edgenext);
   fill_arc_start_stop(arcptr);

  swapflag = NO;
  for (eps = 0; eps < MAX_EPS_RANGE; ++eps) {
  epsx = epsy = epsz = (double)eps;

   if (eq_epsilon_check_arg(lineptr->p1.x, arcptr->p1.x, epsx)
                && eq_epsilon_check_arg(lineptr->p1.y, arcptr->p1.y,
                                                    epsy)
                && eq_epsilon_check_arg(lineptr->p1.z, arcptr->p1.z,
                                                    epsz)) {
            /* switch line          */
            index = get_line_index(lineptr);
            swap_line_start_end(index);
```

```
            lineptr->status &= ZEROSWAPMASK;
            lineptr->status |= EDGESWAP;
            swapflag = YES;
    } else if ((arcptr->offset_angle % 360) != 0
                && eq_epsilon_check_arg(lineptr->p2.x, arcptr->p2.x,
                                        epsx)
                && eq_epsilon_check_arg(lineptr->p2.y, arcptr->p2.y,
                                        epsy)
                && eq_epsilon_check_arg(lineptr->p2.z, arcptr->p2.z,
                                        epsz)) {
            /* switch arc */
            index = get_arc_index(arcptr);
            swap_arc_start_end(index);
            arcptr->status &= ZEROSWAPMASK;
            arcptr->status |= EDGESWAP;
            swapflag = YES;
    } else if (eq_epsilon_check_arg(lineptr->p1.x, arcptr->p2.x,
                                        epsx)
                && eq_epsilon_check_arg(lineptr->p1.y, arcptr->p2.y,
                                        epsy)
                && eq_epsilon_check_arg(lineptr->p1.z, arcptr->p2.z,
                                        epsz)) {
            /* switch both */
            index = get_line_index(lineptr);
            swap_line_start_end(index);
            lineptr->status &= ZEROSWAPMASK;
            lineptr->status |= EDGESWAP;
            index = get_arc_index(arcptr);
            swap_arc_start_end(index);
            arcptr->status &= ZEROSWAPMASK;
            arcptr->status |= EDGESWAP;
            swapflag = YES;
    } else if (eq_epsilon_check_arg(lineptr->p2.x, arcptr->p1.x,
                                        epsx)
                && eq_epsilon_check_arg(lineptr->p2.y, arcptr->p1.y,
                                        epsy)
                && eq_epsilon_check_arg(lineptr->p2.z, arcptr->p1.z,
                                        epsz)) {
            swapflag = YES;
    }
```

```
        if (swapflag)
                break;
        }
      }
} else { /* NOT THE FIRST CALL */
      if (((*(edgenext))->status & ELEMMASK) == SOAP_LINE) {
        /* find the common point */
        line2ptr = (Soap_Line *)*(edgenext);

        swapflag = NO;
        for (eps = 0; eps < MAX_EPS_RANGE; ++eps) {
        epsx = epsy = epsz = (double)eps;

         if (eq_epsilon_check_arg(lineptr->p2.x, line2ptr->p2.x, epsx)
                 && eq_epsilon_check_arg(lineptr->p2.y, line2ptr->p2.y,
                                                                epsy)
                 && eq_epsilon_check_arg(lineptr->p2.z, line2ptr->p2.z,
                                                                epsz)) {
                index = get_line_index(line2ptr);
                swap_line_start_end(index);
                line2ptr->status &= ZEROSWAPMASK;
                line2ptr->status |= EDGESWAP;
                swapflag = YES;
         } else if (eq_epsilon_check_arg(lineptr->p2.x, line2ptr->p1.x,
                                                                epsx)
                 && eq_epsilon_check_arg(lineptr->p2.y, line2ptr->p1.y,
                                                                epsy)
                 && eq_epsilon_check_arg(lineptr->p2.z, line2ptr->p1.z,
                                                                epsz)) {
                swapflag = YES;
        }
        if (swapflag)
                break;
        }
      } else if (((*(edgenext))->status & ELEMMASK) == SOAP_ARC) {
        arcptr = (Soap_Arc *)*(edgenext);
        fill_arc_start_stop(arcptr);

        swapflag = NO;
```

```
for (eps = 0; eps < MAX_EPS_RANGE; ++eps) {
epsx = epsy = epsz = (double)eps;

#ifdef ARCDEBUG
printf("\n2/2:CHECKING LINE/ARC: %f %f %f, %f %f %f",
lineptr->p2.x, lineptr->p2.y, lineptr->p2.z,
arcptr->p2.x, arcptr->p2.y, arcptr->p2.z);
printf("\n2/1:CHECKING LINE/ARC: %f %f %f, %f %f %f",
lineptr->p2.x, lineptr->p2.y, lineptr->p2.z,
arcptr->p1.x, arcptr->p1.y, arcptr->p1.z);
SLAM;
printf("\nI: %d, CENTER: %f %f %f, RAD: %d, SO: %d %d",
get_arc_index(arcptr),
arcptr->center_world.x, arcptr->center_world.y, arcptr->center_world.z,
arcptr->radius, arcptr->start_angle, arcptr->offset_angle);
printf("\nEPSILON: %f", epsx);
#endif
        if ((arcptr->offset_angle % 360) != 0
                && eq_epsilon_check_arg(lineptr->p2.x, arcptr->p2.x,
                                                epsx)
                && eq_epsilon_check_arg(lineptr->p2.y, arcptr->p2.y,
                                                epsy)
                && eq_epsilon_check_arg(lineptr->p2.z, arcptr->p2.z,
                                                epsz)) {
            index = get_arc_index(arcptr);
            swap_arc_start_end(index);
            arcptr->status &= ZEROSWAPMASK;
            arcptr->status |= EDGESWAP;
#ifdef ARCDEBUG
printf("\nSWAPPED ARC!!!");
#endif
            swapflag = YES;
        } else if (eq_epsilon_check_arg(lineptr->p2.x, arcptr->p1.x,
                                                epsx)
                && eq_epsilon_check_arg(lineptr->p2.y, arcptr->p1.y,
                                                epsy)
                && eq_epsilon_check_arg(lineptr->p2.z, arcptr->p1.z,
                                                epsz)) {
            swapflag = YES;
        }
```

```
                if (swapflag)
                        break;
                }
            }
  }
}

/*-----------------------------------------------------------*/
/*
** !
*/
void fill_arc_start_stop(arc)
Soap_Arc   *arc;
{
   double  theta, tcos, tsin, newx, newy, newz, rot1, rot2;
   FPoint  start, end;


  /* Get start and end points on XY PLANE */
   theta = (double)-arc->start_angle * M_PI / 180.0;
   start.x = (double)arc->radius * cos(theta);
   start.y = (double)arc->radius * sin(theta);
   start.z = 0.0;

  /* get the end point                    */
   theta = (double)-(arc->start_angle + arc->offset_angle)
                * M_PI / 180.0;
  end.x = (double)arc->radius * cos(theta);
  end.y = (double)arc->radius * sin(theta);
  end.z = 0.0;

  /* now, rotate relative to the plane that the arc   */
  /* resides upon.....                                        */
  if (arc->direction == 2) {  /* parallel to YZ           */
     /* rotate -90 about the Y axis */
     tsin = sin(-90.0 * M_PI / 180.0);
     tcos = cos(-90.0 * M_PI / 180.0);

          newx = start.x * tcos - start.z * tsin;
```

```
    newz = start.x * tsin + start.z * tcos;
    start.x = newx;
    start.z = newz;
    newx = end.x * tcos - end.z * tsin;
    newz = end.x * tsin + end.z * tcos;
    end.x = newx;
    end.z = newz;
} else if (arc->direction == 3) {   /* to ZX            */
    /* rotate 90 about the X axis */
    tsin = sin(90.0 * M_PI / 180.0);
    tcos = cos(90.0 * M_PI / 180.0);

    newz = start.z * tcos - start.y * tsin;
    newy = start.z * tsin + start.y * tcos;
    start.y = newy;
    start.z = newz;
    newz = end.z * tcos - end.y * tsin;
    newy = end.z * tsin + end.y * tcos;
    end.y = newy;
    end.z = newz;
}


/* now apply rotations rot1 and rot2 to circlepoints    */
/* These are stolen from the Starch code, so they    */
/* should work...                                                  */
rot1 = -arc->rot1 * M_PI / 180.0;
rot2 = arc->rot2 * M_PI / 180.0;
tcos = cos(rot1);
tsin = sin(rot1);

/* around y */
newx = start.x * tcos - start.z * tsin;
newz = start.x * tsin + start.z * tcos;
start.x = newx;
start.z = newz;
newx = end.x * tcos - end.z * tsin;
newz = end.x * tsin + end.z * tcos;
end.x = newx;
```

```
end.z = newz;


tcos = cos(rot2);
tsin = sin(rot2);
/* around z */
newx = start.x * tcos - start.y * tsin;
newy = start.x * tsin + start.y * tcos;
start.x = newx;
start.y = newy;
newx = end.x * tcos - end.y * tsin;
newy = end.x * tsin + end.y * tcos;
end.x = newx;
end.y = newy;

/* now translate back to unrotated centerpoint   */
start.x += (double)arc->center_world.x;
start.y += (double)arc->center_world.y;
start.z += (double)arc->center_world.z;

end.x += (double)arc->center_world.x;
end.y += (double)arc->center_world.y;
end.z += (double)arc->center_world.z;

/* NOW, FILL THE SOAP_ARC START STOP POINT FIELDS */
transfer_fpoint(&(arc->p1), &start);

transfer_fpoint(&(arc->p2), &end);

}

/*-----------------------------------------------------------*/
/*
** Put polygon elements in order.
*/

void edge_order(edgelist_pointer, part)
Edgelist    *edgelist_pointer;
Part            *part;
{
```

```
  Edgelist  *edge_top, *edgetemp, *ep1;
  short     elcount, i, j, offset, offtemp, eps,
                 matchflag, matchinsert, index, lastmatch;
  FPoint    refvert, matchvert1, matchvert2;
  Soap_Line         *lineptr;
  Soap_Arc *arcptr;
  double    epsx, epsy, epsz;
  Edgelist  *edgedan;
  short     offdan, d;

   edge_top = edgelist_pointer;
   elcount = get_edgelist_element_count(edgelist_pointer);
#ifdef DEBUG
printf("\n************PART %s, STATUS: %lx", part->nodename,
(long)((*edge_top)->status & GEOMASK));
#endif

  /* find middle element and put at beginning of list        */
  if (((*edge_top)->status & GEOMASK) == SOAP_CONNECT ||
          ((*edge_top)->status & GEOMASK) == SOAP_SWEEP ||
          ((*edge_top)->status & GEOMASK) == SOAP_ROTSWEEP) {
    if (get_edgelist_line_count(edge_top) &&
              (get_edgelist_element_count(edge_top) & 1)) {
             check_half_and_swap(edge_top, part);
    }
  }

#ifdef DEBUG
   edgetemp = edgelist_pointer;
  offset = 0;
  for (i=0; i<elcount; ++i) {
          if (offset == LIST_SIZE - 1) {
             edgetemp = (Edgelist *)*edgetemp;
             offset = 0;
             --i;       /* this one doesn't count! */
             continue;
          }
          if (((*edgetemp)->status & ELEMMASK) == SOAP_LINE) {
             lineptr = (Soap_Line *)*edgetemp;
```

```
            printf("\nXXL:p1 %f %f %f, p2 %f %f %f",
              lineptr->p1.x, lineptr->p1.y, lineptr->p1.z,
              lineptr->p2.x, lineptr->p2.y, lineptr->p2.z);
        } else {
            arcptr = (Soap_Arc *)*edgetemp;
             fill_arc_start_stop(arcptr);
            printf("\nXXA:p1 %f %f %f, p2 %f %f %f",
             arcptr->p1.x, arcptr->p1.y, arcptr->p1.z,
             arcptr->p2.x, arcptr->p2.y, arcptr->p2.z);
        }

        ++edgetemp;
        ++offset;
  }
#endif

  offset = 0;
  matchinsert = NO;
  matchflag = YES;                /* fake it for entry state */

  for (i=0; i<elcount; ++i) {
        if (offset == LIST_SIZE - 1) {
            edgelist_pointer = (Edgelist *)*edgelist_pointer;
            offset = 0;
            --i;        /* this one doesn't count! */
            continue;
        }

        /* get a reference vertex                          */
        if (!matchflag)
            edgetemp = edge_top;
        else
            edgetemp = edgelist_pointer;

        if (!matchflag) {
            matchinsert = YES;
        }

        if (((*edgetemp)->status & ELEMMASK) == SOAP_LINE) {
            lineptr = (Soap_Line *)*edgetemp;
```

```
            if (!i) {
                if (check_not_isolated(edge_top) == 1) {
                        transfer_fpoint(&refvert, &(lineptr->p1));

                        lineptr->status |= P1MASK;
#ifdef DEBUG
printf("\nSTARTING WITH p1");
#endif
                } else {
                        transfer_fpoint(&refvert, &(lineptr->p2));

                        lineptr->status |= P2MASK;
#ifdef DEBUG
printf("\nSTARTING WITH p2");
#endif
                }
            } else if (((lineptr->status) & MATCHMASK) == P1MASK) {
                    /* p1 was matched, use p2 */
                    transfer_fpoint(&refvert,  &(lineptr->p2));

            } else { /* use p1, by design */
                    transfer_fpoint(&refvert,  &(lineptr->p1));

            }
        } else if (((*edgetemp)->status & ELEMMASK) == SOAP_ARC) {
            arcptr = (Soap_Arc *)*edgetemp;
             fill_arc_start_stop(arcptr);

            if (!i) {
                if (check_not_isolated(edge_top) == 1) {
                        transfer_fpoint(&refvert, &(arcptr->p1));
                        arcptr->status |= P1MASK;
                } else {
                        transfer_fpoint(&refvert, &(arcptr->p2));
                        arcptr->status |= P2MASK;
                }
            } else if (((arcptr->status) & MATCHMASK) == P1MASK) {
                    /* p1 was matched. Use p2   */
```

```
                transfer_fpoint(&refvert, &(arcptr->p2));

        } else { /* use p1, by design */
                transfer_fpoint(&refvert, &(arcptr->p1));

        }
      } else {
        printf("\nHORRIBLE ERROR");
        SLAM;
        exit(0);
      }
#ifdef DEBUG
printf("\nREFVERT: %f %f %f",refvert.x, refvert.y, refvert.z);
SLAM;
#endif
      /* find a matching vertex. Doesn't matter which way */
      /* we go, since SWIVEL has no CW/CCW convention... */
      /* (Yes it does.) */
      offtemp = offset + 1;
      edgetemp = edgelist_pointer + 1;

      /* set up a n+1 reference for swap...              */
      if ((i + 1) != elcount) {
        if (offtemp == LIST_SIZE - 1) {
                ep1 = (Edgelist *)*edgetemp;
        } else {
                ep1 = edgetemp;
        }
      }

      /* now compare vertices...                              */
      matchflag = NO;
      lastmatch = NO;

      for (eps = 0; eps < MAX_EPS_RANGE; ++eps) {
      epsx = epsy = epsz = (double)eps;
      offtemp = offset + 1;
      edgetemp = edgelist_pointer + 1;

      for (j=i+1; j<elcount; ++j) {
```

```
		if (offtemp == LIST_SIZE - 1) {
			edgetemp = (Edgelist *)*edgetemp;
			offtemp = 0;
			--j;
			continue;
		}
		if (((*edgetemp)->status & ELEMMASK) == SOAP_LINE) {
			lineptr = (Soap_Line *)*edgetemp;
			transfer_fpoint(&matchvert1, &(lineptr->p1));
			transfer_fpoint(&matchvert2, &(lineptr->p2));
		} else if (((*edgetemp)->status & ELEMMASK) == SOAP_ARC) {
			arcptr = (Soap_Arc *)*edgetemp;
			fill_arc_start_stop(arcptr);
			transfer_fpoint(&matchvert1, &(arcptr->p1));
			transfer_fpoint(&matchvert2, &(arcptr->p2));
		}
#ifdef DEBUG
printf("\n*****matchinsert %d", matchinsert);
printf("\nEPSILON: %f",epsx);
printf("\nMATCHVERT1: %f %f %f",matchvert1.x, matchvert1.y, matchvert1.z);
printf("\nMATCHVERT2: %f %f %f",matchvert2.x, matchvert2.y, matchvert2.z);
SLAM;
#endif
		/* now test refvert against matchverts  */
		 if (eq_epsilon_check_arg(matchvert1.x, refvert.x, epsx)
				&& eq_epsilon_check_arg(matchvert1.y, refvert.y, epsy)
				&& eq_epsilon_check_arg(matchvert1.z, refvert.z, epsz)) {
			/* found a match! */
			lastmatch = YES;
			if (ep1 != edgetemp && !matchinsert) {
			    swap_elements(edge_top, *ep1, *edgetemp);
			} else if (matchinsert) {
			   /* insert a dummy element and then swap it        */
			   /* and then delete it finally...                  */
			   index = find_free_line();
			    insert_line(edge_top, index, 0);
			   if (offtemp + 1 == LIST_SIZE - 1) {
				edgedan = (Edgelist *)*(edgetemp + 1);
			   } else {
```

```
                    edgedan = edgetemp + 1;
                }
                swap_elements(edge_top, *edge_top, *edgedan);
                delete_line(edge_top, index, part);
                (*edge_top)->status |= P1MASK;
            }
            if (!matchinsert) { /* can only reverse direction once! */
                matchflag = YES;
                (*ep1)->status |= P1MASK;
            }
            break;
        } else if (eq_epsilon_check_arg(matchvert2.x, refvert.x, epsx)
                && eq_epsilon_check_arg(matchvert2.y, refvert.y, epsy)
                && eq_epsilon_check_arg(matchvert2.z, refvert.z, epsz)) {
            /* found a match! */
            lastmatch = YES;
            if (ep1 != edgetemp && !matchinsert) {
                swap_elements(edge_top, *ep1, *edgetemp);
            } else if (matchinsert) {
                /* insert a dummy element and then swap it        */
                /* and then delete it finally...                   */
                index = find_free_line();
#ifdef DEBUG
printf("\nindex=%d",index);
#endif
                insert_line(edge_top, index, 0);
                if (offtemp + 1 == LIST_SIZE - 1) {
                        edgedan = (Edgelist *)*(edgetemp + 1);
                } else {
                        edgedan = edgetemp + 1;
                }
#ifdef DEBUG
printf("\nedgetemp + 1 = %d",get_line_index((Soap_Line *)*edgedan));
#endif

                swap_elements(edge_top, *edge_top, *edgedan);
                delete_line(edge_top, index, part);
                (*edge_top)->status |= P2MASK;
#ifdef DEBUG
  edgedan = edge_top;
```

```
  offdan = 0;
  for (d=0; d<elcount; ++d) {
            if (offdan == LIST_SIZE - 1) {
              edgedan = (Edgelist *)*edgedan;
              offdan = 0;
              --d;          /* this one doesn't count! */
              continue;
            }
            if (((*edgedan)->status & ELEMMASK) == SOAP_LINE) {
              lineptr = (Soap_Line *)*edgedan;
              printf("\nQQL:p1 %f %f %f, p2 %f %f %f",
                lineptr->p1.x, lineptr->p1.y, lineptr->p1.z,
                lineptr->p2.x, lineptr->p2.y, lineptr->p2.z);
            } else {
              arcptr = (Soap_Arc *)*edgedan;
              printf("\nQQA:p1 %f %f %f, p2 %f %f %f",
                arcptr->p1.x, arcptr->p1.y, arcptr->p1.z,
                arcptr->p2.x, arcptr->p2.y, arcptr->p2.z);
            }

            ++edgedan;
            ++offdan;
  }
#endif
                        }
                        if (!matchinsert) {
                          matchflag = YES;
                          (*ep1)->status |= P2MASK;
                        }
                        break;
              }
              ++edgetemp;
              ++offtemp;
            }
            if (!lastmatch) {
#ifdef DEBUG
              if (!matchinsert && i == elcount / 2) {
printf("\nFIRST AFTER FIRST: BREAK!!!!!!!!!!!!!!!!!!!!!!!!");
SLAM;
```

```
            }
#endif
/* NOTE: The other way this might work is to check this after the
20 iterations of epsilon, instead of at the very beginning...    */

            if (!matchinsert && i == elcount / 2)
                    /* if failure at halfway point, reverse insert        */
                    break;
          } else
            break;
          }
          /* increment when in insert mode too! */
          if (matchflag || matchinsert) {
             ++edgelist_pointer;
             ++offset;
          } else {
             --i;
          }
   }
#ifdef DEBUG
   edgetemp = edge_top;
   offset = 0;
   for (i=0; i<elcount; ++i) {
          if (offset == LIST_SIZE - 1) {
             edgetemp = (Edgelist *)*edgetemp;
             offset = 0;
             --i;        /* this one doesn't count! */
             continue;
          }
          if (((*edgetemp)->status & ELEMMASK) == SOAP_LINE) {
             lineptr = (Soap_Line *)*edgetemp;
             printf("\nZBL:p1 %f %f %f, p2 %f %f %f",
               lineptr->p1.x, lineptr->p1.y, lineptr->p1.z,
               lineptr->p2.x, lineptr->p2.y, lineptr->p2.z);
          } else {
             arcptr = (Soap_Arc *)*edgetemp;
             printf("\nZBA:p1 %f %f %f, p2 %f %f %f",
              arcptr->p1.x, arcptr->p1.y, arcptr->p1.z,
              arcptr->p2.x, arcptr->p2.y, arcptr->p2.z);
```

```
            }

            ++edgetemp;
            ++offset;
  }
#endif

#ifdef OLD
  /* BEFORE LEAVING, CHECK LOOPS FOR SWEEP TYPE!! */
  if (((*edge_top)->status & GEOMASK) == SOAP_CONNECT ||
            ((*edge_top)->status & GEOMASK) == SOAP_SWEEP ||
            ((*edge_top)->status & GEOMASK) == SOAP_ROTSWEEP) {
            if (get_edgelist_line_count(edge_top) &&
               (get_edgelist_element_count(edge_top) & 1)) {
               loop_check(edge_top, part);
            }
  }
#endif

#ifdef DEBUG
  edgetemp = edge_top;
  offset = 0;
  while (*edgetemp != ELEMNULL) {
            if (offset == LIST_SIZE - 1) {
               edgetemp = (Edgelist *)*edgetemp;
               offset = 0;
               continue;
            }

            if (((*edgetemp)->status & ELEMMASK) == SOAP_LINE) {
               lineptr = (Soap_Line *)*edgetemp;
               printf("\nZAL:p1 %f %f %f, p2 %f %f %f",
                 lineptr->p1.x, lineptr->p1.y, lineptr->p1.z,
                 lineptr->p2.x, lineptr->p2.y, lineptr->p2.z);
printf("\nSTATUS: %d", lineptr->status);
SLAM;
            } else {
               arcptr = (Soap_Arc *)*edgetemp;
               printf("\nZAA:p1 %f %f %f, p2 %f %f %f",
                 arcptr->p1.x, arcptr->p1.y, arcptr->p1.z,
```

```
                arcptr->p2.x, arcptr->p2.y, arcptr->p2.z);
printf("\nSTATUS: %d", arcptr->status);
SLAM;
            }


            ++edgetemp;
            ++offset;
  }
#endif
}

/*--------------------------------------------------------------*/
/*
** GET RID OF DUPLICATE ENTITIES
*/

void delete_duplicates(edgelist_pointer, part)
Edgelist    *edgelist_pointer;
Part            *part;
{
  Edgelist  *edgetemp, *edge_top;
  short     offset, offtemp, index;
  Soap_Line             *lineptr, *lineptr2;
  Soap_Arc *arcptr, *arcptr2;


  edge_top = edgelist_pointer;
  offset = 0;

  while (*edgelist_pointer != ELEMNULL) {
            if (offset == LIST_SIZE - 1) {
                edgelist_pointer = (Edgelist *)*edgelist_pointer;
                offset = 0;
                continue;
            }

            /* figure out what we have...                          */
            if (((*edgelist_pointer)->status & ELEMMASK) == SOAP_LINE) {
```

```
  lineptr = (Soap_Line *)*edgelist_pointer;
  arcptr = ARCNULL;
} else if (((*edgelist_pointer)->status & ELEMMASK) == SOAP_ARC) {
  arcptr = (Soap_Arc *)*edgelist_pointer;
  lineptr = LINENULL;
} else {
  printf("\nAWESOMELY UNHOLY ERROR!");
  exit(0);
}

/* now go through the rest of the list...                    */
offtemp = offset + 1;
if (offtemp == LIST_SIZE - 1) {
  if (*(edgelist_pointer + 1) != ELEMNULL) {
        edgetemp = (Edgelist *)*(edgelist_pointer + 1);
        offtemp = 0;
  } else {
        edgetemp = edgelist_pointer + 1;
  }
} else {
  edgetemp = edgelist_pointer + 1;
}

while (*edgetemp != ELEMNULL) {
  if (offtemp == LIST_SIZE - 1) {
        edgetemp = (Edgelist *)*edgetemp;
        offtemp = 0;
        continue;
  }

  /* figure out what we have...                              */
  if (((*edgetemp)->status & ELEMMASK) == SOAP_LINE) {
        lineptr2 = (Soap_Line *)*edgetemp;
        arcptr2 = ARCNULL;
  } else if (((*edgetemp)->status & ELEMMASK) == SOAP_ARC) {
        arcptr2 = (Soap_Arc *)*edgetemp;
        lineptr2 = LINENULL;
  } else {
        printf("\nAWESOMELY UNHOLY ERROR (PART 2)!");
        exit(0);
```

```
}

if (lineptr != LINENULL && lineptr2 != LINENULL) {
        /* check for duplicate line...                              */
        /* remember, endpoints haven't been re-ordered yet! */
        if (eq_epsilon_accurate(lineptr->p1.x, lineptr2->p1.x)
                && eq_epsilon_accurate(lineptr->p1.y, lineptr2->p1.y)
                && eq_epsilon_accurate(lineptr->p1.z, lineptr2->p1.z)
                && eq_epsilon_accurate(lineptr->p2.x, lineptr2->p2.x)
                && eq_epsilon_accurate(lineptr->p2.y, lineptr2->p2.y)
                && eq_epsilon_accurate(lineptr->p2.z, lineptr2->p2.z)) {
          index = get_line_index(lineptr2);
          delete_line(edge_top, index, part);
          continue; /* list has been closed up. don't inc */
        } else if (eq_epsilon_accurate(lineptr->p1.x, lineptr2->p2.x)
                && eq_epsilon_accurate(lineptr->p1.y, lineptr2->p2.y)
                && eq_epsilon_accurate(lineptr->p1.z, lineptr2->p2.z)
                && eq_epsilon_accurate(lineptr->p2.x, lineptr2->p1.x)
                && eq_epsilon_accurate(lineptr->p2.y, lineptr2->p1.y)
                && eq_epsilon_accurate(lineptr->p2.z, lineptr2->p1.z)) {
          index = get_line_index(lineptr2);
          delete_line(edge_top, index, part);
          continue; /* list has been closed up. don't inc */
        }
} else if (arcptr != ARCNULL && arcptr2 != ARCNULL) {
        /* check for duplicate arc...            */
        if (eq_epsilon_accurate(arcptr->center_world.x,
                              arcptr2->center_world.x)
                && eq_epsilon_accurate(arcptr->center_world.y,
                                      arcptr2->center_world.y)
                && eq_epsilon_accurate(arcptr->center_world.z,
                                      arcptr2->center_world.z)
                && arcptr->radius == arcptr2->radius
                && ( (arcptr->start_angle == arcptr2->start_angle
                  && arcptr->offset_angle == arcptr2->offset_angle)
                  || (arcptr->start_angle == (arcptr2->start_angle
                                                  + arcptr2->offset_angle)
                  && arcptr->offset_angle ==
                  -(arcptr2->offset_angle)) )) {
```

```
                        index = get_arc_index(arcptr2);
                        delete_arc(edge_top, index, part);
                        continue;
                    }
            }
            ++edgetemp;
            ++offtemp;
        }
        ++edgelist_pointer;
        ++offset;
  }
}

/*------------------------------------------------------------*/
/*
** ONLY CALLED FOR ODD-NUMBERED CONNECT-TYPE EDGELISTS
** IMPETUS FOR THIS ROUTINE IS THAT A VERTEX WITH THREE EMANATING
** EDGES CAN BE CREATED BY THICKNESS CODE, SO THE LOOPS MIGHT BE
** IN OPPOSITE ORDERS ON EITHER SIDE OF THE CONNECTING EDGE.
** CALL THIS **BEFORE** ORDERING VERTICES OF EDGES...
*/
void loop_check(edgeptr, part)
Edgelist   *edgeptr;
Part        *part;
{
  short     offset, elemcount, i, j, k, listsize,
                  backward_off, forward_off, arccount, tempoffset;
  Soap_Line       *lineptr;
  Soap_Arc *arcptr;
  Edgelist  *edge_top;
  Polylist  *polyptr;
  FPoint    p1, p2, p3, p4;
  short     offang[2];
  Soap_Line       linep[MAX_CONNECT];
  Element   *elemtemp;
  Element   *elptr[MAX_CONNECT];


  edge_top = edgeptr;
  listsize = get_edgelist_element_count(edgeptr);
```

```
arccount = get_edgelist_arc_count(edgeptr);

/* HACK THIS FOR A SWEEP OF TWO ARC SEGMENTS OR FULL CIRCLES... */
if (listsize == 3 && arccount == 2) {
        /* ASSUME START AND END ARE THE SAME FOR BOTH ARCS!!!            */
        elemcount = offset = 0;
        while (*edgeptr != ELEMNULL) {
          if (offset == LIST_SIZE - 1) {
                  edgeptr = (Edgelist *)*edgeptr;
                  offset = 0;
                  continue;
          }

          if (((*edgeptr)->status & ELEMMASK) == SOAP_ARC) {
                  arcptr = (Soap_Arc *)*edgeptr;

                  elptr[elemcount] = *edgeptr;
                  offang[elemcount++] = arcptr->offset_angle;
          }
          ++edgeptr;
          ++offset;
        }
        if (offang[0] == offang[1]) {
          arcptr = (Soap_Arc *)elptr[0]; /* arbitrary */
          arcptr->offset_angle = -arcptr->offset_angle;
        }
        if (((*edge_top)->status & GEOMASK) != SOAP_CONNECT)
          return;

        /* Now Reverse everything based on orientation of  */
        /* parent polygon pair...                          */
        polyptr = part->parent->poly_top;
        if (polyptr == POLYNULL)
          return;

        if (*polyptr == EDGENULL)
          return;

        edgeptr = *polyptr;
```

```
            if (*edgeptr == ELEMNULL)
               return;

            if (((*edgeptr)->status & ELEMMASK) != SOAP_ARC)
               return; /* error */

            arcptr = (Soap_Arc *)*edgeptr;
            if (arcptr->offset_angle > 0) {
               arcptr = (Soap_Arc *)elptr[0];
               arcptr->offset_angle = -arcptr->offset_angle;
               arcptr = (Soap_Arc *)elptr[1];
               arcptr->offset_angle = -arcptr->offset_angle;
            }

            return;
}

offset = 0;
elemcount = 0;

while (*edgeptr != ELEMNULL) {
            if (offset == LIST_SIZE - 1) {
               edgeptr = (Edgelist *)*edgeptr;
               offset = 0;
               continue;
            }

            if (((*edgeptr)->status & ELEMMASK) == SOAP_LINE) {
               lineptr = (Soap_Line *)*edgeptr;

                transfer_fpoint(&(linep[elemcount].p1), &(lineptr->p1));

                transfer_fpoint(&(linep[elemcount].p2), &(lineptr->p2));

               elptr[elemcount] = *edgeptr;
            } else if (((*edgeptr)->status & ELEMMASK) == SOAP_ARC) {
               arcptr = (Soap_Arc *)*edgeptr;
```

```
			/* go from center to midway along arc			*/
			/* to handle full circle arc cases			*/
			/* Otherwise p1 to p2					*/

			 fill_arc_start_stop(arcptr);

			if ((arcptr->offset_angle % 360) == 0) {
				transfer_fpoint(&(linep[elemcount].p1), &(arcptr->p1));
				transfer_fpoint(&(linep[elemcount].p2),
							&(arcptr->center_world));
			} else {
				transfer_fpoint(&(linep[elemcount].p1), &(arcptr->p1));
				transfer_fpoint(&(linep[elemcount].p2), &(arcptr->p2));
			}

			elptr[elemcount] = *edgeptr;
		} else {
		  printf("\nROLLICKING DWARF PUS GROSS-OUT ERROR");
		  exit(0);
		}

		++edgeptr;
		++elemcount;
		++offset;
	}
#ifdef DEBUG
	for(i=0; i<elemcount; ++i) {
		printf("\nP1: %f %f %f, P2: %f %f %f",
		     linep[i].p1.x, linep[i].p1.y, linep[i].p1.z,
		     linep[i].p2.x, linep[i].p2.y, linep[i].p2.z);
	}
#endif

	/* THIS IS A MODIFICATION OF ETHAN'S FAMOUS PARALLEL TEST!	*/
	k = elemcount / 2;
	i = k - 1;
	backward_off = i;
	forward_off = (i + 2) % listsize;
	for (j=0; j < k; ++j) {
		if (!check_parallel(&(linep[backward_off]), &(linep[forward_off])) )
```

```
            break;
          forward_off = (i + j + 3)%listsize;
          backward_off = (i - j - 1) < 0 ?
                                  (i - j - 1) + listsize : (i - j - 1);
  }
#ifdef DEBUG
printf("\nK%d, I%d, J%d", k,i,j);
#endif

   /* if anything not parallel, we need to reverse one of the loops */
   /* reverse the first loop....                                    */
  if (j != k) {
#ifdef DEBUG
printf("\n------------------------------------REVERSED!");
#endif
          for (j=0; j<k/2; ++j) {
              swap_elements(edge_top, elptr[j], elptr[i - j]);
              elemtemp = elptr[j];
              elptr[j] = elptr[i - j];
              elptr[i-j] = elemtemp;
             /* !!! ONLY USING P1 -- DO P1 ONLY! */
               transfer_fpoint(&p1, &(linep[j].p1));
               transfer_fpoint(&(linep[j].p1), &(linep[i - j].p1));
              transfer_fpoint(&(linep[i - j].p1), &p1);
          }
  }

  if (((*edge_top)->status & GEOMASK) != SOAP_CONNECT)
    return;

   /* now check that the top loop goes in the same direction      */
   /* as polygon 1 of the connect....                              */
   polyptr = part->parent->poly_top;
  if (polyptr == POLYNULL)
          return;

  if (*polyptr == EDGENULL)
          return;
```

```
   edgeptr = *polyptr;
   if (*edgeptr == ELEMNULL)
             return;
#ifdef DEBUG
printf("\nDOING THE DIRTY DEED!");
printf("\nSTATUS!: %lx",(long)((*edgeptr)->status));
#endif
   if (((*edgeptr)->status & ELEMMASK) == SOAP_ARC) {
             arcptr = (Soap_Arc *)*edgeptr;
#ifdef DEBUG
printf("\nARCP1/P2: %f %f %f // %f %f %f",
arcptr->p1.x, arcptr->p1.y, arcptr->p1.z,
arcptr->p2.x, arcptr->p2.y, arcptr->p2.z);
#endif
             fill_arc_start_stop(arcptr);
#ifdef OLD
             if ((arcptr->status & SWAPMASK) == EDGESWAP)
                 transfer_fpoint(&p1, &(arcptr->p2));
             else
#endif
                 transfer_fpoint(&p1, &(arcptr->p1));
   } else if (((*edgeptr)->status & ELEMMASK) == SOAP_LINE) {
             lineptr = (Soap_Line *)*edgeptr;
#ifdef DEBUG
printf("\nLINP1/P2: %f %f %f // %f %f %f",
lineptr->p1.x, lineptr->p1.y, lineptr->p1.z,
lineptr->p2.x, lineptr->p2.y, lineptr->p2.z);
#endif
#ifdef OLD
             if ((lineptr->status & SWAPMASK) == EDGESWAP)
                 transfer_fpoint(&p1, &(lineptr->p2));
             else
#endif
                 transfer_fpoint(&p1, &(lineptr->p1));
   } else {
             return;
   }

   ++edgeptr;
#ifdef DEBUG
```

```
printf("\nSTATUS!: %lx",(long)((*edgeptr)->status));
#endif
  if (((*edgeptr)->status & ELEMMASK) == SOAP_ARC) {
            arcptr = (Soap_Arc *)*edgeptr;
            fill_arc_start_stop(arcptr);
#ifdef OLD
            if ((arcptr->status & SWAPMASK) == EDGESWAP)
               transfer_fpoint(&p2, &(arcptr->p2));
            else
#endif
               transfer_fpoint(&p2, &(arcptr->p1));
  } else if (((*edgeptr)->status & ELEMMASK) == SOAP_LINE) {
            lineptr = (Soap_Line *)*edgeptr;
#ifdef DEBUG
printf("\nLINP1/P2: %f %f %f // %f %f %f",
lineptr->p1.x, lineptr->p1.y, lineptr->p1.z,
lineptr->p2.x, lineptr->p2.y, lineptr->p2.z);
#endif
#ifdef OLD
            if ((lineptr->status & SWAPMASK) == EDGESWAP)
               transfer_fpoint(&p2, &(lineptr->p2));
            else
#endif
               transfer_fpoint(&p2, &(lineptr->p1));
  } else {
            return;
  }

  /* Now find these in p1 in top or bottom loop and see if loop  */
  /* goes in same order....                                      */
#ifdef DEBUG
printf("\nP1!!!!!: %f %f %f",p1.x, p1.y, p1.z);
#endif

  for (j=0; j<elemcount; ++j) {
            if (j == elemcount / 2)
               continue;
#ifdef DEBUG
printf("\nLINEP!!: %f %f %f",linep[j].p1.x, linep[j].p1.y, linep[j].p1.z);
```

```
#endif
            if (eq_epsilon_accurate(linep[j].p1.x, p1.x) &&
                eq_epsilon_accurate(linep[j].p1.y, p1.y) &&
                eq_epsilon_accurate(linep[j].p1.z, p1.z)) {
                /* get next element in loop! */
                if (j > elemcount / 2) {
                        k = (j + 1 - (elemcount / 2 + 1)) % (elemcount / 2);
                        k += elemcount/2 + 1;
                } else {
                        k = (j + 1) % (elemcount / 2);
                }
#ifdef DEBUG
printf("\nKKKKKKKKK: %d",k);
#endif
                if (eq_epsilon_accurate(linep[k].p1.x, p2.x) &&
                        eq_epsilon_accurate(linep[k].p1.y, p2.y) &&
                        eq_epsilon_accurate(linep[k].p1.z, p2.z)) {
#ifdef DEBUG
printf("\nREVERSING!!");
#endif
                        /* reverse both loops!                          */

                k = elemcount / 2;
                i = k - 1;
                        for (j=0; j<k/2; ++j) {
#ifdef DEBUG
printf("\n1EL1/2: %lx // %lx",elptr[j],elptr[i - j]);
#endif
                            swap_elements(edge_top, elptr[j], elptr[i - j]);
                        }
                k = elemcount;
                i = k - 1;
                        for (j=0; j<k/4; ++j) {
#ifdef DEBUG
printf("\n2EL1/2: %lx // %lx",elptr[k/2 + 1 + j], elptr[i - j]);
#endif
                            swap_elements(edge_top, elptr[k/2 + 1 + j], elptr[i - j]);
                        }
                }
                break;
```

```
            }
    }
}

/*----------------------------------------------------------*/
short check_not_isolated(edgeptr)
Edgelist    *edgeptr;
{
    short       offset, lastmatch, eps1, eps2;
    FPoint      refvert;
    Soap_Line               *lineptr;
    Soap_Arc *arcptr;
    Edgelist   *edge_top;
    double      epsx, epsy, epsz;


    edge_top = edgeptr;

    if (((*edgeptr)->status & ELEMMASK) == SOAP_LINE) {
            lineptr = (Soap_Line *)*edgeptr;
            transfer_fpoint(&refvert, &(lineptr->p1));

    } else if (((*edgeptr)->status & ELEMMASK) == SOAP_ARC) {
            arcptr = (Soap_Arc *)*edgeptr;
            transfer_fpoint(&refvert, &(arcptr->p1));

    }

    lastmatch = NO;

    for (eps1 = 0; eps1 < MAX_EPS_RANGE; ++eps1) {
            epsx = epsy = epsz = (double)eps1;

            offset = 1;
            edgeptr = edge_top + 1;
            while (*edgeptr != ELEMNULL) {
               if (offset == LIST_SIZE - 1) {
                        edgeptr = (Edgelist *)*edgeptr;
                        offset = 0;
```

```
            continue;
        }

        if (((*edgeptr)->status & ELEMMASK) == SOAP_LINE) {
            lineptr = (Soap_Line *)*edgeptr;

            if (eq_epsilon_check_arg(lineptr->p1.x, refvert.x, epsx)
             && eq_epsilon_check_arg(lineptr->p1.y, refvert.y, epsy)
             && eq_epsilon_check_arg(lineptr->p1.z, refvert.z, epsz)) {
              lastmatch = YES;
              break;
            } else if (eq_epsilon_check_arg(lineptr->p2.x, refvert.x, epsx)
             && eq_epsilon_check_arg(lineptr->p2.y, refvert.y, epsy)
             && eq_epsilon_check_arg(lineptr->p2.z, refvert.z, epsz)) {
              lastmatch = YES;
              break;
            }
        } else if (((*edgeptr)->status & ELEMMASK) == SOAP_ARC) {
            arcptr = (Soap_Arc *)*edgeptr;
            fill_arc_start_stop(arcptr);

            if (eq_epsilon_check_arg(arcptr->p1.x, refvert.x, epsx)
             && eq_epsilon_check_arg(arcptr->p1.y, refvert.y, epsy)
             && eq_epsilon_check_arg(arcptr->p1.z, refvert.z, epsz)) {
              lastmatch = YES;
              break;
            } else if (eq_epsilon_check_arg(arcptr->p2.x, refvert.x, epsx)
             && eq_epsilon_check_arg(arcptr->p2.y, refvert.y, epsy)
             && eq_epsilon_check_arg(arcptr->p2.z, refvert.z, epsz)) {
              lastmatch = YES;
              break;
            }
        }

        ++edgeptr;
        ++offset;
    }

    if (lastmatch)
```

```
}

edgeptr = edge_top;

if (((*edgeptr)->status & ELEMMASK) == SOAP_LINE) {
          lineptr = (Soap_Line *)*edgeptr;
          transfer_fpoint(&refvert, &(lineptr->p2));

} else if (((*edgeptr)->status & ELEMMASK) == SOAP_ARC) {
          arcptr = (Soap_Arc *)*edgeptr;
          transfer_fpoint(&refvert, &(arcptr->p2));

}

lastmatch = NO;

for (eps2 = 0; eps2 < MAX_EPS_RANGE; ++eps2) {
          epsx = epsy = epsz = (double)eps2;

          offset = 1;
          edgeptr = edge_top + 1;
          while (*edgeptr != ELEMNULL) {
            if (offset == LIST_SIZE - 1) {
                      edgeptr = (Edgelist *)*edgeptr;
                      offset = 0;
                      continue;
            }

            if (((*edgeptr)->status & ELEMMASK) == SOAP_LINE) {
                      lineptr = (Soap_Line *)*edgeptr;

                      if (eq_epsilon_check_arg(lineptr->p1.x, refvert.x, epsx)
                       && eq_epsilon_check_arg(lineptr->p1.y, refvert.y, epsy)
                       && eq_epsilon_check_arg(lineptr->p1.z, refvert.z, epsz)) {
                        lastmatch = YES;
                        break;
                      } else if (eq_epsilon_check_arg(lineptr->p2.x, refvert.x, epsx)
                       && eq_epsilon_check_arg(lineptr->p2.y, refvert.y, epsy)
                       && eq_epsilon_check_arg(lineptr->p2.z, refvert.z, epsz)) {
```

```
                        lastmatch = YES;
                        break;
                    }
            } else if (((*edgeptr)->status & ELEMMASK) == SOAP_ARC) {
                    arcptr = (Soap_Arc *)*edgeptr;
                    fill_arc_start_stop(arcptr);

                    if (eq_epsilon_check_arg(arcptr->p1.x, refvert.x, epsx)
                     && eq_epsilon_check_arg(arcptr->p1.y, refvert.y, epsy)
                     && eq_epsilon_check_arg(arcptr->p1.z, refvert.z, epsz)) {
                        lastmatch = YES;
                        break;
                    } else if (eq_epsilon_check_arg(arcptr->p2.x, refvert.x, epsx)
                     && eq_epsilon_check_arg(arcptr->p2.y, refvert.y, epsy)
                     && eq_epsilon_check_arg(arcptr->p2.z, refvert.z, epsz)) {
                        lastmatch = YES;
                        break;
                    }
            }
            ++edgeptr;
            ++offset;
        }

        if (lastmatch)
            break;
  }

  if (eps1 < eps2)
        return(1);
  else
        return(2);
}

/*-------------------------------------------------------------*/
/*
** ONLY CALLED FOR ODD-NUMBERED CONNECT-TYPE EDGELISTS
** FIND THE EDGE WITH THREE EDGES EMANATING FROM BOTH ENDPOINTS.
** CALL THIS **BEFORE** ORDERING EDGES...
*/
```

```
void check_half_and_swap(edgeptr, part)
Edgelist   *edgeptr;
Part            *part;
{
  short     offset, lastmatch1, lastmatch2, eps1, eps2,
                    curoff, offtemp, eps1val[2], eps2val[2],
                    epsadd[MAX_CONNECT], addcount, minval, i,
                    arccount, linecount;
  FPoint   refvert;
  Soap_Line           *lineptr;
  Soap_Arc *arcptr;
  Edgelist  *edge_top, *edgetemp, *lastedge, *epsptr[MAX_CONNECT];
  double    epsx, epsy, epsz;

#ifdef DEBUG
printf("\nSWAP:NODENAME %s",part->nodename);
#endif

  /*SPECIAL CASE: 2 arcs and a line */
   arccount = get_edgelist_arc_count(edgeptr);
   linecount = get_edgelist_line_count(edgeptr);

  if (arccount == 2 && linecount == 1) {
           edge_top = edgeptr;
           offset = 0;
           while (*edgeptr != ELEMNULL) {
             if (offset == LIST_SIZE - 1) {
                    edgeptr = (Edgelist *)*edgeptr;
                    offset = 0;
                    continue;
             }
             if (((*edgeptr)->status & ELEMMASK) == SOAP_LINE) {
                    if (edgeptr == edge_top)
                      return;
                    swap_elements(edge_top, *edgeptr, *edge_top);
                    return;
             }
             ++edgeptr;
             ++offset;
           }
```

```
            return;
    }

    edge_top = edgeptr;
    addcount = 0;
    offset = 0;

    while (*edgeptr != ELEMNULL) {
            if (offset == LIST_SIZE - 1) {
                edgeptr = (Edgelist *)*edgeptr;
                offset = 0;
                continue;
            }

        if (((*edgeptr)->status & ELEMMASK) == SOAP_LINE) {
                lineptr = (Soap_Line *)*edgeptr;
                transfer_fpoint(&refvert, &(lineptr->p1));
            } else if (((*edgeptr)->status & ELEMMASK) == SOAP_ARC) {
                arcptr = (Soap_Arc *)*edgeptr;
                fill_arc_start_stop(arcptr);
                transfer_fpoint(&refvert, &(arcptr->p1));
            }
#ifdef DEBUG
printf("\nREFVERT: %f %f %f",refvert.x, refvert.y, refvert.z);
#endif
            lastmatch1 = NO;
            lastedge = EDGENULL;

            for (eps1 = 0; eps1 < MAX_EPS_RANGE; ++eps1) {
                epsx = epsy = epsz = (double)eps1;
#ifdef DEBUG
printf("\n%f %f %f ==================",epsx,epsy,epsz);
#endif
                offtemp = 0;
                edgetemp = edge_top;
                while (*edgetemp != ELEMNULL) {
                        if (offtemp == LIST_SIZE - 1) {
                            edgetemp = (Edgelist *)*edgetemp;
                            offtemp = 0;
```

```
            continue;
         }
         if (edgetemp == edgeptr || edgetemp == lastedge) {
            ++edgetemp;
            ++offtemp;
            continue;
   }
         if (((*edgetemp)->status & ELEMMASK) == SOAP_LINE) {
            lineptr = (Soap_Line *)*edgetemp;

             if (eq_epsilon_check_arg(lineptr->p1.x, refvert.x, epsx)
                        && eq_epsilon_check_arg(lineptr->p1.y,
                                                        refvert.y, epsy)
                        && eq_epsilon_check_arg(lineptr->p1.z,
                                                        refvert.z, epsz)) {
                     eps1val[lastmatch1] = eps1;
                     ++lastmatch1;
            } else if (eq_epsilon_check_arg(lineptr->p2.x,
                                                        refvert.x, epsx)
                        && eq_epsilon_check_arg(lineptr->p2.y,
                                                        refvert.y, epsy)
                        && eq_epsilon_check_arg(lineptr->p2.z,
                                                        refvert.z, epsz)) {
                     eps1val[lastmatch1] = eps1;
                     ++lastmatch1;
            }
         } else if (((*edgetemp)->status & ELEMMASK) == SOAP_ARC) {
            arcptr = (Soap_Arc *)*edgetemp;
             fill_arc_start_stop(arcptr);

             if (eq_epsilon_check_arg(arcptr->p1.x, refvert.x, epsx)
                        && eq_epsilon_check_arg(arcptr->p1.y,
                                                        refvert.y, epsy)
                        && eq_epsilon_check_arg(arcptr->p1.z,
                                                        refvert.z, epsz)) {
                     eps1val[lastmatch1] = eps1;
                     ++lastmatch1;
            } else if (eq_epsilon_check_arg(arcptr->p2.x,
                                                        refvert.x, epsx)
                        && eq_epsilon_check_arg(arcptr->p2.y,
```

```
                                        refvert.y, epsy)
                    && eq_epsilon_check_arg(arcptr->p2.z,
                                        refvert.z, epsz)) {
                    eps1val[lastmatch1] = eps1;
                    ++lastmatch1;
                }
            }
            if (lastmatch1 == 1 && lastedge == EDGENULL) {
                lastedge = edgetemp;
            } else if (lastmatch1 == 2) {
                break;
            }

            ++edgetemp;
            ++offtemp;
        }
        if (lastmatch1 == 2) {
            if (eps1val[1] - eps1val[0] > 4) {
                lastedge = EDGENULL;
                lastmatch1 = NO;
                continue;
            }
            break;
        }
    } /* for EPS_RANGE */


if (((*edgeptr)->status & ELEMMASK) == SOAP_LINE) {
        lineptr = (Soap_Line *)*edgeptr;
        transfer_fpoint(&refvert, &(lineptr->p2));
    } else if (((*edgeptr)->status & ELEMMASK) == SOAP_ARC) {
        arcptr = (Soap_Arc *)*edgeptr;
        fill_arc_start_stop(arcptr);
        transfer_fpoint(&refvert, &(arcptr->p2));
    }

    lastmatch2 = NO;
    lastedge = EDGENULL;
```

```
for (eps2 = 0; eps2 < MAX_EPS_RANGE; ++eps2) {
  epsx = epsy = epsz = (double)eps2;

  offtemp = 0;
  edgetemp = edge_top;
  while (*edgetemp != ELEMNULL) {
          if (offtemp == LIST_SIZE - 1) {
             edgetemp = (Edgelist *)*edgetemp;
             offtemp = 0;
             continue;
          }
          if (edgetemp == edgeptr || edgetemp == lastedge) {
             ++edgetemp;
             ++offtemp;
             continue;
          }

          if (((*edgetemp)->status & ELEMMASK) == SOAP_LINE) {
             lineptr = (Soap_Line *)*edgetemp;

              if (eq_epsilon_check_arg(lineptr->p1.x, refvert.x, epsx)
                      && eq_epsilon_check_arg(lineptr->p1.y,
                                                      refvert.y, epsy)
                      && eq_epsilon_check_arg(lineptr->p1.z,
                                                      refvert.z, epsz)) {
                    eps2val[lastmatch2] = eps2;
                    ++lastmatch2;
              } else if (eq_epsilon_check_arg(lineptr->p2.x,
                                                      refvert.x, epsx)
                      && eq_epsilon_check_arg(lineptr->p2.y,
                                                      refvert.y, epsy)
                      && eq_epsilon_check_arg(lineptr->p2.z,
                                                      refvert.z, epsz)) {
                    eps2val[lastmatch2] = eps2;
                    ++lastmatch2;
            }
          } else if (((*edgetemp)->status & ELEMMASK) == SOAP_ARC) {
             arcptr = (Soap_Arc *)*edgetemp;
              fill_arc_start_stop(arcptr);
```

```
if (eq_epsilon_check_arg(arcptr->p1.x, refvert.x, epsx)
        && eq_epsilon_check_arg(arcptr->p1.y,
                                refvert.y, epsy)
        && eq_epsilon_check_arg(arcptr->p1.z,
                                refvert.z, epsz)) {
    eps2val[lastmatch2] = eps2;
    ++lastmatch2;
} else if (eq_epsilon_check_arg(arcptr->p2.x,
                                refvert.x, epsx)
        && eq_epsilon_check_arg(arcptr->p2.y,
                                refvert.y, epsy)
        && eq_epsilon_check_arg(arcptr->p2.z,
                                refvert.z, epsz)) {
    eps2val[lastmatch2] = eps2;
    ++lastmatch2;
}
}
if (lastmatch2 == 1 && lastedge == EDGENULL) {
    lastedge = edgetemp;
} else if (lastmatch2 == 2) {
    break;
}
++edgetemp;
++offtemp;
}

if (lastmatch2 == 2) {
    if (eps2val[1] - eps2val[0] > 4) {
        lastedge = EDGENULL;
        lastmatch2 = NO;
        continue;
    }
    break;
}
} /* FOR EPS2 RANGE */

#ifdef DEBUG
printf("\nLASTMATCH1: %d (2?), LASTMATCH2: %d (2?)",lastmatch1,lastmatch2);
SLAM;
```

```
#endif
            if (lastmatch1 == 2 && lastmatch2 == 2) {
              epsadd[addcount] = eps1val[0] + eps1val[1]
                                             + eps2val[0] + eps2val[1];
              epsptr[addcount++] = edgeptr;
#ifdef DEBUG
if (((*edgeptr)->status & ELEMMASK) == SOAP_LINE) {

            lineptr = (Soap_Line *)*edgeptr;

printf("\nL1: p1 %f %f %f, p2 %f %f %f",
lineptr->p1.x, lineptr->p1.y, lineptr->p1.z,
lineptr->p2.x, lineptr->p2.y, lineptr->p2.z);
printf("\nINDEX: %d", get_line_index(lineptr));
} else {
   arcptr = (Soap_Arc *)*edgeptr;
printf("\nA1: p1 %f %f %f, p2 %f %f %f",
arcptr->p1.x, arcptr->p1.y, arcptr->p1.z,
arcptr->p2.x, arcptr->p2.y, arcptr->p2.z);
printf("\nINDEX: %d", get_arc_index(arcptr));

}
printf("\nEPSADD: %d / 1: %d %d, 2: %d %d",epsadd[addcount-1],
eps1val[0], eps1val[1], eps2val[0], eps2val[1]);
#endif
            }

            ++edgeptr;
            ++offset;
   } /* FOR ALL EDGES */

   if (addcount) {
            minval = 32000;
            for (i=0; i<addcount; ++i) {
              if (minval > epsadd[i]) {
                        minval = epsadd[i];
                        edgeptr = epsptr[i];
              }
            }
```

```
#ifdef DEBUG
if (((*edgeptr)->status & ELEMMASK) == SOAP_LINE) {

            lineptr = (Soap_Line *)*edgeptr;

printf("\nL1: p1 %f %f %f, p2 %f %f %f",
lineptr->p1.x, lineptr->p1.y, lineptr->p1.z,
lineptr->p2.x, lineptr->p2.y, lineptr->p2.z);
printf("\nINDEX: %d", get_line_index(lineptr));
} else {
   arcptr = (Soap_Arc *)*edgeptr;
printf("\nA1: p1 %f %f %f, p2 %f %f %f",
arcptr->p1.x, arcptr->p1.y, arcptr->p1.z,
arcptr->p2.x, arcptr->p2.y, arcptr->p2.z);
printf("\nINDEX: %d", get_arc_index(arcptr));

}
printf("\nSWAPPED FIRST WITH MIDDLE %d %d", eps1, eps2);
printf("\nEDGETOP %lx",edge_top);
#endif
            if (edgeptr == edge_top)
              return;
            swap_elements(edge_top, *edgeptr, *edge_top);
  } /* if addcount */
}

/* DO NOT PLACE ANY FUNCTIONS AFTER START OF RCS LOG!
$Log:     breeze.c,v $
 * Revision 2.7  90/10/31  18:01:44  dan
 * Calling loop check after vertices have been ordered.
 * Not checking for order swap in loop check...
 *
 * Revision 2.6  90/10/30  20:13:08  dan
 * Added call for concave check
 *
 * Revision 2.5  90/10/19  18:19:39  dan
 * Added checks for CONNECT type before loop-check endcase...
 *
 * Revision 2.4  90/10/17  14:03:37  dan
 * Loop Check is re-vamped to match connect with polygons...
```

```
* No more explicit REVERSE for connects...
*
* Revision 2.3  90/10/11  18:32:42  ethan
* fixed sweep bug in subdivide connect
*
* Revision 2.2  90/10/10  11:37:14  dan
* Added return vals for all prims, also get_unique_num for endcaps
*
* Revision 2.1  90/10/05  10:29:36  dan
* New Rev
*
* Revision 1.15  90/10/02  18:30:05  dan
* Shortened "EC1" to "1" for unique naming.
*
* Revision 1.14  90/10/01  21:40:24  dan
* Bug Fixes to loop_check and check_half_and_swap.
*
* Revision 1.13  90/09/29  11:48:25  dan
* Changed EPSILON from 1.0e-10 to 1.0e-4 (!) For parallel tests to work.
*
* Revision 1.12  90/09/29  10:59:04  dan
* Full Arc bug fixes, connect identify bug fix
*
* Revision 1.11  90/09/27  17:06:41  dan
* Fixed fan blade polygon rendering problem.
* (Cryptic enough?)
*
* Revision 1.10  90/09/27  15:16:12  dan
* Epsilon varied from 0 to EPS_MAX now instead of 2, 1, 2, ... EPS_MAX (!)
*
* Revision 1.9  90/09/25  14:10:36  dan
* Many changes: Added Stepsize, added MASK defines, general clean-up
*
* Revision 1.8  90/09/21  14:57:39  dan
* Added Connect stuff for Thickening.
*
* Revision 1.7  90/09/20  16:59:59  dan
* Took out explicit point transfering.
*
```

```
* Revision 1.6  90/09/07  17:47:08  dan
* Fixed arc/arc/connecting line sweep problem...
*
* Revision 1.5  90/09/07  11:07:53  dan
* Added translation to Constraints.
*
* Revision 1.4  90/09/06  18:08:56  dan
* More constraints stuff
*
* Revision 1.3  90/08/30  13:34:15  dan
* Fixed a sweep bug, added polygon and cleaned up cyls
*
* Revision 1.2  90/08/28  10:59:19  dan
* Put endcaps into separate parts.
*
* Revision 1.1  90/08/17  18:17:19  dan
* Initial revision
*
*/
```

| | |
|---|---|
| User: | MICRORENTMind |
| Application: | PrintMonitor |
| Document: | color.c |
| Date: | Wednesday, November 14, 1990 |
| Time: | 6:47:21 PM |
| Printer: | Peace of Mind |

```
/*
** COLOR.C
**
** Copyright 1990, by VPL Research
**
$Header: /usr/starch/source/starch/RCS/color.c,v 2.5 90/10/24 15:05:18 dan Exp $
**
*/

#include <stdio.h>
#include <gl/gl.h>
#include <gl/device.h>
#include "soap.h"
#include "prod.h"
#include "globals.h"
#include "group.h"
#include "soapxtrn.h"

#ifndef YES
#define YES          1
#define NO           0
#endif

#define   COLSIZE           10
#define ROWSIZE             9

#define VPORTSIZE    MVIEWWIDTH
#define   BLOTCHSIZE        33
#define BLOTCHSPACEX        4
#define BLOTCHSPACEY        8

#define FRAMESIZE    2

#define ARRAYLEFT    108
#define ARRAYBOT     108
#define ARRAYTOP     VPORTSIZE - FRAMESIZE

#define BLACKWHITEHEIGHT  35
#define SPANSIZE     365
```

```
#define SELCOLSIZE      96
#define NOTCHSIZE       15

/* in READMAIN.C */
extern short matis_groupnum;
extern Boolean          ctrl_key_p();

/* in GRAPHUTIL.C */
extern Boolean mouseinrect();

/* in SOAPPROD.C */
extern short do_soap_event();

/* in GRAPHPROD.C */
extern void highlight_selected();
extern Boolean shift_key_p();

/* in GRAPHUTIL.C */
extern short maxproductcoord();

/* in INTERF.C */
extern short color_on;
extern Boolean get_user_string();

/* in EDITINFO.C */
extern void set_color_viewport();

/* from GROUP.C */
extern short groupnum_at_y();
extern short groupscrollpos;
extern Boolean          select_group();
extern short curgroup;
extern void get_group_text_line();
extern void do_group_text();
extern short groupcount;
extern void show_group_name();
extern void highlight_group_text();
extern short groupcount;
```

```
Part *find_right_tree_current();
Part *find_left_tree_current();
Part *get_bottom_right();
Part *soap_descend_for_name();
Part *soap_find_groupname();
void set_part_color();
void copy_color_down();
void normal_weirdness();
void convert_weirdness();
void soap_do_group_select();

void color_dum();
void color_screen();
void color_exit_color_down();
short which_blotch();
short inside_palette();
short inside_left_ramp();
short inside_bottom_ramp();
long do_color_menu();
void highlight_current_part();
void soap_reverse();
void soap_stepsize();
void get_part_color();

static void soap_select_group();
static void soap_group_view_update();
static void soap_unselect_group();
static void soap_add_group_to_selectlist();
static void soap_delete_group_from_selectlist();
static void soap_show_group_text();
static void soap_highlight_selected_groups();
static short soap_group_in_selectlist();
static short all_groups_in_convert();

void soap_show_color();
void soap_color_view_update();

static long xorg, yorg;
```

```
/* FROM INTERF.C */
extern long colmenu_off, colmenu_on, colmenu_con_on, colmenu_norm_on;

typedef struct {
   short  r,g,b;
} Refcol;

static Refcol refcol[COLSIZE * ROWSIZE] = {
   255, 255, 255,
   255, 255, 255,
   255, 255, 255,
   255, 255, 255,
   255, 255, 255,
   255, 255, 255,
   255, 255, 255,
   255, 255, 255,
   255, 255, 255,
   255, 255, 255, /* 0 */
   255, 135, 135,
   255, 179, 135,
   255, 179, 71,
   255, 155, 19,
   219, 223, 19,
   219, 223, 119,
   163, 239, 187,
   163, 243, 251,
   163, 179, 251,
   255, 179, 239,  /*1*/
   255, 131, 183,
   251, 147, 135,
   251, 147, 23,
   243, 155, 3,
   151, 155, 3,
   59, 155, 91,
   59, 143, 119,
   59, 143, 175,
   123, 143, 175,
   235, 143, 183, /*2*/
   231, 75, 119,
```

```
255, 123, 91,
255, 107, 11,
223, 119, 7,
87, 143, 3,
43, 131, 43,
3, 115, 99,
7, 111, 151,
75, 91, 151,
143, 75, 131, /*3*/
223, 55, 103,
215, 43, 31,
227, 83, 11,
143, 99, 3,
67, 103, 3,
3, 99, 3,
3, 99, 83,
3, 83, 139,
39, 55, 127,
103, 39, 107, /*4*/
191, 11, 75,
183, 11, 3,
139, 39, 3,
107, 63, 3,
35, 87, 3,
3, 55, 15,
3, 67, 55,
3, 43, 111,
19, 31, 95,
83, 23, 83, /*5*/
151, 3, 59,
131, 3, 3,
91, 27, 3,
51, 47, 3,
19, 47, 3,
3, 31, 15,
3, 43, 31,
3, 19, 75,
7, 15, 75,
51, 3, 51, /*6*/
83, 3, 31,
```

```
  79, 3, 3,
  47, 11, 3,
  31, 19, 3,
  15, 23, 3,
  3, 23, 3,
  3, 23, 19,
  3, 3, 35,
  7, 3, 27,
  23, 3, 23, /* 7 */
  0, 0, 0,
  0, 0, 0,
  0, 0, 0,
  0, 0, 0,
  0, 0, 0,
  0, 0, 0,
  0, 0, 0,
  0, 0, 0,
  0, 0, 0,
  0, 0, 0 /* 8 */
};

static short soap_selectcount;
static short soap_selectlist[200];     /* 1000 ! in GRAPHPROD.C   */

static short clutterflag;

static Refcol             currentcolor = {
   0,0,0
};

static short normal_mode = 0;
static short convert_mode = 0;

/* accessed from SOAP2IRIS.C */
double       norm_maxval;

/*
** THIS IS ACCESSED FROM SOAPPROD.C
*/
```

```
static short all_groups_in_convert()
{
  short  i;
  Part   *part;

  for (i=0; i<groupcount; ++i) {
            if ((part = soap_find_groupname(groups[i].name)) == PARTNULL)
              return(0);
  }
  return(1); /* YES, all present */
}

void highlight_current_part()
{
  Part   *part;
  short  i;

  if (soap_selectcount == 0) {
            if (curgroup == -1)
               highlight_selected();
            else if ((part = soap_find_groupname(groups[curgroup].name))
                       != PARTNULL)
               highlight_selected();
  } else {
            for (i=0; i<soap_selectcount; ++i) {
               part = soap_find_groupname(groups[soap_selectlist[i]].name);
              if (part != PARTNULL)
                       iris_do_polylist_thang(part,YES,normal_mode);
            }
  }
}

/*
**
*/
void set_part_color()
{
  char   refstring[20];
  Part  *part;
```

```
    short   i, groupnum;

    for (i=0; i<soap_selectcount; ++i) {
                groupnum = soap_selectlist[i];
                strcpy(refstring,groups[groupnum].name);

                /* now find this name in the soap database */
                part = soap_find_groupname(refstring);
                if (part == PARTNULL) {
#ifdef DEBUG
                    printf("\nCOULD NOT FIND %s in SOAP TREE",refstring);
#endif
                    continue;
                }

                groups[groupnum].r = (unsigned char)currentcolor.r;
                groups[groupnum].g = (unsigned char)currentcolor.g;
                groups[groupnum].b = (unsigned char)currentcolor.b;

                /* COPY THIS COLOR TO ALL RELEVANT CHILDREN... */
                copy_color_down(part, 0);
                changeflag = 1;
    } /* for all selected groups */

    update_soap_viewport();
    swapbuffers();
    update_soap_viewport();
}

/*
**
*/
void get_part_color()
{
    Refcol groupcolor;
    char   refstring[20];
    Part   *part;
    short  groupnum;
```

```
   if (soap_selectcount != 1)
            return;

   groupnum = soap_selectlist[0];

   strcpy(refstring,groups[groupnum].name);

   /* now find this name in the soap database */
   part = soap_find_groupname(refstring);
  if (part == PARTNULL) {
#ifdef DEBUG
     printf("\nCOULD NOT FIND %s in SOAP TREE",refstring);
#endif
     return;
  }

   groupcolor.r = (short)groups[groupnum].r;
   groupcolor.g = (short)groups[groupnum].g;
   groupcolor.b = (short)groups[groupnum].b;

  frontbuffer(TRUE);
   draw_blotch_color(&groupcolor);
  frontbuffer(FALSE);
   draw_blotch_color(&groupcolor);
}

/*
**
*/
void soap_reverse()
{
  short  i;

   for (i=0; i<soap_selectcount; ++i) {
            groups[soap_selectlist[i]].reverse ^= 0x01;
  }

  if (convert_mode)
            convert_to_soap();
```

```
    changeflag = 1;
}

/*
**
*/
void soap_stepsize()
{
    short   feedbrect[4], first, i, step, groupnum;
    char    prompt[80], response[80];

    if (soap_selectcount == 0)
            return;         /* nothing selected! */

    feedbrect[LEFTINDEX] = 400;
    feedbrect[RIGHTINDEX] = 700;
    feedbrect[BOTINDEX] = 400;
    feedbrect[TOPINDEX] = 450;

    /* default */
    groupnum = soap_selectlist[0];

    strcpy(prompt, "Enter Stepsize: ");
    if (groups[groupnum].stepsize == 0)
            strcpy(response, "10");     /* old file w/10 deg default... */
    else
            sprintf(response,"%d",groups[groupnum].stepsize);

    first = TRUE;
    /* Make minimum 2 since endcaps with 360 points cannot be          */
    /* rendered by SGI...                                               */
    while (atoi(response) < 2 || atoi(response) > 90 || first) {
            if (!get_user_string(prompt,response,6,feedbrect,25,20))
              return;
            first = FALSE;
    }

    step = atoi(response);
```

```
  for (i=0; i<soap_selectcount; ++i) {
        groups[soap_selectlist[i]].stepsize = step;
  }

  if (convert_mode)
        convert_to_soap();

  changeflag = 1;
}

/*
**
*/

void color_dum()
{
  return;
}

/*
** Translate currently selected part to Part * in Soap Tree.
*/
#ifdef OLD
void soap_previous()
{
  char   refstring[20];
  Part   *part;

  /* use soap_groupnum to index group structure for name */
  if (soap_groupnum != last_soap_groupnum || current_tree_part == PARTNULL
        || (soap_groupnum == -1 && last_soap_groupnum == -1)) {
        if (soap_groupnum == -1 && last_soap_groupnum != -1) {
           matis_groupnum = -1;
           last_soap_groupnum = -1;
           return;
        }

        if (soap_groupnum == -1 && last_soap_groupnum == -1) {
           if (matis_groupnum != -1)
```

```
                soap_groupnum = matis_groupnum;
            else
                return;
        } else {
            matis_groupnum = soap_groupnum;
        }


    strcpy(refstring,groups[soap_groupnum].name);
    /* now find this name in the soap database */

    part = soap_find_groupname(refstring);
    if (part == PARTNULL) {
#ifdef DEBUG
        printf("\nCOULD NOT FIND %s in SOAP TREE",refstring);
#endif
        return;
    }

    current_tree_top = part;
        current_tree_part = part;

        last_soap_groupnum = soap_groupnum;
  } else {
        /* always call this with valid part */
        do_previous_in_tree(current_tree_part);
  }

  update_soap_viewport();
  swapbuffers();
  update_soap_viewport();
}

/*
**
*/

void soap_next()
{
  char   refstring[20];
```

```
Part   *part;

/* use soap_groupnum to index group structure for name  */
if (soap_groupnum != last_soap_groupnum || current_tree_part == PARTNULL
        || (soap_groupnum == -1 && last_soap_groupnum == -1)) {
        if (soap_groupnum == -1 && last_soap_groupnum != -1) {
          matis_groupnum = -1;
          last_soap_groupnum = -1;
          return;
        }

        if (soap_groupnum == -1 && last_soap_groupnum == -1) {
          if (matis_groupnum != -1)
                soap_groupnum = matis_groupnum;
          else
                return;
        } else {
          matis_groupnum = soap_groupnum;
        }


  strcpy(refstring,groups[soap_groupnum].name);
  /* now find this name in the soap database */
  part = soap_find_groupname(refstring);
  if (part == PARTNULL) {
#ifdef DEBUG
            printf("\nCOULD NOT FIND %s in SOAP TREE",refstring);
#endif
            return;
        }

  current_tree_top = part;
        current_tree_part = part;

        last_soap_groupnum = soap_groupnum;
} else {
        /* always call this with valid part */
        do_next_in_tree(current_tree_part);
}
```

```
    update_soap_viewport();
    swapbuffers();
    update_soap_viewport();
}
#endif      /* #ifdef OLD */

void color_screen()
{
    short   palette_index, val;
    Device  xpos, ypos, dev;
    Refcol  ramp_color;
    Part    *part;

    if (matis_groupnum != -1) {
        soap_selectcount = 1;
        soap_selectlist[0] = matis_groupnum;
    }

    curgroup = -1;
    clear_selectlist();
    info_views_update();
    matis_text_view_update();
    swapbuffers();
    matis_text_view_update();

    if (!all_groups_in_convert()) {
            convert_to_soap();
    } else {
            update_soap_viewport();
            swapbuffers();
            update_soap_viewport();
    }

    initialize_color();
    init_palettes();

    palette_index = -1;
    clutterflag = NO;
```

```
while (TRUE) {

        dev = qread(&val);

        if (mouseinrect(sviewrect)) {
          if (do_soap_event(dev, val)) {
                    initialize_color();
                    continue;
          }
          initialize_color();
        }

        switch (dev) {
  case REDRAW:
                    clear_window();
                    window_draw_both();

                    initialize_color();
                    init_palettes();
                    palette_index = -1;
                    clutterflag = NO;
    break;
          case RIGHTMOUSE:
                    if (val == 0)
                      break;

                    if (do_color_menu() == 7L)
                      return; /*exit menu */

                    break;
  case LEFTMOUSE:
    if (val == 0)
                      break;

                    if (mouseinrect(mgrouprect)) {
                      soap_do_group_select();
#ifdef DEBUG
                      printf("\nSOAP_GROUPNUM: %d",soap_groupnum);
                     SLAM;
```

```
#endif
                    initialize_color();
                    break;
                }

                qread(&xpos);
                qread(&ypos);

        if (inside_palette(xpos,ypos)) {
                    which_blotch(xpos,ypos,&palette_index,NO);
                    draw_blotch(palette_index);
                    draw_ramps(palette_index);
                    swapbuffers();
                    which_blotch(xpos,ypos,&palette_index,YES);
                    draw_blotch(palette_index);
                    draw_ramps(palette_index);
                    clutterflag = YES;
        } else if (palette_index != -1) {
                    if (inside_left_ramp(xpos,ypos)) {
                            frontbuffer(TRUE);
                      while (getbutton(LEFTMOUSE)) {
                              ypos = getvaluator(MOUSEY);

                              if (ypos < yorg + ARRAYBOT)
                                      ypos = yorg + ARRAYBOT;
                              else if (ypos > yorg + ARRAYTOP)
                                      ypos = yorg + ARRAYTOP;
                               which_color_left(ypos, palette_index,
                                         &ramp_color);
                               draw_blotch_color(&ramp_color);
                            }
                            frontbuffer(FALSE);
                            draw_blotch_color(&ramp_color);
                    } else if (inside_bottom_ramp(xpos,ypos)) {
                            frontbuffer(TRUE);
                            while (getbutton(LEFTMOUSE)) {
                              xpos = getvaluator(MOUSEX);

                              if (xpos < xorg + ARRAYLEFT)
                                      xpos = xorg + ARRAYLEFT;
```

```
                                        else if (xpos > xorg + ARRAYLEFT + SPANSIZE)
                                                xpos = xorg + ARRAYLEFT + SPANSIZE;
                                         which_color_bottom(xpos, palette_index,
                                                &ramp_color);
                                        draw_blotch_color(&ramp_color);
                                      }
                                      frontbuffer(FALSE);
                                      draw_blotch_color(&ramp_color);
                              }
                          }
        break;
            case CKEY:
                    if(val == 0) break;
                    if(ctrl_key_p()) {
                      convert_to_soap();
                      initialize_color();
                    }
                    break;
            case WINSHUT:
            case WINQUIT:
                    quit();
    } /* switch */
/*          qreset();*/
  }
}

/*
**
*/

long do_color_menu(dummy)
short       dummy;
{
  long    position;

  if (normal_mode && convert_mode)
          position = dopup(colmenu_on);
  else if (!normal_mode && !convert_mode)
          position = dopup(colmenu_off);
```

```
  else if (normal_mode && !convert_mode)
            position = dopup(colmenu_norm_on);
  else
            position = dopup(colmenu_con_on);

  if (position == -1L)
            return(position);

  switch(position) {
            case 1L:
               get_part_color();
               break;
            case 2L:
               set_part_color();
               break;
            case 3L:
               normal_weirdness();
               break;
            case 4L:
               soap_reverse();
               break;
            case 5L:
               soap_stepsize();
               break;
            case 6L:
               convert_weirdness();
               break;
            case 7L:
               color_exit_color_down();
               break;
  }
  if (position < 7L)
            initialize_color();            /* reset viewport! */

  return(position);
}

/*
**
```

```
*/

initialize_color()
{

   color_on = 1;

   viewport(mviewrect[LEFTINDEX], mviewrect[RIGHTINDEX],
              mviewrect[BOTINDEX], mviewrect[TOPINDEX]);

   ortho2(0.0, (float)VPORTSIZE, 0.0, (float)VPORTSIZE);

   getwindowsize();

   qreset();

   qdevice(LEFTMOUSE);
   tie(LEFTMOUSE, MOUSEX, MOUSEY);
   qdevice(REDRAW);
}

init_palettes()
{
   draw_palette();
   swapbuffers();
   draw_palette();
}

void color_exit_color_down()
{

   color_on = 0;
   normal_mode = 0;

   if (soap_selectcount > 0) {
             matis_groupnum = soap_selectlist[0];
             curgroup = matis_groupnum;
   } else {
             curgroup = -1;
   }
```

```
  select_group_parts(curgroup);

  soap_selectcount = 0;
  currentcolor.r = currentcolor.g = currentcolor.b = 0;

  window_draw_both();
}

getwindowsize() {

   getorigin(&xorg,&yorg);
  xorg += MVIEWLEFT;
  yorg += MVIEWBOT;
}

draw_palette() {

  register i, j;
  short    toplx, toply;
  short    greyval;


  cursoff();

  RGBcolor(0,0,0);
  clear();

  for (i = 0; i < ROWSIZE; i++) {
    for (j = 0; j < COLSIZE; j++) {
              RGBcolor(refcol[i * COLSIZE + j].r,
                       refcol[i * COLSIZE + j].g,
                       refcol[i * COLSIZE + j].b);
              toplx = ARRAYLEFT + j * (BLOTCHSIZE + BLOTCHSPACEX);
              toply = ARRAYTOP - i * (BLOTCHSIZE + BLOTCHSPACEY);
              rectfi(toplx, toply, toplx + BLOTCHSIZE, toply - BLOTCHSIZE);
            }
  }

  /* make White mirror Black */
```

```
 RGBcolor(255, 255, 255);
rectfi(ARRAYLEFT, ARRAYTOP - NOTCHSIZE - 2, ARRAYLEFT + SPANSIZE,
          ARRAYTOP - BLOTCHSIZE);

/* draw tick marks */
for (i=1; i<ROWSIZE; ++i) {
          greyval = 200 - (i * 25);  /* 8 X 25 = 200 */
          RGBcolor(greyval, greyval, greyval);

          rectfi(ARRAYLEFT, ARRAYBOT + i * (BLOTCHSIZE + BLOTCHSPACEY),
             ARRAYLEFT + NOTCHSIZE, ARRAYBOT + i * (BLOTCHSIZE +
             BLOTCHSPACEY) + 1);
}

 RGBcolor(200, 200, 200);
for (i=1; i<COLSIZE; ++i) {
          rectfi(ARRAYLEFT + i * (BLOTCHSIZE + BLOTCHSPACEX) - 2, ARRAYBOT,
             ARRAYLEFT + i * (BLOTCHSIZE + BLOTCHSPACEX),
             ARRAYBOT + NOTCHSIZE);
}

/* BORDERS */
 RGBcolor(200, 200, 255);

recti(0,0,SELCOLSIZE+4,SELCOLSIZE+4);
recti(1,1,SELCOLSIZE+3,SELCOLSIZE+3);

recti(0,ARRAYBOT-2,SELCOLSIZE+4,ARRAYTOP+2);
recti(1,ARRAYBOT-1,SELCOLSIZE+3,ARRAYTOP+1);

recti(ARRAYLEFT-2,0,VPORTSIZE,SELCOLSIZE+4);
recti(ARRAYLEFT-1,1,VPORTSIZE-1,SELCOLSIZE+3);

recti(ARRAYLEFT-2,ARRAYBOT-2,VPORTSIZE,VPORTSIZE);
recti(ARRAYLEFT-1,ARRAYBOT-1,VPORTSIZE-1,VPORTSIZE-1);

 curson();
}
```

```
/* return 1 if the position of the cursor is within the window */
short inside_palette(x,y)
int x, y;
{
  if(x < xorg + ARRAYLEFT)
    return 0;
  if(x > xorg + ARRAYLEFT + SPANSIZE)
    return 0;
  if(y < yorg + ARRAYBOT)
    return 0;
  if(y > yorg + ARRAYTOP)
    return 0;

  return 1;
}

/* return 1 if the position of the cursor is within the window */
short inside_left_ramp(x,y)
int x, y;
{
  if (x < xorg + FRAMESIZE)
    return 0;
  if (x > xorg + FRAMESIZE + SELCOLSIZE)
    return 0;
  if (y < yorg + ARRAYBOT)
    return 0;
  if (y > yorg + ARRAYTOP)
    return 0;

  return 1;
}

/* return 1 if the position of the cursor is within the window */
short inside_bottom_ramp(x,y)
int x, y;
{
  if (x < xorg + ARRAYLEFT)
    return 0;
  if (x > xorg + ARRAYLEFT + SPANSIZE)
```

```
    return 0;
  if (y < yorg + FRAMESIZE)
    return 0;
  if (y > yorg + FRAMESIZE + SELCOLSIZE)
    return 0;

  return 1;
}


short which_blotch(xpos,ypos,index,saveflag)
long        xpos,ypos;
short       *index, saveflag;
{
   static short  ulx, uly, lrx, lry, color;
   short         xnotch, ynotch;
   short         ulxt, ulyt, lrxt, lryt;

  xpos -= xorg + ARRAYLEFT;
  ypos -= yorg + ARRAYBOT;
  ypos = SPANSIZE - ypos;

  *index = (ypos / (BLOTCHSIZE + BLOTCHSPACEY)) * COLSIZE;
  *index += xpos / (BLOTCHSIZE + BLOTCHSPACEX);

  if (clutterflag) {
          RGBcolor(refcol[color].r, refcol[color].g, refcol[color].b);
          rectfi(ulx, uly, lrx+1, lry-1);
  }

  /* notch the chosen thang */
  xnotch = (xpos / (BLOTCHSIZE + BLOTCHSPACEX))
             * (BLOTCHSIZE + BLOTCHSPACEX);
  ynotch = (ypos / (BLOTCHSIZE + BLOTCHSPACEY))
             * (BLOTCHSIZE + BLOTCHSPACEY);

  ulxt = ARRAYLEFT + xnotch;
  ulyt = ARRAYBOT + (SPANSIZE - ynotch);
  lrxt = ARRAYLEFT + xnotch + NOTCHSIZE;
  lryt = ARRAYBOT + (SPANSIZE - (ynotch + NOTCHSIZE));
```

```
if (saveflag) {
            ulx = ulxt;
            uly = ulyt;
            lrx = lrxt;
            lry = lryt;
            color = *index;
}

 RGBcolor(0,0,0);
 rectfi(ulxt, ulyt, lrxt+1, lryt-1);

 RGBcolor(255, 255, 255);
 move2i(ulxt, ulyt);
 draw2i(lrxt, lryt);

 move2i(lrxt, ulyt);
 draw2i(ulxt, lryt);

}

draw_blotch(index)
short index;
{
    short   toplx, toply;

    RGBcolor(refcol[index].r,
                refcol[index].g,
                refcol[index].b);

    currentcolor.r = refcol[index].r;
    currentcolor.g = refcol[index].g;
    currentcolor.b = refcol[index].b;

    toplx = FRAMESIZE;
    toply = FRAMESIZE + SELCOLSIZE;
    rectfi(toplx, toply, toplx + SELCOLSIZE, toply - SELCOLSIZE);

    soap_color_view_update();
```

```
}

/*
** SPECIAL CASE WHICH IS NON-GROUP ORIENTED...
*/

void soap_color_view_update()
{
    set_color_viewport();

   ortho2(0,MCOLORWIDTH,0,MCOLORHEIGHT);

    c3s(cwhite);
   clear();
    soap_show_color();

   viewport(mviewrect[LEFTINDEX], mviewrect[RIGHTINDEX],
                mviewrect[BOTINDEX], mviewrect[TOPINDEX]);

    ortho2(0.0, (float)VPORTSIZE, 0.0, (float)VPORTSIZE);
}

#define Cleft 65
#define Cbot 10
#define xin 5
#define yin 5
#define itheight 20
#define Bbot Cbot
#define Gbot (Cbot+itheight)
#define Rbot (Cbot+2*itheight)
#define Rtop (Cbot+3*itheight)

void soap_show_color()
{
   char   curprompt[80];
   short   tempcolor[3];

    tempcolor[0]=currentcolor.r;
    tempcolor[1]=currentcolor.g;
```

```
    tempcolor[2]=currentcolor.b;

    c3s(tempcolor);
   cmov2s(MCOLORWIDTH/2-25,MCOLORHEIGHT-20);
   charstr("COLOR");

    c3s(cblack);
    sprintf(curprompt,"R: %d",currentcolor.r);
    cmov2s(Cleft+xin,Rbot+yin);
   charstr(curprompt);

    sprintf(curprompt,"G: %d",currentcolor.g);
    cmov2s(Cleft+xin,Gbot+yin);
   charstr(curprompt);

    sprintf(curprompt,"B: %d",currentcolor.b);
    cmov2s(Cleft+xin,Bbot+yin);
   charstr(curprompt);
}

/*
**
*/

draw_blotch_color(color)
Refcol        *color;
{
    short   toplx, toply;

    RGBcolor(color->r,
                  color->g,
                  color->b);

    currentcolor.r = color->r;
    currentcolor.g = color->g;
    currentcolor.b = color->b;

   toplx = FRAMESIZE;
   toply = FRAMESIZE + SELCOLSIZE;
   rectfi(toplx, toply, toplx + SELCOLSIZE, toply - SELCOLSIZE);
```

```
   soap_color_view_update();
}

draw_ramps(index)
short index;
{

   /* first do left-hand vertically interpolated ramp */
   do_vertical_ramp(index);

   /* then do horizontal ramp */
   do_horizontal_ramp(index);
}

do_vertical_ramp(index)
short index;
{
   short   indextop, indexmid, indexbot;
   short   toplx, toply;
   short   i, j, startloop, endloop;
   float   rstart, rend, gstart, gend, bstart, bend;
   float   alphar, alphag, alphab;


   /* check for white */
   if (index < COLSIZE)
            index += COLSIZE;

   /* check for black */
   if (index >= COLSIZE * ROWSIZE - COLSIZE)
            index -= COLSIZE;

   indextop = index - COLSIZE;
   indexmid = index;
   indexbot = index + COLSIZE;

   /* Actually do 2 interpolations which meet in the middle */
   rstart = (float)refcol[indextop].r;
```

```
rend = (float)refcol[indexmid].r;
gstart = (float)refcol[indextop].g;
gend = (float)refcol[indexmid].g;
bstart = (float)refcol[indextop].b;
bend = (float)refcol[indexmid].b;

startloop = 0;
endloop = SPANSIZE / 2;

alphar = (rend - rstart) / (float)endloop;
alphag = (gend - gstart) / (float)endloop;
alphab = (bend - bstart) / (float)endloop;

toplx = FRAMESIZE;
toply = ARRAYTOP;

for (i=startloop; i<endloop; ++i) {
        RGBcolor((short)rstart, (short)gstart, (short)bstart);
        rstart += alphar;
        gstart += alphag;
        bstart += alphab;
        move2i(toplx, toply - i);
        draw2i(toplx + SELCOLSIZE, toply - i);
}

/* 2nd interpolation */
rstart = (float)refcol[indexmid].r;
rend = (float)refcol[indexbot].r;
gstart = (float)refcol[indexmid].g;
gend = (float)refcol[indexbot].g;
bstart = (float)refcol[indexmid].b;
bend = (float)refcol[indexbot].b;

startloop = SPANSIZE / 2;
endloop = SPANSIZE;

alphar = (rend - rstart) / (float)(endloop - startloop);
alphag = (gend - gstart) / (float)(endloop - startloop);
alphab = (bend - bstart) / (float)(endloop - startloop);
```

```
    for (i=startloop; i<endloop; ++i) {
            RGBcolor((short)rstart, (short)gstart, (short)bstart);
            rstart += alphar;
            gstart += alphag;
            bstart += alphab;
            move2i(toplx, toply - i);
            draw2i(toplx + SELCOLSIZE, toply - i);
    }
}

do_horizontal_ramp(index)
short index;
{
    short   indexleft, indexright, indexmid;
    short   toplx, toply;
    short   i, j, startloop, endloop;
    float   rstart, rend, gstart, gend, bstart, bend;
    float   alphar, alphag, alphab;

    /* check for left border */
    if ((index % COLSIZE) == 0) {
            indexleft = index + COLSIZE - 1;
    } else {
            indexleft = index - 1;
    }

    /* check for right border */
    if ((index % COLSIZE) == COLSIZE - 1) {
            indexright = index - COLSIZE + 1;
    } else {
            indexright = index + 1;
    }

    indexmid = index;


    /* Actually do 2 interpolations which meet in the middle */
    rstart = (float)refcol[indexleft].r;
```

```
rend = (float)refcol[indexmid].r;
gstart = (float)refcol[indexleft].g;
gend = (float)refcol[indexmid].g;
bstart = (float)refcol[indexleft].b;
bend = (float)refcol[indexmid].b;

startloop = 0;
endloop = SPANSIZE / 2;

alphar = (rend - rstart) / (float)endloop;
alphag = (gend - gstart) / (float)endloop;
alphab = (bend - bstart) / (float)endloop;

toplx = ARRAYLEFT;
toply = FRAMESIZE;

for (i=startloop; i<endloop; ++i) {
        RGBcolor((short)rstart, (short)gstart, (short)bstart);
        rstart += alphar;
        gstart += alphag;
        bstart += alphab;
        move2i(toplx+i, toply);
        draw2i(toplx+i, toply + SELCOLSIZE);
}

/* 2nd interpolation */
rstart = (float)refcol[indexmid].r;
rend = (float)refcol[indexright].r;
gstart = (float)refcol[indexmid].g;
gend = (float)refcol[indexright].g;
bstart = (float)refcol[indexmid].b;
bend = (float)refcol[indexright].b;

startloop = SPANSIZE / 2;
endloop = SPANSIZE;

alphar = (rend - rstart) / (float)(endloop - startloop);
alphag = (gend - gstart) / (float)(endloop - startloop);
alphab = (bend - bstart) / (float)(endloop - startloop);
```

```
  for (i=startloop; i<endloop; ++i) {
            RGBcolor((short)rstart, (short)gstart, (short)bstart);
            rstart += alphar;
            gstart += alphag;
            bstart += alphab;
            move2i(toplx+i, toply);
            draw2i(toplx+i, toply + SELCOLSIZE);
  }
}

which_color_left(ypos, palindex, color)
long        ypos;
short       palindex;
Refcol      *color;
{
   short  indextop, indexbot, indexmid;
   float  rstart, rend, gstart, gend, bstart, bend, loopval;
   float  alphar, alphag, alphab;


  /* we actually only care about Y */
  ypos -= yorg + ARRAYBOT;
  ypos = SPANSIZE - ypos;

  if (palindex < COLSIZE)
            palindex += COLSIZE;

  /* check for black */
  if (palindex >= COLSIZE * ROWSIZE - COLSIZE)
            palindex -= COLSIZE;

  indextop = palindex - COLSIZE;
  indexmid = palindex;
  indexbot = palindex + COLSIZE;


  if (ypos < SPANSIZE / 2) {
     rstart = (float)refcol[indextop].r;
            rend = (float)refcol[indexmid].r;
```

```
            gstart = (float)refcol[indextop].g;
            gend = (float)refcol[indexmid].g;
            bstart = (float)refcol[indextop].b;
            bend = (float)refcol[indexmid].b;

            loopval = (float)(SPANSIZE / 2);

            alphar = (rend - rstart) / loopval;
            alphag = (gend - gstart) / loopval;
            alphab = (bend - bstart) / loopval;


            color->r = (short)(rstart + ypos * alphar);
            color->g = (short)(gstart + ypos * alphag);
            color->b = (short)(bstart + ypos * alphab);

    } else {
            ypos -= SPANSIZE / 2;

      rstart = (float)refcol[indexmid].r;
            rend = (float)refcol[indexbot].r;
            gstart = (float)refcol[indexmid].g;
            gend = (float)refcol[indexbot].g;
            bstart = (float)refcol[indexmid].b;
            bend = (float)refcol[indexbot].b;

            loopval = (float)(SPANSIZE - SPANSIZE / 2);

            alphar = (rend - rstart) / loopval;
            alphag = (gend - gstart) / loopval;
            alphab = (bend - bstart) / loopval;

            color->r = (short)(rstart + ypos * alphar);
            color->g = (short)(gstart + ypos * alphag);
            color->b = (short)(bstart + ypos * alphab);
    }
}

which_color_bottom(xpos, palindex, color)
long        xpos;
```

```
short       palindex;
Refcol      *color;
{
    short   indexleft, indexright, indexmid;
    float   rstart, rend, gstart, gend, bstart, bend, loopval;
    float   alphar, alphag, alphab;


   /* we actually only care about X */
   xpos -= xorg + ARRAYLEFT;

   /* check for left border */
   if ((palindex % COLSIZE) == 0) {
             indexleft = palindex + COLSIZE - 1;
   } else {
             indexleft = palindex - 1;
   }

   /* check for right border */
   if ((palindex % COLSIZE) == COLSIZE - 1) {
             indexright = palindex - COLSIZE + 1;
   } else {
             indexright = palindex + 1;
   }

   indexmid = palindex;


   if (xpos < SPANSIZE / 2) {
       rstart = (float)refcol[indexleft].r;
             rend = (float)refcol[indexmid].r;
             gstart = (float)refcol[indexleft].g;
             gend = (float)refcol[indexmid].g;
             bstart = (float)refcol[indexleft].b;
             bend = (float)refcol[indexmid].b;

             loopval = (float)(SPANSIZE / 2);

             alphar = (rend - rstart) / loopval;
```

```
            alphag = (gend - gstart) / loopval;
            alphab = (bend - bstart) / loopval;


            color->r = (short)(rstart + xpos * alphar);
            color->g = (short)(gstart + xpos * alphag);
            color->b = (short)(bstart + xpos * alphab);

  } else {
            xpos -= SPANSIZE / 2;

    rstart = (float)refcol[indexmid].r;
            rend = (float)refcol[indexright].r;
            gstart = (float)refcol[indexmid].g;
            gend = (float)refcol[indexright].g;
            bstart = (float)refcol[indexmid].b;
            bend = (float)refcol[indexright].b;

            loopval = (float)(SPANSIZE - SPANSIZE / 2);

            alphar = (rend - rstart) / loopval;
            alphag = (gend - gstart) / loopval;
            alphab = (bend - bstart) / loopval;

            color->r = (short)(rstart + xpos * alphar);
            color->g = (short)(gstart + xpos * alphag);
            color->b = (short)(bstart + xpos * alphab);
  }
}

/*-------------------------*/
/*
** NEW MULTI-SELECT VERSION
*/
void soap_do_group_select()
{
   short   groupnum;

    set_group_viewport();
```

```
 groupnum = groupnum_at_y(port_mousey());

if (groupnum == -1) {
   soap_selectcount = 0;

          soap_group_view_update();
          update_soap_viewport();
          swapbuffers();
          soap_group_view_update();
          update_soap_viewport();
          return;
}

 if(soap_group_in_selectlist(groupnum)) {
          while(getbutton(LEFTMOUSE)){
              set_group_viewport();
              groupnum = groupnum_at_y(port_mousey());

              if(soap_group_in_selectlist(groupnum)){
                      soap_unselect_group(groupnum);
                      soap_group_view_update();
                      update_soap_viewport();
                      swapbuffers();
                      soap_group_view_update();
                      update_soap_viewport();
              }
          }
} else {
          while(getbutton(LEFTMOUSE)){
              set_group_viewport();
              groupnum = groupnum_at_y(port_mousey());

              if(!soap_group_in_selectlist(groupnum)){
                      soap_select_group(groupnum);
                      soap_group_view_update();
                      update_soap_viewport();
                      swapbuffers();
                      soap_group_view_update();
                      update_soap_viewport();
              }
```

```
            }
  }
}

static void soap_group_view_update()
{
   set_group_viewport();
   ortho2(0,MGROUPWIDTH,groupscrollpos,groupscrollpos+MGROUPHEIGHT);

   c3s(mtvcolor);
   clear();

   soap_show_group_text();
   soap_highlight_selected_groups();
}

static void soap_show_group_text()
{
   short  i;

   for (i=0; i<groupcount; ++i)
            show_group_name(i);
}

static void soap_highlight_selected_groups()
{
   short  i;

   for (i=0; i<soap_selectcount; ++i) {
            highlight_group_text(soap_selectlist[i], highcolor);
   }
}

static short soap_group_in_selectlist(groupnum)
short         groupnum;
{
   short  i;

   for (i=0; i<soap_selectcount; ++i) {
```

```
            if (soap_selectlist[i] == groupnum)
              return(1);
  }
  return(0);
}

static void soap_select_group(groupnum)
short       groupnum;
{
   if (!soap_group_in_selectlist(groupnum))
            soap_add_group_to_selectlist(groupnum);
}

static void soap_unselect_group(groupnum)
short       groupnum;
{
   soap_delete_group_from_selectlist(groupnum);
}

static void soap_add_group_to_selectlist(groupnum)
short       groupnum;
{
  if (shift_key_p())
            soap_selectlist[soap_selectcount++] = groupnum;
  else {
            soap_selectcount = 1;
            soap_selectlist[0] = groupnum;
  }

}

static void soap_delete_group_from_selectlist(groupnum)
short       groupnum;
{
  short  i, j;

  for (i = 0; i<soap_selectcount; ++i) {
            if (soap_selectlist[i] == groupnum) {
              for (j = i; j < soap_selectcount; ++j) {
                        soap_selectlist[j] = soap_selectlist[j+1];
```

```
            }
            --soap_selectcount;
            return;
         }
  }
}

/*
**
*/
Part *soap_find_groupname(refstring)
char         *refstring;
{
   if (soap_object[0].root != PARTNULL) {
            return(soap_descend_for_name(soap_object[0].root, refstring));
   } else {
            return(PARTNULL);
   }
}

/*
** Swing through the hierarchy, BUD.
*/

Part *soap_descend_for_name(part, refstring)
Part         *part;
char         *refstring;
{
   short     offset;
   Childlist *childptr;
   Part      *retpart;

   if (strcmp(part->nodename,refstring) == 0)
            return(part);

   /* descend hierarchy   */
   /* for all children... */

   childptr = part->child_top;
```

```
  if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
              }

              retpart = soap_descend_for_name(*childptr, refstring);
              if (retpart != PARTNULL)
                        return(retpart);

              ++childptr;
              ++offset;
            }
  }
  return(PARTNULL);    /* no match for this branch */
}

/*
**
*/
#ifdef OLD
void do_previous_in_tree(part)
Part        *part;
{
  short      offset;
  Childlist  *childptr;
  Part       *newpart;


  if (part == current_tree_top) {
            /* want to cycle around to rightmost bottom of tree...         */
            newpart = get_bottom_right(part);
            current_tree_part = newpart;
  } else {
    /* see if parent has any more children... */
            newpart = find_left_tree_current(part);
```

```
            if (newpart == PARTNULL) {
               newpart = part->parent;
            } else {
               if (newpart->child_top != CHILDNULL) {
                       newpart = get_bottom_right(newpart);
               }
            }
            current_tree_part = newpart;
   }

   /* now do something with it! */
#ifdef DEBUG
   printf("\nPREVIOUS: %lx",current_tree_part);
   SLAM;
#endif
}

/*
**
*/

Part  *get_bottom_right(part)
Part          *part;
{
   short      offset;
   Childlist  *childptr;
   Part       *rightchild;

   /* take last entry of all childlists...                     */
   childptr = part->child_top;
   if (childptr != CHILDNULL) {
     offset = 0;
     while (*childptr != PARTNULL) {
             if (offset == LIST_SIZE - 1) {
                 childptr = (Childlist *)*childptr;
                offset = 0;
                continue;
             }
```

```
                rightchild = *childptr;

                ++childptr;
                ++offset;
            }
            part = get_bottom_right(rightchild);
   }
   return(part);
}

/*
**
*/
Part *find_left_tree_current(part)
Part         *part;
{
   short      offset;
   Childlist  *childptr;
   Part       *leftpart;


   childptr = (part->parent)->child_top;
   leftpart = PARTNULL;

   if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
              }

              if (*childptr == part)
                        break;

              leftpart = *childptr;

              ++childptr;
```

```
                ++offset;
            }
    }
    return(leftpart);
}


/*
**
*/

void do_next_in_tree(part)
Part        *part;
{
    short     offset;
    Childlist *childptr;
    Part      *newpart;

    childptr = part->child_top;

    if (childptr == CHILDNULL) {
            /* Any neighbors here? */
            while (part != current_tree_top) {
                newpart = find_right_tree_current(part);
                if (newpart != PARTNULL)
                        break;
                part = part->parent;
            }
            /* if no neighbors could be found... */
            if (part == current_tree_top)
                current_tree_part = current_tree_top;
            else
                current_tree_part = newpart;
    } else {
            /* next is leftmost child of this part */
            current_tree_part = *childptr;
    }

    /* now do something with it! */
#ifdef DEBUG
```

```
    printf("\nNEXT: %lx",current_tree_part);
   SLAM;
#endif
}

/*
**
*/
Part *find_right_tree_current(part)
Part        *part;
{
   short       offset, toleft;
   Childlist  *childptr;
   Part        *rightpart;


   childptr = (part->parent)->child_top;
   rightpart = PARTNULL;
   toleft = NO;

   if (childptr != CHILDNULL) {
             offset = 0;
             while (*childptr != PARTNULL) {
               if (offset == LIST_SIZE - 1) {
                         childptr = (Childlist *)*childptr;
                         offset = 0;
                         continue;
               }

               if (toleft == YES) {
                         rightpart = *childptr;
                         break;
               }

               if (*childptr == part)
                         toleft = YES;

               ++childptr;
               ++offset;
```

```
        }
  }
   return(rightpart);
}
#endif /* #ifdef OLD */
/*
** DRAW AN ITTY NORMAL FOR this part...
*/

void normal_weirdness()
{
   normal_mode ^= 0x01;
   norm_maxval = (double)maxproductcoord() * 0.05;

   update_soap_viewport();
  swapbuffers();
   update_soap_viewport();
}

/*
**
*/

void convert_weirdness()
{
   convert_mode ^= 0x01;
   if (convert_mode)
              convert_to_soap();
}

/*
**
*/

void copy_color_down(part, count)
Part         *part;
short        count;
{
   short      offset, copyflag;
   Childlist  *childptr;
```

```
Polylist   *polyptr;


childptr = part->child_top;

/* Just go one level deep for ENDCAPS and CONNECTS */
if (count == 2)
        return;

if (childptr != CHILDNULL) {
        offset = 0;
        while (*childptr != PARTNULL) {
          if (offset == LIST_SIZE - 1) {
                childptr = (Childlist *)*childptr;
                offset = 0;
                continue;
          }

          copy_color_down(*childptr, count + 1);

          ++childptr;
          ++offset;
        }
}

if (!count) {
        copyflag = YES;                    /* root guaranteed...          */
} else if (count == 1) {  /* copy down to first level only!   */
        copyflag = NO;
        /* ENDCAPS OR CONNECTS? */
        polyptr = part->poly_top;
        if (polyptr != POLYNULL) {
          if (((**polyptr)->status & GEOMASK) == SOAP_CONNECT ||
                ((**polyptr)->status & GEOMASK) == SOAP_ENDCAP)
                copyflag = YES;
        }
}
if (copyflag) {
        part->r = (unsigned char)currentcolor.r;
```

```
            part->g = (unsigned char)currentcolor.g;
            part->b = (unsigned char)currentcolor.b;
    }
}

/* DO NOT PLACE ANY FUNCTIONS AFTER RCS LOG!
$Log:       color.c,v $
 * Revision 2.5  90/10/24  15:05:18  dan
 * Updates RGB values, added CONVERT option
 *
 * Revision 2.4  90/10/23  15:35:40  mike
 * changed so that shift key must be pressed to do a
 * multi-select of groups.
 *
 * Revision 2.3  90/10/18  18:16:56  dan
 * Added multi-group selection!
 *
 * Revision 2.2  90/10/17  14:09:43  dan
 * Got rid of previous and next
 *
 * Revision 2.1  90/10/05  10:29:41  dan
 * New Rev
 *
 * Revision 1.9  90/09/27  14:58:15  dan
 * Added "Get Color" feature.
 *
 * Revision 1.8  90/09/25  14:10:10  dan
 * Added Stepsize and auto-previous functionality
 *
 * Revision 1.7  90/09/21  10:58:35  dan
 * Fixed crashing problem and Previous/Next wrong-part bug...
 *
 * Revision 1.6  90/09/12  19:30:59  dan
 * No more quit option (Also not in INTERF.C) and printf's #ifdef'd
 *
 * Revision 1.5  90/09/07  19:19:43  mike
 * changed to add winshut and winquit to event
 * manager.
 *
 * Revision 1.4  90/08/30  14:42:04  dan
```

```
* OOPS! Ummm, fixed a bug that was "Ethan's fault".
*
* Revision 1.3  90/08/30  13:44:14  dan
* Massive changes... New menu options and algorithms.
*
* Revision 1.2  90/08/28  11:03:19  dan
* Added Next and Previous and menu bug fixes.
*
* Revision 1.1  90/08/18  20:15:10  dan
* Initial revision
*
*/
```

| | |
|---|---|
| User: | MICRORENTMind |
| Application: | PrintMonitor |
| Document: | convert.c |
| Date: | Wednesday, November 14, 1990 |
| Time: | 6:55:44 PM |
| Printer: | Peace of Mind |

```
/*
** CONVERT.C
**
** Copyright 1990, VPL Research
**
$Header: /usr/starch/source/starch/RCS/convert.c,v 2.14 90/11/01 14:30:39 ethan Exp $
**
*/

#include <gl/gl.h>
#include <gl/device.h>
#include <stdio.h>
#include <math.h>
#include "prod.h"
#include "globals.h"
#include "soap.h"
#include "group.h"  /*must be loaded after soap.h*/
#include "soapxtrn.h"


void make_tree_aux();
Boolean stuff_with_matis();

void sort_lines();
void get_arc_endpoints();
void do_poly_thicken();
void matis_add_wire_arc();

int get_unique_num();

Constraints rootconstraint = {
    0,-32767,32767,0,-32767,32767,0,-32767,32767,
    0,-180,180,0,-180,180,0,-180,180,
  0
};

Constraints defaultconstraint = {
    0,-32767,32767,0,-32767,32767,0,-32767,32767,
    0,-180,180,0,-180,180,0,-180,180,
```

```
  255
};

/* ACCESSED by READMAIN.C */
short soap_first = 1;
short soap_first_1 = 1;

/* IN GRAPHPROD.h */
extern short xoyozo[61];

char tempname[80];

point zeropoint = {0,0,0};

int subcount = 0;

/*-----------------*/

void convert_to_soap()
{
   Part *root;

    show_message("Converting the product ......",
                                        MAINW/2,MAINH/2 + 60 ,25,20);

   if (!soap_first) {
            if (soap_object[0].root != PARTNULL)
                delete_part(soap_object[0].root, 0);
   } else {
            soap_first = 0;
   }

    initialize_object_array();
    initialize_element_arrays();
    initialize_object_name(0,product.pname);

   subcount = 0;          /* initialize subpart counter */
   make_tree_aux(PARTNULL,-1);
```

```
  breeze_simulate(0);

/*   soap_dump(0);*/

   if(!convert_to_swivel(0,swiveldir)){
           show_message("Unable to write the swivel file",MAINW/2,MAINH/2,25,20);
           show_message("Make sure the swivel directory is in the right place",
                               MAINW/2,MAINH/2 - 60 ,25,20);
           show_message("and that you have permission to write to the file",
                               MAINW/2,MAINH/2 - 120 ,25,20);
           wait_for_click();
           clear_messages();
   }

   update_soap_viewport();
   swapbuffers();
   update_soap_viewport();
   clear_messages();
}

void make_tree_aux(dad,gnum)
Part *dad;
short gnum;
{
   Part *curpart;
   short i;

   curpart = add_part(dad,0);
   if(gnum == -1)
        matis_stuff_part(curpart,product.pname,&rootconstraint,
                               (unsigned char)255,
                               (unsigned char)255,
                               (unsigned char)255,
                               (unsigned char)0,  /* DDB: added reverse flag       */
                               &zeropoint, 10);   /* DDB: Default stepsize         */
   else stuff_with_matis(curpart,gnum,0);
   for(i=0;i<groupcount;i++){
           if(groups[i].parent == gnum){
              make_tree_aux(curpart,i);
           }
```

```
  }
}

point       plist1[100],plist2[100];
short       ptype[100], pelmnum[100], psubnum[100];
short       Linecount;

Boolean stuff_with_matis(curpart,gnum,soapnum)
Part *curpart;
short gnum,soapnum;
{
   short      i,h;
   selectitem*partlist;
   short      atomnum,subnum,elmnum,parentof;
   int       tlength,torient; /* for case of knobs */
   point      tpoint,relorigin;

   if(gnum == -1) return;

    matis_stuff_part(curpart,groups[gnum].name,&groups[gnum].constraint,
                              groups[gnum].r,groups[gnum].g,groups[gnum].b,
                             groups[gnum].reverse,  /* DDB */
                              &groups[gnum].origin,
                             groups[gnum].stepsize); /* DDB */

    partlist = &groups[gnum].gpart[0];

    copy_point(&relorigin,&groups[gnum].origin);

   Linecount = 0;

    /* either fill the point array with points, or stuff soap with stuff */
    for(i=0;i<groups[gnum].numparts;i++){
             atomnum = partlist[i].atnum;
             subnum = partlist[i].sbnum;
             elmnum = atom[atomnum].elpntr;
             switch(atom[atomnum].elmflg){
                case LINE:
```

```
        copy_point(&plist1[Linecount],get_subline_p1(elmnum,subnum));
        copy_point(&plist2[Linecount],get_subline_p2(elmnum,subnum));
        ptype[Linecount] = 1;
        Linecount++;
        break;
case REC:
        get_subrect_p1(atomnum,elmnum,subnum,&plist1[Linecount]);
        get_subrect_p2(atomnum,elmnum,subnum,&plist2[Linecount]);
        ptype[Linecount] = 1;
        Linecount++;
        break;
case POLY:
        copy_point(&plist1[Linecount],get_subpoly_p1(elmnum,subnum));
        copy_point(&plist2[Linecount],get_subpoly_p2(elmnum,subnum));
        ptype[Linecount] = 1;
        Linecount++;
        break;
case ARC:
        get_arc_endpoints(elmnum,&plist1[Linecount],
                                        &plist2[Linecount]);
        ptype[Linecount] = 2;    /* show as an arc */
        pelmnum[Linecount] = elmnum; /* need to keep original */
        Linecount++;
        break;
case COLUMN:
        if(groups[gnum].numparts>1){
            sprintf(tempname,"%s is a bad grouping",groups[gnum].name);
            show_message(tempname,MAINW/2,MAINH/2,25,20);
            show_message("A 'column' primitive must be grouped alone",
                    MAINW/2,MAINH/2-120,25,20);
          return FALSE;
/*          wait_for_click();
            clear_messages();
*/
        }

        copy_point(&tpoint,&colmn[elmnum].center);
        subtract_point(&tpoint,&relorigin);
        matis_add_cylinder(add_poly(curpart),&tpoint,
            colmn[elmnum].radius,colmn[elmnum].length,
```

```
            colmn[elmnum].direc);
          return;
case PATTERN:
          /*mike's draw double's as a get_point*/
          draw_pattern(elmnum,P1,subnum,&plist1[Linecount]);
          draw_pattern(elmnum,P2,subnum,&plist2[Linecount]);
          ptype[Linecount] = 3;     /* show as a pattern subpart */
          pelmnum[Linecount] = elmnum;        /* need to keep original */
          psubnum[Linecount] = subnum;
          Linecount++;
          break;

case GRID:
          draw_grid(elmnum,P1,subnum,&plist1[Linecount]);
          draw_grid(elmnum,P2,subnum,&plist2[Linecount]);
          ptype[Linecount] = 1;     /* show as a pattern subpart */
          Linecount++;
          break;


case PARLINE:
          copy_point(&plist1[Linecount],get_subprline_p1(elmnum,subnum));
          copy_point(&plist2[Linecount],get_subprline_p2(elmnum,subnum));
          ptype[Linecount] = 1;
          Linecount++;
          break;

case KNOB:
          if(groups[gnum].numparts>1){
/*            sprintf(tempname,"%s is a bad grouping",groups[gnum].name);
              show_message(tempname,MAINW/2,MAINH/2,25,20);
*/
              show_message("A 'knob' subprimitive must be grouped alone."
                      ,MAINW/2,MAINH/2-120,25,20);
            return FALSE;
/*            wait_for_click();
              clear_messages();
*/
          }
```

```
copy_point(&tpoint,&knob[elmnum].knoborient[subnum].pos);
subtract_point(&tpoint,&relorigin);


/* before adding part, choose correct orientation  */
/* and direction for the knob.                     */

parentof = atom[atomnum].parent;
if (rshrt(form[parentof].shapeflg) == 0xf001)
   parentof--;

switch (xoyozo[form[parentof].plnattr]) {
   case 0: /* knob in y direction or -y direction */
            if (form[parentof].plnattr == 8) { /* -y */
               tlength = -20;
               torient = 3;
   }
            else {
               tlength = 20;    /* +y */
               torient = 3;
            }
            break;
   case 1: /* knob in -x or +x direction */
            if (form[parentof].plnattr == 16) {  /* -x */
               tlength = 20;
               torient = 2;
            }
    else {
               tlength = -20;  /* +x */
               torient = 2;
            }
            break;
  case 2:
            tlength = 20;
            torient = 1;
    break;
  default:
            fprintf(stderr,"%s%s%d%s%d%s%s%d\n",
                "convert.c: Invalid plane",
```

```
                        " attribute ",form[parentof].plnattr,
                        " for formcntr ",parentof,", knob not drawn.",
                        "\nxoyozo = ",xoyozo[form[parentof].plnattr]);
            }

            matis_add_cylinder(add_poly(curpart),&tpoint,20,
                                                tlength,torient);
            return;
        case 10:
            copy_point(&plist1[Linecount],
                        get_subuserpoly_p1(elmnum,subnum));
            copy_point(&plist2[Linecount],
                        get_subuserpoly_p2(elmnum,subnum));
            /*check whether it is an arc*/
            if((upoly[elmnum].arcflg[subnum] & 0x000F) == 1){
               ptype[Linecount] = 2; /* show as an arc */
               pelmnum[Linecount] = upoly[elmnum].arcptr[subnum];
            }
            else if((upoly[elmnum].arcflg[subnum] & 0x000F) == 2){
               ptype[Linecount] = 3; /* show as a pattern */
               pelmnum[Linecount] = upoly[elmnum].arcptr[subnum];
               psubnum[Linecount] = upoly[elmnum].arcflg[subnum]/16;
            }
            else ptype[Linecount] = 1;
            Linecount++;
            break;
        default:
            fprintf (stderr,"Catastrophic error in convert.c!\n");
            exit(-1);
     }
}

/*now sort the polygon and put into soap */
sort_lines();

/*this thickens if appropriate, and does offsets*/
 do_poly_thicken(soapnum,curpart,gnum);

return TRUE;
```

```
/*    printf("\n"); fflush(stdout);*/
}


/*-------------------------------------------*/
int get_unique_num()  /* this gets reset every convert */
{
   subcount++;
   return subcount;
}
/*-------------------------------------------*/

void get_patarc_stuff(subnum,indexnum,r1,r2,arcss)
short   subnum;
short   indexnum;
short  *r1,*r2,*arcss;
{
   pattern *pattrn;
   short  thesubnum;
   int    xyz;
   double  rot1=0,rot2=0;

   pattrn   = &patt[indexnum];
   thesubnum = pattrn->graphinfo[subnum];
   *arcss = -1;
   do {
            (*arcss)++;
   } while ((pattrn->arcit[*arcss].sidenum)*3-1 != thesubnum);

   /* calculate rot1 and rot2 */

   /* the code below ensures that only one axis is changed */
   /* when only ONE set of points is equal.             */

   xyz = 0;

   /* 2 */
   xyz += (pattrn->rectpnts[0].x == pattrn->rectpnts[1].x) * 2;
   /* 3 */
```

```
 xyz += (pattrn->rectpnts[0].y == pattrn->rectpnts[1].y) * 3;
/* 4 */
 xyz += (pattrn->rectpnts[0].z == pattrn->rectpnts[1].z) * 4;
if (xyz <= 4) {
  switch (xyz) {
            case 2:   /* rotate around x */
                      fprintf (stderr, "\nError in convert.c patern_to_matis_arc.");
                      fprintf (stderr, " Case 2 must be used.\n");
                      break;
            case 3:   /* rotate around y */
                      rot1 =
                                 atan2((pattrn->rectpnts[0].z
                                 - pattrn->rectpnts[1].z),
                                 ( pattrn->rectpnts[0].x
                                 - pattrn->rectpnts[1].x));
                      rot1 *= (180 / M_PI); /* must be in degrees */
                      break;
            case 4:   /* rotate around z */
                      rot2 =
                                 atan2((pattrn->rectpnts[0].y
                                 - pattrn->rectpnts[1].y),
                                 ( pattrn->rectpnts[0].x
                                 - pattrn->rectpnts[1].x));
                      rot2 *= (180 / M_PI);
                      break;
          }
 }

 if (pattrn->direction == 2)
          rot2 -= 90;   /* if direction is two for patterns, then the  */
                           /* patern arc must be rotated -90 degrees in z */
                           /* we're not quite sure why this must be done. */

 *r1 = (short) rot1;
 *r2 = (short) rot2;
}


void patrn_to_offset_soap_arc(edgepntr,offset,subnum,indexnum,sweepflag)
Edgelist *edgepntr;
```

```
point        *offset;
short   subnum;
short   indexnum;
short   sweepflag;
{
   pattern *pattrn;
   short  arcss;
   short  rot1,rot2;
   point  p1;

   pattrn  = &patt[indexnum];

    get_patarc_stuff(subnum,indexnum,&rot1,&rot2,&arcss);

   /*offset the arc*/
    copy_point(&p1,&pattrn->arcit[arcss].center);
    offset_point(&p1,offset);

   matis_add_arc(edgepntr,&p1,
                              pattrn->arcit[arcss].radius,
                              pattrn->arcit[arcss].startangle,
                              pattrn->arcit[arcss].offsetangle,
                              pattrn->direction,
                              rot1,
                              rot2,
                              sweepflag);
}


void patrn_to_offset_wire_arc(soapnum,curpart,gnum,edgeptr,offset,subnum,indexnum)
Part *curpart;
short gnum,soapnum;
Edgelist *edgeptr;
point        *offset;
short   subnum;
short   indexnum;
{
   pattern *pattrn;
   short  arcss;
```

```
    short  rot1,rot2;
    point  p1;
    Arc         A;

    pattrn  = &patt[indexnum];

    get_patarc_stuff(subnum,indexnum,&rot1,&rot2,&arcss);

    /*fill the arc*/
    A.lineattr = pattrn->lineattr;
    copy_point(&A.center,&pattrn->arcit[arcss].center);
    A.radius = pattrn->arcit[arcss].radius;
    A.startangle = pattrn->arcit[arcss].startangle;
    A.offsetangle = pattrn->arcit[arcss].offsetangle;
    A.direc = pattrn->direction;
    A.rot1 = rot1;
    A.rot2 = rot2;

    matis_add_wire_arc(soapnum,curpart,gnum,edgeptr,&A,offset);
}


void get_arc_endpoints(arcnum,p1,p2)
short arcnum;
point  *p1,*p2;
{
    double  theta, tcos, tsin, newx, newy, newz, rota, rotb;
    FPoint  start, end;
    Arc         *arc1;

    arc1 = &matis_arcs[arcnum];

    /* Get start and end points on XY PLANE */
    theta = (double)-(arc1->startangle) * M_PI / 180.0;
    start.x = (double)arc1->radius * cos(theta);
    start.y = (double)arc1->radius * sin(theta);
    start.z = 0.0;

    /* get the end point                    */
    theta = (double)-(arc1->startangle + arc1->offsetangle)
```

```
            * M_PI / 180.0;
end.x = (double)arc1->radius * cos(theta);
end.y = (double)arc1->radius * sin(theta);
end.z = 0.0;

/* now, rotate relative to the plane that the arc1 */
/* resides upon.....                                */
if (arc1->direc == 2) {  /* parallel to YZ      */
   /* rotate -90 about the Y axis */
    tsin = sin(-90.0 * M_PI / 180.0);
    tcos = cos(-90.0 * M_PI / 180.0);

          newx = start.x * tcos - start.z * tsin;
   newz = start.x * tsin + start.z * tcos;
   start.x = newx;
   start.z = newz;
   newx = end.x * tcos - end.z * tsin;
   newz = end.x * tsin + end.z * tcos;
   end.x = newx;
   end.z = newz;
} else if (arc1->direc == 3) {  /* to ZX          */
   /* rotate 90 about the X axis */
    tsin = sin(90.0 * M_PI / 180.0);
    tcos = cos(90.0 * M_PI / 180.0);

   newz = start.z * tcos - start.y * tsin;
   newy = start.z * tsin + start.y * tcos;
   start.y = newy;
   start.z = newz;
   newz = end.z * tcos - end.y * tsin;
   newy = end.z * tsin + end.y * tcos;
   end.y = newy;
   end.z = newz;
}

/* now apply rotations rota and rotb to circlepoints  */
/* These are stolen from the Starch code, so they  */
/* should work...                                          */
```

```
rota = -arc1->rot1 * M_PI / 180.0;
rotb = arc1->rot2 * M_PI / 180.0;
tcos = cos(rota);
tsin = sin(rota);

/* around y */
newx = start.x * tcos - start.z * tsin;
newz = start.x * tsin + start.z * tcos;
start.x = newx;
start.z = newz;
newx = end.x * tcos - end.z * tsin;
newz = end.x * tsin + end.z * tcos;
end.x = newx;
end.z = newz;


tcos = cos(rotb);
tsin = sin(rotb);
/* around z */
newx = start.x * tcos - start.y * tsin;
newy = start.x * tsin + start.y * tcos;
start.x = newx;
start.y = newy;
newx = end.x * tcos - end.y * tsin;
newy = end.x * tsin + end.y * tcos;
end.x = newx;
end.y = newy;

/* now translate back to unrotated centerpoint   */
start.x += (double)arc1->center.x;
start.y += (double)arc1->center.y;
start.z += (double)arc1->center.z;

end.x += (double)arc1->center.x;
end.y += (double)arc1->center.y;
end.z += (double)arc1->center.z;

/* NOW, FILL THE Arc STOP POINT FIELDS */
p1->x = (short)start.x+.5;
p1->y = (short)start.y+.5;
```

```
  p1->z = (short)start.z+.5;

  p2->x = (short)end.x+.5;
  p2->y = (short)end.y+.5;
  p2->z = (short)end.z+.5;
}

void get_arctype_endpoints_float(arc1,p1,p2)
Arc *arc1;
vector *p1,*p2;
{
  double theta, tcos, tsin, newx, newy, newz, rota, rotb;
  FPoint start, end;

  /* Get start and end points on XY PLANE */
  theta = (double)-(arc1->startangle) * M_PI / 180.0;
  start.x = (double)arc1->radius * cos(theta);
  start.y = (double)arc1->radius * sin(theta);
  start.z = 0.0;

  /* get the end point                 */
  theta = (double)-(arc1->startangle + arc1->offsetangle)
          * M_PI / 180.0;
  end.x = (double)arc1->radius * cos(theta);
  end.y = (double)arc1->radius * sin(theta);
  end.z = 0.0;

  /* now, rotate relative to the plane that the arc1 */
  /* resides upon.....                               */
  if (arc1->direc == 2) { /* parallel to YZ        */
    /* rotate -90 about the Y axis */
    tsin = sin(-90.0 * M_PI / 180.0);
    tcos = cos(-90.0 * M_PI / 180.0);

       newx = start.x * tcos - start.z * tsin;
    newz = start.x * tsin + start.z * tcos;
    start.x = newx;
```

```
    start.z = newz;
    newx = end.x * tcos - end.z * tsin;
    newz = end.x * tsin + end.z * tcos;
    end.x = newx;
    end.z = newz;
} else if (arc1->direc == 3) {  /* to ZX                 */
    /* rotate 90 about the X axis */
    tsin = sin(90.0 * M_PI / 180.0);
    tcos = cos(90.0 * M_PI / 180.0);

    newz = start.z * tcos - start.y * tsin;
    newy = start.z * tsin + start.y * tcos;
    start.y = newy;
    start.z = newz;
    newz = end.z * tcos - end.y * tsin;
    newy = end.z * tsin + end.y * tcos;
    end.y = newy;
    end.z = newz;
}


/* now apply rotations rota and rotb to circlepoints    */
/* These are stolen from the Starch code, so they    */
/* should work...                                                    */
rota = -arc1->rot1 * M_PI / 180.0;
rotb = arc1->rot2 * M_PI / 180.0;
tcos = cos(rota);
tsin = sin(rota);

/* around y */
newx = start.x * tcos - start.z * tsin;
newz = start.x * tsin + start.z * tcos;
start.x = newx;
start.z = newz;
newx = end.x * tcos - end.z * tsin;
newz = end.x * tsin + end.z * tcos;
end.x = newx;
end.z = newz;
```

```
    tcos = cos(rotb);
    tsin = sin(rotb);
   /* around z */
    newx = start.x * tcos - start.y * tsin;
    newy = start.x * tsin + start.y * tcos;
    start.x = newx;
    start.y = newy;
    newx = end.x * tcos - end.y * tsin;
    newy = end.x * tsin + end.y * tcos;
    end.x = newx;
    end.y = newy;

    /* now translate back to unrotated centerpoint    */
    start.x += (double)arc1->center.x;
    start.y += (double)arc1->center.y;
    start.z += (double)arc1->center.z;

    end.x += (double)arc1->center.x;
    end.y += (double)arc1->center.y;
    end.z += (double)arc1->center.z;

   /* NOW, FILL THE Arc STOP POINT FIELDS */
    p1->x = (float)start.x;
    p1->y = (float)start.y;
    p1->z = (float)start.z;

    p2->x = (float)end.x;
    p2->y = (float)end.y;
    p2->z = (float)end.z;
}

void get_arc_endpoints_float(arcnum,p1,p2)
short arcnum;
vector *p1,*p2;
{
    get_arctype_endpoints_float(&matis_arcs[arcnum],p1,p2);
}
```

```
Boolean shape_arc_p(elmnum,subnum)
short elmnum,subnum;
{
   short val;
   val = patt[elmnum].graphinfo[subnum];
   if (val == 2 || val == 5 || val== 8 || val == 11) return TRUE;
   return FALSE;
}

void print_point(p)
point *p;
{
   printf("%d %d %d  ",p->x,p->y,p->z);
}

void print_line(i)
short i;
{
    if(ptype[i]==1)printf("line %d: ",i);
   else printf("ARC %d: ",i);
    print_point(&plist1[i]);
    print_point(&plist2[i]);
}

#define DELTAOK 1
short delta_check_eq(num1, num2, delta)
short num1, num2;
int delta;
{
   int diff;

   diff = num1 - num2;

   if (diff < 0.0) {
            if (diff >= -delta)
              return(YES);
            return(NO);
   } else if (diff > 0.0) {
            if (diff <= delta)
```

```
                return(YES);
              return(NO);
    } else {
              return(YES);
    }
}

Boolean delta_pointeq_p(p1,p2,delta)
point *p1,*p2;
int delta;
{
    if (delta_check_eq(p1->x, p2->x, delta)
              && delta_check_eq(p1->y, p2->y, delta)
              && delta_check_eq(p1->z, p2->z, delta))
              return TRUE;
    else return FALSE;
}

Boolean delta_pointeq(p1,p2)
point *p1,*p2;
{
    return delta_pointeq_p(p1,p2,DELTAOK);
}

/*-----------------------*/

#define DELTAVECTOROK .05
Boolean delta_vector_check_eq(num1, num2, delta)
float num1, num2, delta;
{
    float diff;

    diff = num1 - num2;

    if (diff < 0.0) {
              if (diff >= -delta)
                return(TRUE);
              return(FALSE);
    } else if (diff > 0.0) {
              if (diff <= delta)
```

```
            return(TRUE);
        return(FALSE);
  } else {
        return(TRUE);
  }
}

Boolean delta_vectoreq_p(v1,v2,delta)
vector *v1,*v2;
float delta;
{
   if (delta_vector_check_eq(v1->x, v2->x,delta)
        && delta_vector_check_eq(v1->y, v2->y, delta)
        && delta_vector_check_eq(v1->z, v2->z, delta))
        return TRUE;
  else return FALSE;
}

Boolean delta_vectoreq(v1,v2)
vector *v1,*v2;
{
  return delta_vectoreq_p(v1,v2,DELTAVECTOROK);
}

/*------------------------*/

Boolean lines_connected_p(i1,i2)
short i1,i2;
{
/* printf("comparing: ");
 print_line(i1);print_line(i2); printf("\n"); fflush(stdout);
*/
/*   if(ptype[i1] == 2 || ptype[i2] == 2){*/
        if (delta_pointeq(&plist1[i1],&plist1[i2]) ||
            delta_pointeq(&plist1[i1],&plist2[i2]) ||
            delta_pointeq(&plist2[i1],&plist1[i2]) ||
            delta_pointeq(&plist2[i1],&plist2[i2])) return TRUE;
/* always check delta just in case???
  }
```

```
  else{
            if (pointeq(&plist1[i1],&plist1[i2]) ||
                pointeq(&plist1[i1],&plist2[i2]) ||
                pointeq(&plist2[i1],&plist1[i2]) ||
                pointeq(&plist2[i1],&plist2[i2])) return TRUE;
  }
*/
/* printf("not connected\n");fflush(stdout);*/
  return FALSE;
}


void swap_linesegs(i1,i2)
short i1,i2;
{
  point  temp;
  short  tnum;
/*    printf("swapping ...");fflush(stdout);*/
    copy_point(&temp,&plist1[i1]);
    copy_point(&plist1[i1],&plist1[i2]);
    copy_point(&plist1[i2],&temp);

    copy_point(&temp,&plist2[i1]);
    copy_point(&plist2[i1],&plist2[i2]);
    copy_point(&plist2[i2],&temp);

  tnum = ptype[i1];
  ptype[i1] = ptype[i2];
  ptype[i2] = tnum;

  tnum = pelmnum[i1];
  pelmnum[i1] = pelmnum[i2];
  pelmnum[i2] = tnum;

  tnum = psubnum[i1];
  psubnum[i1] = psubnum[i2];
  psubnum[i2] = tnum;

/*    printf("done\n");fflush(stdout);*/
```

```
/*will be wrong if a shape's arc has the same endpoints as some line*/
Boolean lines_eqp(i1,i2)
short i1,i2;
{
/*
 print_line(i1);
 print_line(i2); printf("\n");
*/
   if ((ptype[i1] == 2 && ptype[i2] == 1) ||
            (ptype[i1] == 1 && ptype[i2] == 2))
            return FALSE;
    if ((pointeq(&plist1[i1],&plist1[i2]) &&
              pointeq(&plist2[i1],&plist2[i2])) ||
            (pointeq(&plist1[i1],&plist2[i2]) &&
              pointeq(&plist2[i1],&plist1[i2])))
            return TRUE;
   else return FALSE;
}

void delete_lineseg(i)
short i;
{
   int h, n;
   n = sizeof(point);
   for(h=i;h<Linecount;h++){
            memcpy(&plist1[h],&plist1[h+1],n);
            memcpy(&plist2[h],&plist2[h+1],n);
            ptype[h] = ptype[h+1];
            pelmnum[h] = pelmnum[h+1];
            psubnum[h] = psubnum[h+1];
   }
   Linecount -= 1;
}

void remove_duplines()
{
   short i,h;
   for(i=0;i<Linecount-1;i++)
```

```
            for(h=i+1;h<Linecount;h++)
              if(lines_eqp(i,h)) {
                        delete_lineseg(h);
                        h--; /* test same pos */
              }
}

void sort_lines()
{
   short   i,h;
   short sflag=0;
/*
   printf("\nLinecount1 = %d\n",Linecount);
for(i=0;i<Linecount;i++){print_line(i); printf("\n"); fflush(stdout);}
*/
   remove_duplines();
/*
   printf("\nLinecount = %d\n",Linecount);
for(i=0;i<Linecount;i++){print_line(i); printf("\n"); fflush(stdout);}
*/
/*    printf("Attempting to form closed polygon ...\n");*/
   for(i=0;i<Linecount-1;i++){
            for(h=i+1;h<Linecount;h++){
/*               printf("h = %d\n",h);*/
               if(lines_connected_p(i,h)){
                        if(h != i+1) swap_linesegs(i+1,h);
                        break;
              }
              else if(h == Linecount-1){
/*                      printf("*****Warning, couldn't find match for line %d\n",i);*/
                        sflag=1;
              }
            }
  }
   if(!lines_connected_p(0,Linecount-1)){
/*          printf("*****Warning: Couldn't close the polygon\n");*/
            sflag += 5;
  }
/*
  switch(sflag){
```

```
            case 0: printf("SUCCESS!\n");break;
            case 1: printf("*****Better modify your polygon******\n");break;
            case 5: printf("OK if doesn't need to be closed\n");break;
            case 6: printf("*****Better modify your polygon******\n");break;
  }
for(i=0;i<Linecount;i++){print_line(i); printf("\n"); fflush(stdout);}

   printf("\nForming soap lines...\n");fflush(stdout);
*/
}

/**----------------------**/

point *get_plist_p1(lnum)
short lnum;
{
   return &plist1[lnum];
}

point *get_plist_p2(lnum)
short lnum;
{
   return &plist2[lnum];
}

short get_ptype(lnum)
short lnum;
{
   return ptype[lnum];
}

/*calculate the unit normal vector to a plane defined by 2 lines */
/* first, form 2 vectors from the endpoints of the lines */
/* then compute the normal, then normalize it */

void stuff_vector(p1,p2,v)
point *p1,*p2;
vector *v;
{
```

```
    v->x = (float)(p2->x - p1->x);
    v->y = (float)(p2->y - p1->y);
    v->z = (float)(p2->z - p1->z);
}

void stuff_vector_float(p1,p2,v)
vector *p1,*p2;
vector *v;
{
    v->x = (float)(p2->x - p1->x);
    v->y = (float)(p2->y - p1->y);
    v->z = (float)(p2->z - p1->z);
}

void copy_vector(v,v1)
vector *v,*v1;
{
    v->x = v1->x;
    v->y = v1->y;
    v->z = v1->z;
}

void get_normal(v1,v2,normal)
vector *v1,*v2,*normal;
{
    normal->x = v1->y * v2->z - v1->z * v2->y;
    normal->y = -(v1->x * v2->z - v1->z * v2->x);
    normal->z = v1->x * v2->y - v1->y * v2->x;
}

void normalize_vector(v)
vector *v;
{
    float length;
    length = sqrt(pow(v->x,2) + pow(v->y,2) + pow(v->z,2));
/*printf("unnormalized vector: %f %f %f\n",v->x,v->y,v->z);*/
    if (length == 0) return;
    v->x = v->x / length;
    v->y = v->y / length;
```

```
  v->z = v->z / length;
/*printf("normalized vector: %f %f %f\n",v->x,v->y,v->z);*/
}

void abs_vector(v)
vector *v;
{
  v->x = fabs(v->x);
  v->y = fabs(v->y);
  v->z = fabs(v->z);
}

void flip_vector(v)
vector *v;
{
  v->x = -(v->x);
  v->y = -(v->y);
  v->z = -(v->z);
}

Boolean vectors_parallel_p(ve1,ve2)
vector *ve1,*ve2;
{
   vector v1,v2;

   /*don't mung the originals*/
    copy_vector(&v1,ve1); copy_vector(&v2,ve2);
   normalize_vector(&v1);
   normalize_vector(&v2);
   if(delta_vectoreq(&v1,&v2)) return TRUE;
  else{
            flip_vector(&v1);
            if(delta_vectoreq(&v1,&v2)) return TRUE;
  }
  return FALSE;
}

Boolean lines_parallel_p(i1,i2)
short i1,i2;
{
```

```
   vector v1,v2;

     stuff_vector(get_plist_p1(i1),get_plist_p2(i1),&v1);
     stuff_vector(get_plist_p1(i2),get_plist_p2(i2),&v2);
   return vectors_parallel_p(&v1,&v2);
}


/*this mungs the vector so it has the most positive directions*/
/* or in the case of one zero value, with priority y,z,x*/
void make_vector_positive(v1)
vector *v1;
{
  if((v1->x > 0 && v1->y > 0) ||
             (v1->x > 0 && v1->z > 0) ||
             (v1->y > 0 && v1->z > 0)) return;
  else if(v1->x == 0){
             if(v1->y > 0) return;
             else if(v1->y == 0){
                if(v1->z > 0) return;
                else {flip_vector(v1); return;}
             }
             else {flip_vector(v1); return;}
  }
  else if(v1->y == 0){
             if(v1->z > 0) return;
             else if(v1->z == 0){
                if(v1->x > 0) return;
                else {flip_vector(v1); return;}
             }
             else {flip_vector(v1); return;}
  }
  else if(v1->z == 0){
             if(v1->y > 0) return;
             else if(v1->y == 0){
                if(v1->x > 0) return;
                else {flip_vector(v1); return;}
             }
             else {flip_vector(v1); return;}
```

```
  }
   flip_vector(v1);
}

void get_vector_normal(v1,v2,normal)
vector *v1,*v2,*normal;
{
   /*now compute the unit normal*/
/*   normalize_vector(v1);
   normalize_vector(v2);
*/
    get_normal(v1,v2,normal);
   normalize_vector(normal);
    make_vector_positive(normal);
}


void get_circle_unit_normal(gnum,partnum,normal)
short gnum,partnum;
vector *normal;
{
   vector v1,v2;
   short toffang;
   short elmnum;
   point p1,p2;

    elmnum = atom[groups[gnum].gpart[partnum].atnum].elpntr;

/*printf("elmnum = %d\n",elmnum);*/

   /*line 1 = center to startpoint*/

    stuff_vector(&matis_arcs[elmnum].center,get_plist_p1(partnum),&v1);

   /*line 2 = center to 90 degree point*/
    toffang = matis_arcs[elmnum].offsetangle;
    matis_arcs[elmnum].offsetangle = 90;
    get_arc_endpoints(elmnum,&p1,&p2);
    matis_arcs[elmnum].offsetangle = toffang;
```

```
    stuff_vector(&matis_arcs[elmnum].center,&p2,&v2);

   /*now compute the unit normal*/
    get_vector_normal(&v1,&v2,normal);
}

void  get_poly_unit_normal(gnum,normal)
short gnum;
vector *normal;
{
   vector v1,v2;
   short i;
   short linematch=0;

   /*find endpoints of current polygon's lines*/

   /*special hack for full circle arcs*/
   if(groups[gnum].numparts == 1 &&
            atom[groups[gnum].gpart[0].atnum].elmflg == 4){
               get_circle_unit_normal(gnum,0,normal);
              return;
            }

   /*find two non-parallel edges (use edge 0 as one of them)*/
   for(i=1;i<groups[gnum].numparts;i++){
/*          if(!lines_eqp(0,i) && lines_connected_p(0,i)){*/
            if(!lines_parallel_p(0,i)){
               linematch = i;
               break;
            }
  }
  if(linematch == 0){
            sprintf(tempname,"Couldn't thicken %s",groups[gnum].name);
            show_message(tempname,MAINW/2,MAINH/2 - 60 ,25,20);
            wait_for_click();
            clear_messages();
            normal->x = 0; normal->y = 0; normal->z = 0;
            return;
  }
```

```
    stuff_vector(get_plist_p1(0),get_plist_p2(0),&v1);
    stuff_vector(get_plist_p2(linematch),get_plist_p1(linematch),&v2);
/*
printf("vector1: %f %f %f\nvector2 %f %f %f\n",
          v1.x,v1.y,v1.z,v2.x,v2.y,v2.z);SLAM;
*/

   /*now compute the unit normal*/
    get_vector_normal(&v1,&v2,normal);
}

void convert_offset_poly(offset,edgeptr,gtype)
point *offset;
Edgelist *edgeptr;
short gtype;
{
   short i;
   point p1,p2;
   Arc *A;

   for(i=0;i<Linecount;i++){
          if(ptype[i] == 1){
              copy_point(&p1,&plist1[i]); copy_point(&p2,&plist2[i]);
              offset_point(&p1,offset); offset_point(&p2,offset);
              matis_add_line(edgeptr,&p1,&p2,gtype);
          }
          else if(ptype[i] == 2){
             A = &matis_arcs[pelmnum[i]];
             copy_point(&p1,&A->center);
             offset_point(&p1,offset);
             matis_add_arc(edgeptr,&p1,A->radius,A->startangle,
                       A->offsetangle,A->direc,A->rot1,A->rot2,gtype);
          }
          else if(ptype[i] == 3){
             if(!shape_arc_p(pelmnum[i],psubnum[i])){
                     copy_point(&p1,&plist1[i]);  copy_point(&p2,&plist2[i]);
                     offset_point(&p1,offset);  offset_point(&p2,offset);
                     matis_add_line(edgeptr,&p1,&p2,gtype);
             }
```

```
            else{
                        patrn_to_offset_soap_arc(edgeptr,offset,
                                                psubnum[i],pelmnum[i],gtype);
            }

        }
        else printf("BAD SUBPART TYPE in CONVERT_OFFSET_POLY!");
  }
}

void get_plane_intercept(n,p,d)
vector *n;
point *p;
float *d;
{
   *d= -(n->x*p->x + n->y*p->y + n->z*p->z);
}

void copy_point_to_vector(v,p)
point *p;
vector *v;
{
   v->x = (float)p->x;
   v->y = (float)p->y;
   v->z = (float)p->z;
}

void mult_add_vector_to_fpoint(p,v,coeff)
vector *p;
vector *v;
short coeff;
{
   p->x += v->x*coeff;
   p->y += v->y*coeff;
   p->z += v->z*coeff;
}


void make_endcap(edgeptr,p,v1,v2,radius,gtype)
```

```
Edgelist *edgeptr;
point *p;
vector *v1,*v2;
short radius;
short gtype;
{
   vector p1,p2;

/*this is very inaccurate since the radius is small*/
    copy_point_to_vector(&p1,p);
    mult_add_vector_to_fpoint(&p1,v1,radius);
    mult_add_vector_to_fpoint(&p1,v2,radius);
    copy_point_to_vector(&p2,p);
    mult_add_vector_to_fpoint(&p2,v1,-radius);
    mult_add_vector_to_fpoint(&p2,v2,radius);
    matis_add_line_float(edgeptr,&p1,&p2,gtype);

    copy_point_to_vector(&p1,p);
    mult_add_vector_to_fpoint(&p1,v1,-radius);
    mult_add_vector_to_fpoint(&p1,v2,radius);
    copy_point_to_vector(&p2,p);
    mult_add_vector_to_fpoint(&p2,v1,-radius);
    mult_add_vector_to_fpoint(&p2,v2,-radius);
    matis_add_line_float(edgeptr,&p1,&p2,gtype);

    copy_point_to_vector(&p1,p);
    mult_add_vector_to_fpoint(&p1,v1,-radius);
    mult_add_vector_to_fpoint(&p1,v2,-radius);
    copy_point_to_vector(&p2,p);
    mult_add_vector_to_fpoint(&p2,v1,radius);
    mult_add_vector_to_fpoint(&p2,v2,-radius);
    matis_add_line_float(edgeptr,&p1,&p2,gtype);

    copy_point_to_vector(&p1,p);
    mult_add_vector_to_fpoint(&p1,v1,radius);
    mult_add_vector_to_fpoint(&p1,v2,-radius);
    copy_point_to_vector(&p2,p);
    mult_add_vector_to_fpoint(&p2,v1,radius);
    mult_add_vector_to_fpoint(&p2,v2,radius);
    matis_add_line_float(edgeptr,&p1,&p2,gtype);
```

```
}

void connect_endcaps(edgeptr,p1,p2,v1,v2,radius,gtype)
Edgelist *edgeptr;
point *p1,*p2;
vector *v1,*v2;
short radius;
short gtype;
{
   vector ep1,ep2;

    copy_point_to_vector(&ep1,p1);
    mult_add_vector_to_fpoint(&ep1,v1,radius);
    mult_add_vector_to_fpoint(&ep1,v2,radius);
    copy_point_to_vector(&ep2,p2);
    mult_add_vector_to_fpoint(&ep2,v1,radius);
    mult_add_vector_to_fpoint(&ep2,v2,radius);
    matis_add_line_float(edgeptr,&ep1,&ep2,gtype);
}

Boolean find_coplanar_gpart(gnum,p1,p2,pt)
point *p1,*p2,*pt;
short gnum;
{
   point tp1,tp2;
   vector v1,v2,v3,normal,normal1;
   short i;
   selectitem *slist;

   slist = &groups[gnum].gpart[0];
   stuff_vector(p1,p2,&v1);

   /*need a part which has exactly 1 colinear endpoint*/
   /*or the second endpoint lies in the plane defined by the first 3*/
   for(i=0;i<groups[gnum].numparts;i++){
            /*try for colinear endpoint first*/
            get_subpart_p1(slist[i].atnum,slist[i].sbnum,&tp1);
            get_subpart_p2(slist[i].atnum,slist[i].sbnum,&tp2);
```

```
        stuff_vector(p1,&tp1,&v2);
        stuff_vector(p1,&tp2,&v3);
        if(delta_pointeq_p(p1,&tp1,3) || delta_pointeq_p(p2,&tp1,3) ||
          vectors_parallel_p(&v1,&v2)){
           if(!delta_pointeq_p(p1,&tp2,3) && !delta_pointeq_p(p2,&tp2,3) &&
                  !vectors_parallel_p(&v1,&v3)){
                  copy_point(pt,&tp2);
                  return TRUE;
          }
           else continue;
        }
        else if(delta_pointeq_p(p1,&tp2,3) || delta_pointeq_p(p2,&tp2,3) ||
                  vectors_parallel_p(&v1,&v3)){
           copy_point(pt,&tp1);
          return TRUE;
        }
}

/*now just try for coplanar*/
for(i=0;i<groups[gnum].numparts;i++){
        /*try for colinear endpoint first*/
        get_subpart_p1(slist[i].atnum,slist[i].sbnum,&tp1);
        get_subpart_p2(slist[i].atnum,slist[i].sbnum,&tp2);
        stuff_vector(p1,&tp1,&v2);
        stuff_vector(p1,&tp2,&v3);

        /*the only case we could encounter is redundant lines*/
        if(delta_pointeq_p(p1,&tp1,3) || delta_pointeq_p(p2,&tp1,3) ||
          vectors_parallel_p(&v1,&v2)){
           if(delta_pointeq_p(p1,&tp2,3) || delta_pointeq_p(p2,&tp2,3) ||
                  vectors_parallel_p(&v1,&v3)) continue;
        }
        else {
           /*neither point is colinear*/
           /*get a normal and see if the other point produces the same one*/
           get_normal(&v1,&v2,&normal);
           get_normal(&v1,&v3,&normal1);
           if(vectors_parallel_p(&normal,&normal1)){
                  copy_point(pt,&tp1);   /* either point will work */
```

```
                        return TRUE;
                }
            }
    }
    return FALSE;
}


#define LINETHICKNESS 2

/*this creates 2 polygons and a sweep for a line*/
void  matis_add_wire_line(soapnum,curpart,gnum,edgeptr,p1,p2)
Part *curpart;
short gnum,soapnum;
Edgelist *edgeptr;
point *p1,*p2;
{
    vector normal,v1,v2;
    float d1,d2;
    point p3;
    short thickval = LINETHICKNESS;
    Part *temppart;

    /*convert the line to a vector*/
    stuff_vector(p1,p2,&normal);

    /*see if there is a coplanar line in the rest of the group*/
    /*if so, use one of the endpoints to form a normal*/
    /*otherwise pick an arbitrary endpoint based on the plane equation*/
    if(find_coplanar_gpart(gnum,p1,p2,&p3)){
            stuff_vector(p1,&p3,&v2);   /* temporarily use v2 */
            get_normal(&normal,&v2,&v1);      /* to get the normal into v1 */
    }

    else{
            /*compute the plane equations for the endcaps*/
            get_plane_intercept(&normal,p1,&d1);

            /*find another point in one of the planes*/
            /*make sure it is not = to the original point*/
```

```
        if(normal.x != 0){
            if((short)(-d1/normal.x) == p1->x)
                    /*use a different point than the default one*/
                    /*to make sure it is not the same as the end point*/
                    if(p1->y > 5 && p1->y < 15)          /* arbitrary numbers */
                        stuff_point((short)((-d1-(20*normal.y))/normal.x),20,0,&p3);
                    else
                        stuff_point((short)((-d1-(10*normal.y))/normal.x),10,0,&p3);
             else stuff_point((short)(-d1/normal.x),0,0,&p3);
        }
        else if(normal.y != 0){
            if((short)(-d1/normal.y) == p1->y)
                    /*we know a=0,so we can use anything for x without changing y*/
                    stuff_point(10,(short)(-d1/normal.y),0,&p3);
             else stuff_point(0,(short)(-d1/normal.y),0,&p3);
        }
        else if(normal.z != 0){
            if((short)(-d1/normal.z) == p1->z)
                    /*we know a=0,so we can use anything for x without changing z*/
                    stuff_point(10,0,(short)(-d1/normal.z),&p3);
             else stuff_point(0,0,(short)(-d1/normal.z),&p3);
        }
        else {
            printf("Bad wireframe data, endpoints are equal\n");fflush(stdout);
           return;
        }

        stuff_vector(p1,&p3,&v1);
}

/*v1 has a vector on the endcap plane, normal is the original line vector*/
/*get the third normal, and make unit vectors*/
 get_normal(&normal,&v1,&v2); /* get normal into v2 */
normalize_vector(&v1);
normalize_vector(&v2);

 if(groups[gnum].thickness.hflag)
        thickval = max(groups[gnum].thickness.height/2,1);
```

```
  /*do the end caps, pass in copies of the vectors*/
   make_endcap(edgeptr,p1,&v1,&v2,thickval,POLYGROUP);
  edgeptr = add_poly(curpart);
   make_endcap(edgeptr,p2,&v1,&v2,thickval,POLYGROUP);

  /*now do the main body sweep*/
  /*sweeps have to be separate parts, so make it a constrained child*/
  temppart = add_part(curpart,soapnum);

   sprintf(tempname,"Object.s%d",get_unique_num());

   matis_stuff_part(temppart,tempname,&defaultconstraint,
                    groups[gnum].r,groups[gnum].g,groups[gnum].b,
                    groups[gnum].reverse,  /* DDB */
                    &groups[gnum].origin,
                    groups[gnum].stepsize); /* DDB */

  edgeptr = add_poly(temppart);
   make_endcap(edgeptr,p2,&v1,&v2,thickval,CONNECTGROUP);
   make_endcap(edgeptr,p1,&v1,&v2,thickval,CONNECTGROUP);

  /*now close off the sweep*/
   connect_endcaps(edgeptr,p1,p2,&v1,&v2,thickval,CONNECTGROUP);
}



void make_offset_arc_endline(edgeptr,p1,p2,v,thickval,gtype)
Edgelist *edgeptr;
vector *p1,*p2;
vector *v;
short thickval;
short gtype;
{
  vector ep1,ep2;

  /*now send the end lines*/
   copy_vector(&ep1,p1);
   mult_add_vector_to_fpoint(&ep1,v,thickval);
  copy_vector(&ep2,p2);
```

```
    mult_add_vector_to_fpoint(&ep2,v,thickval);
    matis_add_line_float(edgeptr,&ep1,&ep2,gtype);
}

/*p1,p2,p3,p4 are the endpoints of the 2 arcs*/
/*v is the unit vector pointing at the endcap from the original arc, and */
/* thickval is the distance to the endcap*/
/*cv is the unit vector from p1 to the center*/
/*radius is the original radius of the arc which will again be offset*/
/*by thickval in both directions*/
void make_circle_endcap(curpart,edgeptr,p1,p2,p3,p4,
                         A,v,cv,radius,thickval,gtype)
Part *curpart;
Edgelist *edgeptr;
Arc *A;
vector *v,*cv;
vector *p1,*p2,*p3,*p4;
short radius,thickval,gtype;
{
   vector fcenter;
   short rad1,rad2;
   vector ep1,ep2;


   rad1 = radius + thickval;
   if(rad1<0) rad1 = 0;
   rad2 = radius - thickval;
   if(rad2<0) rad2 = 0;

    copy_point_to_vector(&fcenter,&A->center);
    mult_add_vector_to_fpoint(&fcenter,v,thickval);

   /*get the points 180 degrees around the circle*/
    copy_vector(&ep1,p1);
    copy_vector(&ep2,p3);
   if(rad1>rad2){
       mult_add_vector_to_fpoint(&ep1,cv,2*rad1);
       mult_add_vector_to_fpoint(&ep2,cv,2*rad2);
   }
```

```
  else{
      mult_add_vector_to_fpoint(&ep1,cv,2*rad2);
      mult_add_vector_to_fpoint(&ep2,cv,2*rad1);
  }

  /*send the 180 degree arcs*/
   matis_add_arc_float(edgeptr,&fcenter,rad1,A->startangle+180,
                         180,A->direc,A->rot1,A->rot2,gtype);
   matis_add_arc_float(edgeptr,&fcenter,rad2,A->startangle,
                                        -180,A->direc,A->rot1,A->rot2,gtype);
   make_offset_arc_endline(edgeptr,p1,p3,v,thickval,gtype);
   make_offset_arc_endline(edgeptr,&ep2,&ep1,v,thickval,gtype);

  /*do the other half circle as a separate poly*/
  edgeptr = add_poly(curpart);
   matis_add_arc_float(edgeptr,&fcenter,rad2,A->startangle+180,
                                        -180,A->direc,A->rot1,A->rot2,gtype);
   matis_add_arc_float(edgeptr,&fcenter,rad1,A->startangle,
                                        180,A->direc,A->rot1,A->rot2,gtype);
   make_offset_arc_endline(edgeptr,p3,p1,v,thickval,gtype);
   make_offset_arc_endline(edgeptr,&ep1,&ep2,v,thickval,gtype);
}

void make_arc_endcap(edgeptr,p1,p2,p3,p4,A,v,radius,thickval,gtype)
Edgelist *edgeptr;
Arc *A;
vector *v;
vector *p1,*p2,*p3,*p4;
short radius,thickval,gtype;
{
   vector fcenter;
   short rad1,rad2;
   vector ep1,ep2;

  if(thickval >= 0){
              rad1 = radius + thickval;
              if(rad1<0) rad1 = 0;
              rad2 = radius - thickval;
              if(rad2<0) rad2 = 0;
```

```
else{
        rad1 = radius - thickval;
        if(rad1<0) rad1 = 0;
        rad2 = radius + thickval;
        if(rad2<0) rad2 = 0;
}

 copy_point_to_vector(&fcenter,&A->center);
 mult_add_vector_to_fpoint(&fcenter,v,thickval);

 make_offset_arc_endline(edgeptr,p1,p3,v,thickval,gtype);
 make_offset_arc_endline(edgeptr,p4,p2,v,thickval,gtype);
if(rad1)
   matis_add_arc_float(edgeptr,&fcenter,rad1,
                         A->startangle+A->offsetangle,-A->offsetangle,
                         A->direc,A->rot1,A->rot2,gtype);
if(rad2)
   matis_add_arc_float(edgeptr,&fcenter,rad2,
                         A->startangle,A->offsetangle,
                         A->direc,A->rot1,A->rot2,gtype);
}

/*this creates 2 polygons and a sweep for an arc*/
void  matis_add_wire_arc(soapnum,curpart,gnum,edgeptr,A,offset)
Part *curpart;
short gnum,soapnum;
Edgelist *edgeptr;
Arc *A;
point *offset;
{
   vector v1,v2,v3,fcenter;
   vector p1,p2,p3,p4,tp1,tp2;
   point tcent;
   vector ep1,ep2;
   short thickval = LINETHICKNESS;
   short temprad,tempoffset;
   Part *temppart;
   short radin,radout;
```

```
/*do the regular offset*/
 copy_point(&tcent,&A->center);
 offset_point(&A->center,offset);

 if(groups[gnum].thickness.hflag)
         thickval = max(groups[gnum].thickness.height/2,1);

temprad = A->radius;
if(thickval > temprad) thickval = temprad;

/*get the endpoints of the inner arc( accurately)*/
A->radius = radin = temprad - thickval;
 get_arctype_endpoints_float(A,&p3,&p4);

/*now get the outer arc*/
A->radius = radout = temprad + thickval;
 get_arctype_endpoints_float(A,&p1,&p2);

/*use a 45 degree arc to find a non-colinear point on the plane*/
tempoffset = A->offsetangle;
A->offsetangle = 45;
 get_arctype_endpoints_float(A,&tp1,&tp2);
A->offsetangle = tempoffset;

/*get the normalized thickening vectors*/
 stuff_vector_float(&p1,&tp2,&v3);
 stuff_vector_float(&p1,&p3,&v1);
 get_normal(&v3,&v1,&v2);
normalize_vector(&v1);
normalize_vector(&v2);


/*form the two arcs into a polygon for the endcaps*/
/*special case a full circle*/
if((A->offsetangle % 360) == 0){
        make_circle_endcap(curpart,edgeptr,&p1,&p2,&p3,&p4,A,&v2,&v1,
                    temprad,thickval,POLYGROUP);
        edgeptr = add_poly(curpart);
        make_circle_endcap(curpart,edgeptr,&p1,&p2,&p3,&p4,A,&v2,&v1,
```

```
                        temprad,-thickval,POLYGROUP);
}
else{
        make_arc_endcap(edgeptr,&p1,&p2,&p3,&p4,A,&v2,
                        temprad,thickval,POLYGROUP);
        edgeptr = add_poly(curpart);
        make_arc_endcap(edgeptr,&p1,&p2,&p3,&p4,A,&v2,
                        temprad,-thickval,POLYGROUP);
}

/*now do the main body sweep*/
/*sweeps have to be separate parts, so make it a constrained child*/

/*do 2 separate sweeps for the full circle case*/
if((A->offsetangle % 360) == 0){
 /*send the outer sweep*/
 temppart = add_part(curpart,soapnum);

  sprintf(tempname,"Object.s%d",get_unique_num());
  matis_stuff_part(temppart,tempname,&defaultconstraint,
                        groups[gnum].r,groups[gnum].g,groups[gnum].b,
                        groups[gnum].reverse,
                        &groups[gnum].origin,
                        groups[gnum].stepsize);

 edgeptr = add_poly(temppart);
  copy_point_to_vector(&fcenter,&A->center);
  mult_add_vector_to_fpoint(&fcenter,&v2,-thickval);
  matis_add_arc_float(edgeptr,&fcenter,radout,A->startangle,
                        A->offsetangle,A->direc,A->rot1,A->rot2,SWEEPGROUP);
  copy_point_to_vector(&fcenter,&A->center);
  mult_add_vector_to_fpoint(&fcenter,&v2,thickval);
  matis_add_arc_float(edgeptr,&fcenter,radout,A->startangle,
                        A->offsetangle,A->direc,A->rot1,A->rot2,SWEEPGROUP);
 /*close off the outer sweep with a line*/
  copy_vector(&ep1,&p1);
  mult_add_vector_to_fpoint(&ep1,&v2,thickval);
  copy_vector(&ep2,&p1);
  mult_add_vector_to_fpoint(&ep2,&v2,-thickval);
  matis_add_line_float(edgeptr,&ep1,&ep2,SWEEPGROUP);
```

```
  /*send the inner sweep*/
  temppart = add_part(curpart,soapnum);

   sprintf(tempname,"Object.s%d",get_unique_num());
   matis_stuff_part(temppart,tempname,&defaultconstraint,
                              groups[gnum].r,groups[gnum].g,groups[gnum].b,
                              groups[gnum].reverse,
                              &groups[gnum].origin,
                              groups[gnum].stepsize);

  edgeptr = add_poly(temppart);
   copy_point_to_vector(&fcenter,&A->center);
   mult_add_vector_to_fpoint(&fcenter,&v2,thickval);
   matis_add_arc_float(edgeptr,&fcenter,radin,A->startangle,
                              A->offsetangle,A->direc,A->rot1,A->rot2,SWEEPGROUP);
   copy_point_to_vector(&fcenter,&A->center);
   mult_add_vector_to_fpoint(&fcenter,&v2,-thickval);
   matis_add_arc_float(edgeptr,&fcenter,radin,A->startangle,
                              A->offsetangle,A->direc,A->rot1,A->rot2,SWEEPGROUP);
  /*close off the inner sweep with a line*/
  copy_vector(&ep1,&p3);
   mult_add_vector_to_fpoint(&ep1,&v2,thickval);
  copy_vector(&ep2,&p3);
   mult_add_vector_to_fpoint(&ep2,&v2,-thickval);
  matis_add_line_float(edgeptr,&ep2,&ep1,SWEEPGROUP);
}

else{
  temppart = add_part(curpart,soapnum);

  sprintf(tempname,"Object.s%d",get_unique_num());

  matis_stuff_part(temppart,tempname,&defaultconstraint,
                              groups[gnum].r,groups[gnum].g,groups[gnum].b,
                              groups[gnum].reverse,
                              &groups[gnum].origin,
                              groups[gnum].stepsize);
```

```
edgeptr = add_poly(temppart);
/*do the endcaps again for the sweep*/
 make_arc_endcap(edgeptr,&p1,&p2,&p3,&p4,A,&v2,
                    temprad,thickval,CONNECTGROUP);
 make_arc_endcap(edgeptr,&p1,&p2,&p3,&p4,A,&v2,
                    temprad,-thickval,CONNECTGROUP);

/*now close off the sweep with a line*/
 copy_vector(&ep1,&p1);
 mult_add_vector_to_fpoint(&ep1,&v2,thickval);
 copy_vector(&ep2,&p1);
 mult_add_vector_to_fpoint(&ep2,&v2,-thickval);
 matis_add_line_float(edgeptr,&ep2,&ep1,CONNECTGROUP);
}
 /*restore the center point and radius*/
 A->radius = temprad;
 copy_point(&A->center,&tcent);
}

void convert_offset_wirepoly(soapnum,curpart,gnum,offset,edgeptr)
short soapnum;
Part *curpart;
point *offset;
Edgelist *edgeptr;
{
   short i;
   point p1,p2;
   Arc *A;
   Part *temppart;

   temppart = curpart;
   for(i=0;i<Linecount;i++){
          if(i>0){
             temppart = add_part(curpart,soapnum);

             sprintf(tempname,"Object.s%d",get_unique_num());
             matis_stuff_part(temppart,tempname,&defaultconstraint,
                    groups[gnum].r,groups[gnum].g,groups[gnum].b,
                    groups[gnum].reverse,  /* DDB */
```

```
                    groups[gnum].stepsize); /* DDB */

            edgeptr = add_poly(temppart);
        }
        if(ptype[i] == 1){
             copy_point(&p1,&plist1[i]); copy_point(&p2,&plist2[i]);
             offset_point(&p1,offset); offset_point(&p2,offset);
             matis_add_wire_line(soapnum,temppart,gnum,edgeptr,&p1,&p2);
        }
        else if(ptype[i] == 2){
            matis_add_wire_arc(soapnum,temppart,gnum,edgeptr,
                                          &matis_arcs[pelmnum[i]],offset);
        }
        else if(ptype[i] == 3){
            if(!shape_arc_p(pelmnum[i],psubnum[i])){
                    copy_point(&p1,&plist1[i]); copy_point(&p2,&plist2[i]);
                    offset_point(&p1,offset); offset_point(&p2,offset);
                    matis_add_wire_line(soapnum,temppart,gnum,edgeptr,&p1,&p2);
          }
          else{
                    patrn_to_offset_wire_arc(soapnum,temppart,gnum,edgeptr,offset,
                                          psubnum[i],pelmnum[i]);
          }

        }
        else printf("BAD SUBPART TYPE in CONVERT_OFFSET_POLY!");
  }

}

void do_poly_thicken(soapnum,curpart,gnum)
Part *curpart;
short gnum,soapnum;
{
  vector normal;
   point   offset,mainoffset,p1,p2,porigin;
  float  height;
  Edgelist *edgeptr;
  short  i;
```

```
 copy_point(&porigin,&zeropoint);
 subtract_point(&porigin,&groups[gnum].origin);

/*do the original poly first (offset if equal thickened) */
edgeptr = add_poly(curpart);

if(groups[gnum].type == WIREGROUP){
          convert_offset_wirepoly(soapnum,curpart,gnum,&porigin,edgeptr);
          return;
}

 if(!groups[gnum].thickness.hflag){
          convert_offset_poly(&porigin,edgeptr,groups[gnum].type);
          return;
}

 height = (float)groups[gnum].thickness.height;
 get_poly_unit_normal(gnum,&normal);

if(groups[gnum].thickness.htype == POSTHICKEN)
          stuff_point((short)(normal.x * height),(short)(normal.y * height),
                    (short)(normal.z * height),&offset);
else if(groups[gnum].thickness.htype == NEGTHICKEN)
          stuff_point((short)-(normal.x * height),(short)-(normal.y *height),
                    (short)-(normal.z * height),&offset);
 else stuff_point((short)(normal.x * height/2),(short)(normal.y * height/2),
                    (short)(normal.z * height/2),&offset);

/*offset the original poly if thickened in both directions*/
if(groups[gnum].thickness.htype == EQUALTHICKEN)
          stuff_point(-offset.x,-offset.y,-offset.z,&mainoffset);
 else copy_point(&mainoffset,&zeropoint);

/*make the offsets relative to the part origin */
 offset_point(&offset,&porigin);
 offset_point(&mainoffset,&porigin);

/*convert the original poly*/
 convert_offset_poly(&mainoffset,edgeptr,groups[gnum].type);
```

```
if(height == 0) return; /* don't finish if thickness =0 */

/*need to form 2 more surfaces and add them to the current part*/
/*printf("opposing face:\n");*/

/* the opposing polygon*/
edgeptr = add_poly(curpart);
convert_offset_poly(&offset,edgeptr,POLYGROUP);


/*printf("main body sweep:\n");fflush(stdout);*/

/*now do the main body sweep*/
/*sweeps have to be separate parts, so make it a constrained child*/
{
Part *temppart;

temppart = add_part(curpart,soapnum);

sprintf(tempname,"Object.s%d",get_unique_num());
matis_stuff_part(temppart,tempname,&defaultconstraint,
                groups[gnum].r,groups[gnum].g,groups[gnum].b,
                groups[gnum].reverse, /* DDB */
                &groups[gnum].origin,
                groups[gnum].stepsize); /* DDB */

edgeptr = add_poly(temppart);

convert_offset_poly(&offset,edgeptr,CONNECTGROUP);
convert_offset_poly(&mainoffset,edgeptr,CONNECTGROUP);

/*now close off the sweep*/
copy_point(&p1,&plist1[0]); offset_point(&p1,&offset);
copy_point(&p2,&plist1[0]); offset_point(&p2,&mainoffset);
matis_add_line(edgeptr,&p1,&p2,CONNECTGROUP);
}
/*printf("done with sweep\n");fflush(stdout);*/
}
```

```
/*-------------------------*/

/* DO NOT PLACE ANY FUNCTIONS AFTER START OF RCS LOG!
$Log:     convert.c,v $
 * Revision 2.14  90/11/01  14:30:39  ethan
 * name message
 *
 * Revision 2.12  90/10/24  17:01:35  mike
 * made change to knob stuff. multi knobs add matis cyl called with
 * tempart instead of curpart
 *
 * Revision 2.11  90/10/23  21:42:04  ethan
 * patarcs in userpolys
 *
 * Revision 2.10  90/10/23  16:14:57  mike
 * fixed syntax error
 *
 * Revision 2.9  90/10/23  15:27:43  ethan
 * permission message
 *
 * Revision 2.8  90/10/23  15:05:35  mike
 * uses xoyozo of graphprod.c to give correct orientations
 * and direction for knobs.
 *
 * Revision 2.7  90/10/22  15:23:06  mike
 * grids can now be converted
 *
 * Revision 2.6  90/10/19  19:11:52  ethan
 * no more wire bugs?
 *
 * Revision 2.5  90/10/19  17:09:16  mike
 * added convert capablility for parallel lines
 * and added some error checking.
 *
 * Revision 2.4  90/10/16  16:36:29  ethan
 * wirearc work
 *
 * Revision 2.3  90/10/16  14:12:55  ethan
```

```
* fixed thickened lines to planes
*
* Revision 2.2  90/10/12  19:06:03  ethan
* *** empty log message ***
*
* Revision 2.1  90/10/05  10:29:44  dan
* New Rev
*
* Revision 1.34  90/10/02  18:29:41  dan
* Unique Naming to get Beta2 ship working.
*
* Revision 1.33  90/10/01  21:06:17  ethan
* clips arc radius
*
* Revision 1.32  90/10/01  16:09:03  ethan
* fixed delta_pointeq_p
*
* Revision 1.31  90/09/30  15:37:18  ethan
* fixed full circle thickness
*
* Revision 1.30  90/09/29  11:06:12  ethan
* Full circles, more Wireframe stuff (Dan - for EJ in Absentia)
*
* Revision 1.29  90/09/28  12:37:21  ethan
* wireframes
*
* Revision 1.28  90/09/25  14:09:24  dan
* Added stepsize argument to matis_stuff_part()
*
* Revision 1.27  90/09/25  13:03:41  ethan
* vector code touch up
*
* Revision 1.26  90/09/21  14:47:04  ethan
* more user polys
*
* Revision 1.25  90/09/20  17:30:08  dan
* !!!!!!!FIXED ARC START STOP FOR 2nd TIME!!!!!!!!
* (Can't miss THIS log message...)
*
```

```
* Revision 1.24  90/09/20  17:18:18  ethan
* handles user polygons
*
* Revision 1.23  90/09/12  19:38:08  ethan
* error messages
*
* Revision 1.22  90/09/07  22:23:59  ethan
* converts thickened patterns
*
* Revision 1.18  90/09/07  12:14:56  dan
* Fixed arc rot1 and rot2 stuff for start/end routine...
*
* Revision 1.17  90/09/07  11:54:42  mike
* changed a name to patrn_to_soap_arc
*
* Revision 1.14  90/09/06  18:14:37  dan
* Sweep gets same origin as parent part for thickened stuff.
*
* Revision 1.13  90/09/06  18:04:13  ethan
* does knobs
* .
*
* Revision 1.12  90/09/05  19:51:00  ethan
* working on converting patterns
*
* Revision 1.11  90/09/04  15:24:33  ethan
* handles origin and offsets
*
* Revision 1.10  90/08/30  13:34:55  dan
* Added "reverse" argument to matis_stuff_part()
*
* Revision 1.9  90/08/30  13:00:56  ethan
* *** empty log message ***
*
* Revision 1.7  90/08/28  12:25:16  mike
* get_subrect p1 and p2 changed to comply with new versions of this
* function in graphprod.c
*
* Revision 1.6  90/08/27  20:36:17  ethan
```

```
* *** empty log message ***
*
* Revision 1.5  90/08/22  12:38:10  dan
* Added root check for soap deletion
*
* Revision 1.4  90/08/22  11:57:55  dan
* Added deletion of existing soap database before conversion
* to new soap database...
*
* Revision 1.3  90/08/21  19:03:33  ethan
* *** empty log message ***
*
* Revision 1.2  90/08/19  13:47:49  dan
* Added auto-display in Soap Viewport for convert
*
* Revision 1.1  90/08/17  18:17:39  dan
* Initial revision
*
*/
```

| | |
|---|---|
| User: | MICRORENTMind |
| Application: | PrintMonitor |
| Document: | dictionary.h |
| Date: | Wednesday, November 14, 1990 |
| Time: | 7:02:34 PM |
| Printer: | Peace of Mind |

```
/*
** DICTIONARY.H
**
** Copyright 1990 by VPL Research
**
$Header: /usr/starch/source/wringer/RCS/dictionary.h,v 1.2 90/10/02 21:08:02 dan Exp $
**
*/

#define NAMELEN         25

typedef struct {
   short  next;
   short  prev;
} Index;

typedef struct {
   char   entry_name[NAMELEN];
   short  current_index, blankname;
   Index  *first_in_product;
   short  bucket_first, bucket_final;
} Dictionary;

#define NOLINK          -1
#define      NULLINDEX  (Index *)0

/* The number of distinct names in an entire kitchen...            */
#define MAX_WORDS  1000

/* The number at the tail of name can range from 0 to 999  */
#define MAX_INDEX  1000

/* DO NOT PUT ANYTHING AFTER RCS LOG!
$Log:      dictionary.h,v  $
 * Revision 1.2  90/10/02  21:08:02  dan
 * Increased dictionary size to 1000, and index number size to 1000.
 *
 * Revision 1.1  90/09/01  12:16:19  dan
 * Initial revision
```

```
 *
 */
```

| | |
|---|---|
| User: | MICRORENTMind |
| Application: | PrintMonitor |
| Document: | editinfo.c |
| Date: | Wednesday, November 14, 1990 |
| Time: | 7:03:14 PM |
| Printer: | Peace of Mind |

```
/*
** EDITINFO.C
**
** Copyright 1990, VPL Research
**
$Header: /usr/starch/source/starch/RCS/editinfo.c,v 2.5 90/10/24 17:13:11 ethan Exp $
**
*/

#include <stdio.h>
#include <gl/gl.h>
#include <gl/device.h>
#include <math.h>
#include "prod.h"
#include "globals.h"
#include "soap.h"
#include "group.h"  /*must be loaded after soap.h*/

void info_views_update();

void name_view_update();
void set_name_viewport();
void name_view_update();
void show_name();

void color_view_update();
void set_color_viewport();
void color_view_update();
void show_color();
void do_color_edit();

void thickness_view_update();
void set_thickness_viewport();
void thickness_view_update();
void show_thickness();
void do_thickness_edit();

void constraint_view_update();
void set_constraint_viewport();
```

```
void constraint_view_update();
void show_constraint();

/*------------------------------*/

short mnamerect[4]= {MNAMELEFT,MNAMELEFT+MNAMEWIDTH,
                                MNAMEBOT,MNAMEBOT+MNAMEHEIGHT};
short mcolorrect[4]= {MCOLORLEFT,MCOLORLEFT+MCOLORWIDTH,
                                MCOLORBOT,MCOLORBOT+MCOLORHEIGHT};
short mthickrect[4]= {MTHICKLEFT,MTHICKLEFT+MTHICKWIDTH,
                                MTHICKBOT,MTHICKBOT+MTHICKHEIGHT};
short mconstraintrect[4]= {MCONSTRAINTLEFT,MCONSTRAINTLEFT+MCONSTRAINTWIDTH,
                                MCONSTRAINTBOT,MCONSTRAINTBOT+MCONSTRAINTHEI

static char curin[80];
static char curprompt[80];
static char tempstr[80];

/*----------------------------*/
#define Cleft 65
#define Cbot 10
#define xin 5
#define yin 5
#define tcwidth 65
#define itheight 20
#define Bbot Cbot
#define Gbot (Cbot+itheight)
#define Rbot (Cbot+2*itheight)
#define Rtop (Cbot+3*itheight)


short Brect[4] = {MCOLORLEFT+Cleft,MCOLORLEFT+Cleft+tcwidth,
                        MCOLORBOT+Cbot,MCOLORBOT+Gbot};
short Grect[4] = {MCOLORLEFT+Cleft,MCOLORLEFT+Cleft+tcwidth,
                        MCOLORBOT+Gbot,MCOLORBOT+Rbot};
short Rrect[4] = {MCOLORLEFT+Cleft,MCOLORLEFT+Cleft+tcwidth,
                        MCOLORBOT+Rbot,MCOLORBOT+Rtop};

/*------------------------------------*/
```

```
#define thickleft 20
#define thickbot 10
#define thickwidth 170
#define ttextheight 20
#define htypebot thickbot
#define heightbot (thickbot+ttextheight)
#define heighttop (thickbot+2*ttextheight)

short heightrect[4] = {MTHICKLEFT+thickleft,MTHICKLEFT+thickleft+thickwidth,
                        MTHICKBOT+heightbot,MTHICKBOT+heighttop};
short htyperect[4] = {MTHICKLEFT+thickleft,MTHICKLEFT+thickleft+thickwidth,
                        MTHICKBOT+htypebot,MTHICKBOT+heightbot};

/*------------------------------------*/

#define constraintleft 20
#define constraintbot 10
#define constraintwidth 170
#define ctextheight 20
#define chorizsep 70
#define cvertsep 30
#define cstarth 60
#define cstartv 50
#define cchecksize 20

short constraintrects [18] [4];
short ccheckrects[6] [4];

/*------------------------------------*/
void init_constraint_rects()
{
   short v,h;
   for(v=0;v<6;v++){
            for(h=0;h<3;h++){
               constraintrects[(5-v)*3+h][LEFT]= MCONSTRAINTLEFT+cstarth+
                                                        h*chorizsep;
               constraintrects[(5-v)*3+h][RIGHT]= MCONSTRAINTLEFT+cstarth+
                                                        (h+1)*chorizsep;
               constraintrects[(5-v)*3+h][BOTTOM]= MCONSTRAINTBOT+cstartv+
                                                        v*cvertsep;
```

```
                constraintrects[(5-v)*3+h][TOP]= MCONSTRAINTBOT+cstartv+
                                                        v*cvertsep+ctextheight;
            }
    }
    for(v=0;v<6;v++){
            ccheckrects[v][LEFT]=MCONSTRAINTLEFT+cstarth+3*chorizsep+5;
            ccheckrects[v][RIGHT]=MCONSTRAINTLEFT+cstarth+3*chorizsep+cchecksize+5;
            ccheckrects[v][BOTTOM]=MCONSTRAINTBOT+cstartv+v*cvertsep;
            ccheckrects[v][TOP]=MCONSTRAINTBOT+cstartv+v*cvertsep+cchecksize;
/*printf("%d = %d %d  %d %d\n",v,ccheckrects[v][LEFT],ccheckrects[v][RIGHT],
            ccheckrects[v][BOTTOM],ccheckrects[v][TOP]);fflush(stdout);
*/
    }
}

/*------------------------------------*/

void set_name_viewport()
{
    viewport(mnamerect[LEFTINDEX],mnamerect[RIGHTINDEX],
            mnamerect[BOTINDEX],mnamerect[TOPINDEX]);
}

void set_color_viewport()
{
    viewport(mcolorrect[LEFTINDEX],mcolorrect[RIGHTINDEX],
            mcolorrect[BOTINDEX],mcolorrect[TOPINDEX]);
}

void set_thickness_viewport()
{
    viewport(mthickrect[LEFTINDEX],mthickrect[RIGHTINDEX],
            mthickrect[BOTINDEX],mthickrect[TOPINDEX]);
}

void set_constraint_viewport()
{
    viewport(mconstraintrect[LEFTINDEX],mconstraintrect[RIGHTINDEX],
            mconstraintrect[BOTINDEX],mconstraintrect[TOPINDEX]);
```

```
}

/*---------------*/

void name_view_update()
{
    set_name_viewport();

   frontbuffer(TRUE);

   ortho2(0,MNAMEWIDTH,0,MNAMEHEIGHT);

   c3s(cwhite);
   clear();
   show_name();

   frontbuffer(FALSE);

}

void color_update_aux(garray,gnum)
grouping *garray;
short gnum;
{
    set_color_viewport();

   frontbuffer(TRUE);

   ortho2(0,MCOLORWIDTH,0,MCOLORHEIGHT);

   c3s(cwhite);
   clear();
    show_color(garray,gnum);

   frontbuffer(FALSE);
}

void color_view_update()
{
```

```
    color_update_aux(&groups[0],curgroup);
}

void thickness_update_aux(garray,gnum)
grouping *garray;
short gnum;
{
    set_thickness_viewport();

   frontbuffer(TRUE);

   ortho2(0,MTHICKWIDTH,0,MTHICKHEIGHT);

   c3s(cwhite);
   clear();
    show_thickness(garray,gnum);

   frontbuffer(FALSE);

}

void thickness_view_update()
{
    thickness_update_aux(&groups[0],curgroup);
}

void constraint_update_aux(garray,gnum)
grouping *garray;
short gnum;
{
    set_constraint_viewport();

   frontbuffer(TRUE);

   ortho2(0,MCONSTRAINTWIDTH,0,MCONSTRAINTHEIGHT);

   c3s(cwhite);
   clear();
    show_constraint(garray,gnum);
```

```
  frontbuffer(FALSE);

}

void constraint_view_update()
{
    constraint_update_aux(&groups[0],curgroup);
}


void info_views_update()
{
   color_view_update();
   thickness_view_update();
   constraint_view_update();
}

void display_info_views(garray,gnum)
grouping *garray;
short gnum;
{
   long oldmode;

    /*make this invisible to other graphics stuff*/
   oldmode = getdrawmode();
   pushmatrix();
   pushviewport();
  drawmode(NORMALDRAW);

   color_update_aux(garray,gnum);
    thickness_update_aux(garray,gnum);
    constraint_update_aux(garray,gnum);

   drawmode(oldmode);
    popviewport();
    popmatrix();
}

/*---------------------------------*/
```

```
void show_name()
{
  c3s(cred);

  cmov2s(5,MNAMEHEIGHT-20);
   sprintf(curprompt,"Name: %s",product.pname);
   charstr(curprompt);

  cmov2s(5,MNAMEHEIGHT-40);
   sprintf(curprompt,"Number: %d",curprodnum);
   charstr(curprompt);
}

/*------------------------------*/
short tempcolor[3];
void show_color(garray,gnum)
grouping *garray;
short gnum;
{
  if(gnum == -1){
            c3s(cred);
            cmov2s(MCOLORWIDTH/2-25,MCOLORHEIGHT-20);
            charstr("COLOR");
            return;
  }

   tempcolor[0]=garray[gnum].r;
   tempcolor[1]=garray[gnum].g;
   tempcolor[2]=garray[gnum].b;

   c3s(tempcolor);
  cmov2s(MCOLORWIDTH/2-25,MCOLORHEIGHT-20);
  charstr("COLOR");

   c3s(cblack);
   sprintf(curprompt,"R: %d",garray[gnum].r);
    cmov2s(Cleft+xin,Rbot+yin);
   charstr(curprompt);
```

```
    sprintf(curprompt,"G: %d",garray[gnum].g);
    cmov2s(Cleft+xin,Gbot+yin);
    charstr(curprompt);

    sprintf(curprompt,"B: %d",garray[gnum].b);
    cmov2s(Cleft+xin,Bbot+yin);
    charstr(curprompt);
}

void do_R_enter()
{
    short val;

    /*clear first so refresh later doesn't look funny*/
    c3s(cwhite);
    rectfs(Rrect[LEFTINDEX],Rrect[BOTINDEX],Rrect[RIGHTINDEX],Rrect[TOPINDEX]);

    while(TRUE){
        sprintf(curprompt,"R: ");
                sprintf(curin,"%d",groups[curgroup].r);
                if(!get_user_string(curprompt,curin,4,Rrect,xin,yin)) return;
                val = (short) atoi(curin);
                if((val>255) || (val<0)){
                    ringbell();
                    continue;
                }
                else break;
    }
    groups[curgroup].r = val;
    changeflag = TRUE;
}

void do_G_enter()
{
    short val;

    /*clear first so refresh later doesn't look funny*/
    c3s(cwhite);
    rectfs(Grect[LEFTINDEX],Grect[BOTINDEX],Grect[RIGHTINDEX],Grect[TOPINDEX]);
```

```
  while(TRUE){
     sprintf(curprompt,"G: ");
            sprintf(curin,"%d",groups[curgroup].g);
            if(!get_user_string(curprompt,curin,4,Grect,xin,yin))  return;
            val = (short) atoi(curin);
            if((val>255) || (val<0)){
               ringbell();
               continue;
            }
            else break;
  }
  groups[curgroup].g = val;
  changeflag = TRUE;
}

void do_B_enter()
{
  short val;

  /*clear first so refresh later doesn't look funny*/
  c3s(cwhite);
  rectfs(Brect[LEFTINDEX],Brect[BOTINDEX],Brect[RIGHTINDEX],Brect[TOPINDEX]);

  while(TRUE){
     sprintf(curprompt,"B: ");
            sprintf(curin,"%d",groups[curgroup].b);
            if(!get_user_string(curprompt,curin,4,Brect,xin,yin))  return;
            val = (short) atoi(curin);
            if((val>255) || (val<0)){
               ringbell();
               continue;
            }
            else break;
  }
  groups[curgroup].b = val;
  changeflag = TRUE;
}
```

```
void do_color_edit()
{
   if(curgroup == -1) return;
   if(mouseinrect(Rrect)) do_R_enter();
   else if(mouseinrect(Grect)) do_G_enter();
   else if(mouseinrect(Brect)) do_B_enter();
   color_view_update();
}


/*--------------------------------*/
void show_thicken_poly_mess()
{
   show_message("Pick a line or arc to determine length",
                              MAINW/2,MAINH/2,25,20);
   show_message("or hit <Esc> to use default",
                              MAINW/2,MAINH/2-60,25,20);
}

Boolean get_line_or_arc(anum,snum)
short *anum,*snum;
{
   int hits;
   int h,index;
   short atomnum,subnum;
   short val;
   Device dev;

   while(TRUE){
             while(qtest()){
                dev=qread(&val);

                switch(dev){
                          case ESCKEY:
                             if(val == 0) continue;
                             return FALSE;
                          case MIDDLEMOUSE:
                             if(val == 0) continue;
                             if(mouseinrect(mviewrect)) do_rotate();
```

```
                    continue;
                case LEFTMOUSE:
                    if(val == 0) continue;
                    if(mouseinrect(mviewrect)) break;
                    continue;
                case REDRAW:
                    clear_window();
                    window_draw_both();
                    continue;
                default: continue;
            }

            hits = get_pick();

            index = 0;
            for(h=0; h<hits ; h++){
                    index++;
                    atomnum=pbuffer[index++];          /* get atom # */
                    subnum=pbuffer[index++];
                    if(atom[atomnum].elmflg == 1 || atom[atomnum].elmflg == 2 ||
                       atom[atomnum].elmflg == 3 || atom[atomnum].elmflg == 4 ||
                       atom[atomnum].elmflg == 6 || atom[atomnum].elmflg == 10){
                            *anum = atomnum;
                            *snum = subnum;
                            return TRUE;
                    }
            }
        }
    }
}

void thicken_poly()
{
    short len,atomnum,subnum;
    point p1,p2,p3;
    vector v1,v2;

    if(curgroup == -1) return;
    if(groups[curgroup].type != POLYGROUP &&
            groups[curgroup].type != WIREGROUP)  return;
```

```
  groups[curgroup].thickness.hflag = TRUE;

   show_thicken_poly_mess();
  if(get_line_or_arc(&atomnum,&subnum)){
           get_subpart_p1(atomnum,subnum,&p1);
           get_subpart_p2(atomnum,subnum,&p2);
           groups[curgroup].thickness.height = distance(&p1,&p2);

           /*figure out the direction of the vector by which end is closest */
           /*get one point of the polygon*/
           get_subpart_p1(groups[curgroup].gpart[0].atnum,
                               groups[curgroup].gpart[0].sbnum,&p3);

           stuff_vector(&p1,&p2,&v1);
           make_vector_positive(&v1); /* simulate the thickened normal */
           stuff_vector(&p1,&p2,&v2);

           if(distance(&p1,&p3) < distance(&p2,&p3)){
              if(delta_vectoreq_p(&v1,&v2,0))
                        groups[curgroup].thickness.htype = POSTHICKEN;
              else groups[curgroup].thickness.htype = NEGTHICKEN;
           }
           else{
              if(delta_vectoreq_p(&v1,&v2,0))
                        groups[curgroup].thickness.htype = NEGTHICKEN;
              else groups[curgroup].thickness.htype = POSTHICKEN;
           }
  }

  changeflag = TRUE;

  clear_messages();
  thickness_view_update();
}

/*---------------------------------*/

void show_thickness(garray,gnum)
```

```
grouping *garray;
short gnum;
{
  c3s(cred);
  cmov2s(MTHICKWIDTH/2-40,MTHICKHEIGHT-20);
  charstr("THICKNESS");

  if(gnum == -1) return;
   if(!garray[gnum].thickness.hflag) return;

  c3s(cblack);
   sprintf(curprompt,"Height(mm): %d",garray[gnum].thickness.height);
   cmov2s(thickleft+xin,heightbot+yin);
  charstr(curprompt);

  if(garray[gnum].type == WIREGROUP) return;

   sprintf(curprompt,"Type (+,-,=): ");
  if(garray[gnum].thickness.htype == POSTHICKEN) strcat(curprompt,"+");
  else if(garray[gnum].thickness.htype == NEGTHICKEN)
              strcat(curprompt,"-");
  else strcat(curprompt,"=");
   cmov2s(thickleft+xin,htypebot+yin);
  charstr(curprompt);
}

void do_height_enter()
{
  short val;

  /*clear first so refresh later doesn't look funny*/
  c3s(cwhite);
  rectfs(heightrect[LEFTINDEX],heightrect[BOTINDEX],
             heightrect[RIGHTINDEX],heightrect[TOPINDEX]);

  while(TRUE){
           sprintf(curprompt,"Height(mm): ");
           sprintf(curin,"%d",groups[curgroup].thickness.height);
           if(!get_user_string(curprompt,curin,6,heightrect,xin,yin)) return;
           val = atoi(curin);
```

```
            if(val<0){ ringbell(); continue;}
            else break;
  }
   groups[curgroup].thickness.height = val;
  if(val == 0) {
            groups[curgroup].thickness.hflag = FALSE;
            groups[curgroup].thickness.height = HEIGHTTHICK;
  }

  changeflag = TRUE;
}

void do_htype_enter()
{
  short val;

  /*clear first so refresh later doesn't look funny*/
  c3s(cwhite);
  rectfs(htyperect[LEFTINDEX],htyperect[BOTINDEX],
             htyperect[RIGHTINDEX],htyperect[TOPINDEX]);

  while(TRUE){
            sprintf(curprompt,"Type (+,-,=): ");
            if(groups[curgroup].thickness.htype == POSTHICKEN) sprintf(curin,"+");
            else if(groups[curgroup].thickness.htype == NEGTHICKEN)
                sprintf(curin,"-");
            else sprintf(curin,"=");
            if(!get_user_string(curprompt,curin,2,htyperect,xin,yin)) return;
            if(curin[0] != '+' && curin[0] != '-' && curin[0] != '='){
               ringbell();
               continue;
            }
            else break;
  }
  if(curin[0] == '+') groups[curgroup].thickness.htype = POSTHICKEN;
  else if(curin[0] == '-') groups[curgroup].thickness.htype = NEGTHICKEN;
  else groups[curgroup].thickness.htype = EQUALTHICKEN;

  changeflag = TRUE;
```

```
}

void turn_on_thickness()
{
   groups[curgroup].thickness.hflag = TRUE;
   thickness_view_update();
}

void do_thickness_edit()
{
  if(curgroup == -1) return;
   if(!groups[curgroup].thickness.hflag){
            if(curgroup == -1) return;
            if(groups[curgroup].type != POLYGROUP &&
               groups[curgroup].type != WIREGROUP) return;
            groups[curgroup].thickness.hflag = TRUE;
  }
   else if(mouseinrect(heightrect)){
             do_height_enter();
  }
   else if(mouseinrect(htyperect)){
            if(groups[curgroup].type != WIREGROUP)
               do_htype_enter();
  }
   thickness_view_update();
}

/*-----------------------------------*/
void check_rect(rect)
short *rect;
{
  move2s((short)(rect[LEFT]-MCONSTRAINTLEFT),
            (short)(rect[BOTTOM]-MCONSTRAINTBOT));
  draw2s((short)(rect[RIGHT]-MCONSTRAINTLEFT),
            (short)(rect[TOP]-MCONSTRAINTBOT));
  move2s((short)(rect[LEFT]-MCONSTRAINTLEFT),
            (short)(rect[TOP]-MCONSTRAINTBOT));
  draw2s((short)(rect[RIGHT]-MCONSTRAINTLEFT),
            (short)(rect[BOTTOM]-MCONSTRAINTBOT));
}
```

```
void show_constraint(garray,gnum)
grouping *garray;
short gnum;
{
    short v,h;
    double *vals;

    c3s(cred);
    cmov2s(MCONSTRAINTWIDTH/2-40,MCONSTRAINTHEIGHT-20);
    charstr("CONSTRAINT");

    c3s(cred);
    cmov2s(10,MCONSTRAINTHEIGHT-50);
    charstr("ITEM VAL   MIN   MAX   LK");

     cmov2s(10,cstartv+5*cvertsep+yin);
    charstr("X");
     cmov2s(10,cstartv+4*cvertsep+yin);
    charstr("Y");
     cmov2s(10,cstartv+3*cvertsep+yin);
    charstr("Z");
     cmov2s(10,cstartv+2*cvertsep+yin);
    charstr("YAW");
     cmov2s(10,cstartv+cvertsep+yin);
    charstr("PITCH");
     cmov2s(10,cstartv+yin);
    charstr("ROLL");

    c3s(cblack);

    if(gnum == -1) return;

     vals = (double *) &garray[gnum].constraint.xpos;
     for(v=0;v<6;v++){
             for(h=0;h<3;h++,vals++){
                 sprintf(curprompt,"%d",(short) *vals);
                  cmov2s(cstarth+h*chorizsep+xin,cstartv+(5-v)*cvertsep+yin);
/*
```

```
                cmov2s(constraintrects[v*3+h][LEFT]-MCONSTRAINTLEFT+xin,
                        constraintrects[v*3+h][BOTTOM]-MCONSTRAINTBOT+yin);
*/
                charstr(curprompt);
            }
  }

   for(v=0;v<6;v++){
            rects(ccheckrects[v][LEFT]-MCONSTRAINTLEFT,
                    ccheckrects[v][BOTTOM]-MCONSTRAINTBOT,
                    ccheckrects[v][RIGHT]-MCONSTRAINTLEFT,
                    ccheckrects[v][TOP]-MCONSTRAINTBOT);

/*
printf("lock = %d pow = %d AND = %d\n",(short)garray[gnum].constraint.lock,
            (short)pow(2,(double)v),
            (short)(garray[gnum].constraint.lock) & (short)pow(2,(double)v));
*/
            if((short)garray[gnum].constraint.lock & (short)pow(2,(double)v)){
                check_rect((short *)&ccheckrects[v][0]);
            }
  }
}


void do_constraint_val(v,h)
short v,h;
{
   int val;
   double *vals;
   short elnum;

   /*clear first so refresh later doesn't look funny*/
   c3s(cwhite);
   rectfs(constraintrects[v*3+h][LEFT],constraintrects[v*3+h][BOTTOM],
                constraintrects[v*3+h][RIGHT],constraintrects[v*3+h][TOP]);

   /* point to the proper element */
   elnum = v*3+h;
```

```
 vals = (double *) &groups[curgroup].constraint.xpos;
 vals += elnum;

 while(TRUE){
          sprintf(curprompt,"");
          sprintf(curin,"%d",(short) *vals);
          if(!get_user_string(curprompt,curin,7,
                    (short *)&constraintrects[v*3+h][0],xin,yin)) return;
          val = atol(curin);
          if((v<=2 && (val>32767 || val<-32767)) ||
             (v>2 && (val>180 || val<-180)))
             { ringbell(); continue;}
          else break;
 }

 *vals = (double)val;

 changeflag = TRUE;
}

void do_constraint_checkbox(v)
short v;
{
  if((short)groups[curgroup].constraint.lock & (short)pow(2,(double)v)){
          groups[curgroup].constraint.lock &= (~((char)pow(2,(double)v)));
 }
 else
          groups[curgroup].constraint.lock |= (char)pow(2,(double)v);

 changeflag = TRUE;
}

void do_constraint_edit()
{
  short h,v;
  Boolean hit= FALSE;

  if(curgroup == -1) return;

  /* first,find which val to edit */
```

```
    for(v=0;v<6;v++){
            for(h=0;h<3;h++){
                if(mouseinrect((short *)&constraintrects[v*3+h][0])){
                        hit = TRUE;
                        break;
                }
            }
            if(hit) break;
    }
    if (hit){
            do_constraint_val(v,h);
    }
    else{ /* try the check boxes */
            for(v=0;v<6;v++){
                if(mouseinrect((short *)&ccheckrects[v][0])){
                        do_constraint_checkbox(v);
                        break;
                }
            }
    }

    constraint_view_update();
}

/*
            update_part_origin();
            update_swap_matis_viewport();
*/



/* DO NOT PLACE ANY FUNCTIONS AFTER START OF RCS LOG!
$Log:       editinfo.c,v $
 * Revision 2.5  90/10/24  17:13:11  ethan
 * name info
 * thickness ctrl-t
 *
 * Revision 2.4  90/10/23  15:27:59  ethan
```

```
* changeflag
*
* Revision 2.3  90/10/19  19:12:07  ethan
* default thickness stuff
*
* Revision 2.2  90/10/12  19:06:35  ethan
* auto thicken direction
*
* Revision 2.1  90/10/05  10:29:46  dan
* New Rev
*
* Revision 1.9  90/09/30  15:37:38  ethan
* *** empty log message ***
*
* Revision 1.8  90/09/28  12:37:32  ethan
* wireframes
*
* Revision 1.7  90/09/25  13:04:09  ethan
* single group command
* thicken by length
*
* Revision 1.6  90/09/04  17:01:35  dan
* More doubles...
*
* Revision 1.5  90/09/04  16:33:05  dan
* Changed float casts to doubles for constraints filling.
*
* Revision 1.4  90/08/30  13:02:18  ethan
* *** empty log message ***
*
* Revision 1.3  90/08/27  20:36:28  ethan
* *** empty log message ***
*
* Revision 1.2  90/08/18  20:14:22  dan
* general clean up
*
* Revision 1.1  90/08/17  18:18:03  dan
* Initial revision
*
*/
```

User: MICRORENTMind

Application: PrintMonitor

Document: globals.h

Date: Wednesday, November 14, 1990

Time: 7:10:42 PM

Printer: Peace of Mind

```
/*
** GLOBALS.H
**
** Copyright 1990, VPL Research
**
$Header: /usr/starch/source/starch/RCS/globals.h,v 2.2 90/10/23 15:28:16 ethan Exp $
**
*/

#define LEFTINDEX 0
#define RIGHTINDEX 1
#define BOTINDEX 2
#define TOPINDEX 3
#define LEFT 0
#define RIGHT 1
#define BOTTOM 2
#define TOP 3

/* here is the main window */
#define MAINX       70
#define MAINY       10
#define MAINH       980
#define MAINW       1200

/* MATIS AND SOAP VIEWS */
#define BORDERSIZE  10
#define MVIEWSIZE   MAINH/2
#define MVIEWWIDTH  (MVIEWSIZE - (BORDERSIZE + BORDERSIZE / 2))
#define MVIEWHEIGHT MVIEWWIDTH
#define SVIEWWIDTH  MVIEWWIDTH
#define SVIEWHEIGHT MVIEWHEIGHT

/* matis graphics view */
#define MVIEWLEFT   BORDERSIZE
#define MVIEWRIGHT  BORDERSIZE + MVIEWWIDTH
#define MVIEWBOT    (MVIEWSIZE + (BORDERSIZE / 2))
#define MVIEWTOP    (MAINH - BORDERSIZE)

/* soap window */
```

```
#define SVIEWLEFT  BORDERSIZE
#define SVIEWRIGHT (BORDERSIZE + MVIEWWIDTH)
#define SVIEWBOT   BORDERSIZE
#define SVIEWTOP   (MVIEWSIZE - (BORDERSIZE / 2))


/* here is the matis text window */
#define MTEXTWIDTH 150
#define MTEXTHEIGHT (MAINH-20)
#define MTEXTLEFT  (MVIEWLEFT+MVIEWWIDTH+10)
#define MTEXTBOT   10

/* here is the grouping window */
#define MGROUPWIDTH 200
#define MGROUPHEIGHT          (MAINH-20)
#define MGROUPLEFT  (MTEXTLEFT+MTEXTWIDTH+10)
#define MGROUPBOT   10

/* here is the name window */
#define MNAMEWIDTH 320
#define MNAMEHEIGHT 50
#define MNAMEBOT    (MAINH - MNAMEHEIGHT - 10)
#define MNAMELEFT   (MGROUPLEFT+MGROUPWIDTH+10)

/* here is the color window */
#define MCOLORWIDTH MNAMEWIDTH
#define MCOLORHEIGHT          100
#define MCOLORBOT   (MNAMEBOT - MCOLORHEIGHT - 10)
#define MCOLORLEFT  (MGROUPLEFT+MGROUPWIDTH+10)

/* here is the constraint window */
#define MCONSTRAINTWIDTH  MNAMEWIDTH
#define MCONSTRAINTHEIGHT 300
#define MCONSTRAINTBOT        (MCOLORBOT - MCONSTRAINTHEIGHT - 10)
#define MCONSTRAINTLEFT       MCOLORLEFT

/* here is the thickness window */
#define MTHICKWIDTH  MNAMEWIDTH
#define MTHICKHEIGHT  80
```

```
#define MTHICKBOT        (MCONSTRAINTBOT - MTHICKHEIGHT - 10)
#define MTHICKLEFT       MCOLORLEFT

extern mainwin;
extern short mainrect[],mviewrect[],sviewrect[],mtextrect[],feedbrect[];
extern short mgrouprect[],mcolorrect[],mthickrect[],mconstraintrect[];

extern pheader           product;
extern shape    form[];
extern element  atom[];
extern userpoly upoly[];
extern pattern  patt[];
extern rectangle rec[];
extern column   colmn[];
extern Arc      matis_arcs[];
extern Poly     ply[];
extern line     ln[];
extern knobs    knob[];
extern parline  parallel[];
extern mesh     grid[];


extern int formcntr,atomcntr,upolycntr,pattcntr,reccntr,colmncntr,
           arcscntr,plycntr,lncntr,parcntr,knobcntr,gridcntr;


extern short cblack[],cwhite[],cred[],cgreen[],cblue[],ccyan[],cmagenta[],
           cyellow[],cltgrey[],cdkgrey[];
extern short corange[];
extern short ctest1[],ctest2[],ctest3[];

extern short pbuffer[];
#define PBUFSIZE 100

#define linecolor cblue
#define rectcolor cred
#define polycolor cmagenta
#define arccolor  ctest2
#define columncolor corange
#define patterncolor corange
```

```
#define workcolor cdkgrey

#define wincolor  cltgrey  /* main window background */
#define mvcolor   cwhite   /* matis view background (white)*/
#define mtvcolor  ctest1   /* text view background */
#define tsepcolor ctest3   /* text view seperator */
#define highcolor ccyan    /* matis highlight(cyan) */
#define axescolor cblack   /* matis view axes */
#define gtcolor        cred         /* group text color */

/* from readmain */
extern int curprodnum;

typedef struct {
   short atnum;                      /* selected atom number */
   short sbnum;                      /* subpart number of atom */
} selectitem;

/* from graphprod */
extern short selectcount;
extern selectitem selectlist[];
extern short mportx1,mportx2;

/* from matistext */
extern char curline[];

/* from group */
extern short curgroup;
extern char curgroupname[];

/*directory names(readmain)*/
extern char matisdir[],groupingsdir[],swiveldir[];

extern short changeflag;

/* DO NOT PUT ANYTHING AFTER RCS LOG!
$Log:     globals.h,v  $
 * Revision 2.2  90/10/23  15:28:16  ethan
 * changeflag, curgroupname
```

```
*
* Revision 2.1  90/10/05  10:29:47  dan
* New Rev
*
* Revision 1.8  90/09/21  14:48:08  ethan
* handles user polys
*
* Revision 1.7  90/09/12  19:38:26  ethan
* took out prod_errflg
*
* Revision 1.6  90/09/10  13:57:20  mike
* error flag prod_errflg added for use by readmain and interf.c
*
* Revision 1.5  90/09/04  15:44:00  mike
* add extern pbuffer
*
* Revision 1.4  90/08/28  12:24:57  mike
* changed to add gridcntr variable
*
* Revision 1.3  90/08/27  20:36:39  ethan
* *** empty log message ***
*
* Revision 1.2  90/08/18  20:16:33  dan
* capitalized left, right, bottom, top -- less generic
*
* Revision 1.1  90/08/17  18:18:26  dan
* Initial revision
*
*/
```

| | |
|---|---|
| User: | MICRORENTMind |
| Application: | PrintMonitor |
| Document: | graphutil.c |
| Date: | Wednesday, November 14, 1990 |
| Time: | 7:11:38 PM |
| Printer: | Peace of Mind |

```
/*
** GRAPHUTIL.C
**
** Graphics Utilities
**
** Copyright 1990, by VPL Research
**
$Header: /usr/starch/source/starch/RCS/graphutil.c,v 2.1 90/10/05 10:29:53 dan Exp $
**
*/

#include <gl/gl.h>
#include <gl/device.h>
#include <stdio.h>
#include <math.h>
#include "prod.h"
#include "globals.h"

void      print_current_matrix();
short     *make_vert();
void      stuff_point();
void      copy_point();
Boolean pointeq();
void      offset_point();
void      subtract_point();
short     max();
Boolean ptinrect();
Boolean mouseinrect();
short     win_mousex();
short     win_mousey();
short     port_mousex();
short     port_mousey();
short     maxproductcoord();

Coord cm[4][4] = {
   1.0, 0.0, 0.0, 0.0,   /* cumulative matrix */
   0.0, 1.0, 0.0, 0.0,
   0.0, 0.0, 1.0, 0.0,
   0.0, 0.0, 0.0, 1.0
```

```
};

/*--------------------------------------------------------------------*/
void print_current_matrix()
{
    getmatrix(cm);
   printf("top matrix:\n%f %f %f %f\n%f %f %f %f\n%f %f %f %f\n%f %f %f %f\n",
                 cm[0][0],cm[0][1],cm[0][2],cm[0][3],
                 cm[1][0],cm[1][1],cm[1][2],cm[1][3],
                 cm[2][0],cm[2][1],cm[2][2],cm[2][3],
                 cm[3][0],cm[3][1],cm[3][2],cm[3][3]); fflush(stdout);
}

/*--------------------------------------------------------------------*/
/*this routine can be used for temporary creation of a point */

short avert[3];

short *make_vert(x,y,z)
short x,y,z;
{
   avert[0]=x;
   avert[1]=y;
   avert[2]=z;
   return avert;
}

/*--------------------------------------------------------------------*/
void stuff_point(x,y,z,p)
point *p;
short x,y,z;
{
   p->x = x; p->y = y; p->z = z;
}

/*--------------------------------------------------------------------*/

/*copy point p2 into p1*/
```

```
void copy_point(p1,p2)
point *p1,*p2;
{
    stuff_point(p2->x,p2->y,p2->z,p1);
}

/*------------------------------------------------------------*/
Boolean pointeq(p1,p2)
point *p1,*p2;
{
  if((p1->x == p2->x) && (p1->y == p2->y) && (p1->z == p2->z)) return TRUE;
  else return FALSE;
}

/*------------------------------------------------------------*/
void offset_point(p,poff)
point *p,*poff;
{
  p->x += poff->x;
  p->y += poff->y;
  p->z += poff->z;
}

void subtract_point(p,poff)
point *p,*poff;
{
  p->x -= poff->x;
  p->y -= poff->y;
  p->z -= poff->z;
}

/*------------------------------------------------------------*/
short max(a,b)
short a,b;
{
  if (a>b){
          return a;
  }
  else
          return b;
```

```
}

/*------------------------------------------------------------*/

Boolean ptinrect(x,y,rect)
short x,y;
short rect[];
{

  if (x >= rect[LEFTINDEX] && x <= rect[RIGHTINDEX] &&
            y >= rect[BOTINDEX] && y <= rect[TOPINDEX])
          return TRUE;
  else return FALSE;
}

/*------------------------------------------------------------*/
Boolean mouseinrect(rect)
short rect[];
{
   return ptinrect(win_mousex(),win_mousey(),rect);
}

/*------------------------------------------------------------*/
short win_mousex()
{
   long x,y;
   getorigin(&x,&y);
  return ((short)(getvaluator(MOUSEX) - x));
}

/*------------------------------------------------------------*/
short win_mousey()
{
   long x,y;
   getorigin(&x,&y);
  return ((short)(getvaluator(MOUSEY) - y));
}

/*------------------------------------------------------------*/
```

```
short port_mousex()
{
    short l,r,b,t;
    getviewport(&l,&r,&b,&t);
   return (win_mousex() - (short)l);
}

/*---------------------------------------------------------------*/
short port_mousey()
{
    short l,r,b,t;
    getviewport(&l,&r,&b,&t);
   return (win_mousey() - (short)b);
}
/*---------------------------------------------------------------*/
short distance(p1,p2)
point *p1,*p2;
{
   return ((short)sqrt(pow((double)(p2->x - p1->x),2)
                                 + pow((double)(p2->y - p1->y),2)
                                 + pow((double)(p2->z - p1->z),2)));
}
/*---------------------------------------------------------------*/
short maxproductcoord()
{
    point p1,p2;
    p1=product.origin; p2=product.maxlng;
   return distance(&p1,&p2);
}

/*---------------------------------------------------------------*/

/* DO NOT PLACE ANY FUNCTIONS AFTER RCS LOG!
$Log:     graphutil.c,v $
 * Revision 2.1  90/10/05  10:29:53  dan
 * New Rev
 *
 * Revision 1.5  90/09/25  13:05:09  ethan
 * *** empty log message ***
 *
```

```
 * Revision 1.4  90/09/05  19:49:44  ethan
 * *** empty log message ***
 *
 * Revision 1.3  90/08/27  20:36:53  ethan
 * *** empty log message ***
 *
 * Revision 1.2  90/08/18  20:17:01  dan
 * general clean-up
 *
 * Revision 1.1  90/08/17  18:19:05  dan
 * Initial revision
 *
*/
```

| | |
|---|---|
| User: | MICRORENTMind |
| Application: | PrintMonitor |
| Document: | group.c |
| Date: | Wednesday, November 14, 1990 |
| Time: | 7:12:43 PM |
| Printer: | Peace of Mind |

```
/*
** GROUP.C
**
** Copyright 1990, VPL Research
**
$Header: /usr/starch/source/starch/RCS/group.c,v 2.9 90/11/01 14:31:03 ethan Exp $
**
*/

#include <stdio.h>
#include <gl/gl.h>
#include <gl/device.h>
#include "prod.h"
#include "globals.h"
#include "soap.h"
#include "group.h"  /*must be loaded after soap.h*/
#include "soapxtrn.h"

Boolean read_groupings();
void write_groupings();

void group_view_update();
void group_view_core();
void set_group_viewport();

void show_groups();
void do_group_text();
void group_text_pos(); void get_group_text_line(); short find_group_aux();
short find_level();
short groupnum_at_y();

void highlight_group_text();
void highlight_gselected_text();
void highlight_core();

void clear_groups();
void add_group();
void ungroup();
void set_group_defaults();
```

```
void delete_group();
void print_groups();

Boolean select_group();
void select_group_parts();

void set_part_origin();
void get_part_rel_origin();
void update_constraint_pos();

Boolean group_planar_p();

/* utilities */
void delete_pos();


short mgrouprect[4]= {MGROUPLEFT,MGROUPLEFT+MGROUPWIDTH,
                              MGROUPBOT,MGROUPBOT+MGROUPHEIGHT};

grouping    groups[maxgroups];
short groupcount = 0;

short grouproot= -1;  /* root index */

short curgroup;

char tstring[80];

extern short soap_first_1;

char curgroupname[80];

short groupscrollpos = 0;

/*------------------------------------*/

void group_view_update_single()
{
   set_group_viewport();
```

```
  ortho2(0,MGROUPWIDTH,groupscrollpos,groupscrollpos+MGROUPHEIGHT);

  c3s(mtvcolor);
  clear();
  show_groups();
}

void group_view_update()
{
   group_view_update_single();
  swapbuffers();
   group_view_update_single();
}


void set_group_viewport()
{
  viewport(mgrouprect[LEFTINDEX],mgrouprect[RIGHTINDEX],
               mgrouprect[BOTINDEX],mgrouprect[TOPINDEX]);
}

/*--------------------------*/

void set_new_groupname()
{
    strcpy(curgroupname,product.pname);
}

void clear_groups()
{
   groupcount = 0;
   curgroup = -1;
}

void select_to_group(group)
grouping *group;
{
    short i;

    for(i=0; i<selectcount; i++) {
```

```
            (*group).gpart[i].atnum = selectlist[i].atnum;
            (*group).gpart[i].sbnum = selectlist[i].sbnum;
   }
   (*group).numparts = selectcount;
}

/****** these should become obsolete

void group_poly()
{
   if(curgroup == -1){
            groups[groupcount].type = POLYGROUP;
            add_group();
   }
   else {
            groups[curgroup].type = POLYGROUP;
            select_to_group(&groups[curgroup]);
   }

   curgroup = -1;
   clear_selectlist();

   update_matis_views();
   group_view_update();
}

void group_sweep()
{
   if(curgroup == -1){
            groups[groupcount].type = SWEEPGROUP;
            add_group();
   }
   else {
            groups[curgroup].type = SWEEPGROUP;
            select_to_group(&groups[curgroup]);
   }

   curgroup = -1;
   clear_selectlist();
```

```
  update_matis_views();
  group_view_update();
}
*****/

void show_bad_groupcount()
{
   show_message("Groups can only have 40 subprimitives",
                        MAINW/2,MAINH/2,25,20);
   show_message("Try subdividing the group",
                                    MAINW/2,MAINH/2 - 60 ,25,20);
   wait_for_click();
   clear_messages();
  return;
}

void show_bad_group()
{
   show_message("The selected grouping does not form",
                        MAINW/2,MAINH/2,25,20);
   show_message("a valid convex polygon or sweep.",
                        MAINW/2,MAINH/2 - 60 ,25,20);
   wait_for_click();
   clear_messages();
  return;
}

void show_concave_group()
{
   show_message("The selected grouping is concave",
                        MAINW/2,MAINH/2,25,20);
   show_message("Try subdividing it into convex parts",
                        MAINW/2,MAINH/2 - 60 ,25,20);
   wait_for_click();
   clear_messages();
  return;
}

void show_too_many_groups()
```

```
{
   show_message("There is a limit of 100 groups per product",
                        MAINW/2,MAINH/2,25,20);
   show_message("Try using thickening, or sweeps",
                        MAINW/2,MAINH/2 - 60 ,25,20);
   wait_for_click();
   clear_messages();
   return;
}

short convert_group_to_soap(gnum)
short gnum;
{
   Part *curpart;

   curpart = add_part(PARTNULL,1);
   if(!stuff_with_matis(curpart,gnum,1)) return FALSE;

   return breeze_simulate(1);
}

void stuff_next_group()
{
   sprintf(groups[groupcount].name,"Object");
   make_name_unique(groupcount);
   select_to_group(&groups[groupcount]);
   set_group_defaults(groupcount);
}

void group_poly()
{
   short gnum,result;
   Boolean tempflag;

   if(selectcount>40) {show_bad_groupcount();return;}
   if(selectcount == 0) return;

   if (!soap_first_1) {
          if (soap_object[1].root != PARTNULL)
```

```
delete_part(soap_object[1].root, 1);
}
else soap_first_1 = 0;
initialize_object_name(1,"test");

/*form new group or replace currently selected group*/
/* in either case, use next available group to test*/
/* for validity, then take appropriate action*/

stuff_next_group();

/*if replacing a group, use the same name during conversion*/
if(curgroup != -1){
        strcpy(groups[groupcount].name,groups[curgroup].name);
}

if(group_planar_p(groupcount)){
        groups[groupcount].type = POLYGROUP;
        /*only want to test the original poly for concaveness*/
        tempflag = groups[groupcount].thickness.hflag;
        groups[groupcount].thickness.hflag = FALSE;
        result = convert_group_to_soap(groupcount);
        groups[groupcount].thickness.hflag = tempflag;
}
else{
        groups[groupcount].type = SWEEPGROUP;
        result = convert_group_to_soap(groupcount);
}

if(result == 0){
        show_bad_group();
        return;
}
else if(result == -1){show_concave_group(); return;}

if(curgroup == -1){
        if(groupcount>= maxgroups-1) {show_too_many_groups(); return;}
        groupcount++;
}
else select_to_group(&groups[curgroup]);
```

```
  curgroup = -1;
   clear_selectlist();

  changeflag = TRUE;

   update_matis_views();
   group_view_update();
   info_views_update();
}


void group_wireframe()
{
   if(selectcount>40) {show_bad_groupcount();return;}
  if(selectcount == 0) return;

  if(curgroup == -1){
            if(groupcount>= maxgroups-1) {show_too_many_groups(); return;}
            stuff_next_group();
            groups[groupcount].type = WIREGROUP;
            groups[groupcount].thickness.hflag = TRUE;
            groupcount++;
  }
  else {
            select_to_group(&groups[curgroup]);
            groups[curgroup].type = WIREGROUP;
            groups[curgroup].thickness.hflag = TRUE;
  }

  curgroup = -1;
   clear_selectlist();

  changeflag = TRUE;

   update_matis_views();
  group_view_update();
  info_views_update();
}
```

```
void show_naming_mess()
{
   show_message("Select a name and hit <enter> (<Esc> to cancel)",
                  250,MAINH/2,25,20);
   show_message("<enter> with nothing selected creates a new name",
                  250,MAINH/2 - 60 ,25,20);
}

void name_part()
{
   static char curin[30];   /* use as next partname's guess */
   short feedbrect[4];
   short i;
   char *s;

   if(curgroup == -1) return;

   show_naming_mess();

   if(!choose_name()) goto exit;
   if(curgname != -1){
          swap_defaults(&groups[curgroup],&gdefaults[curgname]);
          make_name_unique(curgroup);
          group_view_update();
          info_views_update();
          changeflag = TRUE;
          goto exit;
   }

   feedbrect[LEFTINDEX] = 400;
   feedbrect[RIGHTINDEX] = 800;
   feedbrect[BOTINDEX] = 400;
   feedbrect[TOPINDEX] = 450;

   clear_messages();
   if(!get_user_string("New part name: ",curin,17,feedbrect,25,20)) goto exit;

   s = curin;
```

```
    while(*s == ' ')++s;
    if(*s == '\0') {*curin = '\0'; goto exit;}
    strcpy(groups[curgroup].name,s);

    swap_defaults(&gdefaults[gdefaultsnum],&groups[curgroup]);
    make_name_unique(curgroup);
    gdefaultsnum++;
    write_default_groupings();
    group_view_update();
    changeflag = TRUE;

exit:
    clear_messages();
}

void replace_default()
{
    if(!choose_name() || curgname == -1 || curgroup == -1) return;

    /*use the default name, but replace the default values*/
    strcpy(groups[curgroup].name,gdefaults[curgname].name);
    make_name_unique(curgroup);

    swap_sub_defaults(&gdefaults[curgname],&groups[curgroup]);

    group_view_update();
    write_default_groupings();
    return;
}

void delete_default()
{
    if(!choose_name() || curgname == -1) return;

    delete_gdefault(curgname);
    write_default_groupings();
}

void ungroup()
{
```

```
  if(curgroup == -1) return;
  delete_group(curgroup);
  curgroup = -1;
  changeflag = TRUE;

  update_matis_views();
  group_view_update();
/*    print_groups();*/
}

void delete_group(gnum)
short gnum;
{
  int h, n;
  short dad;

  dad = groups[gnum].parent;
  n = sizeof(grouping);
/*    printf("size: %d",n);*/
/*  print_groups();*/
  /*redo the parents*/
  for(h=0;h<groupcount;h++){
            if(groups[h].parent > gnum) groups[h].parent -= 1;
            else if(groups[h].parent == gnum) groups[h].parent = dad;
  }

  /*now kill the group*/
  for(h=gnum;h<groupcount;h++)
            memcpy(&groups[h],&groups[h+1],n);
  groupcount--;

/*  print_groups();*/
}

Boolean delete_group_part(gnum,pnum)
short gnum,pnum;
{
  short h;
  int n;
```

```
  grouping *g;

  g = &groups[gnum];
  n = sizeof(selectitem);
  for(h=pnum;h<g->numparts;h++)
        memcpy(&g->gpart[h],&g->gpart[h+1],n);
  g->numparts--;
  if(!g->numparts) return FALSE;
  return TRUE;
}


/*----------------------------*/
void set_group_defaults(gnum)
short gnum;
{
  groups[gnum].parent = grouproot;
  groups[gnum].r=(unsigned char)100;
  groups[gnum].g=(unsigned char)100;
  groups[gnum].b=(unsigned char)100;
  groups[gnum].reverse = (unsigned char)0;       /* DDB */
  groups[gnum].stepsize = 10;                            /* DDB */

  groups[gnum].thickness.hflag = FALSE;
  groups[gnum].thickness.wflag = FALSE;
  groups[gnum].thickness.height = HEIGHTTHICK;
  groups[gnum].thickness.htype = POSTHICKEN;
  groups[gnum].thickness.width = 0;
  groups[gnum].thickness.wtype = POSTHICKEN;

  groups[gnum].origin.x = 0;
  groups[gnum].origin.y = 0;
  groups[gnum].origin.z = 0;

  groups[gnum].constraint.xpos = 0.0;
  groups[gnum].constraint.ypos = 0.0;
  groups[gnum].constraint.zpos = 0.0;
  groups[gnum].constraint.xmin = -32767.0;
  groups[gnum].constraint.ymin = -32767.0;
  groups[gnum].constraint.zmin = -32767.0;
```

```
    groups[gnum].constraint.xmax = 32767.0;
    groups[gnum].constraint.ymax = 32767.0;
    groups[gnum].constraint.zmax = 32767.0;
    groups[gnum].constraint.yaw_attitude = 0.0;
    groups[gnum].constraint.pitch_attitude = 0.0;
    groups[gnum].constraint.roll_attitude = 0.0;
    groups[gnum].constraint.yaw_min = -180.0;
    groups[gnum].constraint.pitch_min = -180.0;
    groups[gnum].constraint.roll_min = -180.0;
    groups[gnum].constraint.yaw_max = 180.0;
    groups[gnum].constraint.pitch_max = 180.0;
    groups[gnum].constraint.roll_max = 180.0;
    groups[gnum].constraint.lock = (unsigned char)255;

    if(atom[groups[gnum].gpart[0].atnum].elmflg == KNOB)
            groups[gnum].stepsize = 60;
}


/*------------------------*/

void print_group(group)
grouping *group;
{
   short i;

   printf(" name: %s\n",(*group).name);
   printf(" %d parts: ",(*group).numparts);
   for(i=0; i<(*group).numparts; i++)
            printf("(%d %d) ",(*group).gpart[i].atnum,(*group).gpart[i].sbnum);
   printf("\n parent: %d\n",(*group).parent);
}

void print_groups()
{
  int i;
  for(i=0; i<groupcount; i++){
            printf("\ngrouping %d\n",i);
            print_group(&groups[i]);
```

```
  }
  fflush(stdout);
}


/*----------------------------*/
#define grouptab 20
#define gtheight 15

/*here are the routines to find the heirarchichal line# and level of a group*/
static short gcount;

void group_text_pos(gnum,x,y)
short gnum;
short *x;
short *y;
{
    short linenum,level;
     get_group_text_line(gnum,&linenum,&level);
   *x = level * grouptab;
   *y = MGROUPHEIGHT - linenum * gtheight;
}

void get_group_text_line(gnum,linenum,level)
short gnum;
short *linenum;
short *level;
{
   gcount = 0;
   *level =  find_level(gnum);
   *linenum = gcount;
   if (*level == 0) printf("error: didn't find a group\n");
/*    printf("group %d is at line %d, level %d\n",gnum,*linenum,*level);
   fflush(stdout);
*/
}

/* inefficient way to find the level but has side effect that */
/* gcount = printed line # of the group */
/* quicker way to find level is just count up parents until hit -1 */
```

```
short find_level(gnum)
short gnum;
{
   return find_group_aux(gnum,-1,1);
}

short find_group_aux(target,gnum,level)
short gnum,level;
{
   short i,lv;

   gcount++;

   for (i=0; i<groupcount; i++){
            if(groups[i].parent == gnum){
               if(i == target) return level;
               if ((lv= find_group_aux(target,i,level + 1)) != 0)
                        return lv;
            }
   }
   return 0;
}

/*here is the inverse routine which finds the group for a given y position*/
short groupnum_at_y(mousey)
short mousey;
{
   short x,y,i;

   mousey += groupscrollpos;

   for(i=0;i<groupcount;i++){
            group_text_pos(i,&x,&y);
            if (mousey-y+5 < gtheight && mousey-y+5 >=0) return i;
   }
/*    printf("didn't find it\n");fflush(stdout);*/
   return -1;
}
```

```
void move_to_group_pos(gnum)
short gnum;
{
   short x,y;
    group_text_pos(gnum,&x,&y);
   cmov2s(x,y);
}

void do_group_text(i)
short i;
{
  if(i == -1) return;
   c3s(gtcolor);
   if (groups[i].type == POLYGROUP) sprintf(curline,"<P> %s",groups[i].name);
  else if (groups[i].type == SWEEPGROUP)
                 sprintf(curline,"<S> %s",groups[i].name);
  else if (groups[i].type == WIREGROUP)
                 sprintf(curline,"<W> %s",groups[i].name);
   else sprintf(curline,"<P> %s",groups[i].name);
   charstr(curline);
}

void show_group_name(gnum)
short gnum;
{
    move_to_group_pos(gnum);
    do_group_text(gnum);
}

void show_groups()
{
   short i;

/*    print_groups();*/
   for(i=0; i<groupcount; i++){
              show_group_name(i);
  }
    highlight_gselected_text();
}
```

```
void highlight_group_text(gnum,colora)
short gnum;
short *colora;
{

  if(gnum == -1) return;

   set_group_viewport();
  frontbuffer(TRUE);
   highlight_core(gnum,colora);
  frontbuffer(FALSE);

   highlight_core(gnum,colora);
}

void highlight_core(gnum,colora)
short      gnum;
short      *colora;
{
   short y,x;

   ortho2(0,MGROUPWIDTH,groupscrollpos,groupscrollpos+MGROUPHEIGHT);

    group_text_pos(gnum,&x,&y);
   c3s(colora);
    pmv2s(0,y+gtheight-5);
   rpdr2s(MGROUPWIDTH,0);
    rpdr2s(0,-(gtheight-2));
   rpdr2s(-MGROUPWIDTH,0);
    pclos();

    cmov2s(x,y);
    do_group_text(gnum);
}

Boolean select_group(groupnum)
short groupnum;
```

```
{
  if(groupnum == curgroup) return FALSE;

/*    printf("selecting %d\n",groupnum); fflush(stdout);*/

    highlight_group_text(curgroup,mtvcolor);
  curgroup = groupnum;

    highlight_group_text(curgroup,highcolor);

   info_views_update();
/*    printf("highlighting %d\n",curgroup); fflush(stdout);*/

  return TRUE;
}

void select_group_parts(gnum)
short gnum;
{
   short i;
   selectitem *plist;

   if (gnum == -1) return;
   plist = groups[gnum].gpart;
   for(i=0; i < groups[gnum].numparts; i++)
            select_subpart(plist[i].atnum,plist[i].sbnum);
}

void highlight_gselected_text()
{
   if(curgroup != -1)
            highlight_group_text(curgroup,highcolor);
}


/*---------------------------*/

short find_up_brother(gnum)
short gnum;
```

```
{
   short dad,i;

   if(gnum == -1) return -1;              /* root has no brothers */
   dad = groups[gnum].parent;
   /*find the upper brother (lower group number)*/
   for(i=gnum-1;i>=0;i--)
            if(groups[i].parent == dad) return i;
   return -1;
}

short find_down_brother(gnum)
short gnum;
{
   short dad,i;

   if(gnum == -1) return -1;              /* root has no brothers */
   dad = groups[gnum].parent;
   /*find the lower brother(higher group count)*/
   for(i=gnum+1;i<groupcount;i++)
            if(groups[i].parent == dad) return i;
   return -1;
}

void increase_level(gnum)
short gnum;
{
   short newdad;

   newdad = find_up_brother(gnum);
   if(newdad == -1) /* no upper brother */
            if((newdad=find_down_brother(gnum)) == -1) return; /*no lower brother*/
   groups[gnum].parent = newdad;
   group_view_update();
}

void decrease_level(gnum)
short gnum;
{
   if (groups[gnum].parent == -1) return;
```

```
    groups[gnum].parent = groups[groups[gnum].parent].parent;
   group_view_update();
}

void decrease_line(gnum)
short gnum;
{
   short uncle;

   if((uncle = find_up_brother(groups[gnum].parent)) == -1) return;
   groups[gnum].parent = uncle;
   group_view_update();
}

void increase_line(gnum)
short gnum;
{
   short uncle;

   if((uncle = find_down_brother(groups[gnum].parent)) == -1) return;
   groups[gnum].parent = uncle;
   group_view_update();
}


/*-----------------------------*/
/* grouping file stuff */

void write_groupings(fname)
char *fname;
{
   char fpath[80];
   FILE *groupfile;
   short result;
   char *c;

    sprintf(fpath,"%s/%s.group",groupingsdir,fname);
   if((groupfile=fopen(fpath,"w")) == NULL) {
            sprintf (tstring,"\nFile \"%s\" could not be opened",fname);
```

```
            show_message(tstring,MAINW/2,MAINH/2,25,20);
            show_message("Make sure the groupings directory is in the right place",
                                    MAINW/2,MAINH/2 - 60 ,25,20);
            wait_for_click();
            clear_messages();
            return;
    }
    /*write out the file version*/
    fputc(1,groupfile);

    /* write out the current mapping of atoms to elements */
    fprintf(groupfile,"%d ",atomcntr);
     fwrite(atom,sizeof(element),atomcntr+1,groupfile);

    /* now write the groupings */
    fprintf(groupfile,"%d ",groupcount);
    result = fwrite(groups,sizeof(grouping),groupcount,groupfile);

    /* write out the user polygons */
/*printf("polys = %d\n",upolycntr);fflush(stdout);*/
    fprintf(groupfile,"%d ",upolycntr);
     fwrite(upoly,sizeof(userpoly),upolycntr,groupfile);

    fclose(groupfile);

   changeflag = FALSE;

/*    printf("wrote %d groupings\n",result); fflush(stdout);*/
}


/*----*/

static      element     tempatom[MAXATOM];
static  short tempatomcntr;


Boolean find_atom(elnum,eltype,atnum)
short elnum,eltype;
short *atnum;
```

```
{
   short i;
   for(i=0;i<=atomcntr;i++){
            if(atom[i].elpntr == elnum && atom[i].elmflg == eltype){
               *atnum = i;
               return TRUE;
            }
   }
   return FALSE;
}

/*this function adjusts the loaded grouping data via the loaded*/
/*atom mappings*/
/*THIS IS NOT A PERFECT PROCESS*/
void correct_loaded_groupings()
{
   short i,h;
   short atomnum,elmnum,subnum,eltype,anum;

   for(i=0;i<groupcount;i++){
            for(h=0;h<groups[i].numparts;h++){
               atomnum=groups[i].gpart[h].atnum;
               subnum =groups[i].gpart[h].sbnum;
               elmnum =tempatom[atomnum].elpntr;
               eltype =tempatom[atomnum].elmflg;
               /*try to find the corresponding atom and subpart*/
               if(!find_atom(elmnum,eltype,&anum) ||
                subnum >= atom_subparts(anum)){
                        if(!delete_group_part(i,h)) {
                           delete_group(i);
                           i--;
                           goto nextgroup;
                        }
                        h--;
                        continue;
               }
               /*found it, now stuff it into the groupings*/
               groups[i].gpart[h].atnum = anum;
            }
```

```
nextgroup:
            continue;
    }
}


/*problem -- first round grouping files only have n-1 atom array elements*/

Boolean read_groupings(fname)
char *fname;
{
    char fpath[120];
    FILE *groupfile;
    int version;

    sprintf(fpath,"%s/%s.group",groupingsdir,fname);
    if((groupfile=fopen(fpath,"r")) == NULL) {
            return FALSE;
    }

    version = fgetc(groupfile);
    if(version>='0'){
            fclose(groupfile);
            return read_groupings_v0(fname);
    }
    switch(version){
            case 1: read_groupings_v1(groupfile);
                    break;
            default: printf("UNKNOWN GROUPINGS FILE VERSION\n");fflush(stdout);
    }

    changeflag = FALSE;
    return TRUE;
}


Boolean read_groupings_v0(fname)
char *fname;
{
    char fpath[120];
```

```
   FILE *groupfile;
   short result;

    sprintf(fpath,"%s/%s.group",groupingsdir,fname);
   if((groupfile=fopen(fpath,"r")) == NULL) {
            return FALSE;
   }

   /* read in the atom to element array */
    fscanf(groupfile,"%hd",&tempatomcntr);
/*    printf("%d atoms\n",tempatomcntr); fflush(stdout);*/
    if(tempatomcntr != fread(tempatom,sizeof(element),
                                              tempatomcntr,groupfile))
            printf("bad atom[] read\n");fflush(stdout);

   /*now read in the groupings */
    result = fread(groups,sizeof(grouping),maxgroups,groupfile);


    fclose(groupfile);
/*    printf("read %d groups\n",result); fflush(stdout);*/
   groupcount = result;
   curgroup = -1;
    clear_selectlist();
   return TRUE;
}

Boolean read_groupings_v1(groupfile)
FILE *groupfile;
{
   short result;

   /* read in the atom to element array */
    fscanf(groupfile,"%hd ",&tempatomcntr);
/*printf("%d atoms\n",tempatomcntr); fflush(stdout);*/
   if(tempatomcntr+1 !=
            fread(tempatom,sizeof(element),      tempatomcntr+1,groupfile)){
              printf("bad atom[] read\n");
              fflush(stdout);
```

```
        }

  /*now read in the groupings array */
  fscanf(groupfile,"%hd ",&groupcount);
/*printf("%d groups\n",groupcount); fflush(stdout);*/
  if(groupcount != fread(groups,sizeof(grouping),groupcount,groupfile)){
          printf("****ERROR: inconsistent groupings file v1\n");
          fflush(stdout);
  }

  /*now read in the user polygons array */
  fscanf(groupfile,"%d ",&upolycntr);
/*printf("%d user polys\n",upolycntr); fflush(stdout);*/
  if(upolycntr != fread(upoly,sizeof(userpoly),MAXELM,groupfile)){
          printf("****ERROR: bad groupings file v1 - wrong file size\n");
          fflush(stdout);
  }
  process_userpolys();

  fclose(groupfile);

  correct_loaded_groupings();

  curgroup = -1;
  clear_selectlist();
}

/*------------------------------*/

void show_part_origin_mess()
{
   show_message("Select a highlighted part (or hit ESC)",250,450,25,20);
}

Boolean get_new_origin()
{
   int hits;
   int index,h,i;
   short items,item,subnum;
```

```
 short val;
 Device dev;

while(TRUE){
 while(qtest()){
 dev=qread(&val);

 switch(dev){
        case ESCKEY:
          if(val == 0) continue;
          return FALSE;
  case MIDDLEMOUSE:
          if(val == 0) continue;
          if(mouseinrect(mviewrect)) do_rotate();
          continue;
        case LEFTMOUSE:
          if(val == 0) continue;
          if(mouseinrect(mviewrect)) break;
          continue;
        case REDRAW:
          clear_window();
          window_draw_both();
           show_part_origin_mess();
          continue;
        default: continue;
 }

 hits = get_pick();

 index=0;
/*printf("hit count: %d  hits: ",hits);*/
 for(h=0; h<hits ; h++){
   items= pbuffer[index++];
   if(items != 2){
          printf("error: hit depth != 2");
          exit(-1);
        }
        item=pbuffer[index++];  /* get atom # */
        subnum=pbuffer[index++];
/*printf("(%d, %d) ",item,subnum);fflush(stdout);*/
```

```
            if(subpart_in_selectlist(item,subnum)) {
               if(get_subpart_center(item,subnum,&groups[curgroup].origin)){
/*
printf("new origin: %d %d %d\n",groups[curgroup].origin.x,
    groups[curgroup].origin.y,groups[curgroup].origin.z);fflush(stdout);
*/
                        return TRUE;
               }
            }
   }
  }
 }
}

void set_part_origin()
{
  if (curgroup == -1) return;

   show_part_origin_mess();

   if(!get_new_origin()) {clear_messages(); return;}

   update_swap_matis_viewport();

  clear_messages();

  changeflag = TRUE;
}

void get_part_rel_origin(gnum,pt)
short gnum;
point *pt;
{
    copy_point(pt,&groups[gnum].origin);
  if (groups[gnum].parent != -1)
           subtract_point(pt,&groups[groups[gnum].parent].origin);
}
```

```
point nullpoint = {0,0,0};

void draw_part_origin()
{
   point *p1;
   short offset,loff;

   if(curgroup == -1) return;
   p1 = &groups[curgroup].origin;
/*    if(pointeq(p1,&nullpoint)) return;*/

   offset = (mportx2-mportx1)/20;
   loff = 2*offset;

   moves(p1->x,p1->y,p1->z);
   rmvs(-offset,0,0);
   rdrs(loff,0,0);
   moves(p1->x,p1->y,p1->z);
   rmvs(0,-offset,0);
   rdrs(0,loff,0);
   moves(p1->x,p1->y,p1->z);
   rmvs(0,0,-offset);
   rdrs(0,0,loff);
}

/*------------------------------*/

Boolean group_planar_p(gnum)
short gnum;
{
   selectitem *partlist;
   point p1,p2,p3;
   vector v1,v2,normal,norm;
   int h;

   partlist = &groups[gnum].gpart[0];

   /*1 or 2 subparts is definitely planar*/
   if(groups[gnum].numparts<3) return TRUE;
```

```
/*get the comparison normal from the first subprim. + 1 nonlinear pt*/
  get_subpart_p1(partlist[0].atnum,partlist[0].sbnum,&p1);
  get_subpart_p2(partlist[0].atnum,partlist[0].sbnum,&p2);
 stuff_vector(&p1,&p2,&v1);
/*now find a non co-linear point, try p1's first*/
 for(h=1;h<groups[gnum].numparts;h++){
          get_subpart_p1(partlist[h].atnum,partlist[h].sbnum,&p3);
          if(delta_pointeq_p(&p1,&p3,3) || delta_pointeq_p(&p2,&p3,3)) continue;
          stuff_vector(&p1,&p3,&v2);
          if(!vectors_parallel_p(&v1,&v2)) break;
}
 if(h==groups[gnum].numparts){
          /*now try p2's*/
          for(h=1;h<groups[gnum].numparts;h++){
               get_subpart_p1(partlist[h].atnum,partlist[h].sbnum,&p3);
              if(delta_pointeq_p(&p1,&p3,3) || delta_pointeq_p(&p2,&p3,3))
                      continue;
              stuff_vector(&p1,&p3,&v2);
              if(!vectors_parallel_p(&v1,&v2)) break;
          }
          if(h==groups[gnum].numparts) return TRUE;
}

 get_vector_normal(&v1,&v2,&normal);

 for(h=1;h<groups[gnum].numparts;h++){
          get_subpart_p1(partlist[h].atnum,partlist[h].sbnum,&p3);
          if(!delta_pointeq_p(&p1,&p3,3) && !delta_pointeq_p(&p2,&p3,3)){
              stuff_vector(&p1,&p3,&v2);
              if(!vectors_parallel_p(&v1,&v2)){
                      if(!point_planar_p(&p3,&p1,&p2,&normal))
                        return FALSE;
              }
          }
          /*need to test the other end point as well*/
          get_subpart_p2(partlist[h].atnum,partlist[h].sbnum,&p3);
          if(delta_pointeq_p(&p1,&p3,3) || delta_pointeq_p(&p2,&p3,3)) continue;
          stuff_vector(&p1,&p3,&v2);
          if(vectors_parallel_p(&v1,&v2)) continue;
```

```
            if(!point_planar_p(&p3,&p1,&p2,&normal))
              return FALSE;
  }
  return TRUE;
}

/*------------------------------*/
short  get_side(x1,y1,x2,y2,x,y)
float  x1,y1,x2,y2,x,y;
{
   float  result;

   result =  x1 * (y2 - y);
   result -= y1 * (x2 - x);
   result += x2*y - y2*x;

    if(delta_vector_check_eq(result,0,.005)) return 0;
   else if (result > 0.0) return -1;    /*counter clockwise */
   return 1;
}


void  get_uv_coords(u,v,orig,pt,k1,k2)
vector  *u,*v,*orig,*pt;
float  *k1,*k2;
{
   if(v->x != 0){
            if(u->y != 0){
               *k2=(u->x*(pt->y - orig->y) - u->y*(pt->x - orig->x)) /
                                       (v->y*u->x - v->x);
               *k1=(pt->y - orig->y - (*k2)*v->y) / u->y;
               return;
            }
            else{
               *k2=(u->x*(pt->z - orig->z) - u->z*(pt->x - orig->x)) /
                                       (v->z*u->x - v->x);
               *k1=(pt->z - orig->z - (*k2)*v->z) / u->z;
               return;
            }
   }
```

```
  else if(v->y != 0){
            if(u->z != 0){
              *k2=(u->y*(pt->z - orig->z) - u->z*(pt->y - orig->y)) /
                                        (v->z*u->y - v->y);
              *k1=(pt->z - orig->z - (*k2)*v->z) / u->z;
              return;
            }
            else{
              *k2=(u->y*(pt->x - orig->x) - u->x*(pt->y - orig->y)) /
                                        (v->x*u->y - v->y);
              *k1=(pt->x - orig->x - (*k2)*v->x) / u->x;
              return;
            }
  }
  else{
            if(u->x != 0){
              *k2=(u->z*(pt->x - orig->x) - u->x*(pt->z - orig->z)) /
                                        (v->x*u->z - v->z);
              *k1=(pt->x - orig->x - (*k2)*v->x) / u->x;
              return;
            }
            else{
              *k2=(u->z*(pt->y - orig->y) - u->y*(pt->z - orig->z)) /
                                        (v->y*u->z - v->z);
              *k1=(pt->y - orig->y - (*k2)*v->y) / u->y;
              return;
            }
  }
}


Boolean convex_poly_p(edgeptr)
Edgelist *edgeptr;
{
  vector p1,p2,p3;
  vector v2,normal;
  vector u,v,orig;
   float k1,k2,k3,k4,k5,k6;
  short sideflag = 0; /*0=neither, 1=right, -1=left*/
```

```
/*get the initial side from the first subprim. + 1 nonlinear pt*/
 if(!get_next_point(&p1,edgeptr)) return TRUE;
if(!get_next_point(&p2,EDGENULL)) return TRUE;
 stuff_vector_float(&p1,&p2,&u);

 /*now find a non co-linear point, try p1's first*/
 while(get_next_point(&p3,EDGENULL)){
        if(delta_pointeq_p(&p1,&p3,3) || delta_pointeq_p(&p2,&p3,3)) continue;
        stuff_vector_float(&p1,&p3,&v2);
        if(!vectors_parallel_p(&u,&v2)) break;
 }

  get_vector_normal(&u,&v2,&normal);
 /*now get v to complete a basis for the plane*/
  get_vector_normal(&u,&normal,&v);
 normalize_vector(&u);

 /*use p1 as the origin*/
  copy_vector(&orig,&p1);

 /*get the first two sets of u,v vals (p1 = origin in uv space)*/
 k1 = 0; k2 = 0;
  get_uv_coords(&u,&v,&orig,&p2,&k3,&k4);

 /*now cycle through the rest of the points and check each against*/
 /*the previous 2 to see if it is on the same side*/
  get_next_point(&p3,edgeptr); get_next_point(&p3,EDGENULL);
 while(get_next_point(&p3,EDGENULL)){
        get_uv_coords(&u,&v,&orig,&p3,&k5,&k6);
        if(!sideflag) sideflag = get_side(k1,k2,k3,k4,k5,k6);
        else if(sideflag != get_side(k1,k2,k3,k4,k5,k6)) return FALSE;
        k1=k3; k2=k4; k3=k5; k4=k6;
 }
 return TRUE;
}


/*--------------------------------------*/
```

```
void reset_group_scroll()
{
   groupscrollpos = 0;
}

void offset_group_scrollpos(offset)
short offset;
{
   groupscrollpos += offset;
}

short group_scroll_to_mouse(starty)
long starty;
{
   long currenty;
   short yoffset;
   short curtextbot;

   curtextbot = MGROUPHEIGHT - groupcount*gtheight - gtheight;

   currenty=getvaluator(MOUSEY);

   yoffset = (short)(starty - currenty);
   if((groupscrollpos + yoffset) < curtextbot)
            yoffset = curtextbot-groupscrollpos;
   if((groupscrollpos + yoffset) > 0) yoffset= -groupscrollpos;

   offset_group_scrollpos(yoffset);

   set_group_viewport();
   ortho2(0,MGROUPWIDTH,groupscrollpos,groupscrollpos+MGROUPHEIGHT);

   c3s(mtvcolor);
   clear();
   show_groups();

   swapbuffers();

   offset_group_scrollpos(-yoffset);
```

```
  return yoffset;
}

/*-----------------------------*/

/* DO NOT PLACE ANY FUNCTIONS AFTER RCS LOG!
$Log:     group.c,v $
 * Revision 2.9  90/11/01  14:31:03  ethan
 * name message
 *
 * Revision 2.8  90/10/30  20:11:55  ethan
 * checks for concave polygons
 *
 * Revision 2.7  90/10/24  17:14:59  ethan
 * ctrl-t
 *
 * Revision 2.6  90/10/23  15:28:42  ethan
 * changeflag, group filename
 *
 * Revision 2.5  90/10/22  15:40:10  ethan
 * capitals
 *
 * Revision 2.4  90/10/19  19:13:08  ethan
 * cntrl-w
 *
 * Revision 2.3  90/10/15  17:45:35  ethan
 * scrollable groups
 *
 * Revision 2.2  90/10/12  19:06:48  ethan
 * minor mods
 *
 * Revision 2.1  90/10/05  10:29:54  dan
 * New Rev
 *
 * Revision 1.21  90/10/01  16:09:28  ethan
 * bug fixes
 *
 * Revision 1.20  90/09/30  15:38:32  ethan
 * fixed update bug
```

```
*
* Revision 1.19  90/09/28  12:37:53  ethan
* wireframes
*
* Revision 1.18  90/09/25  14:09:07  dan
* Added default for stepsize.
*
* Revision 1.17  90/09/25  13:05:16  ethan
* single group command
*
* Revision 1.16  90/09/21  14:48:42  ethan
* handles user poly
*
* Revision 1.15  90/09/12  19:39:02  ethan
* error messages
*
* Revision 1.14  90/09/10  19:11:55  ethan
* *** empty log message ***
*
* Revision 1.11  90/09/07  19:16:59  mike
* changed for new show_messages routine
*
* Revision 1.8  90/09/04  15:44:22  mike
* changed to reflect extern pbuffer in globals.h
*
* Revision 1.7  90/09/04  15:24:54  ethan
* does origin stuff
*
* Revision 1.6  90/08/30  13:36:13  dan
* Fixed default types for constraint structure, added reverse
*
* Revision 1.5  90/08/30  13:02:26  ethan
* *** empty log message ***
*
* Revision 1.3  90/08/27  20:36:58  ethan
* *** empty log message ***
*
* Revision 1.2  90/08/18  20:16:11  dan
* general clean up
*
```

```
* Revision 1.1  90/08/17  18:19:17  dan
* Initial revision
*
*/
```

| | |
|---|---|
| User: | MICRORENTMind |
| Application: | PrintMonitor |
| Document: | group.h |
| Date: | Wednesday, November 14, 1990 |
| Time: | 7:17:55 PM |
| Printer: | Peace of Mind |

```
/*
** GROUP.H
**
** Copyright 1990, VPL Research
**
$Header: /usr/starch/source/starch/RCS/group.h,v 2.2 90/10/19 19:13:21 ethan Exp $
**
*/

#define maxgroups 100
#define maxgparts 50

#define POLYGROUP 0
#define SWEEPGROUP 1
#define CONNECTGROUP 2
#define WIREGROUP 3

#define HEIGHTTHICK 10                  /* default thickness height */

#define POSTHICKEN 0
#define NEGTHICKEN 1
#define EQUALTHICKEN 2
typedef struct {
   Boolean  hflag;             /* TRUE = thickened */
   short    height;
   short    htype;
   Boolean  wflag;
   short    width;
   short    wtype;
} thick;

typedef struct {
   char     name[20];
   short    type;              /* poly, sweep, connect, wireframe */
   point    origin;            /* absolute point of rotation */
   short    numparts;
   selectitem gpart[maxgparts];  /* index into atom[],subpart */
   unsigned char r,g,b,reverse;
   thick    thickness;
```

```
  Constraints          constraint;
  short    parent;              /* index into groups[] */
  short    stepsize;
  char     filler[198];
} grouping;

extern short groupcount;
extern grouping groups[];

typedef struct {
  float  x;
  float  y;
  float  z;
} vector;

/*from partname.c*/
extern short curgname;
extern short gdefaultsnum;
extern grouping gdefaults[];

/* DO NOT PUT ANYTHING AFTER RCS LOG!
$Log:     group.h,v $
 * Revision 2.2  90/10/19  19:13:21  ethan
 * default thickness = 10
 *
 * Revision 2.1  90/10/05  10:29:55  dan
 * New Rev
 *
 * Revision 1.9  90/09/28  12:39:45  ethan
 * wireframes
 *
 * Revision 1.8  90/09/28  12:38:13  ethan
 * *** empty log message ***
 *
 * Revision 1.7  90/09/25  14:12:34  dan
 * Added stepsize to groupings structure. (Reduced blank area by
 * a short...)
 *
 * Revision 1.6  90/09/21  15:08:12  ethan
```

```
* added CONNECTGROUP type
*
* Revision 1.5  90/09/04  15:26:44  ethan
* *** empty log message ***
*
* Revision 1.4  90/08/30  14:08:45  dan
* partname.c externs
*
* Revision 1.3  90/08/30  13:36:50  dan
* Added "reverse" field to groupings structure
*
* Revision 1.2  90/08/27  20:37:04  ethan
* *** empty log message ***
*
* Revision 1.1  90/08/17  18:19:30  dan
* Initial revision
*
*/
```

| | |
|---|---|
| User: | MICRORENTMind |
| Application: | PrintMonitor |
| Document: | interf.c |
| Date: | Wednesday, November 14, 1990 |
| Time: | 7:18:45 PM |
| Printer: | Peace of Mind |

```
/*
** INTERF.C
**
** Pop-up dialog box interfaces...
**
** Copyright 1990, VPL Research
**
$Header: /usr/starch/source/starch/RCS/interf.c,v 2.10 90/10/26 14:58:16 ethan Exp $
**
*/

#include <gl/gl.h>
#include <gl/device.h>
#include <stdio.h>
#include <math.h>
#include "prod.h"
#include "globals.h"

/* in COLOR.C */
extern void color_screen();

void do_main_menu();
void do_group_menu();
void load_matis();
void load_soap();
void save_soap();
void set_matis_dir();
Boolean get_matis_dir();
void set_groupings_dir();
void set_swivel_dir();
void delete_userpoly();

Boolean get_user_string();
void feedback_view_update();
void set_feedback_viewport();
void show_feedback_text();
void clear_messages();
void wait_for_click();
```

```
void load_groupings();
void save_groupings();

extern flag_quit();
extern group_poly();
extern group_wireframe();
extern group_sweep();
extern make_polygon();
extern group_part();
extern name_part();
extern set_part_origin();
extern replace_default();
extern delete_default();
extern thicken_poly();
extern ungroup();
extern convert_to_soap();
extern close_rect();
extern extend_to_rect();


/* THESE ARE ACCESSED BY COLOR.C! */
long colmenu_off, colmenu_on, colmenu_con_on, colmenu_norm_on;

static long polymenu;
static long dirmenu;
static long filemenu;
static long groupmenu;
static long menu;

static char curin[120]; /* current input line */
static char curprompt[80];

static short feedbrect[4];
static char menustring[200];


#define fby    20
#define fbx    25
```

```
/* THIS IS A GLOBAL! */
short      color_on;

/*-------------------*/
/*
** THIS ROUTINE SHOULD ONLY BE CALLED ONCE!
*/

void init_menus()
{
  polymenu=
        defpup("Poly Edit Menu %t|Close Rectangle |Extend to Rectangle ");

  dirmenu=
        defpup("Directory Menu %t|Set Matis Directory %f|Set Groupings Directory %f|Set Swivel Directory
%f",set_matis_dir,set_groupings_dir,set_swivel_dir);

  filemenu=
        defpup("File Menu %t|Load Groupings %f|Save Groupings %f|Directories
%m",load_groupings,save_groupings,dirmenu);

  groupmenu=
        defpup("Group Menu %t|Group Polygon %f|Group Wireframe %f|Make Polygon %l|Delete Polygon
%f|Ungroup %f%l|Thicken Polygon %f|Set Origin %f|Name Part %f|Replace Default %f|Delete Default %f",

group_poly,group_wireframe,delete_userpoly,ungroup,thicken_poly,set_part_origin,name_part,replace_default
,delete_default);

  menu=
        defpup("Matis Menu %t|Soap Edit|Load Matis %f|Convert %f|File Menu %m|Group Menu %m%l|Quit
%f",load_matis,convert_to_soap,filemenu,groupmenu,flag_quit);

  colmenu_off =
        defpup("Soap Menu %t|Get Color |Set Color |Normal ON |Reverse |Stepsize  |Convert ON %l|Soap
Exit");
  colmenu_on =
        defpup("Soap Menu %t|Get Color |Set Color |Normal OFF |Reverse |Stepsize |Convert OFF %l|Soap
Exit");
  colmenu_con_on =
        defpup("Soap Menu %t|Get Color |Set Color |Normal ON |Reverse |Stepsize  |Convert OFF %l|Soap
```

```
Exit");
   colmenu_norm_on =
            defpup("Soap Menu %t|Get Color |Set Color |Normal OFF |Reverse |Stepsize |Convert ON %|
Exit");

   color_on = 0;
}

void do_main_menu()
{
   short  index;

   index = dopup(menu);

   if (index == 1)
            color_screen();
}

void do_group_menu()
{
   short  index;

   index = dopup(groupmenu);

   if (index == 3)
            make_polygon();
}

void do_poly_menu()
{
   short  index;

   index = dopup(polymenu);

   if (index == 1)
            close_rect();
   else if (index == 2)
            extend_to_rect();
}
```

| | |
|---|---|
| User: | MICRORENTMind |
| Application: | PrintMonitor |
| Document: | matistext.c |
| Date: | Wednesday, November 14, 1990 |
| Time: | 7:34:27 PM |
| Printer: | Peace of Mind |

```
/*
** MATISTEXT.C
**
** Copyright 1990, VPL Research
**
$Header: /usr/starch/source/starch/RCS/matistext.c,v 2.1 90/10/05 10:29:58 dan Exp $
**
*/

#include <gl/gl.h>
#include <gl/device.h>
#include <stdio.h>
#include <math.h>
#include "prod.h"
#include "globals.h"

#define theight 16
#define atomtab 20

void matis_text_view_update();
void set_matis_text_viewport();

void reset_scroll();
void offset_mtext_scrollpos();

short item_at_y();

void show_product_text();
void draw_end_seperators();
void do_shape_text();
void do_atom_text();
short atom_text_pos();
void highlight_atom_text();
void highlight_selected_text();
void unhighlight_selected_text();

short mtextrect[4] =
  {MTEXTLEFT, MTEXTLEFT+MTEXTWIDTH, MTEXTBOT , MTEXTBOT+MTEXTHEIGHT};
```

```
char curline[80]; /* 80 char per text line */

short mtextscrollpos = 0;

/*------------------------------------*/

void matis_text_view_update()
{
    set_matis_text_viewport();
    ortho2(0,MTEXTWIDTH,mtextscrollpos,mtextscrollpos+MTEXTHEIGHT);

    c3s(mtvcolor);

   clear();

    show_product_text();
    highlight_selected_text();

}

void set_matis_text_viewport()
{
  viewport(mtextrect[LEFTINDEX],mtextrect[RIGHTINDEX],
                mtextrect[BOTINDEX],mtextrect[TOPINDEX]);
}

void show_product_text()
{
   short i,h;
   short atomnum=0;

   for (i=0;i<=formcntr;i++){
            c3s(tsepcolor);
            pmv2s(0,atom_text_pos(atomnum)+7);
            rpdr2s(MTEXTWIDTH,0);
            rpdr2s(0,-5);
            rpdr2s(-MTEXTWIDTH,0);
            pclos();
```

```
            for(h=0; h<form[i].numatoms; h++,atomnum++){
                cmov2s(atomtab,atom_text_pos(atomnum)-theight+5);
               do_atom_text(atom[atomnum]);
            }
   }
   draw_end_seperators();
}

void draw_end_seperators()
{
   c3s(cblack);
    pmv2s(0,atom_text_pos(0)+7);
   rpdr2s(MTEXTWIDTH,0);
   rpdr2s(0,-5);
   rpdr2s(-MTEXTWIDTH,0);
   pclos();

    pmv2s(0,atom_text_pos(atomcntr)-theight);
   rpdr2s(MTEXTWIDTH,0);
   rpdr2s(0,-5);
   rpdr2s(-MTEXTWIDTH,0);
   pclos();
}

void do_atom_text(elem)
element elem;
{
   switch(elem.elmflg) {
            case 1:
                        c3s(linecolor);
                        sprintf(curline,"lines #%d",elem.elpntr);
                        charstr(curline);
                        break;
            case 2:
                        c3s(rectcolor);
                        sprintf(curline,"rectangle #%d",elem.elpntr);
                        charstr(curline);
                        break;
            case 3:
```

```
            c3s(polycolor);
            sprintf(curline,"polygon #%d",elem.elpntr);
            charstr(curline);
            break;
case 4:
            c3s(arccolor);
            sprintf(curline,"arc #%d",elem.elpntr);
            charstr(curline);
            break;
case 5:
            c3s(columncolor);
            sprintf(curline,"column #%d",elem.elpntr);
            charstr(curline);
            break;
case 6:
            c3s(patterncolor);
            sprintf(curline,"pattern #%d",elem.elpntr);
            charstr(curline);
            break;
case 7:
            c3s(workcolor);
            sprintf(curline,"grid #%d",elem.elpntr);
            charstr(curline);
            break;
case 8:
            c3s(workcolor);
            sprintf(curline,"|| lines #%d",elem.elpntr);
            charstr(curline);
            break;
case 9:
            c3s(workcolor);
            sprintf(curline,"knobs #%d",elem.elpntr);
            charstr(curline);
            break;
case 10:
            c3s(workcolor);
            sprintf(curline,"user poly #%d",elem.elpntr);
            charstr(curline);
            break;
```

```
        default:
                c3s(workcolor);
                sprintf(curline,"type %d #%d",elem.elmflg,elem.elpntr);
                charstr(curline);
                break;

  }
}

void get_atom_text(elem,str)
element elem;
char *str;
{
   switch(elem.elmflg) {
        case 1:     sprintf(str,"lines #%d",elem.elpntr);
                    break;
        case 2:     sprintf(str,"rectangle #%d",elem.elpntr);
                    break;
        case 3:     sprintf(str,"polygon #%d",elem.elpntr);
                    break;
    case 4: sprintf(str,"arc #%d",elem.elpntr);
                    break;
    case 5: sprintf(str,"column #%d",elem.elpntr);
                    break;
    case 6: sprintf(str,"pattern #%d",elem.elpntr);
                    break;
     case 10: sprintf(str,"user poly #%d",elem.elpntr);
                    break;
        default:sprintf(str,"type %d #%d",elem.elmflg,elem.elpntr);
                    break;

  }
}


#define msepheight 8               /* seperator height */

void light_atom_text(atomnum,colora)
short atomnum;
short *colora;
```

```
{
  short liney;

   set_matis_text_viewport();

  ortho2(0,MTEXTWIDTH,mtextscrollpos,MTEXTHEIGHT+mtextscrollpos);

        liney = atom_text_pos(atomnum);
        c3s(colora);
        pmv2s(0,liney);
        rpdr2s(MTEXTWIDTH,0);
        rpdr2s(0,-(theight-2));
        rpdr2s(-MTEXTWIDTH,0);
        pclos();

        cmov2s(atomtab,liney-theight+5);
        do_atom_text(atom[atomnum]);
}

void highlight_atom_text(atomnum)
short atomnum;
{
   light_atom_text(atomnum,highcolor);
}

void highlight_selected_text()
{
  int i;
   for(i=0;i<selectcount;i++){
        highlight_atom_text(selectlist[i].atnum);
/*      show_selected_number(i);*/
  }
}

void unhighlight_atom_text(atomnum)
short atomnum;
{
   light_atom_text(atomnum,mtvcolor);
}
```

```
void unhighlight_selected_text()
{
   int i;
    for(i=0;i<selectcount;i++){
            unhighlight_atom_text(selectlist[i].atnum);
   }
}

short atom_text_pos(atomnum)
short atomnum;
{
  return (MTEXTHEIGHT -
             (atomnum*theight + (atom[atomnum].parent+1)*msepheight));
}

short text_bottom()
{
    return atom_text_pos(atomcntr) - theight;
}

short item_at_y(y)
short y;
{
    short i,liney;
    short lowest;

    y += mtextscrollpos;
   liney = MTEXTHEIGHT - y;
    lowest = liney / (theight + msepheight);
/*    printf("pos: %d  from top: %d  lowest: %d\n",y,liney,lowest);*/
   if(lowest >= atomcntr) return atomcntr;
    for(i=lowest;i<=atomcntr;i++)
{
/*            printf("#%d  at  %d\n",i,atom_text_pos(i));*/
            if(atom_text_pos(i) < y){
               break;
            }
}
  if(i > 0) i -= 1;
```

```
/*    printf("item: %d\n",i); fflush(stdout);*/
   return i;
}


/*--------------------------------------*/

void reset_scroll()
{
    mtextscrollpos = 0;
}

void offset_mtext_scrollpos(offset)
short offset;
{
    mtextscrollpos += offset;
}

short scroll_to_mouse(starty)
long starty;
{
    long currenty;
    short yoffset;
    short curtextbot;

     curtextbot = atom_text_pos(atomcntr)-theight-msepheight;

    currenty=getvaluator(MOUSEY);

    yoffset = (short)(starty - currenty);
    if((mtextscrollpos + yoffset) < curtextbot)
              yoffset = curtextbot-mtextscrollpos;
    if((mtextscrollpos + yoffset) > 0) yoffset= -mtextscrollpos;

     offset_mtext_scrollpos(yoffset);

     set_matis_text_viewport();
    ortho2(0,MTEXTWIDTH,mtextscrollpos,mtextscrollpos+MTEXTHEIGHT);
```

```
  c3s(mtvcolor);
  clear();
  show_product_text();
   highlight_selected_text();

  swapbuffers();

   offset_mtext_scrollpos(-yoffset);
  return yoffset;
}

/* DO NOT PLACE ANY FUNCTIONS AFTER RCS LOG!
$Log:     matistext.c,v $
 * Revision 2.1  90/10/05  10:29:58  dan
 * New Rev
 *
 * Revision 1.6  90/09/25  13:05:52  ethan
 * *** empty log message ***
 *
 * Revision 1.5  90/09/06  18:06:30  ethan
 * all types named
 *
 * Revision 1.4  90/08/27  20:37:18  ethan
 * *** empty log message ***
 *
 * Revision 1.2  90/08/18  20:16:23  dan
 * general clean-up
 *
 * Revision 1.1  90/08/17  18:20:19  dan
 * Initial revision
 *
*/
```

| | |
|---|---|
| User: | MICRORENTMind |
| Application: | PrintMonitor |
| Document: | newname.c |
| Date: | Wednesday, November 14, 1990 |
| Time: | 7:35:51 PM |
| Printer: | Peace of Mind |

```
/*
** NEWNAME.C
**
** Checks for same names across products
**
** Copyright 1990, VPL Research
**
$Header: /usr/starch/source/wringer/RCS/newname.c,v 1.4 90/10/02 21:34:52 dan Exp $
**
*/

#include <stdio.h>
#include <malloc.h>
#include <string.h>
#include <memory.h>
#include <math.h>
#include "plan.h"
#include "dictionary.h"

/*
#define DEBUG
*/

/* from WRINGER.C  */
extern short            prod_ok[];
extern char             scriptpath[];

/* accessed from WALL2SWV.C */
void check_current_script();

/* accessed from WRINGER.C  */
void initialize_dictionary();

static void check_and_allocate();
static void parse_name();
static void parse_root();
static void clear_bucket();
static void add_link();
```

```
void read_script_names();

#define YES   1
#define NO    0

/* ACCESSED BY WALL2SWV.C      */
Dictionary  dictionary[MAX_WORDS];
short            last_entry;

static char   nodename[NAMELEN];
static char   nodenum[10];
static short nodeindex;
static short curbucket_first, curbucket_final;

/*----------------------------------------------------------------*/
void initialize_dictionary()
{
   short  i;

   last_entry = 0;

   for (i=0; i<MAX_WORDS; ++i) {
             dictionary[i].entry_name[0] = '\0';
             dictionary[i].current_index = 0;
   }
}

/*----------------------------------------------------------------*/
/*
** WE KNOW PRODUCT IS OK IF THIS IS CALLED!
*/

void check_current_script(prodptr)
product_location    *prodptr;
{
   char   filename[80];
   FILE   *handle;
   short  i;
```

```
 strcpy(filename, scriptpath);
 strcat(filename, prodptr->prod_name);
 strcat(filename, ".SWV");

 handle = fopen(filename, "r");
 if (handle == NULL) {
          printf("\nMASSIVE ERROR: Could not re-open script file.");
          exit(1);
 }

 /* Parse out MakeName's in script file...         */
 /* Check against dictionary entries...            */

 /* first clear out all dictionary first_in_product pointers      */

 for (i=0; i<MAX_WORDS; ++i) {
          dictionary[i].first_in_product = NULLINDEX;
          dictionary[i].bucket_first = NOLINK;
          dictionary[i].bucket_final = NOLINK;
          dictionary[i].blankname = NO;
 }

 /* then check and allocate                                  */
 check_and_allocate(handle,prodptr->prod_name);

 fclose(handle);

 /* the dictionary points off to various buckets filled with    */
 /* old indices. We want to start from the end of each bucket*/
 /* and work backwards to avoid phase errors.                   */

}

/*--------------------------------------------------------*/
static void check_and_allocate(handle,prodname)
FILE        *handle;
char        *prodname;
{
  short  i;
```

```
 char    textline[100];
 char   parse[9];

 while (fgets(textline,100,handle) != NULL) {
        strncpy(parse, textline, 8);
        parse[8] = '\0';

        if (strcmp(parse,"MakeName") == 0) {
          /* will return full name in nodename */
           parse_name(textline);

          /* If node name is product name, skip! These we don't  */
          /* want to number...                                    */
          if (strcmp(nodename,prodname) == 0) {
#ifdef DEBUG
                 printf("\n++++PRODNAME SKIP!");
#endif
                 continue;
          }

          /* This will truncate the number from nodename and put */
          /* it into nodenum and nodeindex...                     */
          parse_root();

          /* check the nodename against the Dictionary    */
          for (i=0; i<last_entry; ++i) {
                 if (strcmp(dictionary[i].entry_name, nodename) == 0) {
                   /* we found a match.     */
                   /* check for a numberless name  */

                    ++(dictionary[i].current_index);

                   if (nodeindex == -1) {
                          dictionary[i].blankname = YES;
                          break;
                   }

                   /* Allocate a bucket */
                   if (dictionary[i].first_in_product == NULLINDEX) {
```

```
                    dictionary[i].first_in_product = (Index *)malloc(
                              MAX_INDEX * sizeof(Index));
#ifdef DEBUG
printf("\nMALLOC RETURNS: %lx",dictionary[i].first_in_product);
fflush(stdout);
#endif
                    clear_bucket(dictionary[i].first_in_product);
               }

               curbucket_first = dictionary[i].bucket_first;
               curbucket_final = dictionary[i].bucket_final;
               /* Bucket is sorted in ascending old index order */
               add_link(dictionary[i].first_in_product, nodeindex);
               dictionary[i].bucket_first = curbucket_first;
               dictionary[i].bucket_final = curbucket_final;

               break;
          }
     }

     if (i == last_entry) {
          /* couldn't find the name. Add new dictionary entry! */
          strcpy(dictionary[i].entry_name, nodename);

          ++last_entry;
          ++dictionary[i].current_index;

          if (nodeindex == -1) {
             dictionary[i].blankname = YES;
             continue;
          }

          dictionary[i].first_in_product = (Index *)malloc(
                    MAX_INDEX * sizeof(Index));
          clear_bucket(dictionary[i].first_in_product);

     curbucket_first = dictionary[i].bucket_first;
     curbucket_final = dictionary[i].bucket_final;
     /* Bucket is sorted in ascending old index order */
     add_link(dictionary[i].first_in_product, nodeindex);
```

```
                    dictionary[i].bucket_first = curbucket_first;
                    dictionary[i].bucket_final = curbucket_final;
                }
            }
    }
}

/*-----------------------------------------------------------*/
static void parse_name(refstring)
char        *refstring;
{
    char   *s, *r;

    s = refstring + 8;
    r = nodename;  /* GLOBAL */

    while (*s == ' ')
            ++s;

    /* fgets leaves in the \n... must check for it. */
    while (*s != '\n' && *s != '\0')
            *r++ = *s++;

    *r = '\0';  /* terminate! */

#ifdef DEBUG
    printf("\nNODENAME: %s",nodename);
#endif
}

/*-----------------------------------------------------------*/
static void parse_root()
{
    char   *s, *r;
    short  namelen;


    namelen = strlen(nodename);
```

```
  s = nodename + namelen - 1;  /* GLOBAL */
  r = nodenum;   /* GLOBAL */

   /* skip trailing white space */
  while (*s == ' ')
            --s;

  /* skip back over numerics */
  while (*s >= '0' && *s <= '9')
            --s;

  ++s;   /* first digit */

  while (*s == '0')   /* skip leading zeroes  */
    ++s;

  /* CHECK TO SEE IF THERE WERE ANY NUMERICS AT ALL! */
  if (*s == ' ' || *s == '\0' || *s == '\n') {
            *r = '\0'; /* NULL STRING */
            nodeindex = -1;
  } else {
            while (*s != ' ' && *s != '\0' && *s != '\n') {
               *r++ = *s;
               *s++ = '\0';    /* truncate */
            }
            *r = '\0';  /* terminate! */
            nodeindex = atoi(nodenum);
  }
#ifdef DEBUG
  printf("\n=>NODENAME: %s",nodename);
  printf("\n=>NODENUM: %s, INDEX: %d",nodenum,nodeindex);
fflush(stdout);
#endif
}

/*------------------------------------------------------------*/
static void clear_bucket(index)
Index           index[];
{
  short   i;
```

```
  for (i=0; i<MAX_INDEX; ++i) {
            index[i].prev = NOLINK;
            index[i].next = NOLINK;
  }
}

/*------------------------------------------------------------*/
/*
** CURBUCKET_FIRST and CURBUCKET_FINAL must be initialized before
** calling this function!!
*/

static void add_link(bucket, oldindex)
Index       bucket[];
short       oldindex;
{
  short  count;

  /* ASSUME THERE IS NO PROBLEM WITH SAME INDEX NUMBERS  */
  /* FOR A NAME WITHIN A PRODUCT FILE. STARCH SHOULD TAKE */
  /* CARE OF THAT!                                        */

  if (curbucket_first == NOLINK && curbucket_final == NOLINK) {
            curbucket_first = oldindex;
            curbucket_final = oldindex;
  } else {
            if (oldindex < curbucket_first) {
              bucket[curbucket_first].prev = oldindex;
              bucket[oldindex].next = curbucket_first;
              curbucket_first = oldindex;
            } else if (oldindex > curbucket_final) {
              bucket[oldindex].prev = curbucket_final;
              bucket[curbucket_final].next = oldindex;
              curbucket_final = oldindex;
            } else if (oldindex - curbucket_first
                        < curbucket_final - oldindex) {
              count = curbucket_first;
              while (count < oldindex)
```

```
                        count = bucket[count].next;

                if (count > oldindex) {
                        bucket[oldindex].prev = bucket[count].prev;
                        bucket[bucket[count].prev].next = oldindex;
                        bucket[oldindex].next = count;
                        bucket[count].prev = oldindex;
                }
            } else {
                count = curbucket_final;
                while (count > oldindex)
                        count = bucket[count].prev;

                if (count < oldindex) {
                        bucket[oldindex].next = bucket[count].next;
                        bucket[bucket[count].next].prev = oldindex;
                        bucket[oldindex].prev = count;
                        bucket[count].next = oldindex;
                }
            }
    }
}

/* DO NOT PLACE ANY FUNCTIONS AFTER LOG MESSAGE!
$Log:       newname.c,v $
 * Revision 1.4  90/10/02  21:34:52  dan
 * Checks for leading zeroes now in tail-end number of name...
 *
 * Revision 1.2  90/09/04  11:37:00  dan
 * put #ifdef DEBUG's around printf's...
 *
 * Revision 1.1  90/09/01  12:16:03  dan
 * Initial revision
 *
*/
```

| | |
|---|---|
| User: | MICRORENTMind |
| Application: | PrintMonitor |
| Document: | partname.c |
| Date: | Wednesday, November 14, 1990 |
| Time: | 7:37:15 PM |
| Printer: | Peace of Mind |

```
/*
PARTNAME.C
$Lock$
*/

#include <gl/gl.h>
#include <gl/device.h>
#include <stdio.h>
#include <math.h>
#include "prod.h"
#include "globals.h"
#include "soap.h"
#include "group.h"


#define NAMERBOT MTEXTBOT
#define NAMERHEIGHT MTEXTHEIGHT
#define NAMERWIDTH MTEXTWIDTH
#define NAMERTOP (NAMERBOT+NAMERHEIGHT)
#define NAMERLEFT MTEXTLEFT
#define NAMERRIGHT (NAMERLEFT+NAMERWIDTH)

void highlight_gname_selected_text();


short namerrect[4] = {NAMERLEFT,NAMERRIGHT,NAMERBOT,NAMERTOP};

#define MAXDEFAULTS 100
grouping gdefaults[MAXDEFAULTS];
short gdefaultsnum;
short curgname = -1;
/*------------------------------------------*/
#define gnametab 20
#define theight 15


short gname_text_pos(gdefnum)
short gdefnum;
{
```

```
  return NAMERHEIGHT - 5 - gdefnum*theight;
}

short gname_text_bottom()
{
   return gname_text_pos(gdefaultsnum);
}

short gname_at_y(y)
short y;
{
   if(y<gname_text_bottom() || y>NAMERHEIGHT-10) return -1;
   return (NAMERHEIGHT-10-y)/theight;
}

static char tname[80];

void do_gname_text(i)
short i;
{
    sprintf(tname,"%s",gdefaults[i].name);
   charstr(tname);
}

void show_gnames()
{
   short i;

  color(PUP_BLACK);
/*    print_gnames();*/
   for(i=0; i<gdefaultsnum; i++){
             cmov2s(gnametab,gname_text_pos(i)-theight);
             do_gname_text(i);
  }
    highlight_gname_selected_text();
}

/*highflag = TRUE -- black background, white text*/
void highlight_gname_text(gnum,highflag)
```

```
short gnum;
short highflag;
{
  if(gnum == -1) return;

  if(highflag) color(PUP_BLACK);
  else color(PUP_WHITE);

   pmv2s(1,gname_text_pos(gnum)-5);
  rpdr2s(NAMERWIDTH-2,0);
  rpdr2s(0,-(theight-2));
  rpdr2s(-NAMERWIDTH+2,0);
  pclos();

  if(highflag) color(PUP_WHITE);
  else color(PUP_BLACK);

   cmov2s(gnametab,gname_text_pos(gnum)-theight);
   do_gname_text(gnum);
}

void highlight_gname_selected_text()
{
  if(curgname != -1)
            highlight_gname_text(curgname,TRUE);
            display_info_views(&gdefaults[0],curgname);
}


void do_default_select()
{
   short item;

   while(getbutton(LEFTMOUSE)){
            item= gname_at_y(port_mousey());

            if(item != curgname){
               highlight_gname_text(curgname,FALSE);
               curgname = item;
               highlight_gname_text(curgname,TRUE);
```

```
                display_info_views(&gdefaults[0],curgname);
            }
    }
}

/*------------------------------*/

void delete_gdefault(gnum)
short gnum;
{
    int h,n;
    n = sizeof(grouping);

    for(h=gnum;h<gdefaultsnum;h++)
            memcpy(&gdefaults[h],&gdefaults[h+1],n);
    gdefaultsnum--;

    if(gnum == curgname) curgname = -1;
}

/*bad way to do it, but works for now!*/
void make_name_unique(gnum)
short gnum;
{
    int i,h;
    char tname[80];

    for(i=0;TRUE;i++){
            sprintf(tname,"%s.%d",groups[gnum].name,i);
            for(h=0;h<groupcount;h++)
                if(strcmp(tname,groups[h].name) == 0) break;
            if(h == groupcount) break;
    }
      sprintf(groups[gnum].name,"%s.%d",groups[gnum].name,i);
}

/*------------------------------*/

void init_pup_stuff()
```

```
{
    pushmatrix();
    pushviewport();

      /* enable overlay */
    drawmode(PUPDRAW);

    /*set up the viewport*/
    viewport(namerrect[LEFTINDEX],namerrect[RIGHTINDEX],
              namerrect[BOTINDEX],namerrect[TOPINDEX]);

    ortho2(0,namerrect[RIGHTINDEX] - namerrect[LEFTINDEX],
              0,namerrect[TOPINDEX] - namerrect[BOTINDEX]);

    color(PUP_WHITE);
    clear();
    color(PUP_BLACK);
    rects(0,0,
              namerrect[RIGHTINDEX] - namerrect[LEFTINDEX],
              namerrect[TOPINDEX] - namerrect[BOTINDEX]);

    show_gnames();
}

void kill_pup_stuff()
{
    drawmode(PUPDRAW);
    frontbuffer(TRUE);
    color(PUP_CLEAR);
    clear();
    frontbuffer(FALSE);
    popviewport();
    popmatrix();
}

Boolean choose_name()
{
    long oldmode;
    Device dev;
    short c;
```

```
char keyBoardWasQueued;

oldmode = getdrawmode();

 init_pup_stuff();

qdevice(KEYBD);
qdevice(ESCKEY);
/* read till eof ('\n' or '\r') */
while(dev = qread(&c)) {
            switch(dev){
              case LEFTMOUSE:
                        if(c == 0) break;
                        do_default_select();
                        continue;

              case REDRAW:
                        clear_messages();
                        drawmode(oldmode);

                        clear_window();
                        window_draw_both();

                        init_pup_stuff();

                        continue;
              case ESCKEY:
                        goto escape;
              case KEYBD:
                switch(c) {
                          case '\n':
                          case '\r':
                                    goto done;
                          default:
                                    continue;
                        }
              default: continue;
  }
}
```

```
done:
   if(!keyBoardWasQueued) unqdevice(KEYBD);
    kill_pup_stuff();
   drawmode(oldmode);
    info_views_update();
   return TRUE;

escape:
   if(!keyBoardWasQueued) unqdevice(KEYBD);
    kill_pup_stuff();
   drawmode(oldmode);
    info_views_update();
   return FALSE;
}

/*------------------------------*/
/* default groupings file stuff */

void write_default_groupings()
{
   char *fname;
   char fpath[80];
   FILE *namefile;
   short result;

    sprintf(fpath,"%s/gnames",groupingsdir);
   if((namefile=fopen(fpath,"w")) == NULL) {
            show_message("File \"gnames\" could not be opened\n",
                                MAINW/2,MAINH/2,25,20);
            show_message("Make sure the groupings directory is in the right place",
                                MAINW/2,MAINH/2 - 60 ,25,20);
            wait_for_click();
            clear_messages();
            return;
   }
   /* now write the groupings */
   result = fwrite(gdefaults,sizeof(grouping),gdefaultsnum,namefile);

   fclose(namefile);
/*    printf("wrote %d groupings\n",result); fflush(stdout);*/
```

```
}

Boolean read_default_groupings(fname)
char *fname;
{
    char fpath[80];
   FILE *namefile;
    short result;

     sprintf(fpath,"%s/gnames",groupingsdir);
   if((namefile=fopen(fpath,"r")) == NULL) {
              gdefaultsnum = 0;
              return FALSE;
   }

    /*now read in the groupings */
    result = fread(gdefaults,sizeof(grouping),MAXDEFAULTS,namefile);

    fclose(namefile);
/*    printf("read %d groups\n",result); fflush(stdout);*/
   gdefaultsnum = result;
  return TRUE;
}

/*---------------------------*/

void swap_defaults(g1,g2)
grouping  *g1,*g2;
{
    strcpy(g1->name,g2->name);
     memcpy(&g1->r,&g2->r,sizeof(thick)+sizeof(Constraints)+3);
}

void swap_sub_defaults(g1,g2)
grouping  *g1,*g2;
{
     memcpy(&g1->r,&g2->r,sizeof(thick)+sizeof(Constraints)+3);
}
```

```
/*-------------------------*/

/*
$Log:       partname.c,v $
 * Revision 2.2  90/10/24  17:16:18  ethan
 * name info
 *
 * Revision 2.1  90/10/05  10:25:57  dan
 * New Rev
 *
 * Revision 1.7  90/10/01  16:09:43  ethan
 * bug fixes
 *
 * Revision 1.6  90/09/28  12:40:33  ethan
 * *** empty log message ***
 *
 * Revision 1.5  90/09/21  14:54:55  ethan
 * added log
 *
*/
```

| | |
|---|---|
| User: | MICRORENTMind |
| Application: | PrintMonitor |
| Document: | polyedit.c |
| Date: | Wednesday, November 14, 1990 |
| Time: | 7:38:39 PM |
| Printer: | Peace of Mind |

```
/*
** POLYEDIT.C
**
** Copyright 1990, VPL Research
**
$Header: /usr/starch/source/starch/RCS/polyedit.c,v 2.7 90/11/13 14:48:59 ethan Exp $
**
*/

#include <stdio.h>
#include <gl/gl.h>
#include <gl/device.h>
#include "prod.h"
#include "globals.h"
#include "soap.h"
#include "group.h"

void connect_arc();
Boolean poly_planar_p();

short peditrect[] = {SVIEWLEFT, SVIEWRIGHT, SVIEWBOT, SVIEWTOP};

/*------------------------*/

void show_make_poly_mess()
{
    show_message("Click on a line end point to connect to it",
                400,430,25,20);
    show_message("<shift>-click on an arc endpoint to connect to and add the arc",
                400,370,25,20);
    show_message("Use menu functions to add points (you must have at least 3)",
                400,310,25,20);
    show_message("Hit <enter> when the polygon is finished (<Esc> to cancel)",
                400,250,25,20);
}

void make_polygon()
{
    show_make_poly_mess();
```

```
   clear_selectlist();
   update_matis_views();

   if(form_new_poly()) {
              formcntr++;
              atomcntr++;
              upolycntr++;
              clear_messages();
              group_poly();
              update_matis_views();

              changeflag = TRUE;
              return;
   }

   clear_selectlist();
   update_matis_views();
   clear_messages();
}

/*return 0=none, 1=p1, 2=p2*/
short check_endpoint_click(atomnum,subnum,pt)
short atomnum,subnum;
point *pt;
{
   point p1,p2;
   int hits;

              /* redraw product into pick buffer*/
              set_matis_viewport();
              pushmatrix();

              pick(pbuffer,100);
              initnames();

              rotate_to_current();

              /*now draw the 2 endpoints*/
```

```
            loadname(1);
            get_subpart_p1(atomnum,subnum,&p1);
            pnt(p1.x,p1.y,p1.z);
            loadname(2);
            get_subpart_p2(atomnum,subnum,&p2);
            pnt(p2.x,p2.y,p2.z);

            hits = endpick(pbuffer);
            popmatrix();

            if(hits == 0) return 0;

            if (pbuffer[1] == 1){
                copy_point(pt,&p1);
              return 1;
            }
            copy_point(pt,&p2);
            return 2;
}


int get_pick()
{
   int hits;

   /* redraw product into pick buffer*/
    set_matis_viewport();
   pushmatrix();

   pick(pbuffer,PBUFSIZE);
   initnames();

   rotate_to_current();
   show_product();

   hits = endpick(pbuffer);
   popmatrix();

   return hits;
```

```
Boolean form_new_poly()
{
   int hits;
   int index,h;
   short items,atomnum,subnum;
   point pt;
   short val;
   Device dev;
   userpoly *tpoly;
   element *telm;
   shape *tshape;

   tshape = &form[formcntr+1];
   tshape->numatoms = 1;
   tshape->shapeflg = 0xf000;
   tshape->plnattr = 1;
   tshape->partsnum = 1;

   telm = &atom[atomcntr+1];
   telm->parent = formcntr+1;
   telm->elmflg = 10;
   telm->elpntr = upolycntr;

   tpoly = &upoly[upolycntr];
   tpoly->numpoints = 0;

   while(TRUE){
    if(getbutton(RETKEY)){
          if (upoly[upolycntr].numpoints < 3) return FALSE;
          if (poly_planar_p(upolycntr)) return TRUE;
          else {
             clear_messages();
             show_message("You can only create planar polygons!",
                                 400,450,25,20);
             wait_for_click();
             clear_messages();
             upoly[upolycntr].numpoints = 0;
             clear_selectlist();
```

```
            update_matis_views();
            show_make_poly_mess();
            continue;
        }
}
if(qtest()){
        dev=qread(&val);

        switch(dev){
          case ESCKEY:
                    if(val == 0) continue;
                    return FALSE;
          case RIGHTMOUSE:
                    if(val == 0) continue;
                    do_poly_menu();
                    continue;
          case MIDDLEMOUSE:
                    if(val == 0) continue;
                    if(mouseinrect(mviewrect)) do_rotate();
                    continue;
          case LEFTMOUSE:
                    if(val == 0) continue;
                    if(shift_key_p()){connect_arc();continue;}
                    if(mouseinrect(mviewrect)) break;
                    continue;
          case REDRAW:
                    clear_window();
                    window_draw_both();
                    show_make_poly_mess();
                    continue;
          default: continue;
        }

        if((hits = get_pick()) == 0) continue;

        index=0;
        for(h=0; h<hits ; h++){
          items= pbuffer[index++];
          atomnum=pbuffer[index++];          /* get atom # */
          subnum=pbuffer[index++];
```

```
                if(check_endpoint_click(atomnum,subnum,&pt) != 0){
                        add_subpart_to_selectlist(atomcntr+1,tpoly->numpoints);
                        tpoly->arcflg[tpoly->numpoints] = 0;
                        tpoly->arcflg[tpoly->numpoints+1] = 0; /*do closing line*/
                        copy_point(&tpoly->pointlist[tpoly->numpoints++],&pt);
                        update_matis_viewport();swapbuffers();
                        break;
                }
            }
    }
  }
}

void connect_arc()
{
    int hits;
    int index,h,i;
    short items,atomnum,subnum;
    point pt;
    short ptnum;
    userpoly *tpoly;

    tpoly = &upoly[upolycntr];

    if((hits = get_pick()) == 0) return;

    index=0;
    for(h=0; h<hits ; h++){
            items= pbuffer[index++];
            atomnum=pbuffer[index++];          /* get atom # */
            subnum=pbuffer[index++];

/*look for an arc endpoint, add both endpoints to the plist*/
/* and show the arc in the userpoly*/
/*if it is a pattern, need to store subpart info as a hack*/
            if((atom[atomnum].elmflg == ARC ||
              (atom[atomnum].elmflg == PATTERN &&
                        shape_arc_p(atom[atomnum].elpntr,subnum)))
```

```
                && (ptnum = check_endpoint_click(atomnum,subnum,&pt)) != 0)
                {
                        add_subpart_to_selectlist(atomcntr+1,tpoly->numpoints);
                        add_subpart_to_selectlist(atomcntr+1,tpoly->numpoints+1);

                        /*stuff the arc data*/
                        /*here is the hack to store the subnum for a pattern*/
                        if(atom[atomnum].elmflg == PATTERN)
                            tpoly->arcflg[tpoly->numpoints] = 2+16*subnum;
                        else tpoly->arcflg[tpoly->numpoints] = 1;
                        tpoly->arcptr[tpoly->numpoints] = atom[atomnum].elpntr;
                        tpoly->arcflg[tpoly->numpoints+1] = 0; /*do closing line*/

                        copy_point(&tpoly->pointlist[tpoly->numpoints++],&pt);
                        if(ptnum == 1) get_subpart_p2(atomnum,subnum,&pt);
                        else get_subpart_p1(atomnum,subnum,&pt);
                        copy_point(&tpoly->pointlist[tpoly->numpoints++],&pt);

                        update_matis_viewport();swapbuffers();
                        return;
                }
  }
}

Boolean check_delete_group(gnum,upolynum)
short gnum,upolynum;
{
   int i;

   for(i=0;i<groups[gnum].numparts;i++){
           if(atom[groups[gnum].gpart[i].atnum].elmflg == 10 &&
              atom[groups[gnum].gpart[i].atnum].elpntr == upolynum){
              delete_group(gnum);
              return TRUE;
              }
  }
  return FALSE;
}

/*this delete the userpoly primitive, shifts all others down*/
```

```
/* deletes all groupings referencing the primitive*/
/* deletes the atom and shape created for the primitive and shifts others*/
/* shifts appropriate atom references to userpolys down*/
/* then shifts appropriate groupings references to atoms down*/
void delete_upoly(pnum)
{
   int h, i, n;
   short atomnum,formnum;

   clear_selectlist();
   curgroup = -1;

   n = sizeof(userpoly);

   /*kill the poly*/
   for(h=pnum;h<upolycntr;h++)
          memcpy(&upoly[h],&upoly[h+1],n);
   upolycntr--;

   /*delete any groupings containing the poly*/
   for(h=0;h<groupcount;h++){
          if(check_delete_group(h,pnum)) h--;
   }

   /*kill the atom and the shape*/
   for(atomnum=0;atomnum<=atomcntr;atomnum++){
          if(atom[atomnum].elmflg==10 &&atom[atomnum].elpntr==pnum) break;
   }
   formnum = atom[atomnum].parent;
   n=sizeof(element);
   for(h=atomnum;h<=atomcntr;h++){
          memcpy(&atom[h],&atom[h+1],n);
          atom[h].parent--;
   }
   atomcntr--;
   n=sizeof(shape);
   for(h=formnum;h<=formcntr;h++)
          memcpy(&form[h],&form[h+1],n);
   formcntr--;
```

```
 /*shift other atom references to userpolys down*/
 for(h=0;h<=atomcntr;h++){
          if(atom[h].elmflg==10 && atom[h].elpntr>pnum)
             atom[h].elpntr--;
 }

 /*shift other group references to atoms down*/
 for(h=0;h<groupcount;h++){
          for(i=0;i<groups[h].numparts;i++){
             if(groups[h].gpart[i].atnum>atomnum)
                   groups[h].gpart[i].atnum--;
          }
 }

 update_matis_views();
 group_view_update();

}


void process_userpolys()
{
 element *telm;
 shape *tshape;
 int i;

 for(i=0;i<upolycntr;i++){
          formcntr++;
          atomcntr++;
          tshape = &form[formcntr];
          tshape->numatoms = 1;
          tshape->shapeflg = 0xf000;
          tshape->plnattr = 1;
          tshape->partsnum = 1;

          telm = &atom[atomcntr];
          telm->parent = formcntr;
          telm->elmflg = 10;
```

```
            telm->elpntr = i;
  }
}

/*-----------------------------*/

void  get_point_normal(pnt,p1,p2,normal)
point  *pnt,*p1,*p2;
vector *normal;
{
   vector v1,v2;

    stuff_vector(p1,p2,&v1);
    stuff_vector(p1,pnt,&v2);

   /*compute the unit normal*/
/*    normalize_vector(&v1);
   normalize_vector(&v2);
*/
    get_normal(&v1,&v2,normal);
   normalize_vector(normal);
}

/*in order for this to work, p1 and p2 had to be 2 of the points used*/
/*to calculate normal*/
Boolean  point_planar_p(pnt,p1,p2,normal)
point  *pnt,*p1,*p2;
vector *normal;
{
   vector nor;

     get_point_normal(pnt,p1,p2,&nor);

   if(delta_vectoreq_p(&nor,normal,.1)) return TRUE;
   flip_vector(&nor);
   if(delta_vectoreq_p(&nor,normal,.1)) return TRUE;
  return FALSE;
}
```

```
Boolean poly_planar_p(pnum)
short pnum;
{
   int h;
    vector v1,v2,normal;
    point *plist;

   /*2 or 3 point polygons are definitely planar*/
   if(upoly[pnum].numpoints < 4) return TRUE;

    plist = &upoly[pnum].pointlist[0];

   /*use the first 2 points plus a non-linear point to determine the plane*/
   /*first find a non-linear point -- if none, then planar*/
    stuff_vector(&plist[0],&plist[1],&v1);
    for(h=2;h<upoly[pnum].numpoints;h++){
            if(delta_pointeq_p(&plist[0],&plist[h],3) ||
                delta_pointeq_p(&plist[1],&plist[h],3)) continue;
            stuff_vector(&plist[1],&plist[h],&v2);
            if(!vectors_parallel_p(&v1,&v2)) break;
   }
   if(h==upoly[pnum].numpoints) return TRUE;
    get_vector_normal(&v1,&v2,&normal);

    for(h=2;h<upoly[pnum].numpoints;h++){
            if(delta_pointeq_p(&plist[0],&plist[h],3) ||
                delta_pointeq_p(&plist[1],&plist[h],3)) continue;
            stuff_vector(&plist[1],&plist[h],&v2);
            if(vectors_parallel_p(&v1,&v2)) continue;
            if(!point_planar_p(&plist[h],&plist[0],&plist[1],&normal))
              return FALSE;
   }
  return TRUE;
}

/*---------------------------*/

void show_close_rect_err_mess()
{
```

```
    clear_messages();
    clear_messages();
    show_message("You must select exactly 3 non-colinear points",
                        400,450,25,20);
    show_message("to perform this function",
                        400,390,25,20);
    wait_for_click();
    clear_messages();
    show_make_poly_mess();
}

void add_vertex_to_poly(origpt,startpt,endpt)
point *origpt,*startpt,*endpt;
{
    point pt;
    userpoly *tpoly;

    tpoly = &upoly[upolycntr];

    copy_point(&pt,origpt);
    offset_point(&pt,endpt);
    subtract_point(&pt,startpt);

    add_subpart_to_selectlist(atomcntr+1,tpoly->numpoints);
    tpoly->arcflg[tpoly->numpoints] = 0;
    tpoly->arcflg[tpoly->numpoints+1] = 0; /*do closing line*/
    copy_point(&tpoly->pointlist[tpoly->numpoints++],&pt);
}

/*this will actually close any quadrilateral*/
void close_rect()
{
    userpoly *tpoly;
    vector v1,v2,normal;
    point *plist;

    tpoly = &upoly[upolycntr];

    if(tpoly->numpoints != 3) {
            show_close_rect_err_mess();
```

```
            return;
            }

    plist = &tpoly->pointlist[0];

    /*use the first 3 points to determine the plane*/
    /*make sure the third point if not colinear*/
     stuff_vector(&plist[0],&plist[1],&v1);
     stuff_vector(&plist[1],&plist[2],&v2);
     if(delta_pointeq_p(&plist[0],&plist[2],3) ||
            delta_pointeq_p(&plist[1],&plist[2],3) ||
            vectors_parallel_p(&v1,&v2)) {show_close_rect_err_mess(); return;}

    /*now just add v2 to the first point to get the new vertex*/
     add_vertex_to_poly(&plist[0],&plist[1],&plist[2]);

    update_matis_viewport();swapbuffers();
}


void show_extend_rect_err_mess()
{
   clear_messages();
   clear_messages();
   show_message("You must select exactly 2 points",
                        400,450,25,20);
   show_message("to perform this function",
                        400,390,25,20);
   wait_for_click();
   clear_messages();
   show_make_poly_mess();
}

void extend_to_rect()
{
   userpoly *tpoly;
   vector v1,v2,normal;
   point *plist;
   point p1,p2;
```

```
short atomnum,subnum;

tpoly = &upoly[upolycntr];
plist = &tpoly->pointlist[0];

if(tpoly->numpoints != 2) {
        show_extend_rect_err_mess();
        return;
        }

clear_messages();
show_message("Pick a line or arc to offset points by (<Esc> to cancel)",
                430,430,25,20);

if(!get_line_or_arc(&atomnum,&subnum)){
        clear_messages();
        show_make_poly_mess();
        return;
}
get_subpart_p1(atomnum,subnum,&p1);
get_subpart_p2(atomnum,subnum,&p2);

/*figure out the direction of the vector by which end is closest*/
if(distance(&p1,&plist[0]) < distance(&p2,&plist[0])){
        add_vertex_to_poly(&plist[1],&p1,&p2);
        add_vertex_to_poly(&plist[0],&p1,&p2);
}
else{
        add_vertex_to_poly(&plist[1],&p2,&p1);
        add_vertex_to_poly(&plist[0],&p2,&p1);
}

update_matis_viewport();swapbuffers();
clear_messages();
show_make_poly_mess();
}


/*-----------------------------*/
```

```
/*
$Log:     polyedit.c,v $
 * Revision 2.7  90/11/13  14:48:59  ethan
 * accepts but doesn't group concave polys
 *
 * Revision 2.6  90/11/06  22:50:38  ethan
 * bug fix to arcs
 *
 * Revision 2.5  90/10/30  20:12:34  ethan
 * checks for concave polygons
 *
 * Revision 2.4  90/10/23  21:43:09  ethan
 * patarcs in userpolys
 *
 * Revision 2.3  90/10/23  15:29:31  ethan
 * changeflag
 *
 * Revision 2.2  90/10/12  19:08:18  ethan
 * drawer additions
 *
 * Revision 2.1  90/10/05  10:29:35  dan
 * New Rev
 *
 * Revision 1.4  90/10/01  16:09:54  ethan
 * bug fixes
 *
 * Revision 1.3  90/09/28  12:40:44  ethan
 * fixes
 *
 * Revision 1.2  90/09/25  13:06:28  ethan
 * fixed parallel condition
 *
 * Revision 1.1  90/09/21  14:56:02  ethan
 * Initial revision
 *
*/
```

| | |
|---|---|
| User: | MICRORENTMind |
| Application: | PrintMonitor |
| Document: | readmain.c |
| Date: | Wednesday, November 14, 1990 |
| Time: | 7:40:47 PM |
| Printer: | Peace of Mind |

```
/*
** READMAIN.C
**
** Copyright 1990, VPL Research
**
$Header: /usr/starch/source/starch/RCS/readmain.c,v 2.10 90/10/26 14:57:58 ethan Exp $
**
*/

#include <stdio.h>
#include <gl/gl.h>
#include <gl/device.h>
#include <ctype.h>
#include <string.h>
#include "prod.h"
#include "globals.h"
#include "soap.h"
#include "soapxtrn.h"

/* in CONVERT.C */
extern short soap_first;

/* in SOAPPROD.C */
extern short do_soap_event();
short sviewrect[] = {SVIEWLEFT, SVIEWRIGHT, SVIEWBOT, SVIEWTOP};

/* in GRAPHPROD.C */
extern void do_rotate();

/* in GROUP.C */
extern Boolean          read_groupings();
extern short curgroup;

/* in GRAPHUTIL.C */
extern Boolean mouseinrect();

void do_events();
int  load_product();
void do_scroll();
```

```
void do_select();
void do_matis_select();
void do_matis_text_select();
void do_matis_text_menu_select();
void do_group_hierarchy();
void do_group_select();
void do_group_scroll();

void unselect_current_group();

void save_prefs();
Boolean try_prefs();

void open_product_file();
void close_product_file();

void flag_quit();
Boolean quit();


char matisdir[80] = "./matis";
char groupingsdir[80] = "./groupings";
char swiveldir[80] = "./swivel";

/*------*/

/* THESE ARE ACCESSED BY COLOR.C */
short       matis_groupnum = -1;
Boolean quitflag=FALSE;

short changeflag=FALSE;

short pbuffer[PBUFSIZE];

int curprodnum;


static FILE    *prodfile,*prodlist;
static char   productfilename[80],use_prodlist = 0;
```

```
/*--------*/

void main(argc,argv)
int argc;
char *argv[];
{
char        command[80];
int         i;
char   *c;

   init_window();
   init_menus();
   init_constraint_rects();

   qdevice(MIDDLEMOUSE);
   qdevice(LEFTMOUSE);
   qdevice(RIGHTMOUSE);
   qdevice(LEFTARROWKEY);
   qdevice(RIGHTARROWKEY);
   qdevice(UPARROWKEY);
   qdevice(DOWNARROWKEY);
   qdevice(WINSHUT);
   qdevice(WINQUIT);
   qdevice(ESCKEY);
   qdevice(GKEY);
   qdevice(CKEY);
   qdevice(WKEY);
   qdevice(TKEY);
   qdevice(F1KEY);
   qdevice(F2KEY);
   qdevice(F3KEY);
   qdevice(F4KEY);
   qdevice(F5KEY);
   qdevice(F6KEY);
```

```
initialize_object_array();
initialize_element_arrays();

try_prefs();
read_default_groupings();
open_product_file();

curprodnum = 0;
if (argc == 1)
        load_product(0, "", 1);
else {
        /* use alpha name or file containing names of products */
        for (c = argv[1]; *c != NULL; c++) {
          if (isalpha (*c)) {
                if ((prodlist = fopen (argv[1],"r")) == NULL) {
                  load_product (0, argv[1], 1);
                  break;
                }
                else {
                  getnextprod(0,1);
                  use_prodlist = 1;
                  break;
                }
          }
        }
        if (*c == NULL)
          load_product(atoi(argv[1]),"", 1);
}
close_product_file();

for(i=0;i<PBUFSIZE;i++) pbuffer[i]=0;          /* init hit buffer */

do_events();          /* returns to quit */
}

/*----------------------------*/
void open_product_file()
{
 while(1){
```

```
  sprintf(productfilename,"%s/fmpatern",matisdir);

  if ((prodfile = fopen (productfilename,"r")) == NULL) {
            show_message("File \"fmpatern\" could not be opened\n",
                                    MAINW/2,MAINH/2,25,20);
            show_message("Please enter the correct path to the Matis directory",
                                    MAINW/2,MAINH/2 - 60 ,25,20);
            wait_for_click();
            clear_messages();
            if (!get_matis_dir())
              quit();
  }
  else return;
 }
}

void close_product_file()
{
  fclose(prodfile);
}

/* prefs file stuff */

void save_prefs()
{
  FILE *prefsfile;

  if((prefsfile=fopen("starch.prefs","w")) == NULL) {
            show_message("The prefs file could not be saved!",
                                    MAINW/2,MAINH/2 - 60 ,25,20);
            wait_for_click();
            clear_messages();
            return;
  }
  /* write out the current paths */
   fprintf(prefsfile,"%s\n",matisdir);
   fprintf(prefsfile,"%s\n",groupingsdir);
   fprintf(prefsfile,"%s\n",swiveldir);

  fclose(prefsfile);
```

```
}

Boolean try_prefs()
{
  FILE *prefsfile;

  if((prefsfile=fopen("starch.prefs","r")) == NULL) {
            return FALSE;
  }

  /* read in the default paths */
   fscanf(prefsfile,"%s",matisdir);
   fscanf(prefsfile,"%s",groupingsdir);
   fscanf(prefsfile,"%s",swiveldir);

   fclose(prefsfile);
  return TRUE;
}

/*--------------------*/

void flag_quit()
{
  quitflag = TRUE;
}

Boolean quit()
{
  if(!save_changes()) {quitflag = FALSE; return FALSE;}
   save_prefs();
   clear_messages();
   exit(0);
}

Boolean shift_key_p()
{
  if(getbutton(LEFTSHIFTKEY) || getbutton(RIGHTSHIFTKEY)) return TRUE;
  return FALSE;
}
```

```
Boolean ctrl_key_p()
{
  if(getbutton(LEFTCTRLKEY) || getbutton(RIGHTCTRLKEY)) return TRUE;
  return FALSE;
}

void do_events()
{
  short    val;
  Device   dev;

  qreset();

  while(1){
          if(quitflag){
            quit();
          }
          dev=qread(&val);
          if (mouseinrect(sviewrect)) {
             if (do_soap_event(dev, val))
                     continue;
          }

          switch(dev){
            case MIDDLEMOUSE:
                     if(val == 0) break;
                     if(mouseinrect(mviewrect)) do_rotate();
                     else if(mouseinrect(mtextrect)) do_scroll();
                     else if(mouseinrect(mgrouprect)) do_group_scroll();
                     break;
            case LEFTMOUSE:
                     if(val == 0) break;
                     do_select();
                     break;
            case RIGHTMOUSE:
                     if(val == 0) break;
                     if(shift_key_p()) do_main_menu();
                     else if(mouseinrect(mtextrect)){
                        short y;
                         set_matis_text_viewport();
```

```
y= port_mousey();

if(text_bottom()>y){
        do_group_menu();
        break;
}
else do_matis_text_menu_select();
}
else if(mouseinrect(mviewrect) || mouseinrect(mgrouprect))
  do_group_menu();
else do_main_menu();
break;

case LEFTARROWKEY:
case RIGHTARROWKEY:
case UPARROWKEY:
case DOWNARROWKEY:
        if(val == 0) break;
  do_group_hierarchy(dev);
  break;

case GKEY:
        if(val == 0) break;
        if(ctrl_key_p()) group_poly();
        break;
case CKEY:
        if(val == 0) break;
        if(ctrl_key_p()) convert_to_soap();
        break;
case WKEY:
        if(val == 0) break;
        if(ctrl_key_p()) group_wireframe();
        break;
case TKEY:
        if(val == 0) break;
        if(ctrl_key_p()) turn_on_thickness();
        break;

case F1KEY:
```

```
    if (use_prodlist && val != 0 && save_changes()) {
            open_product_file();
            getnextprod(0,1);
            close_product_file();
        }
        break;

case F2KEY:
    if (use_prodlist && val != 0 && save_changes()) {
            open_product_file();
            getnextprod(1,1);
        }
        break;

case F3KEY:
    if (use_prodlist && val != 0 && save_changes()) {
            open_product_file();
            getnextprod(0,0);
            close_product_file();
        }
        break;

case F4KEY:
    if (use_prodlist && val != 0 && save_changes()) {
            open_product_file();
            getnextprod(1,0);
        }
        break;

case F5KEY:
        if(val == 0) break;
        if(save_changes()){
            open_product_file();

            load_product(curprodnum+1, "" ,1);
            close_product_file();
            break;
        }
case F6KEY:
```

```
                    if(val == 0) break;
                    if(save_changes()){
                       open_product_file();

                       load_product(curprodnum-1, "", 1);
                       close_product_file();
                      break;
                    }
          case REDRAW:
                    clear_window();
                    window_draw_both();
                    break;
          case WINSHUT:
          case WINQUIT:
                    quit();
                    break;
          }
  }
}


int load_product(num,name,convrtflg)
int num;
char *name;
int convrtflg;
{
   int          tempnum,oldnum;
   char errmsg[100];

/*   printf("\nPRODUCT NUMBER: %d\n",num);*/

   oldnum = curprodnum;

   clear_selectlist();
   clear_groups();
   tempnum = read_product(num,prodfile,name);
   if(tempnum == -1){
             *errmsg = '\0';

             if (*name == '\0')
```

```
            sprintf (errmsg,"%s%d","**Error: Couldn't find product #",num);
        else
            sprintf (errmsg,"%s%s","**Error: Couldn't find product: ",name);

        show_message(errmsg,MAINW/2,MAINH/2,25,20);
        wait_for_click();
        clear_messages();
        return (-1);
}
curprodnum = tempnum;

 init_persp();            /* DO THESE BEFORE CONVERSION! DDB Fix. */

 if(!product_valid_p()){
        sprintf(errmsg,"Bad data in product# %d",curprodnum);
        show_message(errmsg,MAINW/2,MAINH/2,25,20);
        show_message("Try loading a different product",
                                MAINW/2,MAINH/2 - 60 ,25,20);
        wait_for_click();
        clear_messages();
        load_product(oldnum,"", convrtflg);
        return;
}

 init_soap_persp();
matis_groupnum = -1;

 pattrn_subname_init();

 if(!read_groupings(product.pname)){
        if (!soap_first) {
            if (soap_object[0].root != PARTNULL)
                    delete_part(soap_object[0].root, 0);
        }
/*      printf("Couldn't find a groupings file to load.\n");fflush(stdout);*/
} else {
        /* convert what exists for soap view */
        if (convrtflg)
            convert_to_soap();
```

```
            else {
              if (soap_object[0].root != PARTNULL)
                        delete_part(soap_object[0].root, 0);
            }
  }

  set_new_groupname();

  window_draw_both();

  changeflag = FALSE;

  return(0);
}

/* use given file as list of product to be found */

int getnextprod(backward,convrtflg)
int backward;
int convrtflg;
{
  char prodnamestr[100];
  char *c;


  if (backward) {
            fseek (prodlist, -56L, 1);
  }

  c = NULL;
  while (c == NULL) {
            if ((c = fgets(prodnamestr, 100, prodlist)) == NULL) {
              if (backward)
                        fseek (prodlist, -28L, 2);
              else
                        fseek (prodlist, 0L, 0);
            }
  }

  c = strchr (prodnamestr,'\n');
```

```
    *c = '\0';

    for (c = (prodnamestr + 7); *c == ' '; c++);

    load_product (0, c, convrtflg);

}

void do_scroll()
{
    long starty;
    short yoffset = 0;

    starty = getvaluator(MOUSEY);

/*   window_draw();*/

    while(getbutton(MIDDLEMOUSE)){
               yoffset = scroll_to_mouse(starty);
   }
     offset_mtext_scrollpos(yoffset);

    matis_text_view_update();
   swapbuffers();
    matis_text_view_update();
}


void do_group_scroll()
{
    long starty;
    short yoffset = 0;

    starty = getvaluator(MOUSEY);

/*   window_draw();*/

    while(getbutton(MIDDLEMOUSE)){
               yoffset = group_scroll_to_mouse(starty);
```

```
  }
   offset_group_scrollpos(yoffset);

  group_view_update();                en
}

/*------------------------------*/
void do_select()
{
  if(mouseinrect(mviewrect))
            do_matis_select();
  else if (mouseinrect(mtextrect))
            do_matis_text_select();
  else if (mouseinrect(mgrouprect))
            do_group_select();
  else if (mouseinrect(mcolorrect))
            do_color_edit();
  else if (mouseinrect(mthickrect))
            do_thickness_edit();
  else if (mouseinrect(mconstraintrect))
            do_constraint_edit();
  else unselect_current_group();
}

void do_matis_select()
{
  int hits;
  int index,h,i;
  short items,item,subnum;
  Boolean shiftkeyp,ctrlkeyp;

  shiftkeyp = shift_key_p();
  ctrlkeyp = ctrl_key_p();

  hits = get_pick();

  index=0;
/*printf("hit count: %d  hits: ",hits);*/
  for(h=0; h<hits ; h++){
            items= pbuffer[index++];/* get count (should always be 2 */
```

```
                if(items != 2){
                    printf("error: hit depth != 2");
                    exit(-1);
                }
        item=pbuffer[index++];              /* get atom # */
        subnum=pbuffer[index++];
/*printf("(%d, %d) ",item,subnum);*/
                if(shiftkeyp){
                    if(ctrlkeyp) unselect_subpart(item,subnum);
                    else select_subpart(item,subnum);
                }
                else{
                    if(ctrlkeyp) unselect_atom(item);
                    else select_atom(item);
                }
  }
/*printf("\n"); fflush(stdout);*/
   matis_text_view_update();
   update_matis_viewport();

   swapbuffers();

   matis_text_view_update();
   update_matis_viewport();
/*    highlight_selected_text();*/
/*   if(hits == 0) return;*/
/*    print_selectlist();*/
}


void do_matis_text_select()
{
   short item;

   set_matis_text_viewport();
   item= item_at_y(port_mousey());

   if(atom_in_selectlist(item)){
             while(getbutton(LEFTMOUSE)){
```

```
                set_matis_text_viewport();
                item= item_at_y(port_mousey());

                if(atom_in_selectlist(item)){
                        unselect_atom(item);
                        matis_text_view_update();
                        update_matis_viewport();
                        swapbuffers();
                        matis_text_view_update();
                        update_matis_viewport();
                }
            }
    }
    else{
            while(getbutton(LEFTMOUSE)){
                set_matis_text_viewport();
                item= item_at_y(port_mousey());

                if(!atom_in_selectlist(item)){
                        select_atom(item);
                        matis_text_view_update();
                        update_matis_viewport();
                        swapbuffers();
                        matis_text_view_update();
                        update_matis_viewport();
                }
            }
    }
}

char tempstr[80];

void do_matis_text_menu_select()
{
    short atomnum;
    long tempmenu;
    short numsubp,i,pos;
    short subpart;

    set_matis_text_viewport();
```

```
 atomnum= item_at_y(port_mousey());

 numsubp = atom_subparts(atomnum);
 if(atom[atomnum].elmflg== 4 || atom[atomnum].elmflg == 5) return;
/*  if (numsubp < 2) return;*/
 tempmenu = newpup();
  get_atom_text(atom[atomnum],tempstr);
 strcat(tempstr," %t");
 addtopup(tempmenu,tempstr);
 for(i=0;i<numsubp;i++){
          if(subpart_in_selectlist(atomnum,i)){
            switch(atom[atomnum].elmflg){
                    case 6:
                    case 10: sprintf(tempstr,"** subpart #%d",i);
                              break;
                    case 9: sprintf(tempstr,"** knob #%d",i);
                              break;
                    default: sprintf(tempstr,"** line #%d",i);
                              break;
            }
          }
          else {
            switch(atom[atomnum].elmflg){
                    case 6:
                    case 10: sprintf(tempstr,"  subpart #%d",i);
                              break;
                    case 9: sprintf(tempstr,"  knob #%d",i);
                              break;
                    default: sprintf(tempstr,"  line #%d",i);
                              break;
            }
          }
          addtopup(tempmenu,tempstr);
}
subpart = ((short) dopup(tempmenu)) - 1;
if(subpart == -2) return;
 if(subpart_in_selectlist(atomnum,subpart)){
          unselect_subpart(atomnum,subpart);
}
```

```
    else {
            select_subpart(atomnum,subpart);
    }
    matis_text_view_update();
    update_matis_viewport();

    swapbuffers();

    matis_text_view_update();
    update_matis_viewport();
}

/*-------------------------*/
void unselect_current_group()
{
    clear_selectlist();
    matis_groupnum = curgroup = -1;
    window_draw_both();
}

void do_group_select()
{
    short val;
    Device dev;

    /* clear selected if click on nothing even if no current group */
    set_group_viewport();
    matis_groupnum = groupnum_at_y(port_mousey());

    if(matis_groupnum == -1){

        clear_selectlist();    /* clear prims even if no group selected */

            matis_text_view_update();
            update_matis_viewport();
            update_soap_viewport();
            swapbuffers();
            matis_text_view_update();
            update_matis_viewport();
```

```
            update_soap_viewport();
    }

    do{
            /*allow auto thickening*/
            while(qtest()){
              dev=qread(&val);
              if(dev == TKEY){
                        if(val == 0) continue;
                        if(ctrl_key_p()) turn_on_thickness();
              }
            }
            /*reuse first group in case it was real but mouse was released*/
       if(select_group(matis_groupnum)){
               clear_selectlist();
               select_group_parts(curgroup);

               matis_text_view_update();
               update_matis_viewport();
               update_soap_viewport();
              swapbuffers();
               matis_text_view_update();
               update_matis_viewport();
               update_soap_viewport();
            }
            if (getbutton(LEFTMOUSE)) {  /* otherwise global set to -1! */
               set_group_viewport();
               matis_groupnum = groupnum_at_y(port_mousey());
            }
    } while(getbutton(LEFTMOUSE));
}

void do_group_hierarchy(dev)
Device dev;
{
    short gnum;

    if(!mouseinrect(mgrouprect)) return;
    if(curgroup == -1) return;
```

```
switch(dev){
        case RIGHTARROWKEY:
            increase_level(curgroup);
            changeflag = TRUE;
            break;
        case LEFTARROWKEY:
            decrease_level(curgroup);
            changeflag = TRUE;
            break;
        case UPARROWKEY:
            decrease_line(curgroup);
            changeflag = TRUE;
            break;
        case DOWNARROWKEY:
            increase_line(curgroup);
            changeflag = TRUE;
            break;
  }
/*
   update_constraint_pos();
   constraint_view_update();
*/
}

/* DO NOT PLACE ANY FUNCTIONS AFTER RCS LOG!
$Log:     readmain.c,v $
 * Revision 2.10  90/10/26  14:57:58  ethan
 * f5, f6
 *
 * Revision 2.9  90/10/24  17:15:54  ethan
 * ctrl-t
 *
 * Revision 2.8  90/10/23  15:29:21  ethan
 * changeflag
 *
 * Revision 2.7  90/10/22  15:21:10  mike
 * readmain can now move back and forth through output
 * of wringer.  f1 = forward f2 = back f3 = forward
```

```
* with no convert and f4 = back with no convert
*
* Revision 2.6  90/10/19  18:36:07  mike
* readmain can now use the output of wringer to
* sequentially select products that are included in
* a plan.
*
* Revision 2.5  90/10/19  16:36:15  ethan
* wireframe ctrl key
*
* Revision 2.4  90/10/16  18:25:22  ethan
* ctrl key bug fix
*
* Revision 2.3  90/10/15  17:45:51  ethan
* scrollable groups
*
* Revision 2.2  90/10/12  19:07:56  ethan
* *** empty log message ***
*
* Revision 2.1  90/10/05  10:30:00  dan
* New Rev
*
* Revision 1.24  90/09/30  15:38:45  ethan
* *** empty log message ***
*
* Revision 1.23  90/09/25  15:48:31  dan
* Reset matis_groupnum when reading in a new product.
* !!!!!!!!!!!!!!!!!!!!!!!!!!!!!!!!!!!!!!!!!!!!!!!!!!!!!!!
*
* Revision 1.22  90/09/25  14:09:45  dan
* Updates soap viewport during group selection now!
*
* Revision 1.21  90/09/25  13:06:15  ethan
* *** empty log message ***
*
* Revision 1.20  90/09/21  14:49:09  ethan
* handles user polys
*
* Revision 1.19  90/09/12  19:39:51  ethan
* error messages
```

```
*
* Revision 1.18  90/09/10  15:43:41  mike
* addition of clear_message for product not found errors
*
* Revision 1.12  90/09/07  19:18:37  mike
* event queue changed to quit for winshut and
* winquit
*
* also exit(0) added to quit()
*
* Revision 1.11  90/09/04  15:37:50  mike
* function variables for "subpart_in_selectlist" were
* changed to reflect changes to the function.
*
* Revision 1.10  90/09/04  15:27:07  ethan
* *** empty log message ***
*
* Revision 1.9  90/08/30  13:02:58  ethan
* *** empty log message ***
*
* Revision 1.8  90/08/28  11:38:09  dan
* Fixed ORTHO BAD WINDOW BUG
*
* Revision 1.7  90/08/28  11:07:20  dan
* Added a global for COLOR.C's use. Also a bug fix.
*
* Revision 1.6  90/08/27  20:37:27  ethan
* *** empty log message ***
*
* Revision 1.5  90/08/22  12:36:08  dan
* Added deletion call (and check) for soap database
* when reading in a new product.
*
* Revision 1.4  90/08/21  19:01:05  ethan
* *** empty log message ***
*
* Revision 1.2  90/08/18  20:15:57  dan
* general clean-up
*
```

```
 * Revision 1.1  90/08/17  18:20:55  dan
 * Initial revision
 *
 */
```

| | |
|---|---|
| User: | MICRORENTMind |
| Application: | PrintMonitor |
| Document: | snapfilm.c |
| Date: | Wednesday, November 14, 1990 |
| Time: | 7:44:10 PM |
| Printer: | Peace of Mind |

```
/*
** SNAPFILM.C
**
** Lowest level memory management for SOAP database for SNAPPY
** functions only!
** The applications programmer shouldn't be calling these directly!
**
** Copyright 1990, by VPL Technologies.
**
$Header: /usr/starch/source/starch/RCS/snapfilm.c,v 2.1 90/10/05 10:30:03 dan Exp $
**
*/

#include <stdio.h>
#include <malloc.h>
#include "soap.h"


/* from SOAPQRY.C */
extern short get_edgelist_element_count();
extern short get_polylist_length();
extern short get_childlist_count();

void            sever_part_from_parent_snappy();
void            delete_poly_status_snappy();

/* STATIC FUNCTIONS */
static void     delete_polylist_down_snappy();


/*------------------------------------------------------------*/
/*
** (SUBSET OF delete_polylist_down_snappy.)
*/
void delete_poly_status_snappy(edgelist_pointer)
Edgelist    *edgelist_pointer;
{
  short     offset;
```

```
  offset = 0;

  while (*edgelist_pointer != ELEMNULL) {
    if (offset == LIST_SIZE - 1) {
                edgelist_pointer = (Edgelist *)*edgelist_pointer;
               offset = 0;
               continue;
    }
     (*edgelist_pointer)->status = PENDING;
     ++edgelist_pointer;
    ++offset;
  }
}

/*---------------------------------------------------------------*/
/*
** We get here for a terminal part only!
*/

void sever_part_from_parent_snappy(part)
Part          *part;
{

  /* This also sets elements to PENDING                    */
  if (part->poly_top != POLYNULL) {
            delete_polylist_down_snappy(part);
  }

  /* at this point, everything's PENDING                   */
  part->status |= NOTVALID;
}


/*---------------------------------------------------------------*/
/*
**
*/
static void delete_polylist_down_snappy(part)
Part          *part;
```

```
{
  Edgelist  *edgelist_pointer;
  Polylist  *polyptr;
  short     offset, off1;

  polyptr = part->poly_top;
  off1 = 0;

  while (*polyptr != EDGENULL) {
          if (off1 == LIST_SIZE - 1) {
             polyptr = (Polylist *)*polyptr;
             off1 = 0;
             continue;
          }

          /* set all elements in edgelist to PENDING */
          edgelist_pointer = *polyptr;
          offset = 0;

          while (*edgelist_pointer != ELEMNULL) {
            if (offset == LIST_SIZE - 1) {
                    edgelist_pointer = (Edgelist *)*edgelist_pointer;
                    offset = 0;
                    continue;
            }
            (*edgelist_pointer)->status &= ZEROMEMMASK;
            (*edgelist_pointer)->status |= PENDING;
            ++edgelist_pointer;
            ++offset;
          }

          ++polyptr;
          ++off1;
  } /* for all polygons */
}


/* DO NOT PLACE ANY FUNCTIONS AFTER RCS LOG!
$Log:      snapfilm.c,v  $
 * Revision 2.1  90/10/05  10:30:03  dan
```

```
* New Rev
*
* Revision 1.3  90/09/25  14:16:44  dan
* Added #defines for MASKS
*
* Revision 1.2  90/08/30  13:40:38  dan
* Added logical "and" check to part status flag
*
* Revision 1.1  90/08/17  18:21:51  dan
* Initial revision
*
*/
```

| | |
|---|---|
| User: | MICRORENTMind |
| Application: | PrintMonitor |
| Document: | soap.h |
| Date: | Wednesday, November 14, 1990 |
| Time: | 7:44:58 PM |
| Printer: | Peace of Mind |

```
/*
** SOAP.H
**
** Soap database and memory management header file
**
** Copyright 1990 by VPL Research
**
$Header: /usr/starch/source/starch/RCS/soap.h,v 2.2 90/10/17 14:03:24 dan Exp $
**
*/

#define SLAM                fflush(stdout)

#define EPSILON             2.0        /* 1.0e-10 (in your dreams) */
#define MAX_EPS_RANGE       20

#ifndef TRUE
#define TRUE                1
#endif

#ifndef FALSE
#define FALSE               0
#endif

#define YES                 1
#define NO          0

#define OK                  1

/* These are for element status flags. High byte. */
#define UNUSED              0x0000
#define PENDING             0x0100
#define ACTIVE              0x0200

/* Element status flag: low byte                        */
/* We have fifteen slots (1 - 15) available for basic   */
/* geometry types...                                              */
#define SOAP_POINT  0x0001
#define SOAP_LINE 0x0002
```

```
#define SOAP_ARC        0x0003
#define SOAP_CYLINDER           0x0004

/* This flag is or'd to LINE and ARC types          */
/* if they define the edges of a swept surface.     */
/* (4 bits available...)                            */
#define SOAP_SWEEP      0x0010
#define SOAP_CONNECT            0x0020
#define SOAP_ENDCAP     0x0030
#define SOAP_ROTSWEEP           0x0040

/* NOTE!!! Lower two bits of MSNibble reserved      */
/* for point flagging in edge ordering routine!!  */
/* Also for swap flagging for loop check...         */
#define EDGESWAP        0x1000

/* The maximum number of line segments to be connected */
#define MAX_CONNECT40

/* These are for part status flags. */
#define VALID                   0x0001
#define NOTVALID        0x0000
#define REVERSE                 0x0100

/* THESE ARE THE MASKS USED TO ACCESS THE STATUS WORDS          */
/* Element status */
#define    MEMMASK              0x0F00
#define GEOMASK                 0x00F0
#define ELEMMASK        0x000F
#define CYLMASK                 0x00FF
#define NOGEOMASK       0x00FF
#define ZEROGEOMASK 0xFF0F
#define P1MASK                  0x1000
#define P2MASK                  0x2000
#define MATCHMASK       0x3000
#define SWAPMASK        0x1000
#define ZEROSWAPMASK            0x0FFF
#define ZEROMATCHMASK           0x0FFF
#define ZEROMEMMASK             0x00FF
```

```
#define MEMELEMMASK            0x0F0F

/* Lock Byte */
#define LOCKXMASK   0x20
#define LOCKYMASK   0x10
#define LOCKZMASK   0x08
#define LOCKYAWMASK            0x04
#define LOCKPITCHMASK          0x02
#define LOCKROLLMASK           0x01

/* Part Status */
#define REVMASK                0xFF00
#define VALIDMASK   0x00FF


#define     LIST_SIZE  10

#define BADINDEX    -1

#define NULLPTR                (char *)0

#define MAX_POINT   3000
#define MAX_LINE    1000
#define     MAX_ARC            500
#define     MAX_CYLINDER       200
#define MAX_OBJECT  2

/*
** TYPEDEFS!
*/

/*
** An Edgelist is made up of Element pointers.
*/

typedef struct {
  short      status;  /* high byte: element identifier    */
                                  /* low byte: valid/not valid flag   */
  char       *owner;  /* The owner of this element.       */
                                  /* This must be cast as a Part ptr! */
```

```
} Element;

typedef Element          *Edgelist;
typedef Edgelist   *Polylist;

typedef struct {
   double       xpos, xmin, xmax;
   double       ypos, ymin, ymax;
   double       zpos, zmin, zmax;

   double       yaw_attitude, yaw_min, yaw_max;
   double       pitch_attitude, pitch_min, pitch_max;
   double       roll_attitude, roll_min, roll_max;

   /* The lock byte is arranged as follows:          */
   /* msb                                         lsb*/
   /* xx | xx | x | y | z | yaw | pitch | roll */
   /* bit = 0 means unlocked, bit = 1 is locked*/
   unsigned char   lock;
} Constraints;

/*
** PARTS ARE ALLOCATED ON THE HEAP
*/
/* Floating point Point */
typedef struct {
   double   x, y, z;
} FPoint;

typedef struct part_el {
   short          status;   /* valid = 1, not valid = 0 */
   struct part_el  *parent; /* parent part, NULLPTR if  */
                                            /* part is root of node tree*/
   char          nodename[20];
   struct part_el  **child_top;/* points to top of list.   */
                                            /* NULLPTR if no children.  */
   Polylist      *poly_top;          /* polygons part is made of */
   Constraints              constraint;          /* This part's constraints. */
```

```
  FPoint      absorigin;          /* Absolute origin value... */
  FPoint      relorigin; /* Relative origin value... */
  FPoint      orgoffset; /* distance betwn rel & rot */
  unsigned char  r, g, b, a;      /* This part's color!      */
  short       stepsize;  /* The angular increment   */
} Part;

/* struct part_el **child_top is the same as Childlist *child_top   */
typedef Part    *Childlist;

#define ELEMNULL      (Element *)0
#define EDGENULL      (Edgelist *)0
#define POLYNULL      (Polylist *)0
#define CHILDNULL     (Childlist *)0
#define PARTNULL      (Part *)0

/*
** OBJECTS ARE DEFINED AS DATA
*/

typedef struct {
  char        object_name[20];    /* as from MATIS file      */
  Part        *root;              /* root node of tree       */
} Soap_Object;

/*
** GEOMETRY STRUCTURES DEFINED AS DATA
*/

/* Integer Point */
typedef struct {
  short       x, y, z;
} IPoint;


/* SPoint is used to add points to the SOAP edgelist...      */
/* So far, only used for SWEEPS...                           */

typedef struct {
  short  status;
```

```
  Part   *owner;
  double  x, y, z;
} Soap_Point;

typedef struct {
  short        status;    /* high byte: element identifier    */
                                                    /* low byte: valid/not valid flag   */
  Part         *owner;  /* The owner of this line.            */
  FPoint       p1, p2;   /* start and end, world coords.       */
  IPoint       ps1, ps2; /* start and end, screen coords.  */
} Soap_Line;

typedef struct {
  short        status;    /* as above */
  Part         *owner;  /* as above */
  FPoint       center_world;  /* arc center, world   */
  IPoint       center_screen; /* arc center, screen   */
  FPoint       p1, p2;    /* start and end, world coords          */
  IPoint       ps1, ps2; /* start and end, screen coords          */
  short        radius, start_angle, offset_angle,
                         direction, rot1, rot2;
  short        stepsize;  /* for meshes */
} Soap_Arc;

typedef struct {
  short        status;    /* as above */
  Part         *owner;  /* as above */
  FPoint       center_world;  /* cap center (base) */
  IPoint       center_screen;  /* screen coords       */
  short        radius, length, direction;
  short        stepsize;
} Soap_Cylinder;

#define LINENULL        (Soap_Line *)0
#define ARCNULL                       (Soap_Arc *)0
#define CYLINDERNULL(Soap_Cylinder *)0

#define        SCALEVAL   0.1            /* mm to cm */
```

```
/* DO NOT PUT ANYTHING AFTER RCS LOG!
$Log:    soap.h,v $
 * Revision 2.2  90/10/17  14:03:24  dan
 * Added SWAP masks
 *
 * Revision 2.1  90/10/05  10:30:04  dan
 * New Rev
 *
 * Revision 1.9  90/09/29  14:12:36  dan
 * Increased MAX_POINTS and MAX_LINES
 *
 * Revision 1.8  90/09/25  14:12:12  dan
 * Added MASKS and stepsize fields to Arcs and Cylinders
 *
 * Revision 1.7  90/09/20  17:00:25  dan
 * upped limit for number of points, lines, arcs, cyls
 *
 * Revision 1.6  90/09/06  18:11:11  dan
 * Stuff for constraints, MAHN
 *
 * Revision 1.5  90/09/04  17:01:48  dan
 * Made constraints doubles
 *
 * Revision 1.4  90/08/30  13:42:26  dan
 * Added REVERSE #define....
 *
 * Revision 1.3  90/08/27  18:02:10  ethan
 * *** empty log message ***
 *
 * Revision 1.2  90/08/22  12:37:24  dan
 * Put in check for TRUE/FALSE already defined...
 *
 * Revision 1.1  90/08/17  18:22:19  dan
 * Initial revision
 *
 */
```

| | |
|---|---|
| User: | MICRORENTMind |
| Application: | PrintMonitor |
| Document: | soap2swv.c |
| Date: | Wednesday, November 14, 1990 |
| Time: | 7:53:05 PM |
| Printer: | Peace of Mind |

```
/*
** SOAP2SWV.C
**
** Soap to swivel conversion.
**
** Copyright 1990, VPL Research
**
$Header: /usr/starch/source/starch/RCS/soap2swv.c,v 2.5 90/11/06 12:27:02 dan Exp $
**
*/

#include <stdio.h>
#include <malloc.h>
#include <string.h>
#include <math.h>
#include "soap.h"
#include "soapxtrn.h"



short      convert_to_swivel();
short      do_swivel_thang();
short      write_part();
short      write_part_data();
short      do_polylist_thang();
short      do_polygon_thang();
short      do_polymesh();
short      do_connect_mesh();
short      do_cylinder_mesh();
short      do_endcap_thang();

/* from BREEZE.C */
extern short eq_epsilon_check();
extern short ne_epsilon_check();

/* from BREEZE.C  */
extern void order_edgelist();
extern void fill_arc_start_stop();
extern void test_line_next();
```

```
extern void test_arc_next();

/*------------------------------------------------------------*/
/*
** MAIN CONVERSION WRITE ROUTINE
*/

short convert_to_swivel(object_index, swivdir)
short       object_index;
char        *swivdir;
{
    char      fname[80];
    short     len;
    FILE      *handle;

    if (soap_object[object_index].root == PARTNULL)
              return(NO);

    /* perform an explicit garbage collection          */
    garbage_collect();

    /* check again!                                          */
    if (soap_object[object_index].root == PARTNULL)
              return(NO);

    strcpy(fname, swivdir);
    len = strlen(fname);
    if (fname[len - 1] != '/') {
              fname[len] = '/';
              fname[len + 1] = '\0';
    }

     strcat(fname, soap_object[object_index].object_name);
    strcat(fname, ".SWV");

    if ((handle = fopen(fname, "w")) == NULL) {
/*            printf("\nCOULD NOT OPEN SWIVEL FILE!");*/
              return(NO);
    }
```

```
  /*SWIVEL*/if (fprintf(handle,"ShowWork\n") < 0) {
            fclose(handle);
            return(NO);
  }
  /*SWIVEL*/if (fprintf(handle,"UseCenti\n") < 0) {
            fclose(handle);
            return(NO);
  }
  /*SWIVEL*/if (fprintf(handle,"NewWorld\n") < 0) {
            fclose(handle);
            return(NO);
  }

  if (do_swivel_thang(soap_object[object_index].root, handle) == NO) {
/*          printf("\nERROR WRITING SWIVEL FILE!");*/
            fclose(handle);
            return(NO);
  }

  /*SWIVEL*/if (fprintf(handle,"SaveAsWorld %s\n",
                soap_object[object_index].object_name) < 0) {
            fclose(handle);
            return(NO);
  }

  /*SWIVEL*/if (fprintf(handle,"CloseWorld\n") < 0) {
            fclose(handle);
            return(NO);
  }

#ifdef AUTOCLOSE
  /*SWIVEL*/if (fprintf(handle,"Quit\n") < 0) {
            fclose(handle);
            return(NO);
  }
  /*SWIVEL*/if (fprintf(handle,"DrawWorld\n") < 0) {
            fclose(handle);
            return(NO);
  }
```

```
#endif

   fclose(handle);
  return(YES);
}

/*-----------------------------------------------------------*/
/*
** Swing through the hierarchy, BUD.
*/

short do_swivel_thang(part, handle)
Part        *part;
FILE        *handle;
{
  short     offset;
  Childlist *childptr;


  if (write_part(part, handle) == NO)
            return(NO);

  /* descend hierarchy    */
  /* for all children... */

  childptr = part->child_top;

  if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
              }

              if (do_swivel_thang(*childptr, handle) == NO)
                        return(NO);
```

```
                ++childptr;
                ++offset;
            }
    }
    return(YES);
}


/*------------------------------------------------------------*/
/*
**
*/
short write_part(part, handle)
Part        *part;
FILE        *handle;
{
    /* for NODES with no polygons..                    */
    if (part->poly_top == POLYNULL) {
            /*SWIVEL*/if (fprintf(handle,"NewObject\n") < 0)
              return(NO);

            /* Get rid of cube by faking a polygon with one point at origin */
            /*SWIVEL*/if (fprintf(handle,"PolyPoints:\n") < 0)
              return(NO);
            /*SWIVEL*/if (fprintf(handle,"0 0 0 ,\n") < 0)
              return(NO);
            /*SWIVEL*/if (fprintf(handle,"EndPoly\n") < 0)
              return(NO);

      /* part name        */
            /*SWIVEL*/if (fprintf(handle,"MakeName %s\n",part->nodename) < 0)
              return(NO);

      if (part->parent != PARTNULL) {
              /*SWIVEL*/if (fprintf(handle,"LinkTo %s\n",
                          part->parent->nodename) < 0)
                        return(NO);
      }

      /* write out constraints */
```

```
   if (write_part_data(part, handle) == NO)
              return(NO);
           return(YES);
 }

 /* for ENDCAPS and POLYGONS                                              */
 if (((**(part->poly_top))->status & GEOMASK) != SOAP_SWEEP &&
           ((**(part->poly_top))->status & GEOMASK) != SOAP_CONNECT &&
           ((**(part->poly_top))->status & GEOMASK) != SOAP_ROTSWEEP &&
           ((**(part->poly_top))->status & CYLMASK) != SOAP_CYLINDER) {
           /*SWIVEL*/if (fprintf(handle,"NewObject\n") < 0)
              return(NO);
 }

  if (do_polylist_thang(part, handle) == NO)
           return(NO);

 /* FOR EVERYTHING  */
 /* part name             */
  /*SWIVEL*/if (fprintf(handle,"MakeName %s\n",part->nodename) < 0)
           return(NO);

 if (part->parent != PARTNULL) {
    /*SWIVEL*/if (fprintf(handle,"LinkTo %s\n",
                 part->parent->nodename) < 0)
              return(NO);
 }

  /* write out constraints */
 if (write_part_data(part, handle) == NO)
           return(NO);

 return(YES);
}


/*---------------------------------------------------------------*/
/*
**
```

```
*/
short do_polylist_thang(part, handle)
Part        *part;
FILE        *handle;
{
  Polylist  *polyptr;
  short     offset;


  /* go through polylist for part...                    */

 if (part->poly_top != POLYNULL) {
          offset = 0;
          polyptr = part->poly_top;

          while (*polyptr != EDGENULL) {
            if (offset == LIST_SIZE - 1) {
                    polyptr = (Polylist *)*polyptr;
                    offset = 0;
                    continue;
            }
            if (((**polyptr)->status & GEOMASK) == SOAP_ROTSWEEP) {
                    if (do_polymesh(*polyptr, handle) == NO)
                      return(NO);
            } else if (((**polyptr)->status & GEOMASK) == SOAP_CONNECT ||
                       ((**polyptr)->status & GEOMASK) == SOAP_SWEEP) {
                    if (do_connect_mesh(*polyptr, handle) == NO)
                      return(NO);
            } else if (((**polyptr)->status & CYLMASK) == SOAP_CYLINDER) {
                    if (do_cylinder_mesh(*polyptr, handle) == NO)
                      return(NO);
            } else if (((**polyptr)->status & GEOMASK) == SOAP_ENDCAP) {
                    if (do_endcap_thang(part, handle) == NO)
                      return(NO);
            } else {
                    if (do_polygon_thang(*polyptr, handle, part) == NO)
                      return(NO);
            }

            ++polyptr;
```

```
                ++offset;
            }
    } /* else no polygons for this part! (DEFAULT TO SWIVEL CUBE!) */
    return(YES);
}

/*---------------------------------------------------------------*/
/*
** SWIVELIZE a MESH.
*/

short do_polymesh(edgeptr, handle)
Edgelist    *edgeptr;
FILE            *handle;
{
    short   offset, rowsize, colsize;
    Soap_Point  *spptr;
    Soap_Arc    *arcptr;


    /*SWIVEL*/if (fprintf(handle,"BeginMesh\n") < 0)
            return(NO);

    /* rows are paths, and columns are shapes..        */
    /* get the size of the mesh...                     */

    arcptr = (Soap_Arc *)*edgeptr;
    colsize = arcptr->stepsize + 1;

    arcptr = (Soap_Arc *)*(edgeptr + 2);
    rowsize = arcptr->stepsize + 1;

    /*SWIVEL*/if (fprintf(handle,"%d %d SizeMesh\n", rowsize, colsize) < 0)
            return(NO);

    /*SWIVEL*/if (fprintf(handle,"MeshPoints:\n") < 0)
            return(NO);

    edgeptr += 4;   /* get to start of point information    */
```

```
  offset = 4;

  while (*edgeptr != ELEMNULL) {
            if (offset == LIST_SIZE - 1) {
               edgeptr = (Edgelist *)*edgeptr;
               offset = 0;
               continue;
            }

            spptr = (Soap_Point *)*edgeptr;

            /*SWIVEL*/if (fprintf(handle,"%f %f %f ,\n",
                 spptr->x * SCALEVAL,
                 -spptr->y * SCALEVAL,
                 -spptr->z * SCALEVAL) < 0)
              return(NO);

            ++edgeptr;
            ++offset;
  }

  /*SWIVEL*/if (fprintf(handle,"EndMesh\n") < 0)
            return(NO);

  return(YES);
}

/*-------------------------------------------------------------*/
/*
**
*/
short do_polygon_thang(edgelist_pointer, handle, part)
Edgelist    *edgelist_pointer;
FILE           *handle;
Part           *part;
{
  short      offset;
  Element  *elptr;
   Soap_Point             *spptr;
```

```
/* first skip over the definition.... */
offset = 0;
while (*edgelist_pointer != ELEMNULL) {
        if (offset == LIST_SIZE - 1) {
            edgelist_pointer = (Edgelist *)*edgelist_pointer;
            offset = 0;
            continue;
        }
        /* remember, we've already done a garbage collection,          */
        /* so all data is ACTIVE and valid and beautiful... */
        elptr = *edgelist_pointer;
        if ((elptr->status & ELEMMASK) == SOAP_POINT)
            break;

        ++edgelist_pointer;
        ++offset;
}

/* Now, connect the dots...                              */
/*SWIVEL*/if (fprintf(handle,"PolyPoints:\n") < 0)
        return(NO);

while (*edgelist_pointer != ELEMNULL) {
        if (offset == LIST_SIZE - 1) {
            edgelist_pointer = (Edgelist *)*edgelist_pointer;
            offset = 0;
            continue;
        }
        spptr = (Soap_Point *)*edgelist_pointer;

        /*SWIVEL*/if (fprintf(handle,"%f %f %f ,\n",
              spptr->x * SCALEVAL,
              -spptr->y * SCALEVAL,
              -spptr->z * SCALEVAL) < 0)
            return(NO);

        ++edgelist_pointer;
        ++offset;
}
```

```
/*SWIVEL*/if (fprintf(handle,"EndPoly\n") < 0)
            return(NO);

  return(YES);
}

/*-----------------------------------------------------------------*/
/*
**
*/

short write_part_data(part, handle)
Part        *part;
FILE        *handle;
{
   /* write out non-hierarchical related part information            */

   /*SWIVEL*/if (fprintf(handle,"XRange: %f %f ,\n",
                part->constraint.xmin * SCALEVAL,
                part->constraint.xmax * SCALEVAL) < 0)          /* min max , */
            return(NO);

   /*SWIVEL*/if (fprintf(handle,"YRange: %f %f ,\n",
                part->constraint.ymin * SCALEVAL,
                part->constraint.ymax * SCALEVAL) < 0)
            return(NO);

   /*SWIVEL*/if (fprintf(handle,"ZRange: %f %f ,\n",
                part->constraint.zmin * SCALEVAL,
                part->constraint.zmax * SCALEVAL) < 0)
            return(NO);

   if ((part->constraint.lock) & LOCKXMASK) {
            /*SWIVEL*/if (fprintf(handle,"LockX\n") < 0)
              return(NO);
   }
   if ((part->constraint.lock) & LOCKYMASK) {
            /*SWIVEL*/if (fprintf(handle,"LockY\n") < 0)
```

```
                return(NO);
}
if ((part->constraint.lock) & LOCKZMASK) {
        /*SWIVEL*/if (fprintf(handle,"LockZ\n") < 0)
                return(NO);
}

/*SWIVEL*/if (fprintf(handle,"YawRange: %f %f ,\n",
                part->constraint.yaw_min,
                part->constraint.yaw_max) < 0)   /* min max , */
        return(NO);

/*SWIVEL*/if (fprintf(handle,"PitchRange: %f %f ,\n",
                part->constraint.pitch_min,
                part->constraint.pitch_max) < 0)
        return(NO);

/*SWIVEL*/if (fprintf(handle,"RollRange: %f %f ,\n",
                part->constraint.roll_min,
                part->constraint.roll_max) < 0)
        return(NO);

if ((part->constraint.lock) & LOCKYAWMASK) {
        /*SWIVEL*/if (fprintf(handle,"LockYaw\n") < 0)
                return(NO);
}
if ((part->constraint.lock) & LOCKPITCHMASK) {
        /*SWIVEL*/if (fprintf(handle,"LockPitch\n") < 0)
                return(NO);
}
if ((part->constraint.lock) & LOCKROLLMASK) {
        /*SWIVEL*/if (fprintf(handle,"LockRoll\n") < 0)
                return(NO);
}

/* Put the positions and attitudes in                    */
if (part->parent == PARTNULL) {
        /* x y z root */
        /*SWIVEL*/if (fprintf(handle,"AbsPos: %f %f %f ,\n",
                        (part->relorigin.x + part->constraint.xpos) * SCALEVAL,
```

```
                (-part->relorigin.y - part->constraint.ypos) * SCALEVAL,
                (part->relorigin.z + part->constraint.zpos) * SCALEVAL) < 0)
        return(NO);

        /* yaw pitch roll root*/
        /*SWIVEL*/if (fprintf(handle,"AbsAtt: %f %f %f ,\n",
                part->constraint.roll_attitude,
                part->constraint.pitch_attitude,
                part->constraint.yaw_attitude) < 0)
        return(NO);

        /*SWIVEL*/if (fprintf(handle,"AbsScale: 100 ,\n") < 0)
        return(NO);

} else {
        /* x y z children           */
  /*SWIVEL*/if (fprintf(handle,"RelPos: %f %f %f ,\n",
                (part->relorigin.x + part->constraint.xpos) * SCALEVAL,
                (-part->relorigin.y - part->constraint.ypos) * SCALEVAL,
                (part->relorigin.z + part->constraint.zpos) * SCALEVAL) < 0)
        return(NO);

        /* yaw pitch roll children */
        /* NOT IN ORDER ADVERTISED!*/
        /*SWIVEL*/if (fprintf(handle,"RelAtt: %f %f %f ,\n",
                part->constraint.roll_attitude,
                part->constraint.pitch_attitude,
                part->constraint.yaw_attitude) < 0)
        return(NO);

        /*SWIVEL*/if (fprintf(handle,"RelScale: 100 ,\n") < 0)
        return(NO);
}

/* part color           */
/*SWIVEL*/if (fprintf(handle,"SetRGB: %ld %ld %ld ,\n",
                (long)part->r * 256L,
                (long)part->g * 256L,
                (long)part->b * 256L) < 0)
```

```
            return(NO);

  /* THIS PARTICULAR COMMAND IS A KLUGE...              */
  /*SWIVEL*/if (fprintf(handle,"DrawWorld\n") < 0)
    return(NO);
}

/*-----------------------------------------------------------*/
/*
** SWIVELIZE a CONNECT MESH.
*/

short do_connect_mesh(edgeptr, handle)
Edgelist   *edgeptr;
FILE            *handle;
{
  short      offset, rowsize, colsize, elemcount, i, j;
  Soap_Point            *spptr;
  Soap_Arc *arcptr;
  FPoint     tar[210];

  /*SWIVEL*/if (fprintf(handle,"BeginMesh\n") < 0)
            return(NO);

  rowsize = 0;
  offset = 0;
  elemcount = 0;

  while (*edgeptr != ELEMNULL) {
            if (offset == LIST_SIZE - 1) {
               edgeptr = (Edgelist *)*edgeptr;
               offset = 0;
               continue;
            }
            if (((*edgeptr)->status & ELEMMASK) == SOAP_POINT)
               break;

            if (((*edgeptr)->status & ELEMMASK) == SOAP_LINE) {
               rowsize += 2;
            } else if (((*edgeptr)->status & ELEMMASK) == SOAP_ARC) {
```

```
            arcptr = (Soap_Arc *)*edgeptr;
            rowsize += arcptr->stepsize + 1;
        }

        ++elemcount;
        ++edgeptr;
        ++offset;
}

/* get rid of one or two connect edges not counted in rowsize */
if (elemcount & 1) {    /* odd means one connect edge            */
        rowsize -= 2;
        --elemcount;
} else {                        /* even means two connect edges...   */
        rowsize -= 4;
        elemcount -= 2;
}


rowsize = rowsize / 2 - elemcount / 2 + 1;
colsize = 2;

/*SWIVEL*/if (fprintf(handle,"%d %d SizeMesh\n", rowsize, colsize) < 0)
        return(NO);

/*SWIVEL*/if (fprintf(handle,"MeshPoints:\n") < 0)
        return(NO);

/* edgeptr and offset are set to start of point data    */
elemcount = 0;
while (*edgeptr != ELEMNULL) {
        if (offset == LIST_SIZE - 1) {
            edgeptr = (Edgelist *)*edgeptr;
            offset = 0;
            continue;
        }

        spptr = (Soap_Point *)*edgeptr;
        tar[elemcount].x = spptr->x;
```

```
            tar[elemcount].y = spptr->y;
            tar[elemcount].z = spptr->z;

            ++edgeptr;
            ++offset;
            ++elemcount;
    }

    for (i=0; i<colsize; ++i) {
            for (j=0; j<rowsize; ++j) {
              /*SWIVEL*/if (fprintf(handle,"%f %f %f ,\n",
                            tar[i*rowsize + (rowsize - j - 1)].x * SCALEVAL,
                            -tar[i*rowsize + (rowsize - j - 1)].y * SCALEVAL,
                            -tar[i*rowsize + (rowsize - j - 1)].z * SCALEVAL) < 0)
                         return(NO);
            }
    }

    /*SWIVEL*/if (fprintf(handle,"EndMesh\n") < 0)
            return(NO);

   return(YES);
}

/*---------------------------------------------------------*/
/*
** SWIVELIZE a CYLINDER MESH.
*/

short do_cylinder_mesh(edgeptr, handle)
Edgelist    *edgeptr;
FILE             *handle;
{
   short       rowsize, colsize, element_count, row2,i;
   Element   **listptr, **listsave;
    Soap_Point           *spptr;


    /*SWIVEL*/if (fprintf(handle,"BeginMesh\n") < 0)
            return(NO);
```

```
 element_count = get_edgelist_element_count(edgeptr);
--element_count;
row2 = element_count / 2;

rowsize = row2;
colsize = 2;

/*SWIVEL*/if (fprintf(handle,"%d %d SizeMesh\n", rowsize, colsize) < 0)
        return(NO);

/*SWIVEL*/if (fprintf(handle,"MeshPoints:\n") < 0)
        return(NO);

 listptr = get_element_pointer_sequence(edgeptr);
 listsave = listptr;

/* skip over actual cylinder entity...                    */
++listptr;

for (i=0; i<row2; ++i) {
    spptr = (Soap_Point *)*listptr++;

        /*SWIVEL*/if (fprintf(handle,"%f %f %f ,\n",
            spptr->x * SCALEVAL,
            -spptr->y * SCALEVAL,
            -spptr->z * SCALEVAL) < 0) {
           free_element_pointer_sequence(listsave);
          return(NO);
        }
}
listptr += (row2 - 1);

for (i=element_count; i>row2; --i) {
    spptr = (Soap_Point *)*listptr--;

        /*SWIVEL*/if (fprintf(handle,"%f %f %f ,\n",
            spptr->x * SCALEVAL,
            -spptr->y * SCALEVAL,
```

```
                -sppr->z * SCALEVAL) < 0) {
               free_element_pointer_sequence(listsave);
              return(NO);
            }
  }

  /*SWIVEL*/if (fprintf(handle,"EndMesh\n") < 0) {
            free_element_pointer_sequence(listsave);
            return(NO);
  }

   free_element_pointer_sequence(listsave);
  return(YES);
}

/*------------------------------------------------------------*/
/*
**
*/
short do_endcap_thang(part, handle)
Part        *part;
FILE        *handle;
{
   short          offset, capcount, namelen, pcount, i;
   Soap_Point                  *spptr;
   Edgelist     *edgeptr;
   Soap_Cylinder  *cylptr;
   FPoint       endc[200];

   namelen = strlen(part->nodename);
   if (part->nodename[namelen - 1] == '2') {
            edgeptr = *((part->parent)->poly_top);

            /* edgeptr and offset are set to start of point data    */
            cylptr = (Soap_Cylinder *)*edgeptr;

            capcount = 0;
            offset = 1;
            edgeptr += 1;
```

```
        while (*edgeptr != ELEMNULL) {
          if (offset == LIST_SIZE - 1) {
                edgeptr = (Edgelist *)*edgeptr;
                offset = 0;
                continue;
          }

          ++edgeptr;
          ++offset;
          if (capcount == cylptr->stepsize) {
                if (offset == LIST_SIZE - 1) {
                   edgeptr = (Edgelist *)*edgeptr;
                   offset = 0;
                }
                break;
          }

          ++capcount;
        }
} else {
        /* edgeptr and offset are set to start of point data    */
        edgeptr = *((part->parent)->poly_top);
        cylptr = (Soap_Cylinder *)*edgeptr;
        offset = 1;
        edgeptr += 1;
}

capcount = 0;
pcount = 0;

/*SWIVEL*/if (fprintf(handle,"PolyPoints:\n") < 0)
        return(NO);

while (*edgeptr != ELEMNULL) {
        if (offset == LIST_SIZE - 1) {
           edgeptr = (Edgelist *)*edgeptr;
           offset = 0;
           continue;
        }
```

```
            spptr = (Soap_Point *)*edgeptr;

            transfer_fpoint(&(endc[pcount]),&(spptr->x));
            ++pcount;

            if (capcount == cylptr->stepsize - 1)
               break;

            ++edgeptr;
            ++offset;
            ++capcount;
   }

   for (i=pcount - 1; i>=0; --i) {
            /*SWIVEL*/if (fprintf(handle,"%f %f %f ,\n",
                  endc[i].x * SCALEVAL,
                  -endc[i].y * SCALEVAL,
                  -endc[i].z * SCALEVAL) < 0)
               return(NO);
   }

   /*SWIVEL*/if (fprintf(handle,"EndPoly\n") < 0)
            return(NO);

  return(YES);
}

/*-----------------------------------------------------------------*/

/* DO NOT PLACE ANY FUNCTIONS AFTER RCS LOG!
$Log:       soap2swv.c,v $
 * Revision 2.5  90/11/06  12:27:02  dan
 * Endcaps were reversed in ISAAC. Reversed....
 *
 * Revision 2.4  90/10/31  18:06:25  dan
 * Reversed meshes for ISAAC to work.
 *
 * Revision 2.3  90/10/24  16:59:18  dan
```

```
* Fixed endcap bug for cylinders with crashing stepsize
*
* Revision 2.2  90/10/22  15:29:15  dan
* Put in fake polygon for root node and nodes with no geometry.
*
* Revision 2.1  90/10/05  10:30:08  dan
* New Rev
*
* Revision 1.13  90/10/02  12:06:01  dan
* SetRGB put BEFORE draw world.
*
* Revision 1.12  90/09/29  12:11:55  dan
* Scale RGB values for Swivel.
*
* Revision 1.11  90/09/25  14:11:56  dan
* ROTSWEEP type and MASKS
*
* Revision 1.10  90/09/12  19:39:26  ethan
* error message if can't write swivel file
*
* Revision 1.9  90/09/12  19:23:02  dan
* ADded new stuff to make work with Body Electric...
*
* Revision 1.8  90/09/07  11:07:27  dan
* Constraints tidy-up for SWIVEL.
*
* Revision 1.7  90/09/06  18:09:15  dan
* more constraints stuff / Swivel consistency
*
* Revision 1.6  90/08/30  18:47:04  dan
* Fixed min/max swap problem, and solved LockX mystery.
*
* Revision 1.5  90/08/30  13:39:38  dan
* Added new polygon interpreter, changed cyls, added -z
*
* Revision 1.4  90/08/28  11:01:43  dan
* Put endcaps into separate parts.
*
* Revision 1.3  90/08/27  18:01:55  ethan
* *** empty log message ***
```

```
*
* Revision 1.2  90/08/21  15:43:51  dan
* New ordering for scale problem fix. Added Scale commands.
*
* Revision 1.1  90/08/17  18:22:51  dan
* Initial revision
*
*/
```

User: MICRORENTMind

Application: PrintMonitor

Document: soapdump.c

Date: Wednesday, November 14, 1990

Time: 7:56:21 PM

Printer: Peace of Mind

```
/*
** SOAPDUMP.C
**
** DUMP IT!
**
** Copyright 1990, VPL Research
**
$Header: /usr/starch/source/starch/RCS/soapdump.c,v 2.1 90/10/05 10:30:10 dan Exp $
**
*/

#include <stdio.h>
#include <malloc.h>
#include <string.h>
#include <math.h>
#include "soap.h"
#include "soapxtrn.h"


short       soap_dump();
short       do_dump_thang();
short       dump_part();
short       dump_constraints();
short       dump_polylist();
short       dump_edgelist();
short       dump_arc();


/*-------------------------------------------------------*/
/*
** DUMP IT!
*/

short soap_dump(object_index)
short       object_index;
{

  if (soap_object[object_index].root == PARTNULL) {
```

```
            printf("\nROOT IS NULL. NOTHING TO DUMP");
            return(NO);
    }

    /* perform an explicit garbage collection        */
    garbage_collect();

    /* check again!                                  */
    if (soap_object[object_index].root == PARTNULL) {
            printf("\nGARBAGE COLLECTED TO NOTHING!");
            return(NO);
    }

    printf("\nOBJECT NAME: %s", soap_object[object_index].object_name);

    if (do_dump_thang(soap_object[object_index].root) == NO) {
            printf("\nDUMP PROBLEM");
            return(NO);
    }

    return(YES);
}

/*-----------------------------------------------------------------*/
/*
** Swing through the hierarchy, BUD.
*/

short do_dump_thang(part)
Part        *part;
{
    short       offset;
    Childlist *childptr;

    printf("\n**********PART NAME: %s, PART POINTER: %lx",
            part->nodename, part);

    if (dump_part(part) == NO)
            return(NO);
```

```
  if (part->parent != PARTNULL) {
            printf("\nPARENT NAME: %s, PARENT POINTER: %lx",
              part->parent->nodename, part->parent);
  } else {
            printf("\nPARENT IS NULL");
  }

  /* descend hierarchy    */
  /* for all children... */

  childptr = part->child_top;

  if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
              }

              if (do_dump_thang(*childptr) == NO)
                        return(NO);

              ++childptr;
              ++offset;
            }
  }
  return(YES);
}


/*-------------------------------------------------------------*/
/*
**
*/
short dump_part(part)
Part        *part;
{
```

```
  /* write out constraints */
  if (dump_constraints(part) == NO)
            return(NO);

  return(dump_polylist(part));
}


/*-----------------------------------------------------------------*/
/*
**
*/
short dump_polylist(part)
Part        *part;
{
   Polylist  *polyptr;
   short     offset;


   /* go through polylist for part...                              */


   if (part->poly_top != POLYNULL) {
            offset = 0;
            polyptr = part->poly_top;

            while (*polyptr != EDGENULL) {

              if (offset == LIST_SIZE - 1) {
                       polyptr = (Polylist *)*polyptr;
                       offset = 0;
                       continue;
              }
              printf("\nPOLY POINTER: %lx",polyptr);

              if (*polyptr != EDGENULL)
                       printf("\nEDGELIST POINTER: %lx", *polyptr);
              else {
```

```
                    printf("\n++++++++NO EDGELIST POINTER FOR THIS POLYPTR!!");
                    ++polyptr;
                    ++offset;
                    continue;
               }

               if (((**polyptr)->status & CYLMASK) == SOAP_CYLINDER) {
                    printf("\nCYLINDER!!");
               } else {
                    if (((**polyptr)->status & GEOMASK) == SOAP_SWEEP) {
                      printf("\nSWEEP!!");
                    } else if (((**polyptr)->status & GEOMASK) == SOAP_CONNECT) {
                      printf("\nEXPLICIT CONNECT!!");
                    } else {
                      printf("\nPOLYGON!!");
                    }
                    if (dump_edgelist(*polyptr) == NO)
                      return(NO);
               }
               ++polyptr;
               ++offset;
          }
  } else {
          printf("\nPART->POLY_TOP IS NULL!!!");
  }
  return(YES);
}

/*-----------------------------------------------------------*/
/*
**
*/
short dump_edgelist(edgelist_pointer)
Edgelist    *edgelist_pointer;
{
  short      offset;
  Element  *elptr;
  Soap_Line  *lineptr;
  Soap_Point          *spptr;
```

```
offset = 0;
while (*edgelist_pointer != ELEMNULL) {
        if (offset == LIST_SIZE - 1) {
            edgelist_pointer = (Edgelist *)*edgelist_pointer;
            offset = 0;
            continue;
        }
        printf("\nEDGELIST POINTER: %lx", edgelist_pointer);

        /* remember, we've already done a garbage collection,          */
        /* so all data is ACTIVE and valid and beautiful...  */
        elptr = *edgelist_pointer;
        if ((elptr->status & ELEMMASK) == SOAP_LINE) {
            lineptr = (Soap_Line *)elptr;
            printf("\nLINE! P1.XYZ: %f %f %f // P2.XYZ: %f %f %f",
                        lineptr->p1.x,
                        lineptr->p1.y,
                        lineptr->p1.z,
                        lineptr->p2.x,
                        lineptr->p2.y,
                        lineptr->p2.z);
        } else if ((elptr->status & ELEMMASK) == SOAP_ARC) {
            printf("\nARC!");
            if (dump_arc((Soap_Arc *)elptr) == NO)
                    return(NO);
        } else if ((elptr->status & ELEMMASK) == SOAP_POINT) {
            printf("\nPOINT!");
            spptr = (Soap_Point *)elptr;
            printf("\nXYZ: %f %f %f",spptr->x, spptr->y, spptr->z);
        } else {
            printf("\nSOMETHING NEITHER LINE NOR ARC: %d (ERROR)",
                    elptr->status & ELEMMASK);
        }
        ++edgelist_pointer;
        ++offset;
}

return(YES);
```

```
}

/*------------------------------------------------------------*/
/*
** REPLACED IN SOME WAY BY BREEZE INTERACTIVITY.
** Start and End points are relative to center (0,0,0) on XY plane
*/

short dump_arc(arc)
Soap_Arc    *arc;
{
  printf("\nCENTERPOINT: %f %f %f",
            arc->center_world.x,
            arc->center_world.y,
            arc->center_world.z);

  return(YES);
}

/*------------------------------------------------------------*/
/*
**
*/

short dump_constraints(part)
Part        *part;
{
  /* Put the positions and attitudes in                    */
  if (part->parent == PARTNULL) {
            /* x y z root */
            printf("\nAbsPos: %f %f %f",
                        part->constraint.xpos,
                        part->constraint.ypos,
                        part->constraint.zpos);

            /* yaw pitch roll root*/
            printf("\nAbsAtt: %f %f %f",
                        part->constraint.yaw_attitude,
                        part->constraint.pitch_attitude,
                        part->constraint.roll_attitude);
```

```
} else {
        /* x y z children          */
        printf("\nRelPos: %f %f %f",
                part->constraint.xpos,
                part->constraint.ypos,
                part->constraint.zpos);

        /* yaw pitch roll root*/
        printf("\nRelAtt: %f %f %f",
                part->constraint.yaw_attitude,
                part->constraint.pitch_attitude,
                part->constraint.roll_attitude);

}

/* now write out non-hierarchical related part information    */

printf("\nXRange: %f %f",
        part->constraint.xmin,
        part->constraint.xmax);

printf("\nYRange: %f %f",
        part->constraint.ymin,
        part->constraint.ymax);
printf("\nZRange: %f %f",
        part->constraint.zmin,
        part->constraint.zmax);

printf("\nLOCK: %lx",(long)part->constraint.lock);


printf("\nYawRange: %f %f",
        part->constraint.yaw_min,
        part->constraint.yaw_max);


printf("\nPitchRange: %f %f",
        part->constraint.pitch_min,
        part->constraint.pitch_max);
```

```
    printf("\nRollRange: %f %f",
                part->constraint.roll_min,
                part->constraint.roll_max);


  return(YES);
}

/*-------------------------------------------------------------*/
/*-------------------------------------------------------------*/
/*-------------------------------------------------------------*/
/*-------------------------------------------------------------*/
/*-------------------------------------------------------------*/

/* DO NOT PLACE ANY FUNCTIONS AFTER RCS LOG!
$Log:     soapdump.c,v $
 * Revision 2.1  90/10/05  10:30:10  dan
 * New Rev
 *
 * Revision 1.3  90/09/25  14:13:48  dan
 * Added #defines for MASKS
 *
 * Revision 1.2  90/08/22  11:59:25  dan
 * Added POINT Type and printing out Sweeps and Connects.
 *
 * Revision 1.1  90/08/17  18:23:08  dan
 * Initial revision
 *
*/
```

| | |
|---|---|
| User: | MICRORENTMind |
| Application: | PrintMonitor |
| Document: | soapedit.c |
| Date: | Wednesday, November 14, 1990 |
| Time: | 7:57:46 PM |
| Printer: | Peace of Mind |

```
/*
** SOAPEDIT.C
**
** Editing functions for the SOAP database.
**
** Copyright 1990, by VPL Research
**
$Header: /usr/starch/source/starch/RCS/soapedit.c,v 2.2 90/10/17 14:05:09 dan Exp $
**
*/

#include <stdio.h>
#include <malloc.h>
#include "soap.h"

/* in SOAPFILM.C */
extern Part  *add_part_parent();
extern Edgelist        *add_new_edgelist();
extern short add_new_element();

/* in SOAPQRY.C       */
extern short check_element_in_list();
extern short get_edgelist_element_count();
extern Element         **get_element_pointer_sequence();

/* EDIT */
Part         *add_part();
Edgelist   *add_poly();
short        add_point();
short        add_line();
short        replace_line();
short        replace_line_at_offset();
short        swap_lines();
short        swap_line_start_end();
short        insert_line();
short        add_arc();
short        replace_arc();
short        replace_arc_at_offset();
short        swap_arcs();
```

```
short           swap_arc_start_end();
short           insert_arc();
short           add_cylinder();
short           close_poly();
void            reverse_edgelist();
short           replace_element_at_offset();
short           swap_elements();

/* STATIC FUNCTIONS */
static Edgelist         *replace_element_check_pointer();
static void  move_edgelist_down();

/* from SOAPSCUM.C   */
extern Soap_Point       soap_point[];
extern Soap_Line        soap_line[];
extern Soap_Arc                         soap_arc[];
extern Soap_Cylinder    soap_cylinder[];
extern Soap_Object      soap_object[];

/*-----------------------------------------------------------------*/
/*
** Allocate a part. Set child_top and poly_top to NULL for new part.
** RETURNS: pointer to new part or PARTNULL if parent NOTVALID.
*/

Part *add_part(parent_part, object_index)
Part        *parent_part;
short       object_index;
{
  Part   *partptr;

  if (parent_part == PARTNULL) {
        /* allocate the root! */
        partptr = soap_object[object_index].root = (Part *)malloc(sizeof(Part));
  } else {
    if (((parent_part->status) & VALIDMASK) == NOTVALID)
          return(PARTNULL);

        /* add to parent's childlist if it exists. Create one if   */
```

```
            /* it doesn't exist.                                          */
            partptr = add_part_parent(parent_part);
  }
   /* basic initialization */
   partptr->poly_top = POLYNULL;
   partptr->child_top = CHILDNULL;
   partptr->parent = parent_part;  /* ! */
   partptr->status = VALID;
   partptr->nodename[0] = '\0';

   return(partptr);
}

/*-------------------------------------------------------------*/
/*
** Add a polygon to the end of the passed part's polylist. Checks
** for poly_top == NULLPTR and allocates a new list if so.
** RETURNS: pointer to new Edgelist or NULL if part not VALID.
*/
Edgelist *add_poly(part)
Part          *part;
{
  if (part->status == NOTVALID)
            return(EDGENULL);

  if (part->poly_top == POLYNULL) {
            part->poly_top = (Polylist *)malloc(10 * sizeof(Edgelist *));
            *(part->poly_top) = EDGENULL;
  }

   return(add_new_edgelist(part));
}

/*-------------------------------------------------------------*/
/*
** Add a point element to the end of the edgelist.
** RETURNS: number of elements in edgelist, or BADINDEX if point_index
** already exists.
*/
short add_point(edgelist_pointer, point_index)
```

```
Edgelist    *edgelist_pointer;
short           point_index;
{
   Soap_Point  *spptr;

   /* set line status                                          */
   soap_point[point_index].status = (SOAP_POINT | ACTIVE);

   /* get the pointer to the point at point_index    */
   spptr = &(soap_point[point_index]);

   return(add_new_element(spptr, edgelist_pointer));
}

/*-----------------------------------------------------------------*/
/*
** Add a line element to the end of the edgelist.
** RETURNS: number of elements in edgelist, or BADINDEX if line_index
** already exists.
*/
short add_line(edgelist_pointer, line_index)
Edgelist    *edgelist_pointer;
short           line_index;
{
   Soap_Line    *lineptr;

   /* set line status                                          */
   soap_line[line_index].status = (SOAP_LINE | ACTIVE);

   /* get the pointer to the line at line_index    */
   lineptr = &(soap_line[line_index]);

   return(add_new_element(lineptr, edgelist_pointer));
}

/*-----------------------------------------------------------------*/
/*
** Replace a line with a new line. Set the old line status to UNUSED.
** RETURNS: TRUE if replaced, BADINDEX if error and not replaced.
```

```
** (Including finding new line index in list already!!)
*/
short replace_line(edgelist_pointer, new_line_index, old_line_index)
Edgelist    *edgelist_pointer;
short           new_line_index, old_line_index;
{
   short  offset;
   Element *oldline, *newline;

   if (edgelist_pointer == EDGENULL)
           return(BADINDEX);

   /* convert indices to element pointers  */
   oldline = (Element *)&(soap_line[old_line_index]);
   newline = (Element *)&(soap_line[new_line_index]);

   if (check_element_in_list(edgelist_pointer, newline))
           return(BADINDEX);

   soap_line[old_line_index].status = UNUSED;
   soap_line[new_line_index].status = (SOAP_LINE | ACTIVE);

   offset = 0;
   while (*edgelist_pointer != ELEMNULL) {
           if (offset == LIST_SIZE - 1) {
              edgelist_pointer = (Edgelist *)*edgelist_pointer;
              offset = 0;
              continue;
           }
           if (*edgelist_pointer == oldline) {
              *edgelist_pointer = newline;
              return(TRUE);
           }
           ++edgelist_pointer;
           ++offset;
   }
   return(BADINDEX);
}

/*-------------------------------------------------------------*/
```

```
/*
** Swap two lines in the edgelist. Remember that the edgelist should
** be in sequential order. The start and end points should be linked
** correctly.
** RETURNS: TRUE if swapped, BADINDEX if error and not swapped.
** (Error includes either line index not existing in list already!)
*/
short swap_lines(edgelist_pointer, line_index_1, line_index_2)
Edgelist    *edgelist_pointer;
short            line_index_1, line_index_2;
{
  Element  *line1, *line2;
  Edgelist  *saveptr;


  if (edgelist_pointer == EDGENULL)
          return(BADINDEX);

  /* convert indices to element pointers */
   line1 = (Element *)&(soap_line[line_index_1]);
   line2 = (Element *)&(soap_line[line_index_2]);

   if (!check_element_in_list(edgelist_pointer, line1))
          return(BADINDEX);

   if (!check_element_in_list(edgelist_pointer, line2))
          return(BADINDEX);

  /* two pass swap thang:                    */
  /* first replace line1 with line2       */
   saveptr = replace_element_check_pointer(edgelist_pointer, EDGENULL,
             line1, line2);

  /* now replace line2 with line1       */
   replace_element_check_pointer(edgelist_pointer, saveptr,
             line2, line1);

  return(TRUE);
}
```

```
/*---------------------------------------------------------*/
/*
** Switch the start and end points of the line.
** SWAPS BOTH WORLD AND SCREEN!!!
** RETURNS: TRUE if swapped, BADINDEX if error.
*/
short swap_line_start_end(line_index)
short           line_index;
{
  short  temp;
  double tempd;


  if (line_index >= MAX_LINE)
          return(BADINDEX);

   tempd = soap_line[line_index].p1.x;
    soap_line[line_index].p1.x = soap_line[line_index].p2.x;
   soap_line[line_index].p2.x = tempd;

   tempd = soap_line[line_index].p1.y;
    soap_line[line_index].p1.y = soap_line[line_index].p2.y;
   soap_line[line_index].p2.y = tempd;

   tempd = soap_line[line_index].p1.z;
    soap_line[line_index].p1.z = soap_line[line_index].p2.z;
   soap_line[line_index].p2.z = tempd;

   temp = soap_line[line_index].ps1.x;
    soap_line[line_index].ps1.x = soap_line[line_index].ps2.x;
   soap_line[line_index].ps2.x = temp;

   temp = soap_line[line_index].ps1.y;
    soap_line[line_index].ps1.y = soap_line[line_index].ps2.y;
   soap_line[line_index].ps2.y = temp;

   temp = soap_line[line_index].ps1.z;
    soap_line[line_index].ps1.z = soap_line[line_index].ps2.z;
   soap_line[line_index].ps2.z = temp;
```

```
  return(TRUE);
}

/*-----------------------------------------------------------*/
/*
** Insert a line element at the given edgelist offset.
** RETURNS: TRUE if line inserted, BADINDEX if error.
*/
short insert_line(edgelist_pointer, line_index, offset)
Edgelist    *edgelist_pointer;
short            line_index, offset;
{
   short   element_count;


   if (edgelist_pointer == EDGENULL)
            return(BADINDEX);

    element_count = get_edgelist_element_count(edgelist_pointer);
   if (offset >= element_count)
            return(BADINDEX);

   if (line_index >= MAX_LINE)
            return(BADINDEX);

   /* add a dummy line element: used passed line as index */

   if (add_line(edgelist_pointer, line_index) == BADINDEX)
            return(BADINDEX);

   /* now shift everything down one   */
    move_edgelist_down(edgelist_pointer, element_count, offset);

   /* now offset is ready for re-assignment            */
    return(replace_line_at_offset(edgelist_pointer, line_index,
                                                       offset, TRUE));
}
```

```
/*-----------------------------------------------------------*/
/*
** REPLACE A LINE ENTITY AT A GIVEN OFFSET IN THE EDGELIST.
** RETURNS: TRUE if line was replaced, BADINDEX if offset error.
*/
short replace_line_at_offset(edgelist_pointer, line_index, offset, putflag)
Edgelist    *edgelist_pointer;
short            line_index, offset, putflag;
{
  Element *elptr;


  if (edgelist_pointer == EDGENULL)
           return(BADINDEX);

  if (line_index >= MAX_LINE)
           return(BADINDEX);

  soap_line[line_index].status = (SOAP_LINE | ACTIVE);

  elptr = (Element *)&(soap_line[line_index]);

  return(replace_element_at_offset(edgelist_pointer, elptr,
                                                    offset, putflag));
}

/*-----------------------------------------------------------*/
/*
** Add an arc to the end of the edgelist.
** RETURNS: number of elements in edgelist, or BADINDEX if arc_index
** already exists.
*/
short add_arc(edgelist_pointer, arc_index)
Edgelist    *edgelist_pointer;
short            arc_index;
{
  Soap_Arc    *arcptr;

  /* set arc status                                            */
```

```
  soap_arc[arc_index].status = (SOAP_ARC | ACTIVE);

  /* get the pointer to the arc at arc_index   */
  arcptr = &(soap_arc[arc_index]);

  return(add_new_element(arcptr, edgelist_pointer));

}

/*-------------------------------------------------------------*/
/*
** Replace old arc with new arc. Set status of old arc to UNUSED.
** RETURNS: TRUE if replaced, BADINDEX if error and not replaced.
*/
short replace_arc(edgelist_pointer, new_arc_index, old_arc_index)
Edgelist    *edgelist_pointer;
short           new_arc_index, old_arc_index;
{
  short  offset;
  Element *oldarc, *newarc;

  if (edgelist_pointer == EDGENULL)
          return(BADINDEX);

  /* convert indices to element pointers  */
  oldarc = (Element *)&(soap_arc[old_arc_index]);
  newarc = (Element *)&(soap_arc[new_arc_index]);

  if (check_element_in_list(edgelist_pointer, newarc))
          return(BADINDEX);

  soap_arc[old_arc_index].status = UNUSED;
  soap_arc[new_arc_index].status = (SOAP_ARC | ACTIVE);

  offset = 0;
  while (*edgelist_pointer != ELEMNULL) {
          if (offset == LIST_SIZE - 1) {
            edgelist_pointer = (Edgelist *)*edgelist_pointer;
            offset = 0;
            continue;
```

```
            }
            if (*edgelist_pointer == oldarc) {
               *edgelist_pointer = newarc;
              return(TRUE);
            }
            ++edgelist_pointer;
            ++offset;
  }
  return(BADINDEX);
}

/*------------------------------------------------------------*/
/*
** Swap arc1 with arc2 in element list. Remember, start and end points
** must be in sequential order!
** RETURNS: TRUE if swapped, BADINDEX if error and not swapped.
*/
short swap_arcs(edgelist_pointer, arc_index_1, arc_index_2)
Edgelist    *edgelist_pointer;
short            arc_index_1, arc_index_2;
{
  Element  *arc1, *arc2;
  Edgelist  *saveptr;


  if (edgelist_pointer == EDGENULL)
            return(BADINDEX);

  /* convert indices to element pointers  */
  arc1 = (Element *)&(soap_arc[arc_index_1]);
  arc2 = (Element *)&(soap_arc[arc_index_2]);

  if (!check_element_in_list(edgelist_pointer, arc1))
            return(BADINDEX);

  if (!check_element_in_list(edgelist_pointer, arc2))
            return(BADINDEX);

  /* two pass swap thang:                    */
```

```
  /* first replace arc1 with arc2         */
   saveptr = replace_element_check_pointer(edgelist_pointer, EDGENULL,
              arc1, arc2);

  /* now replace arc2 with arc1          */
    replace_element_check_pointer(edgelist_pointer, saveptr,
              arc2, arc1);

  return(TRUE);

}

/*-------------------------------------------------------------*/
/*
** Swap arc start and end points and related information.
** RETURNS: TRUE if swapped, BADINDEX if error and not swapped.
*/
short swap_arc_start_end(arc_index)
short            arc_index;
{
   short   temp;
   double  tempd;

#ifdef ARCDEBUG
printf("\nSWAPPING START END: INDEX: %d", arc_index);
SLAM;
#endif
   if (arc_index >= MAX_ARC)
            return(BADINDEX);

    tempd = soap_arc[arc_index].p1.x;
     soap_arc[arc_index].p1.x = soap_arc[arc_index].p2.x;
    soap_arc[arc_index].p2.x = tempd;

    tempd = soap_arc[arc_index].p1.y;
     soap_arc[arc_index].p1.y = soap_arc[arc_index].p2.y;
    soap_arc[arc_index].p2.y = tempd;

    tempd = soap_arc[arc_index].p1.z;
     soap_arc[arc_index].p1.z = soap_arc[arc_index].p2.z;
```

```
    soap_arc[arc_index].p2.z = tempd;

    temp = soap_arc[arc_index].ps1.x;
    soap_arc[arc_index].ps1.x = soap_arc[arc_index].ps2.x;
    soap_arc[arc_index].ps2.x = temp;

    temp = soap_arc[arc_index].ps1.y;
    soap_arc[arc_index].ps1.y = soap_arc[arc_index].ps2.y;
    soap_arc[arc_index].ps2.y = temp;

    temp = soap_arc[arc_index].ps1.z;
    soap_arc[arc_index].ps1.z = soap_arc[arc_index].ps2.z;
    soap_arc[arc_index].ps2.z = temp;

    /* switch the start and offset angles */
    temp = soap_arc[arc_index].start_angle;
    soap_arc[arc_index].start_angle = temp + soap_arc[arc_index].offset_angle;
    soap_arc[arc_index].offset_angle = -soap_arc[arc_index].offset_angle;

  return(TRUE);
}

/*-----------------------------------------------------------*/
/*
** Insert an arc element at the given offset.
** RETURNS: TRUE if arc inserted, BADINDEX if error.
*/
short insert_arc(edgelist_pointer, arc_index, offset)
Edgelist    *edgelist_pointer;
short       arc_index, offset;
{
   short   element_count;


  if (edgelist_pointer == EDGENULL)
          return(BADINDEX);

   element_count = get_edgelist_element_count(edgelist_pointer);
  if (offset >= element_count)
```

```
            return(BADINDEX);

    if (arc_index >= MAX_ARC)
            return(BADINDEX);

    /* add a dummy arc element: used passed arc as index */

    if (add_arc(edgelist_pointer, arc_index) == BADINDEX)
            return(BADINDEX);

    /* now shift everything down one  */
     move_edgelist_down(edgelist_pointer, element_count, offset);

    /* now offset is ready for re-assignment         */
     return(replace_arc_at_offset(edgelist_pointer, arc_index,
                                                offset, TRUE));
}

/*----------------------------------------------------------*/
/*
** REPLACE AN ARC ENTITY AT A GIVEN OFFSET IN THE EDGELIST.
** RETURNS: TRUE if arc was replaced, BADINDEX if offset error.
*/
short replace_arc_at_offset(edgelist_pointer, arc_index, offset, putflag)
Edgelist    *edgelist_pointer;
short           arc_index, offset, putflag;
{
    Element *elptr;


    if (edgelist_pointer == EDGENULL)
            return(BADINDEX);

    if (arc_index >= MAX_ARC)
            return(BADINDEX);

    soap_arc[arc_index].status = (SOAP_ARC | ACTIVE);

     elptr = (Element *)&(soap_arc[arc_index]);
```

```
    return(replace_element_at_offset(edgelist_pointer, elptr,
                                                        offset, putflag));
}

/*----------------------------------------------------------*/
/*
** Add a cylinder to the end of an edgelist. Cylinders cannot be mixed
** with anything else in an edgelist! Each cylinder is automatically a
** part! There should only be one cylinder per edgelist and one edgelist
** per part! It is possible to constrain a bunch of cylinders to a single
** part, or node of the tree, but may not be supported immediately.
** RETURNS: number of elements in edgelist, or BADINDEX if cylinder_index
** already exists.
*/
short add_cylinder(edgelist_pointer, cylinder_index)
Edgelist    *edgelist_pointer;
short         cylinder_index;
{
   Soap_Cylinder         *cylinderptr;

   /* set cylinder status                                    */
   soap_cylinder[cylinder_index].status = (SOAP_CYLINDER | ACTIVE);

   /* get the pointer to the cylinder at cylinder_index    */
   cylinderptr = &(soap_cylinder[cylinder_index]);

   return(add_new_element(cylinderptr, edgelist_pointer));

}

/*----------------------------------------------------------*/
/*
** CLOSE UP AN EDGELIST, i.e., create a line segment between the
** last endpoint and the first start point and add it to the edgelist.
** RETURNS: TRUE if polygon closed, BADINDEX if there is only one line
** or if the list is empty.
*/
short close_poly(edgelist_pointer)
Edgelist    *edgelist_pointer;
```

```
{

}

/*--------------------------------------------------------------*/
/*
** Reverse the order of an edgelist. This also reverses the order
** of start and end points. This is useful for changing a clockwise
** polygon to a counter-clockwise polygon.
** RETURNS: nothing.
*/
void reverse_edgelist(edgelist_pointer)
Edgelist     *edgelist_pointer;
{
   short   i, element_count;
    Element **listtop, **listbot, **listsave;

    element_count = get_edgelist_element_count(edgelist_pointer);
   if (element_count == 0)
            return;

    listtop = get_element_pointer_sequence(edgelist_pointer);
   listbot = listtop + (element_count - 1);
   listsave = listtop;

   for (i = 0; i < element_count / 2; ++i) {
            if ((((*listtop)->status) & ELEMMASK) == SOAP_ARC)
                swap_arc_start_end(get_arc_index((Soap_Arc *)*listtop));
            else
                swap_line_start_end(get_line_index((Soap_Line *)*listtop));

            if ((((*listbot)->status) & ELEMMASK) == SOAP_ARC)
                swap_arc_start_end(get_arc_index((Soap_Arc *)*listbot));
            else
                swap_line_start_end(get_line_index((Soap_Line *)*listbot));

            if (((*listtop)->status & SWAPMASK) == EDGESWAP)
              (*listtop)->status &= ZEROSWAPMASK;
            else
              (*listtop)->status |= EDGESWAP;
```

```
            if (((*listbot)->status & SWAPMASK) == EDGESWAP)
               (*listbot)->status &= ZEROSWAPMASK;
            else
               (*listbot)->status |= EDGESWAP;

            swap_elements(edgelist_pointer, *listtop, *listbot);
            ++listtop;
            --listbot;
   }

   /* Take care of middle entry if odd-numbered list...   */
   if (element_count & 1) {
            if ((((*listtop)->status) & ELEMMASK) == SOAP_ARC)
                swap_arc_start_end(get_arc_index((Soap_Arc *)*listtop));
            else
                swap_line_start_end(get_line_index((Soap_Line *)*listtop));
   }

   /* free our array */
    free_element_pointer_sequence(listsave);
}

/*------------------------------------------------------------------*/
/*
** REPLACE AN ELEMENT AT A GIVEN EDGELIST OFFSET
** PUTFLAG MEANS THAT VALUE TO BE REPLACED HAS BEEN MOVED ELSEWHERE
** IN LIST and THEREFORE IS NOT TO BE SET TO UNUSED. USUALLY, PUTFLAG
** SHOULD BE SENT AS FALSE (0). (IF IN DOUBT, SET TO FALSE.)
** RETURNS: TRUE if cool, BADINDEX if error
*/

short replace_element_at_offset(edgelist_pointer, elptr, offset, putflag)
Edgelist    *edgelist_pointer;
Element          *elptr;
short            offset, putflag;
{
   short   offcount, off;
```

```
  if (edgelist_pointer == EDGENULL)
          return(BADINDEX);

  offcount = off = 0;
  while (*edgelist_pointer != ELEMNULL) {
          if (off == LIST_SIZE - 1) {
            edgelist_pointer = (Edgelist *)*edgelist_pointer;
            off = 0;
            continue;
          }
          if (offcount == offset) {
            if (!putflag) {
                    (*edgelist_pointer)->status = UNUSED;
            }
            *edgelist_pointer = elptr;
            return(TRUE);
          }
          ++offcount;
          ++off;
          ++edgelist_pointer;
  }
  return(BADINDEX);
}

/*-----------------------------------------------------------------*/
/*
** RETURNS: BADINDEX if elements not found in list.
*/

short swap_elements(edgelist_pointer, elptr1, elptr2)
Edgelist    *edgelist_pointer;
Element          *elptr1, *elptr2;
{
  Edgelist   *saveptr;


  if (edgelist_pointer == EDGENULL)
          return(BADINDEX);
```

```
  if (!check_element_in_list(edgelist_pointer, elptr1))
          return(BADINDEX);

  if (!check_element_in_list(edgelist_pointer, elptr2))
          return(BADINDEX);

 /* two pass swap thang:                          */
 /* first replace elptr1 with elptr2    */
  saveptr = replace_element_check_pointer(edgelist_pointer, EDGENULL,
             elptr1, elptr2);

 /* now replace elptr2 with elptr1    */
  replace_element_check_pointer(edgelist_pointer, saveptr,
             elptr2, elptr1);

  return(TRUE);
}

/*------------------------------------------------------------*/
/*
** STATIC! (USED BY SWAP ONLY!!)
*/

static Edgelist *replace_element_check_pointer(
    edgelist_pointer, check_pointer, element1, element2)
Edgelist    *edgelist_pointer, *check_pointer;
Element        *element1, *element2;
{
  short     offset;

  /* replace element1 with element2 */
  offset = 0;

  while (*edgelist_pointer != ELEMNULL) {
          if (offset == LIST_SIZE - 1) {
             edgelist_pointer = (Edgelist *)*edgelist_pointer;
            offset = 0;
            continue;
          }
          if (edgelist_pointer != check_pointer
```

```
                        && *edgelist_pointer == element1) {
                    *edgelist_pointer = element2;
                    return(edgelist_pointer);
                }
                ++edgelist_pointer;
                ++offset;
    }
}

/*------------------------------------------------------------*/
/*
** DONT LOOK AT THIS MR. APPLICATION PROGRAMMER.
*/

static void move_edgelist_down(edgelist_pointer, element_count, offset)
Edgelist    *edgelist_pointer;
short            element_count, offset;
{
    short      loopcount, off, offcount, i;
    Edgelist   *edge_top,  *nextlist;


    /* Since there are no backlist pointers, this has to be done    */
    /* incrementally. But insertion is the only thing which is       */
    /* subject to this technique, so NO, ETHAN, we aren't putting   */
    /* backlist pointers in!!!!!                                            */

    loopcount = element_count - offset;              /* element count from before add */

    edge_top = edgelist_pointer;
    for (i=0; i<loopcount; ++i) {
                off = offcount = 0;
                edgelist_pointer = edge_top;

                while (*edgelist_pointer != ELEMNULL) {
                  if (off == LIST_SIZE - 1) {
                            edgelist_pointer = (Edgelist *)*edgelist_pointer;
                            off = 0;
                            continue;
```

```
            }
            if (offcount == offset + loopcount - 1) {
                    if (off == LIST_SIZE - 2) {
                        nextlist = (Edgelist *)*(edgelist_pointer + 1);
                        *nextlist = *edgelist_pointer;
                    } else { /* remember, space has been opened up! */
                        *(edgelist_pointer + 1) = *edgelist_pointer;
                    }
                    break;
            }
            ++edgelist_pointer;
            ++off;
            ++offcount;
          }
          --offset;
  }
}

/* DO NOT PLACE ANY FUNCTIONS AFTER RCS LOG!
$Log:      soapedit.c,v $
 * Revision 2.2  90/10/17  14:05:09  dan
 * Things for Vertex SWAP flag in status words...
 *
 * Revision 2.1  90/10/05  10:30:11  dan
 * New Rev
 *
 * Revision 1.3  90/09/25  14:14:17  dan
 * Added #defines for MASKS
 *
 * Revision 1.2  90/08/30  13:43:42  dan
 * Actually wrote "reverse_edgelist" -- empty function till now.
 *
 * Revision 1.1  90/08/17  18:23:23  dan
 * Initial revision
 *
*/
```

User: MICRORENTMind

Application: PrintMonitor

Document: soapfilm.c

Date: Wednesday, November 14, 1990

Time: 8:00:54 PM

Printer: Peace of Mind

```
/*
** SOAPFILM.C
**
** Lowest level memory management for SOAP database.
** The applications programmer shouldn't be calling these directly!
**
** Copyright 1990, by VPL Research.
**
$Header: /usr/starch/source/starch/RCS/soapfilm.c,v 2.1 90/10/05 10:30:12 dan Exp $
**
*/

#include <stdio.h>
#include <malloc.h>
#include "soap.h"


/* from SOAPQRY.C */
extern short get_edgelist_element_count();
extern short get_polylist_length();
extern short get_childlist_count();

Edgelist   *find_element();
void        sever_part_from_parent();
void        delete_polylist_down();
Part        *add_part_parent();
short       add_new_element();
void        edgelist_close();
void        clean_up_polylist();
Edgelist   *add_new_edgelist();
short       clean_out_element();
short       delete_poly_status();

/* STATIC FUNCTIONS */
static Edgelist    *check_edgelists_for_element();
static void        polylist_close();
static void        clean_up_childlist();
static void        childlist_close();
static void        add_new_childlist();
```

```
/* from SOAPSCUM.C */
extern Soap_Object      soap_object[];

/*-------------------------------------------------------------*/
/*
**
*/

Part *add_part_parent(parent)
Part         *parent;
{
   Childlist  *childptr,  *nextlist;
   Part       *partptr;
   short      count;


   if (parent->child_top == CHILDNULL) {
            add_new_childlist(parent);
   }

   /* parent assumed valid (test elsewhere)          */
   childptr = parent->child_top;

   /* go through Childlist until NULL found          */
   count = 0;

   /* polylist has already been malloced and first entry set to NULL */
   while (*childptr != PARTNULL) {
            if (count == LIST_SIZE - 1) {
                childptr = (Childlist *)*childptr;
                count = 0;
                continue;
            }
            ++childptr;
            ++count;
   } /* go through list until we find a NULL */

   if (count == LIST_SIZE - 1) {
```

```
                /* malloc a new childlist for new child */
                *childptr = (Part *)malloc(10 * sizeof(Part *));
                /* set first entry to NULL */
                nextlist = (Childlist *)*childptr;
                childptr = nextlist;
    }

    /* malloc a new part!  */
    *childptr = (Part *)malloc(sizeof(Part));
    *(childptr + 1) = PARTNULL;

    return(*childptr);
}

/*-------------------------------------------------------------*/
/*
** (RECURSIVE)
*/

void edgelist_close(offset, element_count, cur_count, edgelist_pointer)
short           offset, element_count, cur_count;
Edgelist    *edgelist_pointer;
{
    Edgelist  *nextlist;
    short      i;


    /* a PENDING element has been found. Close up the list */
    /* and de-allocate if necessary                        */

    for (i=cur_count; i<element_count; ++i) {
            if (offset == LIST_SIZE - 2) {
              if (*(edgelist_pointer + 1) != ELEMNULL) {
                        /* transfer element from next list */
                        nextlist = (Edgelist *)*(edgelist_pointer + 1);
                        *edgelist_pointer = *nextlist;
                        /* check for only one entry in nextlist!           */
                        /* if so, free next list and set #10 to NULLPTR */
                        if (*(nextlist + 1) == ELEMNULL) {
                          *(edgelist_pointer + 1) = ELEMNULL;
```

```
                        free(nextlist);
                        break;      /* anticipates final iteration          */
                    } else {    /* else keep chuggin!                       */
                        /* recurse into next list                                   */
                        edgelist_pointer = nextlist;
                        edgelist_close(0, element_count, i+1, edgelist_pointer);
                        break;      /* break up the chain of calls          */
                    }
            } else { /* next is NULLPTR */
                    *edgelist_pointer = ELEMNULL;
            }
          } else { /* not at end of list yet */
              *edgelist_pointer = *(edgelist_pointer + 1);
              ++edgelist_pointer;
              ++offset;
          }
  }
}

/*---------------------------------------------------------------*/
/*
** The applications programmer should not have access to this function,
** which is why it's in SOAPFILM.C and not SOAPSCUM.C!!
** Looks for edgelist_pointer and deletes it. Closes up polylist.
*/

void clean_up_polylist(part, edgelist_pointer)
Part        *part;
Edgelist    *edgelist_pointer;
{
   Polylist  *polyptr;
   short     bigcount, poly_count, offset, found;


   polyptr = part->poly_top;
   bigcount = offset = 0;

   /* first, look for passed edgelist pointer                       */
   found = FALSE;
```

```
while (*polyptr != EDGENULL) {
            if (offset == LIST_SIZE - 1) {
                polyptr = (Polylist *)*polyptr;
               offset = 0;
               continue;
            }

            if (*polyptr == edgelist_pointer) {  /* found it!      */
              found = TRUE;
              break;
            }

   ++polyptr;
   ++offset;
            ++bigcount;
 }

 /* then, delete and close up....                                   */
 if (found) {
            poly_count = get_polylist_length(part);

            polylist_close(offset, poly_count, bigcount, polyptr);

            if (*(part->poly_top) == EDGENULL) {
               /* no more polys for this part!!      */
                free(part->poly_top);
              part->poly_top = POLYNULL;
            }
  } /* if passed edgelist pointer is found...        */
}

/*-----------------------------------------------------------*/
/*
**
*/

Edgelist *add_new_edgelist(part)
Part          *part;
{
```

```
 Polylist  *polyptr, *nextlist;
Edgelist  *newlist;
short     count;

count = 0;
 polyptr = part->poly_top;

/* polylist has already been malloced and first entry set to NULL */
while (*polyptr != EDGENULL) {
          if (count == LIST_SIZE - 2) { /* go to next list */
            if (*(polyptr + 1) != EDGENULL) {
                      polyptr = (Polylist *)*(polyptr + 1);
                      count = 0;
            } else {
                      ++polyptr;
                      ++count;
            }
          } else {
             ++polyptr;
            ++count;
          }
} /* go through list until we find a NULL */

if (count == LIST_SIZE - 1) {
          /* malloc a new polylist for new edge */
          *polyptr = (Edgelist *)malloc(10 * sizeof(Edgelist *));
          /* set first entry to NULL */
          nextlist = (Polylist *)*polyptr;
          polyptr = nextlist;
}

 /* set polyptr to new edgelist! */
 *polyptr = (Edgelist *)malloc(10 * sizeof(Element *));
*(polyptr + 1) = EDGENULL;
 newlist = *polyptr;
*newlist = ELEMNULL;

 return(newlist);
}
```

```
/*------------------------------------------------------------*/
/*
**
*/

short add_new_element(elptr, edgelist_pointer)
Element       *elptr;
Edgelist   *edgelist_pointer;
{
  short      count, elcount;
  Edgelist  *nextlist;

  elcount = count = 0;

  /* polylist has already been malloced and first entry set to NULL */
  while (*edgelist_pointer != ELEMNULL) {
          if (*edgelist_pointer == elptr)          /* already in the list!!     */
            return(BADINDEX);

          if ((count % LIST_SIZE) == LIST_SIZE - 2) { /* go to next list */
            if (*(edgelist_pointer + 1) != ELEMNULL) {
                    edgelist_pointer = (Edgelist *)*(edgelist_pointer + 1);
                    count = 0;
            } else {
                    ++edgelist_pointer;
                    ++count;
            }
          } else {
             ++edgelist_pointer;
            ++count;
          }
          ++elcount;
  } /* go through list until we find a NULL */

  if (count == LIST_SIZE - 1) {
          /* malloc a new edgelist for new element */
          *edgelist_pointer = (Element *)malloc(10 * sizeof(Element *));
          /* set first entry to NULL */
          nextlist = (Edgelist *)*edgelist_pointer;
```

```
            edgelist_pointer = nextlist;
  }

   *edgelist_pointer = elptr;
  *(edgelist_pointer + 1) = ELEMNULL;

  return(elcount + 1);   /* include new element in count!          */
}

/*-----------------------------------------------------------*/
/*
** MAJOR FUNCTION, USED BY MOST DELETION ROUTINES.
*/

short clean_out_element(edgelist_pointer, elptr, part)
Edgelist    *edgelist_pointer;
Element        *elptr;
Part           *part;
{
  Edgelist  *edge_top;
  short       i, element_count, offset, found;


   edge_top = edgelist_pointer;

   element_count = get_edgelist_element_count(edgelist_pointer);
  offset = 0;
  found = FALSE;

  /* find offset of this lineptr in edgelist */
  for (i=0; i<element_count; ++i) {
            if (*edgelist_pointer == elptr) {
               found = TRUE;
               break;
            }

            if (offset == LIST_SIZE - 2) {
               if (*(edgelist_pointer + 1) != ELEMNULL) {
                       /* go to next record */
```

```
                    edgelist_pointer = (Edgelist *)*(edgelist_pointer + 1);
                    offset = 0;
                } else {
                    ++edgelist_pointer;
                    ++offset;
                }
            } else {
                ++edgelist_pointer;
                ++offset;
            }
    }

    /* couldn't find element!                    */
    if (!found)
            return(BADINDEX);

    elptr->status = UNUSED;
    edgelist_close(offset, element_count, i, edgelist_pointer);

    if (*edge_top == ELEMNULL) {
            /* no more edges for this polygon!!             */
        free(edge_top);

            /* find the edgelist_pointer in poly_record */
            clean_up_polylist(part, edge_top);

            return(0);
    }

    return(get_edgelist_element_count(edge_top));
}

/*-------------------------------------------------------*/
/*
** (SUBSET OF delete_polylist_down.)
*/
short delete_poly_status(edgelist_pointer, part)
Edgelist    *edgelist_pointer;
Part        *part;
```

```
{
  short      offset, element_count, i;
  Element   *elptr;

   element_count = get_edgelist_element_count(edgelist_pointer);
  /* set all elements in edgelist to UNUSED */

  offset = 0;
  for (i=0; i<element_count; ++i) {
     elptr = *edgelist_pointer;
    elptr->status = UNUSED;

     /* zero offset, zero position, same location for all iters     */
           edgelist_close(offset, element_count - i, 0, edgelist_pointer);

     /* since everything has been moved into current spot, no   */
    /* need to increment!                                                         */
  }
  /* free zero-length edgelist          */
  free(edgelist_pointer);
  /* remove from polylist                        */
   clean_up_polylist(part, edgelist_pointer);

  return(get_polylist_length(part));
}

/*-------------------------------------------------------------*/
/*
** We get here for a terminal or empty-childlisted part only!
*/
void sever_part_from_parent(part, object_index)
Part       *part;
short      object_index;
{
  /* close up parent's childlist for this part    */
  /* check for root */

  if (part->child_top != CHILDNULL) {
           /* de-allocate childlist chunks                        */
           free(part->child_top);
```

```
  }

  /* This also resets elements and deletes edgelists                */
  if (part->poly_top != POLYNULL) {
          delete_polylist_down(part);
  }

  /* at this point, everything's de-allocated.       */
  /* free up part and remove from parent's childlist*/
  /* part == root ???? */
  if (part->parent == PARTNULL) {
          soap_object[object_index].root = PARTNULL;
  } else {
          clean_up_childlist(part->parent, part);
  }
}



/*-----------------------------------------------------------*/
/*
**
*/
void delete_polylist_down(part)
Part        *part;
{
  Element   *elptr;
  Edgelist  *edgelist_pointer;
  Polylist  *polyptr, *polytop;
  short     i, k, element_count, poly_count, offset;

   poly_count = get_polylist_length(part);
   polyptr = part->poly_top;

  for (k=0; k<poly_count; ++k) {
      element_count = get_edgelist_element_count(*polyptr);
          /* set all elements in edgelist to UNUSED */
          edgelist_pointer = *polyptr;
```

```
            offset = 0;
            for (i=0; i<element_count; ++i) {
                elptr = *edgelist_pointer;
               elptr->status = UNUSED;

                /* zero offset, zero position, same location for all iters        */
                edgelist_close(offset, element_count - i, 0, edgelist_pointer);

                /* since everything has been moved into current spot, no      */
               /* need to increment!                                                  */
            }
            /* free zero-length edgelist              */
            free(*polyptr);
            /* remove from polylist                   */
            clean_up_polylist(part, *polyptr);
    } /* for all polygons */

    /* free zero-length polylist */
    free(polyptr);

   part->poly_top = POLYNULL;
}


/*--------------------------------------------------------------*/
/*
** (RECURSIVE)
*/

Edgelist *find_element(part, elptr)
Part          *part;
Element      *elptr;
{
    short       childcount, count, i;
    Childlist  *childptr, *nextptr;
    Edgelist   *retedge;

    /* descend the hierarchy! */

     childcount = get_childlist_length(part);
```

```
  childptr = part->child_top;

  /* function always called with valid part, so this is OK */
  retedge = check_edgelists_for_element(part, elptr);

  if (retedge != EDGENULL)
     return(retedge);   /* otherwise, keep going */

  count = 0;
  for (i=0; i<childcount; ++i) {
        if (*childptr == PARTNULL)
           break;

        /* skip to next list if necessary */
        if (count == LIST_SIZE - 1) {
            childptr = (Childlist *)*childptr;
           count = 0;
        }

        /* recurse to terminal node and check along the way */
        retedge = find_element(*childptr, elptr);
        if (retedge != EDGENULL)
           break;      /* break out if found */

        ++count;
        ++childptr;
  }

  return(retedge);
}

/*-----------------------------------------------------------*/
/*
**
*/
static Edgelist *check_edgelists_for_element(part, elptr)
Part        *part;
Element     *elptr;
{
```

```
short       offset, off2;
Polylist   *polyptr;
Edgelist   *edgeptr;

if (part->poly_top == POLYNULL)
           return(EDGENULL);

if (*(part->poly_top) == EDGENULL)
           return(EDGENULL);

offset = 0;
polyptr = part->poly_top;

while (*polyptr != EDGENULL) {
           if (offset == LIST_SIZE - 1) {
              polyptr = (Polylist *)*polyptr;
              offset = 0;
              continue;
           }
           edgeptr = *polyptr;
           off2 = 0;
           while (*edgeptr != ELEMNULL) {
             if (off2 == LIST_SIZE - 1) {
                      edgeptr = (Edgelist *)*edgeptr;
                      off2 = 0;
                      continue;
             }
             if (*edgeptr == elptr)
                      return(edgeptr);
             ++off2;
             ++edgeptr;
           }
           ++offset;
           ++polyptr;
}
/* didn't find it. Oh sorrow. */
return(EDGENULL);
}

/*-----------------------------------------------------------------*/
```

```
/*
** (RECURSIVE)
*/
static void polylist_close(offset, poly_count, cur_count, polyptr)
short           offset, poly_count, cur_count;
Polylist    *polyptr;
{
  short     i;
  Polylist  *nextlist;

  for (i=cur_count; i<poly_count; ++i) {
    if (offset == LIST_SIZE - 2) {
          if (*(polyptr + 1) != EDGENULL) {
            /* transfer element from next list */
            nextlist = (Polylist *)*(polyptr + 1);
            *polyptr = *nextlist;
            /* check for only one entry in nextlist!        */
            /* if so, free next list and set #10 to NULLPTR */
            if (*(nextlist + 1) == EDGENULL) {
                  *(polyptr + 1) = EDGENULL;
                  free(nextlist);
                  /* we've already transfered real value.        */
                  /* this anticipates next iteration, so break*/
                  break;
            } else {  /* keep chuggin'                       */
                  /* recurse into next list by God.              */
                  polyptr = nextlist;
                  polylist_close(0, poly_count, i+1, polyptr);
                  break;  /* break up the chain */
                }
          } else { /* next is NULLPTR */
                *polyptr = EDGENULL;  /* i.e., plus 1          */
          }
        } else { /* we're not to end of list yet.            */
          *polyptr = *(polyptr + 1);
          ++polyptr;
          ++offset;
        }
  } /* for all elements in list */
```

```
}

/*----------------------------------------------------------*/
/*
** DELETE SPECIFIED ENTRY FROM CHILDLIST
*/

static void clean_up_childlist(parent, delpart)
Part        *parent, *delpart;
{
   Childlist  *childptr, *nextlist;
   short      child_count, offset, found, bigcount;


   childptr = parent->child_top;
   if (childptr == CHILDNULL)
              return;

   /* first, look for passed edgelist pointer                        */
   found = FALSE;
   bigcount = offset = 0;

   while (*childptr != PARTNULL) {
              if (offset == LIST_SIZE - 1) {
                  childptr = (Childlist *)*childptr;
                  offset = 0;
                  continue;
              }

              if (*childptr == delpart) {  /* found it! */
                  found = TRUE;
                  break;
              }

              ++childptr;
      ++offset;
              ++bigcount;
   }

   /* then, delete and close up....                                  */
```

```
  if (found) {
      child_count = get_childlist_length(parent);

              childlist_close(offset, child_count, bigcount, childptr);

              if (*(parent->child_top) == PARTNULL) {
                 /* no more children for this part!!   */
                 free(parent->child_top);
                parent->child_top = CHILDNULL;
              }
   } /* if passed edgelist pointer is found...          */
}

/*--------------------------------------------------------------*/
/*
** (RECURSIVE)
*/

static void childlist_close(offset, child_count, cur_count, childptr)
short           offset, child_count, cur_count;
Childlist   *childptr;
{
   short      i;
   Childlist  *nextlist;


   for (i=cur_count; i<child_count; ++i) {
     if (offset == LIST_SIZE - 2) {
                if (*(childptr + 1) != PARTNULL) {
                   /* transfer element from next list */
                   nextlist = (Childlist *)*(childptr + 1);
                   *childptr = *nextlist;
                   /* check for only one entry in nextlist!          */
                  /* if so, free next list and set #10 to NULLPTR */
                  if (*(nextlist + 1) == PARTNULL) {
                             *(childptr + 1) = PARTNULL;
                              free(nextlist);
                             break;     /* anticipates next iteration             */
                         } else {       /* keep chuggin'                          */
```

```
                        childptr = nextlist;
                         childlist_close(0, child_count, i+1, childptr);
                        break;      /* break up the chain                    */
                    }
            } else { /* next is NULLPTR */
                    *childptr = PARTNULL;
            }
        } else { /* we're not to end of list yet.                */
            *childptr = *(childptr + 1);
            ++childptr;
            ++offset;
    }
  } /* for all elements in list */
}

/*-----------------------------------------------------------*/
/*
**
*/

static void add_new_childlist(part)
Part          *part;
{

   part->child_top = (Childlist *)malloc(10 * sizeof(Part *));
  *(part->child_top) = PARTNULL;

}

/* DO NOT PLACE ANY FUNCTIONS AFTER RCS LOG!
$Log:       soapfilm.c,v  $
 * Revision 2.1  90/10/05  10:30:12  dan
 * New Rev
 *
 * Revision 1.2  90/08/22  11:58:45  dan
 * Major bug fix in sever_part_parent()
 *
 * Revision 1.1  90/08/17  18:23:38  dan
 * Initial revision
```

```
*
*/
```

User: MICRORENTMind

Application: PrintMonitor

Document: soapnorm.c

Date: Wednesday, November 14, 1990

Time: 8:05:08 PM

Printer: Peace of Mind

```
/*
** SOAPNORM.C
**
** Normal deletion routines for the SOAP database.
**
** Copyright 1990, by VPL Research.
**
$Header: /usr/starch/source/starch/RCS/soapnorm.c,v 2.1 90/10/05 10:30:14 dan Exp $
**
*/

#include <stdio.h>
#include <malloc.h>
#include "soap.h"

/* from SOAPFILM.C */
extern short clean_out_element();
extern short delete_poly_status();
extern void sever_part_from_parent();

/* from SOAPQRY.C */
extern short get_childlist_length();
extern short get_polylist_length();
extern short get_edgelist_element_count();
extern short get_edgelist_line_count();
extern short get_edgelist_arc_count();
extern Edgelist        *get_poly_offset();
extern Element         *get_edgelist_offset();

/* NORMAL DELETE */
Part          *delete_part();
short          delete_poly();
short          delete_poly_offset();
short          delete_poly_last_n();
short          delete_poly_last();
short          delete_line();
short          delete_arc();
short          delete_cylinder();
short          delete_line_last();
```

```
short           delete_line_last_n();
short           delete_arc_last();
short           delete_arc_last_n();
short           delete_element_last();
short           delete_element_last_n();
short           delete_element_offset();

/* from SOAPSCUM.C   */
extern Soap_Line        soap_line[];
extern Soap_Arc                         soap_arc[];
extern Soap_Cylinder    soap_cylinder[];

/*--------------------------------------------------------------*/
/*
** ACTUAL DELETION
** Same as above except that lists are de-allocated and the part is
** de-allocated and the parent part's childlist is set to NULLPTR if
** this is the last part in childlist.
** RETURNS: Pointer to parent part.
*/
Part *delete_part(part, object_index)
Part        *part;
short       object_index;
{
   short      childcount, count, i;
   Childlist  *childptr;
   Part       *parent;


   /* descend hierarchy   */
   /* for all children... */

   parent = part->parent;
   childcount = get_childlist_length(part);

   childptr = part->child_top;
   count = 0;

   for (i=0; i<childcount; ++i) {
```

```
            delete_part(*childptr, object_index);
            /* the childlist is closed up so no need to increment */
    }

    /* if terminal, or if childlist empty...                    */
    if (childcount == 0 || part->child_top == CHILDNULL) {
            /* send object index in case of root.  */
            sever_part_from_parent(part, object_index);
            free(part);
    }
    return(parent);
}

/*--------------------------------------------------------------*/
/*
** ACTUAL DELETION
** Set status words of elements in passed edgelist to UNUSED.
** De-allocate all edgelist records. Close up polylist after deleting
** edgelist pointer from it.
** RETURNS: number of elements in polylist, or zero if polylist empty.
*/
short delete_poly(edgelist_pointer, part)
Edgelist    *edgelist_pointer;
Part              *part;
{
    return(delete_poly_status(edgelist_pointer, part));
}

/*--------------------------------------------------------------*/
/*
** ACTUAL DELETION.
** Set element status words of edgelist whose pointer resides at offset
** to UNUSED. Delete edgelist records. Close up polylist after
** deleting edgelist pointer. If last poly, set poly_top to NULLPTR
** and delete polylist.
** RETURNS: number of elements in polylist, or zero if polylist empty.
*/
short delete_poly_offset(part, offset)
Part        *part;
short       offset;
```

```
{
  short      polycount;
  Edgelist   *edgelist_pointer;

   polycount = get_polylist_length(part);

  if (offset >= polycount)
            return(BADINDEX);

  /* translate the offset into an Edgelist *          */
   edgelist_pointer = get_poly_offset(part, offset);
  if (edgelist_pointer == EDGENULL)
            return(BADINDEX);

   return(delete_poly_status(edgelist_pointer, part));
}

/*-------------------------------------------------------------*/
/*
** ACTUAL DELETION
** As above, except delete the last n edgelists and their pointers
** from the polylist. Set elements to UNUSED.
** RETURNS: number of elements in polylist, or zero if polylist empty.
*/
short delete_poly_last_n(part, count)
Part        *part;
short       count;
{
  short      polycount, i, offset;
  Edgelist   *edgelist_pointer;

  /* first make sure there are n elements!            */
   if ((polycount = get_polylist_length(part)) < count)
            return(-1);

  offset = polycount - count;          /* stays constant as list is closed */

  /* start deleting at polycount - count */
  for (i=0; i<count; ++i) {
```

```
            edgelist_pointer = get_poly_offset(part, offset);
            delete_poly_status(edgelist_pointer, part);
  }
   return(get_polylist_length(part));
}

/*----------------------------------------------------------------*/
/*
** ACTUAL DELETION
** As above. Except for last entry of polylist only.
** RETURNS: number of elements in polylist, or zero if polylist empty.
*/
short delete_poly_last(part)
Part        *part;
{
   short       polycount, i, offset;
   Edgelist    *edgelist_pointer;

   /* first make sure there are n elements!          */
    if ((polycount = get_polylist_length(part)) < 1)
            return(-1);

   offset = polycount - 1;

    edgelist_pointer = get_poly_offset(part, offset);

    return(delete_poly_status(edgelist_pointer, part));
}

/*----------------------------------------------------------------*/
/*
** ACTUAL DELETION
** Set element status to UNUSED. Close up and de-allocate if necessary.
** RETURNS: number of elements in edgelist, or BADINDEX if line_index
** not found or out of range.
*/

short delete_line(edgelist_pointer, line_index, part)
Edgelist    *edgelist_pointer;
short           line_index;
```

```
Part            *part;
{
   Element *elptr;

   if (line_index >= MAX_LINE)
            return(BADINDEX);

   soap_line[line_index].status = UNUSED;       /* sets entire thing to 0   */

   elptr = (Element *)&(soap_line[line_index]);

   return(clean_out_element(edgelist_pointer, elptr, part));
}

/*-----------------------------------------------------------------*/
/*
** ACTUAL DELETION
** Set element status to UNUSED. Close up and de-allocate. Set poly_top
** to NULLPTR if last element of last poly.
** RETURNS: number of elements in edgelist, or BADINDEX if arc_index
** not found or out of range.
*/

short delete_arc(edgelist_pointer, arc_index, part)
Edgelist     *edgelist_pointer;
short           arc_index;
Part            *part;
{
   Element *elptr;


   if (arc_index >= MAX_ARC)
            return(BADINDEX);

   soap_arc[arc_index].status = UNUSED;         /* sets entire thing to 0   */

   elptr = (Element *)&(soap_arc[arc_index]);

   return(clean_out_element(edgelist_pointer, elptr, part));
```

```
}

/*--------------------------------------------------------------*/
/* ACTUAL DELETION
** Delete cylinder from the passed edgelist. Close up and de-allocate
** if necessary. Set poly_top to NULLPTR if last element of last poly.
** Set element to UNUSED.
** RETURNS: number of elements in edgelist, or BADINDEX if cylinder_index
** not found.
*/
short delete_cylinder(edgelist_pointer, cylinder_index, part)
Edgelist    *edgelist_pointer;
short           cylinder_index;
Part            *part;
{
   Element *elptr;


   if (cylinder_index >= MAX_CYLINDER)
             return(BADINDEX);

   soap_cylinder[cylinder_index].status = UNUSED; /* sets entire thing to 0   */

   elptr = (Element *)&(soap_cylinder[cylinder_index]);

   return(clean_out_element(edgelist_pointer, elptr, part));
}

/*--------------------------------------------------------------*/
/*
** ACTUAL DELETION
** RETURNS: number of lines in edgelist, or zero if no more lines.
*/
short delete_line_last(edgelist_pointer, part)
Edgelist    *edgelist_pointer;
Part            *part;
{
   Edgelist   *edge_top;
   Element   *linelast;
   short       line_count, i, offset;
```

```
  /* find last occurance of line entity   */
   line_count = get_edgelist_line_count(edgelist_pointer);
  if (line_count < 1)
            return(-1);

   edge_top = edgelist_pointer;
  linelast = ELEMNULL;

  offset = 0;
  while (*edgelist_pointer != ELEMNULL) {
            if (offset == LIST_SIZE - 1) {
                edgelist_pointer = (Edgelist *)*edgelist_pointer;
               offset = 0;
               continue;
            }
            if (((*edgelist_pointer)->status & NOGEOMASK) == SOAP_LINE) {
                linelast = *edgelist_pointer;
            }
            ++edgelist_pointer;
            ++offset;
  }
  if (linelast != ELEMNULL)
            return(clean_out_element(edge_top, linelast, part));
}

/*------------------------------------------------------------------*/
/*
** ACTUAL DELETION
** RETURNS: BADINDEX if count out of range.
*/

short delete_line_last_n(edgelist_pointer, count, part)
Edgelist    *edgelist_pointer;
short          count;
Part            *part;
{
  Edgelist  *edge_top;
  short       line_count, i, offset, precount;
```

```
/* find last occurance of line entity */
 line_count = get_edgelist_line_count(edgelist_pointer);
if (line_count < count)
        return(BADINDEX);

 edge_top = edgelist_pointer;

offset = 0;
precount = 0;

while (*edgelist_pointer != ELEMNULL) {
        if (offset == LIST_SIZE - 1) {
            edgelist_pointer = (Edgelist *)*edgelist_pointer;
            offset = 0;
            continue;
        }
        if (((*edgelist_pointer)->status & NOGEOMASK) == SOAP_LINE) {
            if (precount == line_count - count)
                    break;
            ++precount;
        }
        ++edgelist_pointer;
        ++offset;
}

while (*edgelist_pointer != ELEMNULL) {
        if (offset == LIST_SIZE - 1) {
            edgelist_pointer = (Edgelist *)*edgelist_pointer;
            offset = 0;
            continue;
        }
        if (((*edgelist_pointer)->status & NOGEOMASK) == SOAP_LINE) {
            clean_out_element(edge_top, *edgelist_pointer, part);
            ++precount;
        } else { /* leave edgelist at current offset after close */
            ++edgelist_pointer;
            ++offset;
```

```
		}
	}
	return(OK);
}

/*---------------------------------------------------------------*/
/*
** ACTUAL DELETION
** RETURNS: number of arcs in edgelist, or zero if no more arcs.
*/

short delete_arc_last(edgelist_pointer, part)
Edgelist	*edgelist_pointer;
Part		*part;
{
	Edgelist	*edge_top;
	Element	*arclast;
	short	arc_count, i, offset;

	/* find last occurance of arc entity	*/
	arc_count = get_edgelist_arc_count(edgelist_pointer);
	if (arc_count < 1)
		return(-1);

	edge_top = edgelist_pointer;
	arclast = ELEMNULL;

	offset = 0;
	while (*edgelist_pointer != ELEMNULL) {
		if (offset == LIST_SIZE - 1) {
			edgelist_pointer = (Edgelist *)*edgelist_pointer;
			offset = 0;
			continue;
		}
		if (((*edgelist_pointer)->status & NOGEOMASK) == SOAP_ARC) {
			arclast = *edgelist_pointer;
		}
		++edgelist_pointer;
		++offset;
	}
```

```
  if (arclast != ELEMNULL)
            return(clean_out_element(edge_top, arclast, part));
}

/*-------------------------------------------------------------*/
/*
** ACTUAL DELETION
** RETURNS: BADINDEX if count out of range.
*/

short delete_arc_last_n(edgelist_pointer, count, part)
Edgelist    *edgelist_pointer;
short        count;
Part         *part;
{
  Edgelist  *edge_top;
  short      arc_count, i, offset, precount;


  /* find last occurance of arc entity   */
   arc_count = get_edgelist_arc_count(edgelist_pointer);
  if (arc_count < count)
            return(-1);

   edge_top = edgelist_pointer;

  offset = 0;
  precount = 0;

  while (*edgelist_pointer != ELEMNULL) {
            if (offset == LIST_SIZE - 1) {
                edgelist_pointer = (Edgelist *)*edgelist_pointer;
               offset = 0;
               continue;
            }
            if (((*edgelist_pointer)->status & NOGEOMASK) == SOAP_ARC) {
               if (precount == arc_count - count)
                         break;
               ++precount;
```

```
            }
            ++edgelist_pointer;
            ++offset;
  }

  while (*edgelist_pointer != ELEMNULL) {
            if (offset == LIST_SIZE - 1) {
                edgelist_pointer = (Edgelist *)*edgelist_pointer;
                offset = 0;
                continue;
            }
            if (((*edgelist_pointer)->status & NOGEOMASK) == SOAP_ARC) {
                clean_out_element(edge_top, *edgelist_pointer, part);
                ++precount;
            } else { /* leave edgelist at current offset after close */
                ++edgelist_pointer;
                ++offset;
            }
  }
  return(OK);
}

/*-----------------------------------------------------------------*/
/*
** ACTUAL DELETION
** Delete the last element of an edgelist.
** RETURNS: number of elements in edgelist, or zero if edgelist empty.
*/
short delete_element_last(edgelist_pointer, part)
Edgelist    *edgelist_pointer;
Part           *part;
{
  Element   *elptr;
  short       element_count, offset;

   element_count = get_edgelist_element_count(edgelist_pointer);
  if (element_count < 1)
            return(-1);

  offset = element_count - 1;
```

```
   elptr = get_edgelist_offset(edgelist_pointer, offset);
   return(clean_out_element(edgelist_pointer, elptr, part));
}

/*------------------------------------------------------------*/
/*
** ACTUAL DELETION
** Delete last n elements from edgelist.
** RETURNS: number of elements in edgelist, or zero if edgelist empty.
*/

short delete_element_last_n(edgelist_pointer, count, part)
Edgelist    *edgelist_pointer;
short        count;
Part         *part;
{
   short      elemcount, i, offset;
   Element   *elptr;

   /* first make sure there are n elements!            */
   if ((elemcount = get_edgelist_element_count(edgelist_pointer)) < count)
           return(-1);

   offset = elemcount - count;           /* stays constant as list is closed */

   /* start deleting at elemcount - count */
   for (i=0; i<count; ++i) {
           elptr = get_edgelist_offset(edgelist_pointer, offset);
           clean_out_element(edgelist_pointer, elptr, part);
   }
   return(get_edgelist_element_count(edgelist_pointer));
}

/*------------------------------------------------------------*/
/*
** ACTUAL DELETION
** Delete element at passed offset in passed edgelist.
** RETURNS: number of elements in edgelist, or zero if edgelist empty.
```

```
*/
short delete_element_offset(edgelist_pointer, offset, part)
Edgelist    *edgelist_pointer;
short          offset;
Part           *part;
{
  Element  *elptr;


   elptr = get_edgelist_offset(edgelist_pointer, offset);
  if (elptr != ELEMNULL)
           return(clean_out_element(edgelist_pointer, elptr, part));
  else
           return(-1); /* offset BAD */
}

/* DO NOT PLACE ANY FUNCTIONS AFTER RCS LOG!
$Log:      soapnorm.c,v $
 * Revision 2.1  90/10/05  10:30:14  dan
 * New Rev
 *
 * Revision 1.2  90/09/25  14:14:31  dan
 * Added #defines for MASKS
 *
 * Revision 1.1  90/08/17  18:24:09  dan
 * Initial revision
 *
*/
```

| | |
|---|---|
| User: | MICRORENTMind |
| Application: | PrintMonitor |
| Document: | soapprod.c |
| Date: | Wednesday, November 14, 1990 |
| Time: | 8:07:09 PM |
| Printer: | Peace of Mind |

```
/*
** SOAPPROD.C
**
** Display a shaded version of the current SOAP database
**
** Copyright 1990, VPL Research
**
$Header: /usr/starch/source/starch/RCS/soapprod.c,v 2.1 90/10/05 10:30:15 dan Exp $
**
*/

#include <stdio.h>
#include <gl/gl.h>
#include <gl/device.h>
#include "prod.h"
#include "globals.h"

#define     YES     1
#define     NO      0

/* in COLOR.C */
extern void highlight_current_part();

/* in GRAPHUTIL.C */
extern short maxproductcoord();

/* in SOAP2IRIS.C */
extern void convert_to_iris();

void init_soap_rotm();
void set_soap_viewport();
void soap_view_update_swap();
void soap_view_update();
short do_soap_event();
void do_soap_rotate();
void rotate_soap_to_mouse();
void transform_current_soap();
void rotate_current_soap();
void rotate_to_current_soap();
```

```
void init_soap_persp();
void soap_reset_zoom();
void soap_set_ortho();
void save_current_rotm_soap();
void soap_init_offsets();


static float hottoplight[] = {
   LCOLOR, 0.7, 0.7, 0.7,
   POSITION, 0.0, 0.7, 0.4, 0.0,
  LMNULL
};

static float warmrightlight[] = {
   LCOLOR, 0.6, 0.6, 0.6,
   POSITION, 0.5, 0.2, 0.2, 0.0,
  LMNULL
};

static float coolbottomlight[] = {
   LCOLOR, 0.6, 0.6, 0.6,
   POSITION, 0.0, -0.4, 0.2, 0.0,
  LMNULL
};

static float coldleftlight[] = {
   LCOLOR, 0.5, 0.5, 0.5,
   POSITION, -0.4, -0.1, 0.1, 0.0,
  LMNULL
};

static short soap_maxval;
static short soap_xrot, soap_yrot, soap_zrot;
static short soap_portx1, soap_portx2, soap_porty1, soap_porty2;
static short soap_offset[3];

static Coord soap_ident[4][4] = {
   1.0, 0.0, 0.0, 0.0,    /* identity matrix */
   0.0, 1.0, 0.0, 0.0,
```

```
    0.0, 0.0, 1.0, 0.0,
    0.0, 0.0, 0.0, 1.0
};

static Coord soap_rotm[4][4] = {
    1.0, 0.0, 0.0, 0.0,    /* drawing rotation matrix */
    0.0, 1.0, 0.0, 0.0,
    0.0, 0.0, 1.0, 0.0,
    0.0, 0.0, 0.0, 1.0
};

static Coord soap_baserotm[4][4] = {
    1.0, 0.0, 0.0, 0.0,    /* starting rotation */
    0.0, 1.0, 0.0, 0.0,
    0.0, 0.0, 1.0, 0.0,
    0.0, 0.0, 0.0, 1.0
};

static Coord soap_deltarotm[4][4] = {
    1.0, 0.0, 0.0, 0.0,    /* delta rotation */
    0.0, 1.0, 0.0, 0.0,
    0.0, 0.0, 1.0, 0.0,
    0.0, 0.0, 0.0, 1.0
};

static Coord soap_transm[4][4] = {
    1.0, 0.0, 0.0, 0.0,    /* translation matrix */
    0.0, 1.0, 0.0, 0.0,
    0.0, 0.0, 1.0, 0.0,
    0.0, 0.0, 0.0, 1.0
};


/*--------------------------------------------------------------*/
void init_soap_rotm()
{
   soap_xrot = 0;
   soap_yrot = 1800;
   soap_zrot = 0;
   transform_current_soap();
```

```
    save_current_rotm_soap();
}

/*---------------------------------------------------------------*/
void soap_reset_zoom()
{
    soap_portx1 = -soap_maxval;
    soap_portx2 = soap_maxval;
    soap_porty1 = -soap_maxval;
    soap_porty2 = soap_maxval;
}

/*---------------------------------------------------------------*/
void init_soap_persp()
{
    soap_init_offsets();

   soap_maxval = maxproductcoord() * 0.6;
    soap_reset_zoom();


    set_soap_viewport();

  mmode(MVIEWING);

    ortho((float)soap_portx1,
              (float)soap_portx2,
              (float)soap_porty1,
              (float)soap_porty2, -30000.0, 30000.0);

   loadmatrix(soap_ident);            /* DDB BUG FIX */

    lookat(0.0, 0.0, 15000.0, 0.0, 0.0, 0.0, 0.0);

   lmdef(DEFLIGHT, 2, 10, hottoplight);
   lmdef(DEFLIGHT, 3, 10, warmrightlight);
   lmdef(DEFLIGHT, 4, 10, coolbottomlight);
   lmdef(DEFLIGHT, 5, 10, coldleftlight);
```

```
  lmbind(LIGHT1, 2);
  lmbind(LIGHT2, 3);
  lmbind(LIGHT3, 4);
  lmbind(LIGHT4, 5);

  mmode(MSINGLE);
   soap_set_ortho();

   /*init the translate matrix*/
   pushmatrix();
   loadmatrix(soap_ident);
     translate(soap_offset[0],soap_offset[1],soap_offset[2]);
    getmatrix(soap_transm);
   popmatrix();
}

/*-------------------------------------------------------------*/
void set_soap_viewport()
{
  viewport(SVIEWLEFT, SVIEWRIGHT, SVIEWBOT, SVIEWTOP);
}

/*-------------------------------------------------------------*/
void soap_view_update_swap()
{
   soap_view_update();
  swapbuffers();
}

/*-------------------------------------------------------------*/

void soap_view_update()
{
   pushmatrix();

    rotate_to_current_soap();

   /* matis view background color */
   c3s(mvcolor);
   clear();
```

```
   zclear();

    convert_to_iris(0);
    highlight_current_part();

   popmatrix();
}

/*-----------------------------------------------------*/
/*
** MOUSE IS IN SVIEWRECT
*/
short do_soap_event(dev, val)
Device      dev;
short       val;
{

  switch(dev) {
            case MIDDLEMOUSE:
              if (val == 0)
                        break;
              if(getbutton(ESCKEY)) {
                        break;
              }
               do_soap_rotate();
              qreset();
              return(YES);   /* something processed */
            case LEFTMOUSE:
            case RIGHTMOUSE:
              break;
            case REDRAW:
              break;
            case WINSHUT:
            case WINQUIT:
              break;
            case LEFTARROWKEY:
            case RIGHTARROWKEY:
            case UPARROWKEY:
            case DOWNARROWKEY:
```

```
		break;

  }
  return(NO);		/* nothing processed here */
}

/*------------------------------------------------------------*/
void do_soap_rotate()
{
   long startx,starty,axes;
  startx = getvaluator(MOUSEX); starty = getvaluator(MOUSEY);


   set_soap_viewport();

  zbuffer(TRUE);

#ifndef NOCONCAVE
  concave(TRUE);
#endif

   soap_view_update();

/*
  if(getbutton(ZKEY)){
		if(ctrl_key_p()) do_unzoom();
		else if(shift_key_p()) do_zoom_out();
		else do_zoom();
		return;
  }
   else */if(getbutton(XKEY)) axes=2;
   else axes=0;


  while(getbutton(MIDDLEMOUSE)){
		rotate_soap_to_mouse(startx,starty,axes);
  }

   soap_view_update();
```

```
  zbuffer(FALSE);

#ifndef NOCONCAVE
  concave(FALSE);
#endif

   save_current_rotm_soap();
}

/*-----------------------------------------------------------*/
/* this routine rotates relative to click time, around any 2 axes */
void rotate_soap_to_mouse(startx, starty, axes)
long startx,starty;
short axes;
{
   long mx,my;
   short xwidth,ywidth;

  xwidth = SVIEWWIDTH;
  ywidth = SVIEWHEIGHT;

  mx=getvaluator(MOUSEX);
  my=getvaluator(MOUSEY);

  if(axes == 0){
            soap_xrot = -((short) (((my - starty) * 3600 / ywidth) % 3600));
            soap_yrot = ((short) (((mx - startx) * 3600 / xwidth) % 3600));
            soap_zrot = 0;
  }
  else{
            soap_zrot = ((short) (((mx - startx) * 3600 / xwidth) % 3600));
            soap_yrot = 0;
            soap_xrot = 0;
  }

  mmode(MVIEWING);
   transform_current_soap();
  mmode(MSINGLE);
```

```
   soap_view_update_swap();
}

/*-----------------------------------------------------------*/
/* current rotation matrix M becomes M0R */
void transform_current_soap()
{
   loadmatrix(soap_ident);
   rotate_current_soap();
   getmatrix(soap_deltarotm);

   multmatrix(soap_baserotm);
   getmatrix(soap_rotm);
}

/*-----------------------------------------------------------*/
void rotate_current_soap()
{
   rotate(soap_xrot,'x');
   rotate(soap_yrot,'y');
   rotate(soap_zrot,'z');
}

/*-----------------------------------------------------------*/
/* this sets the top matrix to the current state */
/* need to update translate matrix before calling this */
/* it is not updated here because of 'pick' incompatibility */
void rotate_to_current_soap()
{
   soap_set_ortho();                    /* loads normalizing matrix */
   multmatrix(soap_rotm);
   multmatrix(soap_transm);
}

/*-----------------------------------------------------------*/
void soap_set_ortho()
{
   ortho((float)soap_portx1,
            (float)soap_portx2,
```

```
            (float)soap_porty1,
            (float)soap_porty2, -30000.0, 30000.0);

    lookat(0.0, 0.0, 15000.0, 0.0, 0.0, 0.0, 0.0);
}
/*------------------------------------------------------------*/
void save_current_rotm_soap()
{
    pushmatrix();
    loadmatrix(soap_rotm);
    getmatrix(soap_baserotm);
    popmatrix();
}

/*------------------------------------------------------------*/
/* these offsets will probably init to negative values */
void soap_init_offsets()
{
    soap_offset[0]=(product.origin.x - product.maxlng.x)/2 - product.origin.x;
    soap_offset[1]=(product.origin.y - product.maxlng.y)/2 - product.origin.y;
    soap_offset[2]=(product.origin.z - product.maxlng.z)/2;
}
/*------------------------------------------------------------*/
/*------------------------------------------------------------*/

/* DO NOT PLACE ANY FUNCTIONS AFTER RCS LOG!
$Log:    soapprod.c,v $
 * Revision 2.1  90/10/05  10:30:15  dan
 * New Rev
 *
 * Revision 1.9  90/10/01  21:06:02  ethan
 * better lights
 *
 * Revision 1.8  90/09/27  12:28:14  dan
 * Fixed lighting bug which caused light source to be
 * reversed on Personal Iris platform. (Oops...)
 *
 * Revision 1.7  90/09/13  10:14:16  dan
 * put in NOCONCAVE #ifdef
 *
```

```
 * Revision 1.6  90/09/10  14:35:36  dan
 * 180 init rot change
 *
 * Revision 1.5  90/09/07  20:15:33  dan
 * rotating light source....
 *
 * Revision 1.4  90/08/30  13:45:11  dan
 * Changed a few things to support Soap Edit menu/mode
 *
 * Revision 1.3  90/08/28  11:56:46  dan
 * Soap update now calls "highlight_selected()"
 *
 * Revision 1.2  90/08/18  20:15:28  dan
 * Bug fixes and clean-up
 *
 * Revision 1.1  90/08/17  18:24:32  dan
 * Initial revision
 *
 */
```

| | |
|---|---|
| User: | MICRORENTMind |
| Application: | PrintMonitor |
| Document: | soapqry.c |
| Date: | Wednesday, November 14, 1990 |
| Time: | 8:08:47 PM |
| Printer: | Peace of Mind |

```
/*
** SOAPQRY.C
**
** Query and search functions for the SOAP database.
**
** Copyright 1990, by VPL Research
**
$Header: /usr/starch/source/starch/RCS/soapqry.c,v 2.1 90/10/05 10:30:16 dan Exp $
**
*/

#include "soap.h"


/* QUERY */
Edgelist    *get_poly_offset();
Element     *get_edgelist_offset();
short       get_line_index_offset();
short       get_arc_index_offset();
short       get_element_offset();
short       get_childlist_length();
short       get_polylist_length();
short       get_edgelist_element_count();
short       get_element_count_restricted();
Edgelist    *find_line();
Edgelist    *find_arc();
Edgelist    *find_cylinder();
short       get_edgelist_line_count();
short       get_edgelist_arc_count();
Element     **get_element_pointer_sequence();
void        free_element_pointer_sequence();
short       *get_element_sequence();
void        free_element_sequence();
short       *get_point_sequence();
void        free_point_sequence();
short       *get_screen_sequence();
void        free_screen_sequence();
short       find_free_point();
short       find_free_line();
```

```
short          find_free_arc();
short          find_free_cylinder();
short          get_unused_line_count();
short          get_pending_line_count();
short          get_unused_arc_count();
short          get_pending_arc_count();
short          check_element_in_list();
short          get_line_index();
short          get_arc_index();
short          get_cylinder_index();

static void get_world_coords();
static void get_screen_coords();

/* in SOAPFILM.C */
extern Edgelist *find_element();

/* FROM SOAPSCUM.C */
extern Soap_Point      soap_point[];
extern Soap_Line       soap_line[];
extern Soap_Arc                  soap_arc[];
extern Soap_Cylinder   soap_cylinder[];


/*--------------------------------------------------------------*/
/*
** Find offset of passed line index in passed edgelist.
** RETURNS: Offset of passed line index in passed edgelist, or
** BADINDEX if line_index out of bounds or not found.
*/

short get_line_index_offset(edgelist_pointer, line_index)
Edgelist    *edgelist_pointer;
short          line_index;
{
  Element *elptr;


  if (line_index >= MAX_LINE)
```

```
            return(BADINDEX);

    elptr = (Element *)&(soap_line[line_index]);

    return(get_element_offset(edgelist_pointer, elptr));
}

/*--------------------------------------------------------------*/
/*
**
*/
short get_arc_index_offset(edgelist_pointer, arc_index)
Edgelist    *edgelist_pointer;
short           arc_index;
{
    Element *elptr;


   if (arc_index >= MAX_LINE)
            return(BADINDEX);

    elptr = (Element *)&(soap_arc[arc_index]);

    return(get_element_offset(edgelist_pointer, elptr));
}

/*--------------------------------------------------------------*/
/*
** GENERIC GET OFFSET OF PASSED INDEX IN EDGELIST
** RETURNS: OFFSET or BADINDEX if not found or index out of bounds.
*/

short get_element_offset(edgelist_pointer, elptr)
Edgelist    *edgelist_pointer;
Element        *elptr;
{
    short   offset, count;


    offset = count = 0;
```

```
while (*edgelist_pointer != ELEMNULL) {
            if (offset == LIST_SIZE - 1) {
                edgelist_pointer = (Edgelist *)*edgelist_pointer;
                offset = 0;
                continue;
            }
            if (*edgelist_pointer == elptr)
                return(count);

            ++count;
            ++offset;
            ++edgelist_pointer;
    }
    return(BADINDEX);     /* not found */
}

/*---------------------------------------------------------------*/
/*
** Get the edgelist pointer from location at offset in passed part's
**  polylist.
** RETURNS: Edgelist pointer at polylist offset, or NULLPTR if error.
*/
Edgelist *get_poly_offset(part, offset)
Part        *part;
short       offset;
{
    short      count, off;
    Polylist   *polyptr;

    polyptr = part->poly_top;

    if (polyptr == POLYNULL)
            return(EDGENULL);

    off = count = 0;
    while (*polyptr != EDGENULL) {
            if (off == LIST_SIZE - 1) {
                /* already know it's not null */
```

```
                polyptr = (Polylist *)*polyptr;
                off = 0;
            } else {
                if (count == offset)
                        return(*polyptr);

                ++count;
                ++off;
                ++polyptr;
            }
    }
    return(EDGENULL);
}

/*------------------------------------------------------------*/
/*
** GET THE ELEMENT POINTER AT OFFSET IN EDGELIST
** (Inlcudes any pending elements in count.)
** RETURNS: ELEMENT POINTER OR ELEMNULL if OFFSET BAD
*/

Element *get_edgelist_offset(edgelist_pointer, offset)
Edgelist    *edgelist_pointer;
short           offset;
{
    short       count, off;


    if (edgelist_pointer == EDGENULL)
            return(ELEMNULL);

    off = count = 0;

    while (*edgelist_pointer != ELEMNULL) {
            if (off == LIST_SIZE - 1) {
                /* already know it's not null */
                edgelist_pointer = (Edgelist *)*edgelist_pointer;
                off = 0;
            } else {
                if (count == offset)
```

```
                    return(*edgelist_pointer);

                ++count;
                ++off;
                ++edgelist_pointer;
            }
    }
    return(ELEMNULL);
}

/*-----------------------------------------------------------*/
/*
** Get the length of a childlist. (Not including NULL/NEXTLISTS.)
** If a child is NOTVALID, it is still counted.
** RETURNS: Zero if childlist empty.
*/
short  get_childlist_length(part)
Part           *part;
{
    short      offset, count;
    Childlist  *childptr,  *nextlist;

    if (part->child_top == CHILDNULL)
               return(0);

    childptr = part->child_top;
    offset = count = 0;

    while (*childptr != PARTNULL) {
               if (offset == LIST_SIZE - 1) {
                   nextlist = (Childlist *)*childptr;
                   childptr = nextlist;
                   offset = 0;
               } else {
                   ++offset;
                   ++count;
                   ++childptr;
               }
    }
```

```
   return(count);
}

/*----------------------------------------------------------*/
/*
** Get the number of polygons in a polylist. This does not include the
** NULL/NEXTLIST entries!
** RETURNS: length of polylist, or zero if polylist empty.
*/
short  get_polylist_length(part)
Part          *part;
{
   short       offset, count;
   Polylist   *polyptr,  *nextlist;

   if (part->poly_top == POLYNULL)
            return(0);

   polyptr = part->poly_top;
   offset = count = 0;

   while (*polyptr != EDGENULL) {
            if (offset == LIST_SIZE - 1) {
                nextlist = (Polylist *)*polyptr;
                polyptr = nextlist;
                offset = 0;
            } else {
                ++offset;
                ++count;
                ++polyptr;
            }
   }
   return(count);
}

/*----------------------------------------------------------*/
/*
** Get the number of elements in the passed edgelist.
** RETURNS: number of elements in Edgelist.
*/
```

```
short get_edgelist_element_count(edgelist_pointer)
Edgelist    *edgelist_pointer;
{
   short      offset, count;
   Edgelist  *nextlist;

   offset = count = 0;

   while (*edgelist_pointer != ELEMNULL) {
             if (offset == LIST_SIZE - 1) {
                nextlist = (Edgelist *)*edgelist_pointer;
                edgelist_pointer = nextlist;
               offset = 0;
             } else {
               ++count;
               ++offset;
               ++edgelist_pointer;
             }
   }
   return(count);
}

/*--------------------------------------------------------------*/
/*
** Get the number of ACTIVE elements in the passed edgelist.
** RETURNS: number of elements in Edgelist.
*/
short get_element_count_restricted(edgelist_pointer)
Edgelist    *edgelist_pointer;
{
   short      offset, count;
   Edgelist  *nextlist;

   offset = count = 0;

   while (*edgelist_pointer != ELEMNULL) {
             if (offset == LIST_SIZE - 1) {
                nextlist = (Edgelist *)*edgelist_pointer;
                edgelist_pointer = nextlist;
```

```
            offset = 0;
        } else {
            if (((*edgelist_pointer)->status & MEMMASK) == ACTIVE)
                    ++count;
            ++offset;
            ++edgelist_pointer;
        }
  }
  return(count);
}

/*-----------------------------------------------------------*/
/*
** Search for address of line with passed line_index in all edgelists.
** RETURNS: pointer to edgelist that line was found in, or NULLPTR
** if not found.
** WARNING!: This function may not be too quick!
** (RECURSIVE)
*/
Edgelist *find_line(line_index, part)
short       line_index;
Part        *part;
{
  Element  *eladr;

   eladr = (Element *)&(soap_line[line_index]);

   return(find_element(part, eladr));
}

/*-----------------------------------------------------------*/
/*
** Find the address of the arc at arc index somewhere in the hierarchy.
** RETURNS: pointer to edgelist that arc was found in, or NULLPTR
** if not found.
** WARNING!: This function descends the tree, so it may take time!
*/
Edgelist *find_arc(arc_index, part)
short       arc_index;
```

```
Part        *part;
{
  Element  *eladr;

  eladr = (Element *)&(soap_arc[arc_index]);

  return(find_element(part, eladr));
}

/*------------------------------------------------------------*/
/*
** Find address of cylinder at passed cylinder index somewhere in the
** hierarchy.
** RETURNS: pointer to edgelist that cylinder was found in, or NULLPTR
** if not found.
** WARNING! This call may consume time!
*/
Edgelist *find_cylinder(cylinder_index, part)
short       cylinder_index;
Part        *part;
{
  Element  *eladr;

  eladr = (Element *)&(soap_cylinder[cylinder_index]);

  return(find_element(part, eladr));
}

/*------------------------------------------------------------*/
/*
** Get the number of lines in the passed edgelist.
** RETURNS: number of lines in Edgelist.
*/
short get_edgelist_line_count(edgelist_pointer)
Edgelist    *edgelist_pointer;
{
  short     offset, count;
  Edgelist  *nextlist;

  offset = count = 0;
```

```
  while (*edgelist_pointer != ELEMNULL) {
            if (offset == LIST_SIZE - 1) {
                nextlist = (Edgelist *)*edgelist_pointer;
                edgelist_pointer = nextlist;
               offset = 0;
            } else {
               ++offset;
               if (((*edgelist_pointer)->status & MEMELEMMASK)
                           == (SOAP_LINE | ACTIVE))
                         ++count;
                ++edgelist_pointer;
            }
  }
  return(count);

}

/*-------------------------------------------------------------*/
/*
** Get the number of arcs in the passed edgelist.
** RETURNS: number of arcs in Edgelist.
*/
short  get_edgelist_arc_count(edgelist_pointer)
Edgelist    *edgelist_pointer;
{
  short       offset, count;
  Edgelist   *nextlist;

  offset = count = 0;

  while (*edgelist_pointer != ELEMNULL) {
            if (offset == LIST_SIZE - 1) {
                nextlist = (Edgelist *)*edgelist_pointer;
                edgelist_pointer = nextlist;
               offset = 0;
            } else {
               ++offset;
               if (((*edgelist_pointer)->status & MEMELEMMASK)
```

```
                    == (SOAP_ARC | ACTIVE))
                        ++count;
                ++edgelist_pointer;
            }
    }
    return(count);

}

/*----------------------------------------------------------*/
/*
** Get an array describing the passed edgelist.
** FORMAT:
** element type 1, index number 1
** element type 2, index number 2
** ....
** NOTE: Get the count first, so you know how many are in the array.
** RETURNS: pointer to an array of element types and index numbers.
*/
short *get_element_sequence(edgelist_pointer)
Edgelist    *edgelist_pointer;
{
    short   element_count, offset, elstat, index;
    short   *listbuffer, *listtop;

    element_count = get_element_count_restricted(edgelist_pointer);
    listbuffer = (short *)malloc(element_count * 2 * sizeof(short));
    listtop = listbuffer;

    offset = 0;

    /* now read everything into listbuffer */
    while (*edgelist_pointer != ELEMNULL) {
            if (offset == LIST_SIZE - 1) {
                edgelist_pointer = (Edgelist *)*edgelist_pointer;
                offset = 0;
                continue;
            }
            if (((*edgelist_pointer)->status & MEMMASK) == ACTIVE) {
                elstat = (*edgelist_pointer)->status & ELEMMASK;
```

```
            if (elstat == SOAP_LINE) {
                    index = get_line_index((Soap_Line *)*edgelist_pointer);
            } else if (elstat == SOAP_ARC) {
                    index = get_arc_index((Soap_Arc *)*edgelist_pointer);
            } else {
                    index = get_cylinder_index((Soap_Cylinder *)*edgelist_pointer);
            }

            *listbuffer++ = (*edgelist_pointer)->status;
            *listbuffer++ = index;
          } /* only if ACTIVE! */
          ++edgelist_pointer;
          ++offset;
  }
  return(listtop);
}

/*------------------------------------------------------------*/
/*
** Unallocate this thing.
** RETURNS: nothing.
*/
void free_element_sequence(array_pointer)
short        *array_pointer;
{
  free(array_pointer);
}

/*------------------------------------------------------------*/
/*
** Get an array describing the passed edgelist.
** FORMAT:
** element *1
** element *2
** ....
** NOTE: Get the count first, so you know how many are in the array.
** NOTE: Unlike get_element_sequence(), no ACTIVE/PENDING restrictions!
** RETURNS: pointer to an array of element types and index numbers.
*/
```

```
Element **get_element_pointer_sequence(edgelist_pointer)
Edgelist    *edgelist_pointer;
{
    short   element_count, offset, elstat, index;
    Element **listbuffer, **listtop, *elptr;


    element_count = get_edgelist_element_count(edgelist_pointer);
    listbuffer = (Element **)malloc(element_count * sizeof(Element *));
    listtop = listbuffer;

    offset = 0;

    /* now read everything into listbuffer */
    while (*edgelist_pointer != ELEMNULL) {
            if (offset == LIST_SIZE - 1) {
                edgelist_pointer = (Edgelist *)*edgelist_pointer;
                offset = 0;
                continue;
            }

            elptr = *edgelist_pointer;

            *listbuffer++ = elptr;

            ++edgelist_pointer;
            ++offset;
    }
    return(listtop);
}

/*--------------------------------------------------------------*/
/*
** Unallocate this thing.
** RETURNS: nothing.
*/
void free_element_pointer_sequence(array_pointer)
Element     **array_pointer;
{
    free(array_pointer);
```

```
}

/*-----------------------------------------------------------*/
/*
** get the start and end points and other info from passed edgelist.
** World coordinates!
** FORMAT:
** xs, ys, zs, xe, ye, ze, element type, index number         (1)
** xs, ys, zs, xe, ye, ze, element type, index number   (2)
** ...
** Note: Be sure to get count so you know how much to read...
** RETURNS: pointer to an array of start points, end points, element
** types and index numbers.
*/
short  *get_point_sequence(edgelist_pointer)
Edgelist    *edgelist_pointer;
{
   short      element_count, offset;
   short      *listbuffer, *listtop;


    element_count = get_element_count_restricted(edgelist_pointer);
   listbuffer = (short *)malloc(element_count * 8 * sizeof(short));
   listtop = listbuffer;

   offset = 0;

   /* now read everything into listbuffer */
   while (*edgelist_pointer != ELEMNULL) {
            if (offset == LIST_SIZE - 1) {
                edgelist_pointer = (Edgelist *)*edgelist_pointer;
               offset = 0;
               continue;
            }
            if (((*edgelist_pointer)->status & MEMMASK) == ACTIVE)
                get_world_coords(edgelist_pointer, &listbuffer);

            ++edgelist_pointer;
            ++offset;
```

```
  }
  return(listtop);
}

/*--------------------------------------------------------------*/
/*
** !!!!FIX THIS TO WORK WITH DOUBLES!!!!
*/
static void get_world_coords(edgelist_pointer, listbuffer)
Edgelist    *edgelist_pointer;
short           **listbuffer;
{
   short                elstat, i, *curptr, index;
   Soap_Line                    *lineptr;
   Soap_Arc             *arcptr;
   Soap_Cylinder        *cylptr;

   curptr = *listbuffer;

   elstat = (*edgelist_pointer)->status & ELEMMASK;
   if (elstat == SOAP_LINE) {
      /* get points */
      lineptr = (Soap_Line *)*edgelist_pointer;
            index = get_line_index(lineptr);
      *curptr++ = lineptr->p1.x;
      *curptr++ = lineptr->p1.y;
      *curptr++ = lineptr->p1.z;
      *curptr++ = lineptr->p2.x;
      *curptr++ = lineptr->p2.y;
      *curptr++ = lineptr->p2.z;
   } else if (elstat == SOAP_ARC) {
      arcptr = (Soap_Arc *)*edgelist_pointer;
            index = get_arc_index(arcptr);
      *curptr++ = arcptr->p1.x;
      *curptr++ = arcptr->p1.y;
      *curptr++ = arcptr->p1.z;
      *curptr++ = arcptr->p2.x;
      *curptr++ = arcptr->p2.y;
      *curptr++ = arcptr->p2.z;
   } else {
```

```
    /* for a cylinder, just return 2 copies of centerpoint */
    cylptr = (Soap_Cylinder *)*edgelist_pointer;
            index = get_cylinder_index(cylptr);
    for (i=0; i<2; ++i) {
                *curptr++ = cylptr->center_world.x;
                *curptr++ = cylptr->center_world.y;
                *curptr++ = cylptr->center_world.z;
            }
  }

  /* add last two fields...  */
  *curptr++ = (*edgelist_pointer)->status;
  *curptr++ = index;

  *listbuffer += 8;
}


/*----------------------------------------------------------*/
/*
** Unallocate this stuff.
** RETURNS: nothing.
*/
void free_point_sequence(array_pointer)
short       *array_pointer;
{
  free(array_pointer);
}

/*----------------------------------------------------------*/
/*
** get the start and end points and other info from passed edgelist.
** Screen coordinates!
** FORMAT:
** xs, ys, zs, xe, ye, ze, element type, index number          (1)
** xs, ys, zs, xe, ye, ze, element type, index number    (2)
** ...
** Note: Be sure to get count so you know how much to read...
** RETURNS: pointer to an array of start points, end points, element
```

```
** types and index numbers.
*/
short *get_screen_sequence(edgelist_pointer)
Edgelist    *edgelist_pointer;
{
   short       element_count, offset;
   short       *listbuffer, *listtop;


    element_count = get_element_count_restricted(edgelist_pointer);
    listbuffer = (short *)malloc(element_count * 8 * sizeof(short));
    listtop = listbuffer;

   offset = 0;

   /* now read everything into listbuffer */
   while (*edgelist_pointer != ELEMNULL) {
            if (offset == LIST_SIZE - 1) {
                edgelist_pointer = (Edgelist *)*edgelist_pointer;
               offset = 0;
               continue;
            }

            if (((*edgelist_pointer)->status & MEMMASK) == ACTIVE)
                get_screen_coords(edgelist_pointer, &listbuffer);

            ++edgelist_pointer;
            ++offset;
  }
   return(listtop);
}

/*-----------------------------------------------------------*/
/*
**
*/
static void get_screen_coords(edgelist_pointer, listbuffer)
Edgelist    *edgelist_pointer;
short            **listbuffer;
```

```
{
  short              recsize, elstat, i, *curptr, index;
  Soap_Line                   *lineptr;
  Soap_Arc           *arcptr;
  Soap_Cylinder      *cylptr;


  curptr = *listbuffer;

  elstat = (*edgelist_pointer)->status & ELEMMASK;
  if (elstat == SOAP_LINE) {
            /* get points */
            lineptr = (Soap_Line *)*edgelist_pointer;
            index = get_line_index(lineptr);
            *curptr++ = lineptr->ps1.x;
            *curptr++ = lineptr->ps1.y;
            *curptr++ = lineptr->ps1.z;
            *curptr++ = lineptr->ps2.x;
            *curptr++ = lineptr->ps2.y;
            *curptr++ = lineptr->ps2.z;
  } else if (elstat == SOAP_ARC) {
     arcptr = (Soap_Arc *)*edgelist_pointer;
            index = get_arc_index(arcptr);
     *curptr++ = arcptr->ps1.x;
     *curptr++ = arcptr->ps1.y;
     *curptr++ = arcptr->ps1.z;
     *curptr++ = arcptr->ps2.x;
     *curptr++ = arcptr->ps2.y;
     *curptr++ = arcptr->ps2.z;
  } else {
     /* for a cylinder, just return 2 copies of centerpoint */
     cylptr = (Soap_Cylinder *)*edgelist_pointer;
            index = get_cylinder_index(cylptr);
            for (i=0; i<2; ++i) {
       *curptr++ = cylptr->center_screen.x;
              *curptr++ = cylptr->center_screen.y;
              *curptr++ = cylptr->center_screen.z;
    }
  }
```

```
    /* add last two fields...  */
     *curptr++ = (*edgelist_pointer)->status;
    *curptr++ = index;

    *listbuffer += 8;
}

/*-----------------------------------------------------------------*/
/*
** Unallocate this stuff.
** RETURNS: nothing.
*/
void free_screen_sequence(array_pointer)
short         *array_pointer;
{
    free(array_pointer);
}

/*-----------------------------------------------------------------*/
/*
** Find first UNUSED SPoint struct.
** RETURNS: first available point index, or BADINDEX is there are no more!!
*/
short find_free_point()
{
    short   i;

    for (i=0; i<MAX_POINT; ++i) {
                if ((soap_point[i].status & MEMMASK) == UNUSED)
                    return(i);
    }
    return(BADINDEX);
}

/*-----------------------------------------------------------------*/
/*
** Find first UNUSED line struct.
** RETURNS: first available line index, or BADINDEX is there are no more!!
*/
```

```
short find_free_line()
{
   short  i;

   for (i=0; i<MAX_LINE; ++i) {
             if ((soap_line[i].status & MEMMASK) == UNUSED)
               return(i);
   }
   return(BADINDEX);
}

/*------------------------------------------------------------*/
/*
** Find first UNUSED arc struct.
** RETURNS: first available arc index, or BADINDEX if there are no more!!
*/
short find_free_arc()
{
   short  i;

   for (i=0; i<MAX_ARC; ++i) {
             if ((soap_arc[i].status & MEMMASK) == UNUSED)
               return(i);
   }
   return(BADINDEX);
}

/*------------------------------------------------------------*/
/*
** Find first UNUSED cylinder struct.
** RETURNS: first available cylinder index, or BADINDEX if there are no more!!
*/
short find_free_cylinder()
{
   short  i;

   for (i=0; i<MAX_CYLINDER; ++i) {
             if ((soap_cylinder[i].status & MEMMASK) == UNUSED)
               return(i);
   }
```

```
  return(BADINDEX);
}

/*-----------------------------------------------------------*/
/*
** Return the number of UNUSED lines in line array.
*/
short get_unused_line_count()
{
   short  i, count;

   count = 0;
   for (i=0; i<MAX_LINE; ++i) {
          if ((soap_line[i].status & MEMMASK) == UNUSED)
            ++count;
   }
   return(count);
}

/*-----------------------------------------------------------*/
/*
** Return the number of PENDING lines in line array.
*/
short get_pending_line_count()
{
   short  i, count;

   count = 0;
   for (i=0; i<MAX_LINE; ++i) {
          if ((soap_line[i].status & MEMMASK) == PENDING)
            ++count;
   }
   return(count);
}

/*-----------------------------------------------------------*/
/*
** Return the number of UNUSED arcs in arc array.
*/
```

```
short get_unused_arc_count()
{
   short  i, count;

   count = 0;
   for (i=0; i<MAX_ARC; ++i) {
              if ((soap_arc[i].status & MEMMASK) == UNUSED)
                ++count;
   }
   return(count);
}

/*-------------------------------------------------------------*/
/*
** Return the number of PENDING arcs in arc array.
*/
short get_pending_arc_count()
{
   short  i, count;

   count = 0;
   for (i=0; i<MAX_ARC; ++i) {
              if ((soap_arc[i].status & MEMMASK) == PENDING)
                ++count;
   }
   return(count);
}

/*-------------------------------------------------------------*/
/*
** SEE IF PASSED ELEMENT POINTER EXISTS IN EDGELIST
** RETURN: TRUE if EXISTS, FALSE if NOT.
*/
short check_element_in_list(edgelist_pointer, elptr)
Edgelist    *edgelist_pointer;
Element       *elptr;
{
   short  offset;

   offset = 0;
```

```
  while (*edgelist_pointer != ELEMNULL) {
            if (offset == LIST_SIZE - 1) {
                edgelist_pointer = (Edgelist *)*edgelist_pointer;
                offset = 0;
                continue;
            }
            if (*edgelist_pointer == elptr)
                return(TRUE);

            ++edgelist_pointer;
            ++offset;
  }
  return(FALSE);
}

/*---------------------------------------------------------------*/
/*
** RETURNS: Index of passed lineptr in Soap_Line array.
*/
short  get_line_index(lineptr)
Soap_Line    *lineptr;
{
   Soap_Line                *startel;
   short        recsize, index;

   startel = &(soap_line[0]);
   recsize = sizeof(Soap_Line);
   index = (short) (((long)lineptr - (long)startel) / recsize);

   if (index < 0 || index >= MAX_LINE)
            return(BADINDEX);

   return(index);
}

/*---------------------------------------------------------------*/
/*
** RETURNS: Index of passed arcptr in Soap_Arc array.
*/
```

```
short get_arc_index(arcptr)
Soap_Arc    *arcptr;
{
  Soap_Arc *startel;
  short       recsize, index;

  startel = &(soap_arc[0]);
  recsize = sizeof(Soap_Arc);
  index = (short) (((long)arcptr - (long)startel) / recsize);

  if (index < 0 || index >= MAX_ARC)
          return(BADINDEX);

  return(index);
}

/*-----------------------------------------------------------------*/
/*
** RETURNS: Index of passed cylinder pointer in Soap_Cylinder array.
*/
short get_cylinder_index(cylptr)
Soap_Cylinder           *cylptr;
{
   Soap_Cylinder        *startel;
   short                recsize, index;

   startel = &(soap_cylinder[0]);
   recsize = sizeof(Soap_Cylinder);
   index = (short) (((long)cylptr - (long)startel) / recsize);

  if (index < 0 || index >= MAX_CYLINDER)
          return(BADINDEX);

  return(index);
}

/* DO NOT PLACE ANY FUNCTIONS AFTER RCS LOG!
$Log:       soapqry.c,v $
 * Revision 2.1  90/10/05  10:30:16  dan
```

```
* New Rev
*
* Revision 1.3  90/09/25  14:15:11  dan
* Added #defines for MASKS
*
* Revision 1.2  90/08/30  13:45:45  dan
* Added "get_element_pointer_sequence" for reverse support.
*
* Revision 1.1  90/08/17  18:25:09  dan
* Initial revision
*
*/
```

| | |
|---|---|
| User: | MICRORENTMind |
| Application: | PrintMonitor |
| Document: | soapscum.c |
| Date: | Wednesday, November 14, 1990 |
| Time: | 8:12:33 PM |
| Printer: | Peace of Mind |

```
/*
** SOAPSCUM.C
**
** Soap database memory manager -- high level functions.
**
** Copyright 1990 by VPL Research
**
$Header: /usr/starch/source/starch/RCS/soapscum.c,v 2.1 90/10/05 10:30:18 dan Exp $
**
*/

#include <stdio.h>
#include <malloc.h>
#include "soap.h"

/* in SOAPFILM.C */
extern void edgelist_close();
extern void clean_up_polylist();
extern void delete_polylist_down();
extern short delete_poly_status();
extern void sever_part_from_parent();

/* from SOAPQRY.C */
extern short get_polylist_length();

/* INIT AND CLEANUP */
void        initialize_object_name();
void        initialize_object_array();
void        initialize_element_arrays();
void        clean_up_edgelist();
void        delete_object();
void        delete_polylist();
short       delete_edgelist();
void        garbage_collect();

/* STATICS */
static short take_out_garbage();

/* Declare any data                    */
```

```
Soap_Object             soap_object[MAX_OBJECT];
Soap_Line       soap_line[MAX_LINE];
Soap_Arc        soap_arc[MAX_ARC];
Soap_Cylinder           soap_cylinder[MAX_CYLINDER];
Soap_Point      soap_point[MAX_POINT];

/*-------------------------------------------------------------*/
/*
** Initialize the object indexed by object_index with the passed
** char string.
** RETURNS: nothing.
*/
void initialize_object_name(object_index, object_name)
short       object_index;
char        *object_name;
{
    strcpy(soap_object[object_index].object_name, object_name);
}

/*-------------------------------------------------------------*/
/*
** Set all roots to NULL, and character strings to nullstrings.
*/

void initialize_object_array()
{
   short  object_index;

   for (object_index = 0; object_index < MAX_OBJECT; ++object_index) {
            soap_object[object_index].root = PARTNULL;
            soap_object[object_index].object_name[0] = '\0';
  }
}

/*-------------------------------------------------------------*/
/*
** Set all status words to UNUSED.
** RETURNS: nothing.
*/
```

```
void initialize_element_arrays()
{
  short  i;

  for (i=0; i < MAX_POINT; ++i) {
          soap_point[i].status = UNUSED;
  }

  for (i=0; i < MAX_LINE; ++i) {
          soap_line[i].status = UNUSED;
  }

  for (i=0; i < MAX_ARC; ++i) {
          soap_arc[i].status = UNUSED;
  }

  for (i=0; i < MAX_CYLINDER; ++i) {
          soap_cylinder[i].status = UNUSED;
  }
}

/*-----------------------------------------------------------------*/
/*
** ACTUAL DELETION
** Set PENDING elements to UNUSED. De-allocate edgelist if necessary.
** If last pointer of polylist, de-allocate polylist and set poly_top
** to NULLPTR.
** RETURNS: nothing.
*/

void clean_up_edgelist(edgelist_pointer, part)
Edgelist    *edgelist_pointer;
Part        *part;
{
  Element  *elpoint;
  short    offset, bigcount, element_count;
  Edgelist *edge_top;


  if (edgelist_pointer == EDGENULL)
```

```
            return;

    edge_top = edgelist_pointer;
    offset = bigcount = 0;

    while (*edgelist_pointer != ELEMNULL) {
            if (offset == LIST_SIZE - 1) {
                edgelist_pointer = (Edgelist *)*edgelist_pointer;
                offset = 0;
                continue;
            }

        /* look for PENDING geometry elements */
            elpoint = *edgelist_pointer;
            if ((elpoint->status & MEMMASK) == PENDING) {
                elpoint->status = UNUSED;
                element_count = get_edgelist_element_count(edge_top);

                /* get rid of this element in edgelist */
                edgelist_close(offset, element_count, bigcount, edgelist_pointer);
                /* stay at same offset in edgelist and consider new element */
                if (*edge_top == ELEMNULL) {
                        free(edge_top);
                        clean_up_polylist(part, edge_top);
                        break;
                }
            } else {
                ++edgelist_pointer;     /* go to next element   */
                ++offset;
                ++bigcount;
            }
    }
}

/*--------------------------------------------------------------*/
/*
** Set object root node to NULLPTR and set object_name to null string.
** RETURNS: nothing.
*/
```

```
void delete_object(object_index)
short        object_index;
{
   soap_object[object_index].root = (Part *)NULLPTR;
   soap_object[object_index].object_name[0] = '\0';
}


/*-------------------------------------------------------------*/
/*
** ACTUAL DELETION
** Delete the polylist. Set poly_top to NULLPTR. Use this reset or
** redefine a part's geometry.
** RETURNS: nothing.
*/
void delete_polylist(part)
Part         *part;
{
   delete_polylist_down(part);
}

/*-------------------------------------------------------------*/
/*
** Delete an edgelist. If last pointer of polylist, set poly_top to
** NULLPTR. Set PENDING to UNUSED. Set ACTIVE to UNUSED.
** RETURNS: number of elements in polylist after edgelist deletion.
*/
short delete_edgelist(edgelist_pointer, part)
Edgelist     *edgelist_pointer;
Part              *part;
{
   return(delete_poly_status(edgelist_pointer, part));
}

/*-------------------------------------------------------------*/
/*
** GARBAGE COLLECT THE ENTIRE DATABASE
** RETURNS: nothing. (Trust in God.)
*/
```

```
{
  short   object_index;

  for (object_index = 0; object_index < MAX_OBJECT; ++object_index) {
            take_out_garbage(soap_object[object_index].root, object_index);
  }
}


/*-----------------------------------------------------------*/
/*
** Descend the hierarchy... Check for PENDING.
*/
static short take_out_garbage(part, object_index)
Part          *part;
short         object_index;
{

  short       polycount, offset;
  Childlist  *childptr;
  Polylist   *polyptr;

  /* for objects with root nodes set to NULL */
  if (part == PARTNULL)
            return(NO);


  /* descend hierarchy   */
  /* for all children... */

  childptr = part->child_top;

  if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
```

```
            }

            if (!take_out_garbage(*childptr, object_index)) {
                    ++childptr;
                    ++offset;
            }
        }
}


/* terminal or through with children processing    */
/* go through polylist for part...                 */

if (part->poly_top != POLYNULL) {
        offset = 0;
        polyptr = part->poly_top;

        while (*polyptr != EDGENULL) {
          if (offset == LIST_SIZE - 1) {
                  polyptr = (Polylist *)*polyptr;
                  offset = 0;
                  continue;
          }
           polycount = get_polylist_length(part);

           clean_up_edgelist(*polyptr, part);

          if (part->poly_top == POLYNULL) {
                  /* if this part is NOTVALID, all its children have  */
                  /* already been deleted!!!                          */
                  if (((part->status) & VALIDMASK) == NOTVALID) {
                      sever_part_from_parent(part, object_index);
                    free(part);
                    return(YES);          /* we're done, thanks    */
                  }
                  return(NO);
          }
          if (polycount != get_polylist_length(part))
                  continue;  /* edgelist was de-allocated */
```

```
                ++polyptr;
                ++offset;
            }
    } else if (((part->status) & VALIDMASK) == NOTVALID) {
            /* Again, all children have already been deleted!  */
            sever_part_from_parent(part, object_index);
            free(part);
            return(YES);
    }
    return(NO);
}

/* DO NOT PLACE ANY FUNCTIONS AFTER RCS LOG!
$Log:     soapscum.c,v $
 * Revision 2.1  90/10/05  10:30:18  dan
 * New Rev
 *
 * Revision 1.3  90/09/25  14:15:29  dan
 * Added #defines for MASKS
 *
 * Revision 1.2  90/08/30  13:46:14  dan
 * Added logical "AND" check to part->status accesses
 *
 * Revision 1.1  90/08/17  18:25:30  dan
 * Initial revision
 *
*/
```

| | |
|---|---|
| User: | MICRORENTMind |
| Application: | PrintMonitor |
| Document: | soapsnap.c |
| Date: | Wednesday, November 14, 1990 |
| Time: | 8:13:50 PM |
| Printer: | Peace of Mind |

```
/*
** SOAPSNAP.C
**
** SNAPPY DELETE FUNCTIONS FOR SOAP DATABASE
**
** Copyright 1990, by VPL Research
**
$Header: /usr/starch/source/starch/RCS/soapsnap.c,v 2.1 90/10/05 10:30:19 dan Exp $
**
*/

#include "soap.h"

/* from SNAPFILM.C */
extern short delete_poly_status_snappy();
extern void sever_part_from_parent_snappy();

/* from SOAPQRY.C  */
extern short get_childlist_length();
extern short get_polylist_length();
extern short get_edgelist_element_count();
extern short get_edgelist_line_count();
extern short get_edgelist_arc_count();
extern Edgelist        *get_poly_offset();
extern Element         *get_edgelist_offset();

/* FUNCTION DECLARATIONS */

/* SNAPPY DELETE */
void         delete_part_snappy();
void         delete_poly_snappy();
short        delete_poly_offset_snappy();
short        delete_poly_last_n_snappy();
short        delete_poly_last_snappy();
short        delete_line_snappy();
short        delete_arc_snappy();
short        delete_cylinder_snappy();
short        delete_line_last_snappy();
short        delete_line_last_n_snappy();
```

```
short           delete_arc_last_snappy();
short           delete_arc_last_n_snappy();
short           delete_element_last_snappy();
short           delete_element_last_n_snappy();
short           delete_element_offset_snappy();

/* from SOAPSCUM.C    */
extern Soap_Line        soap_line[];
extern Soap_Arc                         soap_arc[];
extern Soap_Cylinder    soap_cylinder[];

/*
** If any "snappy" routines are used, a garbage collect MUST be done
** before writing the SOAP database to a file.
** If no "snappy" routines are used, no garbage collection is necessary.
*/


/*------------------------------------------------------------*/
/*
** VIRTUAL DELETION
** Delete a part and all of its children. Set part status words to
** NOTVALID. Set status words of geometry elements to PENDING.
** If this is the last part in a childlist, the parent part's child_top
** is NOT set to null pointer, otherwise we wouldn't be able to garbage
** collect!
** RETURNS: pointer to parent part, or NULLPTR if root has been deleted.
*/
void delete_part_snappy(part)
Part        *part;
{
  short      count;
  Childlist  *childptr;


  /* descend hierarchy   */
  /* for all children... */

  childptr = part->child_top;
```

```
  count = 0;

  if (childptr != CHILDNULL) {
            while (*childptr != PARTNULL) {
              if (count == LIST_SIZE - 1) {
                        childptr = (Childlist *)*childptr;
                        count = 0;
                        continue;
              }

              /* set all elements to PENDING, part to NOTVALID   */
               delete_part_snappy(*childptr);

              ++childptr;
              ++count;
            }
  }

   /* childcount is zero, or through with all children                */
    sever_part_from_parent_snappy(part);
}

/*---------------------------------------------------------------*/
/*
** VIRTUAL DELETION
** Set elements in edgelist to PENDING. Do not de-allocate any lists.
** Code must check for status before adding polygon to polygon count
** or allowing operations on individual components of the element list,
** or the entire element list.
** RETURNS: nothing
*/
void delete_poly_snappy(edgelist_pointer)
Edgelist    *edgelist_pointer;
{
    delete_poly_status_snappy(edgelist_pointer);
}

/*---------------------------------------------------------------*/
/*
** VIRTUAL DELETION.
```

```
** Set element status words to PENDING. Do not clean up lists or
** de-allocate anything. If this is the last poly, do not set poly_top
** to NULL.
** RETURNS: BADINDEX if offset out of range.
*/

short delete_poly_offset_snappy(part, offset)
Part        *part;
short       offset;
{
  short       polycount;
  Edgelist    *edgelist_pointer;

   polycount = get_polylist_length(part);

  if (offset >= polycount)
           return(BADINDEX);

  /* translate the offset into an Edgelist *          */
   edgelist_pointer = get_poly_offset(part, offset);

  if (edgelist_pointer == EDGENULL)
           return(BADINDEX);

   delete_poly_status_snappy(edgelist_pointer);

  return(OK);
}

/*------------------------------------------------------------*/
/*
** VIRTUAL DELETION
** As above, except for last n polygons in polylist.
** RETURNS: BADINDEX if count is out of range.
*/

short delete_poly_last_n_snappy(part, count)
Part        *part;
short       count;
```

```
{
   short      polycount, i, offset;
   Edgelist   *edgelist_pointer;

   /* first make sure there are n elements!           */
    if ((polycount = get_polylist_length(part)) < count)
             return(BADINDEX);

   offset = polycount - count;          /* increment this sucker    */

   /* start setting PENDING flags at polycount - count */
   for (i=0; i<count; ++i) {
             edgelist_pointer = get_poly_offset(part, offset+i);
             delete_poly_status_snappy(edgelist_pointer);
   }

  return(OK);
}

/*-----------------------------------------------------------------*/
/*
** VIRTUAL DELETION
** As above. Except for last entry of polylist only.
** RETURNS: BADINDEX if polylist empty!
*/

short  delete_poly_last_snappy(part)
Part          *part;
{
   short      polycount, i, offset;
   Edgelist   *edgelist_pointer;

   /* first make sure there are n elements!           */
    if ((polycount = get_polylist_length(part)) < 1)
             return(BADINDEX);

   offset = polycount - 1;

    edgelist_pointer = get_poly_offset(part, offset);
```

```
      delete_poly_status_snappy(edgelist_pointer);

   return(OK);
}

/*-------------------------------------------------------------*/
/*
** VIRTUAL DELETION
** Set element status to PENDING. Do not close up or de-allocate.
** RETURNS: BADINDEX if line_index out of range.
*/

short  delete_line_snappy(line_index)
short              line_index;
{
   if (line_index >= MAX_LINE)
              return(BADINDEX);

   soap_line[line_index].status = (SOAP_LINE | PENDING);

   return(OK);
}

/*-------------------------------------------------------------*/
/*
** VIRTUAL DELETION
** Set element status to PENDING. Do not close up or de-allocate.
** Do not set poly_top to NULLPTR if last edge of last poly.
** RETURNS: BADINDEX if arc_index out of range.
*/

short  delete_arc_snappy(arc_index)
short              arc_index;
{

   if (arc_index >= MAX_ARC)
              return(BADINDEX);

   soap_arc[arc_index].status = (SOAP_ARC | PENDING);
```

```
  return(OK);
}

/*-----------------------------------------------------------------*/
/* VIRTUAL DELETION
** Set cylinder element to PENDING. Do not close up or de-allocate.
** Do not set poly_top to NULLPTR if last element of last poly.
** RETURNS: number of elements in edgelist, or BADINDEX if cylinder_index
** not found.
*/

short delete_cylinder_snappy(cylinder_index)
short           cylinder_index;
{
  if (cylinder_index >= MAX_CYLINDER)
          return(BADINDEX);

  soap_cylinder[cylinder_index].status = (SOAP_CYLINDER | PENDING);

  return(OK);
}

/*-----------------------------------------------------------------*/
/*
** VIRTUAL DELETION
** As above. (For last ACTIVE line only.)
** RETURNS: BADINDEX if no lines found.
*/

short delete_line_last_snappy(edgelist_pointer)
Edgelist    *edgelist_pointer;
{
  Edgelist  *edge_top;
  Element   *linelast;
  short     line_count, i, offset;

  /* find last occurance of line entity  */
   line_count = get_edgelist_line_count(edgelist_pointer);
  if (line_count < 1)
```

```
            return(BADINDEX);

    edge_top = edgelist_pointer;
    linelast = ELEMNULL;

    offset = 0;
    while (*edgelist_pointer != ELEMNULL) {
            if (offset == LIST_SIZE - 1) {
                edgelist_pointer = (Edgelist *)*edgelist_pointer;
                offset = 0;
                continue;
            }
            if ((*edgelist_pointer)->status == (SOAP_LINE | ACTIVE)) {
                linelast = *edgelist_pointer;
            }
            ++edgelist_pointer;
            ++offset;
    }
    if (linelast != ELEMNULL) {
            linelast->status = (SOAP_LINE | PENDING);
            return(OK);
    }
    return(BADINDEX);
}

/*----------------------------------------------------------------*/
/*
** VIRTUAL DELETION
** As above. For ACTIVE LINES only.
** RETURNS: BADINDEX if count is out of range.
*/

short delete_line_last_n_snappy(edgelist_pointer, count)
Edgelist    *edgelist_pointer;
short       count;
{
    Edgelist  *edge_top;
    short     line_count, i, offset, precount;
```

```
line_count = get_edgelist_line_count(edgelist_pointer);
if (line_count < count)
        return(BADINDEX);

edge_top = edgelist_pointer;

offset = 0;
precount = 0;

/* find first occurance to start snapping at    */
while (*edgelist_pointer != ELEMNULL) {
        if (offset == LIST_SIZE - 1) {
            edgelist_pointer = (Edgelist *)*edgelist_pointer;
            offset = 0;
            continue;
        }
        if ((*edgelist_pointer)->status == (SOAP_LINE | ACTIVE)) {
            if (precount == line_count - count)
                    break;
            ++precount;
        }
        ++edgelist_pointer;
        ++offset;
}

while (*edgelist_pointer != ELEMNULL) {
        if (offset == LIST_SIZE - 1) {
            edgelist_pointer = (Edgelist *)*edgelist_pointer;
            offset = 0;
            continue;
        }
        if ((*edgelist_pointer)->status == (SOAP_LINE | ACTIVE)) {
            (*edgelist_pointer)->status = (SOAP_LINE | PENDING);
        }
        ++edgelist_pointer;
  ++offset;
}
return(OK);
```

```
}

/*---------------------------------------------------------------*/
/*
** VIRTUAL DELETION
** As above. Last ACTIVE arc.
** RETURNS: number of arcs in edgelist, or zero if no more arcs.
*/
short  delete_arc_last_snappy(edgelist_pointer)
Edgelist    *edgelist_pointer;
{
   Edgelist  *edge_top;
   Element   *arclast;
   short      arc_count, i, offset;

   /* find last occurance of arc entity   */
    arc_count = get_edgelist_arc_count(edgelist_pointer);
   if (arc_count < 1)
            return(BADINDEX);

    edge_top = edgelist_pointer;
   arclast = ELEMNULL;

   offset = 0;
   while (*edgelist_pointer != ELEMNULL) {
            if (offset == LIST_SIZE - 1) {
                edgelist_pointer = (Edgelist *)*edgelist_pointer;
               offset = 0;
               continue;
            }
            if ((*edgelist_pointer)->status == (SOAP_ARC | ACTIVE)) {
               arclast = *edgelist_pointer;
            }
            ++edgelist_pointer;
            ++offset;
   }
   if (arclast != ELEMNULL) {
            arclast->status = (SOAP_ARC | PENDING);
            return(OK);
   }
```

```
  return(BADINDEX);
}

/*-----------------------------------------------------------*/
/*
** VIRTUAL DELETION
** As above. Last n ACTIVE arcs only!
** RETURNS: BADINDEX if count out of range.
*/

short delete_arc_last_n_snappy(edgelist_pointer, count)
Edgelist    *edgelist_pointer;
short           count;
{
   Edgelist  *edge_top;
   short      arc_count, i, offset, precount;


   /* find last occurance of arc entity   */
    arc_count = get_edgelist_arc_count(edgelist_pointer);
   if (arc_count < count)
              return(BADINDEX);

    edge_top = edgelist_pointer;

   offset = 0;
   precount = 0;

   while (*edgelist_pointer != ELEMNULL) {
              if (offset == LIST_SIZE - 1) {
                  edgelist_pointer = (Edgelist *)*edgelist_pointer;
                 offset = 0;
                 continue;
              }
              if ((*edgelist_pointer)->status == (SOAP_ARC | ACTIVE)) {
                 if (precount == arc_count - count)
                           break;
                 ++precount;
              }
```

```
            ++edgelist_pointer;
            ++offset;
  }

  while (*edgelist_pointer != ELEMNULL) {
            if (offset == LIST_SIZE - 1) {
               edgelist_pointer = (Edgelist *)*edgelist_pointer;
               offset = 0;
               continue;
            }
            if ((*edgelist_pointer)->status == (SOAP_ARC | ACTIVE)) {
               (*edgelist_pointer)->status = (SOAP_ARC | PENDING);
            }
            ++edgelist_pointer;
    ++offset;
  }
  return(OK);
}

/*-------------------------------------------------------------*/
/*
** VIRTUAL DELETION
** Delete the last element of an edgelist. Do not de-allocate.
** If the last element is already PENDING, no action is taken.
** RETURNS: BADINDEX if no more elements to snap.
*/

short delete_element_last_snappy(edgelist_pointer)
Edgelist    *edgelist_pointer;
{
  Element  *elptr;
  short       element_count, offset;

   element_count = get_edgelist_element_count(edgelist_pointer);
  if (element_count < 1)
            return(BADINDEX);

  offset = element_count - 1;

   elptr = get_edgelist_offset(edgelist_pointer, offset);
```

```
  elptr->status &= ZEROMEMMASK;
  elptr->status |= PENDING;

  return(OK);
}

/*--------------------------------------------------------------*/
/*
** VIRTUAL DELETION
** Delete last n elements from edgelist.
** Any elements already PENDING will be skipped over.
** RETURNS: BADINDEX if count out of range.
*/

short delete_element_last_n_snappy(edgelist_pointer, count)
Edgelist    *edgelist_pointer;
short        count;
{
  short     elemcount, i, offset;
  Element   *elptr;

  /* first make sure there are n elements!        */
  if ((elemcount = get_edgelist_element_count(edgelist_pointer)) < count)
        return(BADINDEX);

  offset = elemcount - count;

  /* start PENDING at elemcount - count */
  for (i=0; i<count; ++i) {
        elptr = get_edgelist_offset(edgelist_pointer, offset+i);
        elptr->status &= ZEROMEMMASK;
        elptr->status |= PENDING;
  }

  return(OK);
}

/*--------------------------------------------------------------*/
/*
```

```
** VIRTUAL DELETION
** Delete element at passed offset in passed edgelist.
** If the element is already PENDING, no action is taken.
** RETURNS: BADINDEX if offset is wrong.
*/

short delete_element_offset_snappy(edgelist_pointer, offset)
Edgelist    *edgelist_pointer;
short           offset;
{
  Element  *elptr;


   elptr = get_edgelist_offset(edgelist_pointer, offset);

  if (elptr != ELEMNULL) {
              elptr->status &= ZEROMEMMASK;
              elptr->status |= PENDING;
              return(OK);
  }

  return(BADINDEX);
}

/* DO NOT PLACE ANY FUNCTIONS AFTER RCS LOG!
$Log:       soapsnap.c,v  $
 * Revision 2.1  90/10/05  10:30:19  dan
 * New Rev
 *
 * Revision 1.2  90/09/25  14:15:45  dan
 * Added #defines for MASKS
 *
 * Revision 1.1  90/08/17  18:25:55  dan
 * Initial revision
 *
*/
```

| | |
|---|---|
| User: | MICRORENTMind |
| Application: | PrintMonitor |
| Document: | soapstuf.c |
| Date: | Wednesday, November 14, 1990 |
| Time: | 8:16:07 PM |
| Printer: | Peace of Mind |

```
/*
** SOAPSTUF.C
**
** Stuffing functions from groupings to Soap
**
** Copyright 1990, VPL Research
**
$Header: /usr/starch/source/starch/RCS/soapstuf.c,v 2.1 90/10/05 10:30:20 dan Exp $
**
*/

#include <stdio.h>
#include <string.h>
#include <gl/gl.h>
#include <memory.h>
#include "soap.h"
#include "soapxtrn.h"
#include "prod.h"
#include "globals.h"
#include "group.h"


Soap_Line  *matis_add_line();
Soap_Arc   *matis_add_arc();
Soap_Cylinder        *matis_add_cylinder();
short                matis_stuff_part();

/*-------------------------------------------------------*/
Soap_Line *matis_add_line(edgeptr, p1, p2, sweepflag)
Edgelist  *edgeptr;
point          *p1, *p2;
short          sweepflag;          /* set to make line a sweep edge */
{
  short  index;

  index = find_free_line();
  if (index == BADINDEX) {
          return((Soap_Line *)0);
  }
```

```
/*
 printf("from %d %d %d  to %d %d %d\n",p1->x,p1->y,p1->z,p2->x,p2->y,p2->z);
 fflush(stdout);
*/
  /* ADD START AND END POINTS TO SOAP */
   soap_line[index].p1.x = (double)p1->x;
   soap_line[index].p1.y = (double)p1->y;
   soap_line[index].p1.z = (double)p1->z;

   soap_line[index].p2.x = (double)p2->x;
   soap_line[index].p2.y = (double)p2->y;
   soap_line[index].p2.z = (double)p2->z;

  /* ADD LINE TO SOAP EDGELIST */
   add_line(edgeptr, index);

  /* CHECK FOR SWEEP FLAG */
  if (sweepflag == 1)
          soap_line[index].status |= SOAP_SWEEP;
  else if (sweepflag == 2)
          soap_line[index].status |= SOAP_CONNECT;

  /* RETURN A POINTER TO THIS LINE */
  return(&(soap_line[index]));
}

Soap_Line *matis_add_line_float(edgeptr, p1, p2, sweepflag)
Edgelist    *edgeptr;
vector          *p1, *p2;
short           sweepflag;           /* set to make line a sweep edge */
{
  short  index;

  index = find_free_line();
  if (index == BADINDEX) {
          return((Soap_Line *)0);
  }
```

```
/*
 printf("from %f %f %f  to %f %f %f\n",p1->x,p1->y,p1->z,p2->x,p2->y,p2->z);
 fflush(stdout);
*/
  /* ADD START AND END POINTS TO SOAP */
    soap_line[index].p1.x = (double)p1->x;
    soap_line[index].p1.y = (double)p1->y;
    soap_line[index].p1.z = (double)p1->z;

    soap_line[index].p2.x = (double)p2->x;
    soap_line[index].p2.y = (double)p2->y;
    soap_line[index].p2.z = (double)p2->z;

  /* ADD LINE TO SOAP EDGELIST */
   add_line(edgeptr, index);

  /* CHECK FOR SWEEP FLAG */
  if (sweepflag == 1)
            soap_line[index].status |= SOAP_SWEEP;
  else if (sweepflag == 2)
            soap_line[index].status |= SOAP_CONNECT;

  /* RETURN A POINTER TO THIS LINE */
  return(&(soap_line[index]));
}

/*----------------------------------------------------------*/
Soap_Arc *matis_add_arc(edgeptr, center, radius, start_angle,
                                offset_angle, direction, rot1, rot2,
                                sweepflag)
Edgelist    *edgeptr;
point           *center;
short            radius, start_angle, offset_angle, direction,
                 rot1, rot2,
                 sweepflag;          /* set to make arc a sweep edge */
{
  short  index;

  index = find_free_arc();
  if (index == BADINDEX) {
```

```
        return((Soap_Arc *)0);
}

/* ADD CENTER POINT TO SOAP */
soap_arc[index].center_world.x = (double)center->x;
soap_arc[index].center_world.y = (double)center->y;
soap_arc[index].center_world.z = (double)center->z;

/* ADD RADIUS */
soap_arc[index].radius = radius;

/* ADD START ANGLE AND OFFSET ANGLE */
soap_arc[index].start_angle = start_angle;
soap_arc[index].offset_angle = offset_angle;

/* ADD DIRECTION FLAG */
soap_arc[index].direction = direction;

/* ADD ROTATIONS AROUND YZ and ZX */
soap_arc[index].rot1 = rot1;
soap_arc[index].rot2 = rot2;

/* ADD ARC TO SOAP EDGELIST */
add_arc(edgeptr, index);

/* CHECK FOR SWEEP FLAG */
if (sweepflag == 1)
        soap_arc[index].status |= SOAP_SWEEP;
else if (sweepflag == 2)
        soap_arc[index].status |= SOAP_CONNECT;

/* RETURN A POINTER TO THE ARC */
return(&(soap_arc[index]));
}

Soap_Arc *matis_add_arc_float(edgeptr, center, radius, start_angle,
                        offset_angle, direction, rot1, rot2,
                        sweepflag)
Edgelist    *edgeptr;
```

```
vector          *center;
short            radius, start_angle, offset_angle, direction,
                rot1, rot2,
                sweepflag;              /* set to make arc a sweep edge */
{
   short   index;

   index = find_free_arc();
  if (index == BADINDEX) {
             return((Soap_Arc *)0);
  }

  /* ADD CENTER POINT TO SOAP */
   soap_arc[index].center_world.x = (double)center->x;
   soap_arc[index].center_world.y = (double)center->y;
   soap_arc[index].center_world.z = (double)center->z;

  /* ADD RADIUS */
   soap_arc[index].radius = radius;

  /* ADD START ANGLE AND OFFSET ANGLE */
    soap_arc[index].start_angle = start_angle;
    soap_arc[index].offset_angle = offset_angle;

  /* ADD DIRECTION FLAG */
   soap_arc[index].direction = direction;

  /* ADD ROTATIONS AROUND YZ and ZX */
   soap_arc[index].rot1 = rot1;
   soap_arc[index].rot2 = rot2;

  /* ADD ARC TO SOAP EDGELIST */
   add_arc(edgeptr, index);

  /* CHECK FOR SWEEP FLAG */
  if (sweepflag == 1)
             soap_arc[index].status |= SOAP_SWEEP;
  else if (sweepflag == 2)
             soap_arc[index].status |= SOAP_CONNECT;
```

```
  /* RETURN A POINTER TO THE ARC */
   return(&(soap_arc[index]));
}

/*---------------------------------------------------------*/
/*
** Add passed data to new cylinder record.
*/

Soap_Cylinder *matis_add_cylinder(edgeptr, center, radius, length,
                                                    direction)
Edgelist   *edgeptr;
point          *center;
short          radius, length, direction;
{
   short   index;

   index = find_free_cylinder();
   if (index == BADINDEX) {
            return((Soap_Cylinder *)0);
   }

  /* ADD CENTER POINT TO SOAP */
   soap_cylinder[index].center_world.x = (double)center->x;
   soap_cylinder[index].center_world.y = (double)center->y;
   soap_cylinder[index].center_world.z = (double)center->z;

  /* ADD RADIUS */
   soap_cylinder[index].radius = radius;

  /* ADD LENGTH */
   soap_cylinder[index].length = length;

  /* ADD DIRECTION FLAG */
   soap_cylinder[index].direction = direction;

  /* ADD CYLINDER TO SOAP EDGELIST */
   add_cylinder(edgeptr, index);
```

```
  /* RETURN A POINTER TO THIS CYLINDER */
   return(&(soap_cylinder[index]));
}

/*--------------------------------------------------------------*/
short matis_stuff_part(part, name, constraint, r, g, b, revflag,
                              porigin, stepsize)
Part                    *part;
char                    *name;
Constraints *constraint;
unsigned char           r, g, b, revflag;
point                   *porigin;
short                   stepsize;
{
  /* THIS IS SCARY!     */
   if (strlen(name) > 19)
            return(NO);

   strcpy(part->nodename, name);
    memcpy(&(part->constraint), constraint, sizeof(Constraints));
  part->r = r;
  part->g = g;
  part->b = b;

   /* Store absolute origin for point subtraction */
   part->absorigin.x = (double)porigin->x;
   part->absorigin.y = (double)porigin->y;
   part->absorigin.z = (double)porigin->z;

  if (revflag)
            part->status |= REVERSE;

  if (stepsize == 0)
            part->stepsize = 10;
  else
            part->stepsize = stepsize;

  return(YES);
}
```

```
/*-----------------------------------------------------*/
/*-----------------------------------------------------*/

/* DO NOT PLACE ANY FUNCTIONS AFTER RCS LOG!
$Log:     soapstuf.c,v $
 * Revision 2.1  90/10/05  10:30:20  dan
 * New Rev
 *
 * Revision 1.7  90/09/28  12:40:15  ethan
 * float routines
 *
 * Revision 1.6  90/09/25  14:13:03  dan
 * Added a stepsize field to matis_stuff_part
 *
 * Revision 1.5  90/09/21  14:58:03  dan
 * Added Connect stuff for Thickening.
 *
 * Revision 1.4  90/09/06  18:10:08  dan
 * How DO YOU?? stuff a part...
 *
 * Revision 1.3  90/09/04  15:27:18  ethan
 * adds in origin
 *
 * Revision 1.2  90/08/30  13:47:00  dan
 * Added new "reverse" argument to matis_stuff_part()
 *
 * Revision 1.1  90/08/17  18:26:16  dan
 * Initial revision
 *
*/
```

| | |
|---|---|
| User: | MICRORENTMind |
| Application: | PrintMonitor |
| Document: | soapxtrn.h |
| Date: | Wednesday, November 14, 1990 |
| Time: | 8:19:42 PM |
| Printer: | Peace of Mind |

```
/*
** SOAPXTRN.H
**
** Extern declarations for applications-level soap routines.
**
** Copyright 1990, VPL Research
**
$Header: /usr/starch/source/starch/RCS/soapxtrn.h,v 2.1 90/10/05 10:30:21 dan Exp $
**
*/

/* from SOAPEDIT.C */
extern Part      *add_part();
extern Edgelist  *add_poly();
extern short     add_point();
extern short     add_line();
extern short     replace_line();
extern short     replace_line_at_offset();
extern short     swap_lines();
extern short     swap_line_start_end();
extern short     insert_line();
extern short     add_arc();
extern short     replace_arc();
extern short     replace_arc_at_offset();
extern short     swap_arcs();
extern short     swap_arc_start_end();
extern short     insert_arc();
extern short     add_cylinder();
extern short     close_poly();
extern void      reverse_edgelist();
extern short     replace_element_at_offset();
extern short     swap_elements();

/* from SOAPNORM.C */
extern Part      *delete_part();
extern short     delete_poly();
extern short     delete_poly_offset();
extern short     delete_poly_last_n();
extern short     delete_poly_last();
```

```
extern short    delete_line();
extern short    delete_arc();
extern short    delete_cylinder();
extern short    delete_line_last();
extern short    delete_line_last_n();
extern short    delete_arc_last();
extern short    delete_arc_last_n();
extern short    delete_element_last();
extern short    delete_element_last_n();
extern short    delete_element_offset();


/* from SOAPQRY.C */
extern Edgelist    *get_poly_offset();
extern Element          *get_edgelist_offset();
extern short    get_line_index_offset();
extern short    get_arc_index_offset();
extern short    get_element_offset();
extern short    get_childlist_length();
extern short    get_polylist_length();
extern short    get_edgelist_element_count();
extern short    get_element_count_restricted();
extern Edgelist    *find_line();
extern Edgelist    *find_arc();
extern Edgelist    *find_cylinder();
extern short    get_edgelist_line_count();
extern short    get_edgelist_arc_count();
extern Element          **get_element_pointer_sequence();
extern void     free_element_pointer_sequence();
extern short    *get_element_sequence();
extern void     free_element_sequence();
extern short    *get_point_sequence();
extern void     free_point_sequence();
extern short    *get_screen_sequence();
extern void     free_screen_sequence();
extern short    find_free_point();
extern short    find_free_line();
extern short    find_free_arc();
extern short    find_free_cylinder();
```

```
extern short    get_unused_line_count();
extern short    get_pending_line_count();
extern short    get_unused_arc_count();
extern short    get_pending_arc_count();
extern short    check_element_in_list();
extern short    get_line_index();
extern short    get_arc_index();
extern short    get_cylinder_index();


/* from SOAPSNAP.C */
extern void     delete_part_snappy();
extern void     delete_poly_snappy();
extern short    delete_poly_offset_snappy();
extern short    delete_poly_last_n_snappy();
extern short    delete_poly_last_snappy();
extern short    delete_line_snappy();
extern short    delete_arc_snappy();
extern short    delete_cylinder_snappy();
extern short    delete_line_last_snappy();
extern short    delete_line_last_n_snappy();
extern short    delete_arc_last_snappy();
extern short    delete_arc_last_n_snappy();
extern short    delete_element_last_snappy();
extern short    delete_element_last_n_snappy();
extern short    delete_element_offset_snappy();


/* from SOAPSCUM.C */
extern void     initialize_object_name();
extern void     initialize_object_array();
extern void     initialize_element_arrays();
extern void     clean_up_edgelist();
extern void     delete_object();
extern void     delete_polylist();
extern short    delete_edgelist();
extern void     garbage_collect();


/* DATA from SOAPSCUM.C */
```

```
extern Soap_Object      soap_object[];
extern Soap_Point       soap_point[];
extern Soap_Line        soap_line[];
extern Soap_Arc                 soap_arc[];
extern Soap_Cylinder    soap_cylinder[];

/* DO NOT PUT ANYTHING AFTER RCS LOG!
$Log:     soapxtrn.h,v  $
 * Revision 2.1  90/10/05  10:30:21  dan
 * New Rev
 *
 * Revision 1.2  90/08/30  13:47:34  dan
 * Added "get_element_pointer_sequence" for reverse support.
 *
 * Revision 1.1  90/08/17  18:26:44  dan
 * Initial revision
 *
*/
```

| | |
|---|---|
| User: | MICRORENTMind |
| Application: | PrintMonitor |
| Document: | winmain.c |
| Date: | Wednesday, November 14, 1990 |
| Time: | 8:20:42 PM |
| Printer: | Peace of Mind |

```
/*
** WINMAIN.C
**
** Window Maintenance / Main Window module
**
** Copyright 1990, VPL Research
**
$Header: /usr/starch/source/starch/RCS/winmain.c,v 2.3 90/10/15 17:46:04 ethan Exp $
**
*/

#include <gl/gl.h>
#include <gl/device.h>
#include <stdio.h>
#include <math.h>
#include "prod.h"
#include "globals.h"

void init_window();
void window_draw_both();
void clear_window();
void window_update();
void window_draw_swap();
void window_draw();
void update_matis_viewport();
void update_soap_viewport();
void update_matis_views();

/* in INTERF.C */
extern short color_on;

static float model[] = {
    AMBIENT, 0.1, 0.1, 0.1,
   LOCALVIEWER, 0.0,
   ATTENUATION, 1.0, 0.0, LMNULL
};

/*-----------------------------------------------------------*/
```

```
void init_window()
{
    prefposition(mainrect[0],mainrect[1],mainrect[2],mainrect[3]);
   keepaspect(1,1);
   mainwin = winopen("Matis View");
  doublebuffer();
  RGBmode();
   gconfig();

  lmdef(DEFLMODEL, 1, 10, model);
  lmbind(LMODEL, 1);

  clear_window();
}

/*-------------------------------------------------------------*/
void window_draw_both()
{
  window_draw_swap();
  window_draw();
}

/*-------------------------------------------------------------*/
void window_update()
{
  clear_window();
  window_draw_swap();
}

/*-------------------------------------------------------------*/
void window_draw_swap()
{
  window_draw();
  swapbuffers();
}

/*-------------------------------------------------------------*/
void update_matis_views()
{
```

```
    update_matis_viewport();
    matis_text_view_update();

   swapbuffers();

    update_matis_viewport();
    matis_text_view_update();
}

/*--------------------------------------------------------*/
void window_draw()
{
    update_matis_viewport();
    matis_text_view_update();
    update_soap_viewport();
    group_view_update_single();
   name_view_update();
   info_views_update();
}

/*--------------------------------------------------------*/
void update_matis_viewport()
{
   if (color_on)
            return;

    set_matis_viewport();
   matis_view_update();
}

/*--------------------------------------------------------*/
void update_swap_matis_viewport()
{
   if (color_on)
            return;

    set_matis_viewport();
   matis_view_update();
  swapbuffers();
   matis_view_update();
```

```
}

/*-----------------------------------------------------------*/
void update_soap_viewport()
{
    set_soap_viewport();

   zbuffer(TRUE);

#ifndef NOCONCAVE
   concave(TRUE);
#endif

    soap_view_update();

   zbuffer(FALSE);

#ifndef NOCONCAVE
   concave(FALSE);
#endif
}

/*-----------------------------------------------------------*/
void clear_window()                    /* assumes the viewport is correct */
{

    clear_messages();

    viewport(0, MAINW, 0, MAINH);
     ortho2((float)0.0,(float)MAINW,(float)0.0,(float)MAINH);

    c3s(wincolor);
   clear();
   zclear();   /* do this for SOAP view */

   swapbuffers();

    c3s(wincolor);
   clear();
```

```
  zclear();  /* do this for SOAP view */

  swapbuffers();
}

/* DO NOT PLACE ANY FUNCTIONS AFTER RCS LOG!
$Log:      winmain.c,v $
 * Revision 2.3  90/10/15  17:46:04  ethan
 * scrollable groups
 *
 * Revision 2.2  90/10/12  19:08:03  ethan
 * clear window does clear messages
 *
 * Revision 2.1  90/10/05  10:30:22  dan
 * New Rev
 *
 * Revision 1.7  90/09/13  10:14:31  dan
 * put in NOCONCAVE #ifdef
 *
 * Revision 1.6  90/09/07  20:15:11  dan
 * rotating light source // explicit light model
 *
 * Revision 1.5  90/09/07  17:53:06  dan
 * Turned down the overhead light!!
 *
 * Revision 1.4  90/08/30  13:48:17  dan
 * Added new lighting for our beautiful kitchen products
 *
 * Revision 1.3  90/08/30  13:03:04  ethan
 * *** empty log message ***
 *
 * Revision 1.2  90/08/18  20:14:33  dan
 * Bug fixes to main window
 *
 * Revision 1.1  90/08/17  18:27:13  dan
 * Initial revision
 *
*/
```

| | |
|---|---|
| User: | MICRORENTMind |
| Application: | PrintMonitor |
| Document: | wringer.c |
| Date: | Wednesday, November 14, 1990 |
| Time: | 8:21:37 PM |
| Printer: | Peace of Mind |

```
/*
** (DEBRA) WRINGER.C
**
** Combine product files and wall data for complete kitchen.
**
** Copyright 1990, by VPL Research
**
$Header: /usr/starch/source/wringer/RCS/wringer.c,v 1.6 90/10/22 13:28:17 mike Exp $
**
*/

#include <stdio.h>
#include <string.h>
#include "plan.h"

#define     YES     1
#define     NO      0

void        main();
void        check_script_files();
short       get_pref();
void        put_prefs();
short       get_command_line();
void        get_color_info();
void        get_generic_color();
void        print_help();

/* from READPLAN.C */
extern short get_first_plan();

/* from WALL2SWV.C */
extern short walls_to_swivel();

/* from NEWNAME.C */
extern void initialize_dictionary();

#define     MAXLOCS     200
#define     MAXWALLS    50
```

```
plan                thisplan;
wall                thewalls[MAXWALLS];
product_location    prodlocs[MAXLOCS];

/* ACCESSED BY NEWNAME.C */
short               prod_ok[MAXLOCS];
char                scriptpath[100];

/* ACCESSED BY WALL2SWV.C */
char                scriptname[100];
WColor              wallcolor, floorcolor, ceilingcolor;

static char   fmplanpath[100];
static char   manage_num[20];
static char   plan_index[20];

/*---------------------------------------------------------------*/
void main(argc, argv)
short      argc;
char       *argv[];
{
  FILE  *planhand;
  short  i;
  int        index;
  char   command[80], planfile[80];


  /* initialize scriptpath to current directory.  */
  scriptpath[0] = '\0';
  fmplanpath[0] = '\0';
  manage_num[0] = '\0';
  plan_index[0] = '\0';

  /* Initialize colors to light grey...     */
  wallcolor.r = wallcolor.g = wallcolor.b = 200;
  floorcolor.r = floorcolor.g = floorcolor.b = 200;
  ceilingcolor.r = ceilingcolor.g = ceilingcolor.b = 200;

  index = -1;
```

```
/* argc = 1 / argv[0] == program invoke */
for (i=1; i<argc; ++i) {
          strcpy(command, argv[i]);

          if (command[0] != '-') {
             continue;
          }

          if (command[1] == 'h' || command[1] == 'H') {
             print_help();
             exit(0);
  } else if (command[1] == 'p' || command[1] == 'P') {
             if (!get_command_line(argc, argv, i, scriptpath, YES))
                     ++i;
          } else if (command[1] == 'f' || command[1] == 'F') {
             if (!get_command_line(argc, argv, i, fmplanpath, YES))
                     ++i;
          } else if (command[1] == 'n' || command[1] == 'N') {
             if (!get_command_line(argc, argv, i, plan_index, NO))
                     ++i;
             index = atoi(plan_index);
          } else if (command[1] == 'm' || command[1] == 'M') {
             if (!get_command_line(argc, argv, i, manage_num, NO))
                     ++i;
          }
}

/* check preferences */
if (strlen(fmplanpath) == 0) {
          if (!get_pref(1,fmplanpath))
            printf("\nASSUMING CURRENT DIRECTORY FOR FMPLAN");
}
if (strlen(scriptpath) == 0) {
          if (!get_pref(2,scriptpath))
            printf("\nASSUMING CURRENT DIRECTORY FOR SWIVEL SCRIPTS");
}
if (index == -1 && strlen(manage_num) == 0) {
          if (!get_pref(3,manage_num)) {
```

```
            if (!get_pref(4,plan_index))
                    printf("\nASSUMING PLAN FILE INDEX 0 FOR EVALUATION");
            else
                    index = atoi(plan_index);
        }
}

/* OPEN THE PLAN FILE */
 strcpy(planfile, fmplanpath);
 strcat(planfile, "fmplan");

if ((planhand = fopen(planfile, "r")) == NULL) {
        printf("\nCOULDN'T OPEN \"%s\"",planfile);
        exit(1);
}

if (strlen(manage_num) == 0) {
        if (index == -1)
          index = 0; /* default to first plan...              */
        sprintf(scriptname,"PLAN%d",index);
} else {
        strcpy(scriptname, manage_num);

        index = 0;   /* will decode manage_num by default*/
}

/* UPDATE THE PREFERENCES FILE */
put_prefs();

++index;

/* READ THE PLAN     */
 if (read_plan(planhand, manage_num, index, fmplanpath) < 0) {
        fclose(planhand);
        printf("\nCOULD NOT READ PLAN FILE!");
        exit(1);
}

 fclose(planhand);
```

```
/* CHECK SCRIPT AVAILABILITY   */
 check_script_files();

/* INITIALIZE OUR DICTIONARY   */
 initialize_dictionary();

/* GET COLOR INFORMATION         */
 get_color_info();

 /* now do something with data */
 if (walls_to_swivel() == NO)
          printf("\nPROBLEM WRITING SCRIPT FILE...");

}

/*---------------------------------------------------------------*/
void print_help()
{
  printf("\nWRINGER 1.0 FILE CONVERTER HELP MENU:");
   printf("\nOption          Action");
   printf("\n----------------------------------");
   printf("\n  -p             Script Path");
   printf("\n  -f             FMPLAN Path");
   printf("\n  -n             Plan Index Number");
   printf("\n  -m             Managing Number");
   printf("\n  -h             Help");
   printf("\n----------------------------------");
   printf("\nwringer.color -- FORMAT:");
   printf("\n  Keyword 100 200 255");
  printf("\n    |    ^   ^   ^");
  printf("\n    V    R   G   B");
   printf("\n  walls");
   printf("\n  ceiling");
   printf("\n  floor\n\n");
}

/*---------------------------------------------------------------*/
void put_prefs()
{
```

```
  FILE   *handle;


  if ((handle = fopen("wringer.prefs","w")) == NULL) {
            printf("\nCOULD NOT WRITE TO wringer.prefs FILE");
            return;
  }
   fprintf(handle,"%s\n",fmplanpath);
   fprintf(handle,"%s\n",scriptpath);
   fprintf(handle,"%s\n",manage_num);
   fprintf(handle,"%s\n",plan_index);

  fclose(handle);
}

/*------------------------------------------------------------*/
short get_pref(offset,dest)
short      offset;
char       *dest;
{
  FILE   *handle;
  short  i;

  /* open wringer.prefs file in current directory */
  if ((handle = fopen("wringer.prefs","r")) == NULL)
            return(NO);

  /* All fields guaranteed to be present...         */

  for (i=0; i<offset; ++i) {
            if (fgets(dest,100,handle) == NULL) {
               fclose(handle);
              return(NO);
            }
  }
  if (*dest == '\n') {
            *dest = '\0';    /* for when it's written out again! */
            fclose(handle);
            return(NO);
```

```
    }

    while (*dest != '\n')
            ++dest;

    *dest = '\0';

    fclose(handle);
   return(YES);
}

/*------------------------------------------------------*/
void check_script_files()
{
   char    curfile[80], lffile[80];
   FILE    *handle, *lfhandle;
   short   i, j, k, prodindex, writeflag, repeatcount;


    strcpy(lffile,thisplan.manag_num);
    strcat(lffile,".lf");

   if ((lfhandle = fopen(lffile,"w")) == NULL)
            writeflag = NO;
   else
            writeflag = YES;

   prodindex = 0;

   for (i=0; i<thisplan.wallsnum; ++i) {
            /* reference directly from wall records, since product      */
            /* record does not correctly reference the wall index.      */
            for (j=0; j<thewalls[i].num_of_prods; ++j) {
                strcpy(curfile, scriptpath);
                strcat(curfile, prodlocs[prodindex + j].prod_name);
                strcat(curfile, ".SWV");

                handle = fopen(curfile, "r");

                if (handle == NULL) {
```

```
                        if (writeflag)
                            fprintf(lfhandle,"LOST : %20s\n",
                                    prodlocs[prodindex + j].prod_name);
                        prod_ok[prodindex + j] = NO;
                } else {
                        if (writeflag)
                            fprintf(lfhandle,"FOUND: %20s\n",
                                    prodlocs[prodindex + j].prod_name);
                        prod_ok[prodindex + j] = YES;
                        fclose(handle);

                        /* See how many other instances there are... */
                        repeatcount = 0;
                        for (k=0; k < prodindex + j; ++k) {
                            if (strcmp(prodlocs[k].prod_name,
                                    prodlocs[prodindex + j].prod_name) == 0)
                                ++repeatcount;
                        }
                        prod_ok[prodindex + j] += repeatcount;
                }
            }
            prodindex += j;
    }
    if (writeflag)
            fclose(lfhandle);
}

/*---------------------------------------------------------------*/
short get_command_line(argc, argv, curoff, dest, slashflag)
short       argc;
char        *argv[];
short       curoff;
char        dest[];
short       slashflag;
{
    char   command[80];
    short  i, j;
```

```
  strcpy(command, argv[curoff]);

  i = 2;

  /* check for space between option identifier and argument...   */
  if (command[i] == '\0') {
          if (curoff < (argc - 1)) {
            strcpy(command, argv[curoff + 1]);
            if (command[0] != '-') {
                    i = 0;        /* assume path starts here */
            } else {
                    dest[0] = '\0';
                    return(1);
            }
          } else { /* choose current directory */
            dest[0] = '\0';
            return(1);
          }
  }

  strcpy(dest, &(command[i]));

  if (slashflag) {
          j = strlen(command);
          if (command[j-1] != '/')
            strcat(dest, "/");
  }

  return(i);
}

/*-----------------------------------------------------------*/
void get_color_info()
{
  FILE  *handle;
  char  textline[100], *s;

  /* Look for color file: wringer.color   */
  if ((handle = fopen("wringer.color","r")) == NULL)
```

```
            return;         /* Use defaults...  */

    /* Look for Key Words...                                              */
    /* Remember that colors have already been initialized!! */
    while (fgets(textline,100,handle) != NULL) {
            s = textline;
            while (*s == ' ') ++s;      /* skip blank */
            if (*s == 'W' || *s == 'w') {
                get_generic_color(textline, &wallcolor);
            } else if (*s == 'F' || *s == 'f') {
                get_generic_color(textline, &floorcolor);
            } else if (*s == 'C' || *s == 'c') {
                get_generic_color(textline, &ceilingcolor);
            }
    }
    fclose(handle);
}

/*-------------------------------------------------------------*/
void get_generic_color(line, color)
char        *line;
WColor      *color;
{
    char    number[10], *s, *w;

    s = line;

    while ((*s < '0' || *s > '9') && *s != '\n' && *s != '\0') ++s;
    w = number;
    while (*s >= '0' && *s <= '9')
            *w++ = *s++;
    *w = '\0';
    if (strlen(number) == 0) {
            return;
    }
    color->r = (short)atoi(number);

    while ((*s < '0' || *s > '9') && *s != '\n' && *s != '\0') ++s;
    w = number;
    while (*s >= '0' && *s <= '9')
```

```
        *w++ = *s++;
    *w = '\0';
    if (strlen(number) == 0) {
        return;
    }
    color->g = (short)atoi(number);

    while ((*s < '0' || *s > '9') && *s != '\n' && *s != '\0') ++s;
    w = number;
    while (*s >= '0' && *s <= '9')
        *w++ = *s++;
    *w = '\0';
    if (strlen(number) == 0) {
        return;
    }
    color->b = (short)atoi(number);
}

/* DO NOT PLACE ANY FUNCTIONS AFTER THE RCS LOG!
$Log:   wringer.c,v $
 * Revision 1.6  90/10/22  13:28:17  mike
 * changed output format for Lost and Found.
 *
 * Revision 1.5  90/10/19  15:45:50  dan
 * Now reads color file for walls, ceiling, and floor
 *
 * Revision 1.4  90/10/01  13:21:21  dan
 * Support for giant products bug fix, also fixed MAXLOCS for
 * larger kitchens....
 *
 * Revision 1.3  90/09/04  11:36:30  dan
 * Added lost and found print out and prefs file stuff.
 *
 * Revision 1.2  90/09/01  12:16:50  dan
 * Added Dictionary name checking
 *
 * Revision 1.1  90/08/27  10:11:24  dan
 * Initial revision
 *
```

*/

| | |
|---|---|
| User: | MICRORENTMind |
| Application: | PrintMonitor |
| Document: | interf.c |
| Date: | Wednesday, November 14, 1990 |
| Time: | 8:28:42 PM |
| Printer: | Peace of Mind |

```
/*
** INTERF.C
**
** Pop-up dialog box interfaces...
**
** Copyright 1990, VPL Research
**
$Header: /usr/starch/source/starch/RCS/interf.c,v 2.10 90/10/26 14:58:16 ethan Exp $
**
*/

#include <gl/gl.h>
#include <gl/device.h>
#include <stdio.h>
#include <math.h>
#include "prod.h"
#include "globals.h"

/* in COLOR.C */
extern void color_screen();

void do_main_menu();
void do_group_menu();
void load_matis();
void load_soap();
void save_soap();
void set_matis_dir();
Boolean get_matis_dir();
void set_groupings_dir();
void set_swivel_dir();
void delete_userpoly();

Boolean get_user_string();
void feedback_view_update();
void set_feedback_viewport();
void show_feedback_text();
void clear_messages();
void wait_for_click();
```

```
void load_groupings();
void save_groupings();

extern flag_quit();
extern group_poly();
extern group_wireframe();
extern group_sweep();
extern make_polygon();
extern group_part();
extern name_part();
extern set_part_origin();
extern replace_default();
extern delete_default();
extern thicken_poly();
extern ungroup();
extern convert_to_soap();
extern close_rect();
extern extend_to_rect();


/* THESE ARE ACCESSED BY COLOR.C! */
long colmenu_off, colmenu_on, colmenu_con_on, colmenu_norm_on;

static long polymenu;
static long dirmenu;
static long filemenu;
static long groupmenu;
static long menu;

static char curin[120]; /* current input line */
static char curprompt[80];

static short feedbrect[4];
static char menustring[200];


#define fby    20
#define fbx    25
```

```
/* THIS IS A GLOBAL! */
short        color_on;

/*-------------------*/
/*
** THIS ROUTINE SHOULD ONLY BE CALLED ONCE!
*/

void init_menus()
{
  polymenu=
          defpup("Poly Edit Menu %t|Close Rectangle |Extend to Rectangle ");

  dirmenu=
          defpup("Directory Menu %t|Set Matis Directory %f|Set Groupings Directory %f|Set Swivel Directory
%f",set_matis_dir,set_groupings_dir,set_swivel_dir);

  filemenu=
          defpup("File Menu %t|Load Groupings %f|Save Groupings %f|Directories
%m",load_groupings,save_groupings,dirmenu);

  groupmenu=
          defpup("Group Menu %t|Group Polygon %f|Group Wireframe %f|Make Polygon %l|Delete Polygon
%f|Ungroup %f%l|Thicken Polygon %f|Set Origin %f|Name Part %f|Replace Default %f|Delete Default %f",

group_poly,group_wireframe,delete_userpoly,ungroup,thicken_poly,set_part_origin,name_part,replace_default
,delete_default);

  menu=
          defpup("Matis Menu %t|Soap Edit|Load Matis %f|Convert %f|File Menu %m|Group Menu %m%l|Quit
%f",load_matis,convert_to_soap,filemenu,groupmenu,flag_quit);

  colmenu_off =
          defpup("Soap Menu %t|Get Color |Set Color |Normal ON |Reverse |Stepsize  |Convert ON %l|Soap
Exit");
  colmenu_on =
          defpup("Soap Menu %t|Get Color |Set Color |Normal OFF |Reverse |Stepsize |Convert OFF %l|Soap
Exit");
  colmenu_con_on =
          defpup("Soap Menu %t|Get Color |Set Color |Normal ON |Reverse |Stepsize  |Convert OFF %l|Soap
```

```
Exit");
   colmenu_norm_on =
            defpup("Soap Menu %t|Get Color |Set Color |Normal OFF |Reverse |Stepsize |Convert ON %l|Soap
Exit");

   color_on = 0;
}

void do_main_menu()
{
   short  index;

   index = dopup(menu);

   if (index == 1)
            color_screen();
}

void do_group_menu()
{
   short  index;

   index = dopup(groupmenu);

   if (index == 3)
            make_polygon();
}

void do_poly_menu()
{
   short  index;

   index = dopup(polymenu);

   if (index == 1)
            close_rect();
   else if (index == 2)
            extend_to_rect();
}
```

```
void load_matis()
{
   short val;

   if(!save_changes()) return;

   feedbrect[LEFTINDEX] = 350;
   feedbrect[RIGHTINDEX] = 750;
   feedbrect[BOTINDEX] = 400;
   feedbrect[TOPINDEX] = 450;

   sprintf(curprompt,"Product name(or <enter>): ");
   curin[0] = '\0';

   if(!get_user_string(curprompt,curin,20,feedbrect,fbx,fby)) return;

   if(curin[0] != '\0') {
            open_product_file();
            load_product(0,curin,1);
            close_product_file();
            return ;   /* this return is necessary */
   }

   sprintf(curprompt,"Product number: ");
   sprintf(curin,"%d",curprodnum);
   if(!get_user_string(curprompt,curin,6,feedbrect,fbx,fby)) return;

   open_product_file();

   load_product(atoi(curin),"",1);
   close_product_file();
}


void load_groupings()
{
   char *c;
   char mess[80];
```

```
 sprintf(curprompt,"Load groupings file: ");
 sprintf(curin,"%s",product.pname);

feedbrect[LEFTINDEX] = 400;
feedbrect[RIGHTINDEX] = 800;
feedbrect[BOTINDEX] = 400;
feedbrect[TOPINDEX] = 450;

 if(!get_user_string(curprompt,curin,20,feedbrect,fbx,fby)) return;

 /*convert to all uppers*/
 for(c=curin; *c != '\0' ;c++) *c = toupper(*c);

 if(!read_groupings(curin)){
           sprintf(mess,"\nFile \"%s.group\" could not be found\n",curin);
           show_message(mess,MAINW/2,MAINH/2,25,20);
           wait_for_click();
           clear_messages();
           return;
 }
 window_draw_both();
}

void save_groupings()
{
  char *c;

  sprintf(curprompt,"Save groupings file as: ");
  sprintf(curin,"%s",curgroupname);

 feedbrect[LEFTINDEX] = 400;
 feedbrect[RIGHTINDEX] = 800;
 feedbrect[BOTINDEX] = 400;
 feedbrect[TOPINDEX] = 450;

  if(!get_user_string(curprompt,curin,20,feedbrect,fbx,fby)) return;

 /*convert to all uppers*/
 for(c=curin; *c != '\0' ;c++) *c = toupper(*c);
```

```
    write_groupings(curin);
    strcpy(curgroupname,curin);
}

Boolean save_changes()
{
    if(!changeflag) return TRUE;

    feedbrect[LEFTINDEX] = 200;
    feedbrect[RIGHTINDEX] = 800;
    feedbrect[BOTINDEX] = 400;
    feedbrect[TOPINDEX] = 450;

    while(TRUE){
            sprintf(curprompt,
               "Save the changes to this product (y or n, <Esc> to cancel)? ");
            curin[0] = '\0';

            if(!get_user_string(curprompt,curin,20,feedbrect,fbx,fby))
              return FALSE;
            if(curin[0] == 'y') {
               show_message("I am now saving the swivel and groupings files ....",
                            MAINW/2,MAINH/2 + 120 ,25,20);
               convert_to_soap();
               write_groupings(curgroupname);
               clear_messages();
              return TRUE;
            }
            else if(curin[0] == 'n') return TRUE;
    }
}

void set_matis_dir()
{
    get_matis_dir();

    open_product_file();
    close_product_file();
}
```

```
Boolean get_matis_dir()
{
  feedbrect[LEFTINDEX] = 300;
  feedbrect[RIGHTINDEX] = 900;
  feedbrect[BOTINDEX] = 400;
  feedbrect[TOPINDEX] = 450;

   sprintf(curprompt,"Matis directory: ");
   sprintf(curin,"%s",matisdir);

   if(!get_user_string(curprompt,curin,80,feedbrect,fbx,fby)) return FALSE;

   strcpy(matisdir,curin);
  return (TRUE);

}

void set_groupings_dir()
{
  feedbrect[LEFTINDEX] = 300;
  feedbrect[RIGHTINDEX] = 900;
  feedbrect[BOTINDEX] = 400;
  feedbrect[TOPINDEX] = 450;

   sprintf(curprompt,"Groupings directory: ");
   sprintf(curin,"%s",groupingsdir);

   if(!get_user_string(curprompt,curin,80,feedbrect,fbx,fby)) return;

   strcpy(groupingsdir,curin);
}

void set_swivel_dir()
{
  feedbrect[LEFTINDEX] = 300;
  feedbrect[RIGHTINDEX] = 900;
  feedbrect[BOTINDEX] = 400;
  feedbrect[TOPINDEX] = 450;
```

```
    sprintf(curprompt,"Swivel directory: ");
    sprintf(curin,"%s",swiveldir);

    if(!get_user_string(curprompt,curin,80,feedbrect,fbx,fby)) return;

    strcpy(swiveldir,curin);
}

void delete_userpoly()
{
    short pnum;

    feedbrect[LEFTINDEX] = 480;
    feedbrect[RIGHTINDEX] = 730;
    feedbrect[BOTINDEX] = MAINH/2-120;
    feedbrect[TOPINDEX] = MAINH/2-70;

    sprintf(curprompt,"User Poly number: ");
    sprintf(curin,"");

    if(!get_user_string(curprompt,curin,3,feedbrect,fbx,fby)) return;

    if(atoi(curin) >= upolycntr || atoi(curin) < 0) return;
    pnum = (short)atoi(curin);

    show_message("Deleting a User Poly means I must delete",
                            MAINW/2,MAINH/2,25,20);
    show_message("all groupings which use it!",
                            MAINW/2,MAINH/2-60,25,20);
    sprintf(curprompt,"Is this OK (y or n)? ");
    sprintf(curin,"");

    if(get_user_string(curprompt,curin,2,feedbrect,fbx,fby)){
            if(curin[0] == 'y')
                delete_upoly(pnum);
    }
    clear_messages();
```

```
  changeflag = TRUE;
}

/*-----------------------------------*/
Boolean  get_user_string(prompt,userStr,maxlen,rect,xoffset,yoffset)
char *prompt, *userStr;
int maxlen;
short *rect;
short  xoffset,yoffset;
{
#define clearprompt(aprmpt) color(PUP_WHITE); clear(); color(PUP_BLACK);          rects(0,0,wxsize,
cmov2s(xoffset, yoffset); charstr(aprmpt);

   int cur_str_len;
  short c;
  Device dev;
  char *str;
  char *prmpt = prompt, keyBoardWasQueued;
  long oldmode;
   short  wxsize, wysize,maxwidth;
  Boolean initflg = TRUE;

  /* save old state to restore latter */

  oldmode = getdrawmode();
  keyBoardWasQueued = isqueued(KEYBD);

                          /* enable overlay, and be sure rubber band box will be red */
  drawmode(PUPDRAW);
                          /* figure out how big we are this time around */

  /*set up the viewport*/
  viewport(rect[LEFTINDEX],rect[RIGHTINDEX],rect[BOTINDEX],rect[TOPINDEX]);

  frontbuffer(TRUE);

  wxsize = rect[RIGHTINDEX] - rect[LEFTINDEX];
  wysize = rect[TOPINDEX] - rect[BOTINDEX];

    ortho2(0,(float)wxsize+0.5,0,(float)wysize+0.5);
```

```
    maxwidth = (wxsize-xoffset) - (xoffset + strwidth(prompt));

/*   userStr[0] = '\0';*/

    /* display prompt */
    cur_str_len = strlen(userStr);
    clearprompt(prmpt);
    /* display rightmost portion of current string */
    for(str=userStr; *str && strwidth(str) > maxwidth; str++)
      ;
    charstr(str);


   qdevice(KEYBD);
   qdevice(ESCKEY);
   /* read till eof ('\n' or '\r') */
   while(dev = qread(&c)) {
              switch(dev) {
                case REDRAW:
/*
                          drawmode(PUPDRAW);
                          frontbuffer(TRUE);
                          color(PUP_CLEAR);
                          clear();
*/
                          frontbuffer(FALSE);
                          drawmode(oldmode);

                          clear_window();
                          window_draw_both();

                          drawmode(PUPDRAW);
                          viewport(rect[LEFTINDEX],rect[RIGHTINDEX],
                                      rect[BOTINDEX],rect[TOPINDEX]);
                          frontbuffer(TRUE);
                     ortho2(0,(float)wxsize+0.5,0,(float)wysize+0.5);
                          qreset();
                          qdevice(KEYBD);
```

```
            cur_str_len = strlen(userStr);
            clearprompt(prmpt);
            /* display rightmost portion of current string */
            for(str=userStr; *str && strwidth(str) > maxwidth; str++);
            charstr(str);
            break;
case ESCKEY:
            if(c == 0) break;
            goto escape;
case LEFTMOUSE:
            if(c == 0) break;
            goto done;
case WINSHUT:
case WINQUIT:
            quit();
case KEYBD:
            /*start fresh on first keystroke except on <backspace>*/
            if(initflg){
              if(c != '\b'){
                        cur_str_len = 0;
                        clearprompt(prmpt);
              }
              initflg = FALSE;
            }
            switch(c) {
              case '\027':       /* ^W sets cursor back to start */
                        cur_str_len = 0;
                        clearprompt(prmpt);
                        break;
              case '\n':
              case '\r':
              goto done;
              case '\b':
                        if(cur_str_len) {
                          userStr[--cur_str_len] = '\0';
                          clearprompt(prmpt);
                          /* display rightmost portion */
                          for(str=userStr; *str && strwidth(str) > maxwidth;
```

```
                        charstr(str);
                    }
                    break;
                default:
                    if(cur_str_len < (maxlen -1)) {
                    str = &userStr[cur_str_len];
                    userStr[cur_str_len++] = c;
                    userStr[cur_str_len] = '\0';
                    charstr(str);
                    }
                    else {
                        ringbell();
                    }
                    break;
            }
        default:
            break;
    }

  }
done:

  frontbuffer(FALSE);

  if(!keyBoardWasQueued) unqdevice(KEYBD);
  drawmode(PUPDRAW);
  color(PUP_CLEAR);
  clear();
  drawmode(oldmode);

  userStr[maxlen] = '\0';
  return TRUE;
escape:

  frontbuffer(FALSE);

  if(!keyBoardWasQueued) unqdevice(KEYBD);
  drawmode(PUPDRAW);
  color(PUP_CLEAR);
```

```
  clear();
  drawmode(oldmode);

  userStr[maxlen] = '\0';
  return FALSE;
}

/*-----------------------------------------*/
Boolean show_message(prompt,x,y,xoffset,yoffset)
char *prompt;
short x,y;
short xoffset,yoffset;
{
  long oldmode;
  short wxsize,wysize;
  long width;

  oldmode = getdrawmode();

  pushmatrix();
  pushviewport();

  /* enable overlay */
  drawmode(PUPDRAW);

  /*set up the viewport*/
  width = strwidth(prompt);

  viewport(x-(width/2)-xoffset,x+(width/2)+xoffset,y,y+50);

  wxsize = strwidth(prompt) + 2*xoffset;
  wysize = 50;
  ortho2(0,(float)wxsize+0.5,0,(float)wysize+0.5);

  color(PUP_WHITE);
  clear();
  color(PUP_BLACK);
  rects(0,0,wxsize,wysize);
  cmov2s(xoffset, yoffset);
  charstr(prompt);
```

```
    popviewport();
    popmatrix();

   drawmode(oldmode);
}

void clear_messages()
{
   long oldmode;

   oldmode = getdrawmode();

    pushmatrix();
    /*set up the viewport*/
    pushviewport();

   viewport (0,mainrect[RIGHTINDEX] - mainrect[LEFTINDEX],
               0,mainrect[TOPINDEX] - mainrect[BOTINDEX]);


   ortho2 (0,mainrect[RIGHTINDEX] - mainrect[LEFTINDEX],
               0,mainrect[TOPINDEX] - mainrect[BOTINDEX]);

   drawmode(PUPDRAW);
   color(PUP_CLEAR);
   clear();

    popviewport();
    popmatrix();

   drawmode(oldmode);
}

void wait_for_click()
{
   Device dev;
    short val;
```

```
  qreset();
  while(TRUE){
            dev = qread(&val);
            switch(dev){
              case LEFTMOUSE:
              case RIGHTMOUSE:
              case MIDDLEMOUSE:
                        if(val == 0) continue;
                        return;
            }
  }

}

/*-----------------------------------------*/
/* DO NOT PLACE ANY FUNCTIONS AFTER RCS LOG!
$Log:     interf.c,v $
 * Revision 2.10  90/10/26  14:58:16  ethan
 * *** empty log message ***
 *
 * Revision 2.9  90/10/24  17:15:38  ethan
 * *** empty log message ***
 *
 * Revision 2.8  90/10/24  15:05:47  dan
 * Added two more menus for Convert option is soap edit menu.
 *
 * Revision 2.7  90/10/23  21:42:42  ethan
 * load groupings show_message
 *
 * Revision 2.6  90/10/23  15:29:10  ethan
 * changeflag
 *
 * Revision 2.5  90/10/22  15:22:10  mike
 * calls to load product must include flag to convert them now.
 * this was added.
 *
 * Revision 2.4  90/10/19  19:13:47  ethan
 * rearranged main menu
 *
 * Revision 2.3  90/10/16  16:36:58  ethan
```

```
* menu lines
*
* Revision 2.2  90/10/12  19:07:42  ethan
* polyedit menu
*
* Revision 2.1  90/10/05  10:29:56  dan
* New Rev
*
* Revision 1.14  90/09/27  14:58:31  dan
* Added Get Color and Switched ON/OFF for Normals menu entry....(!)
*
* Revision 1.13  90/09/27  14:41:21  ethan
* group wireframe
*
* Revision 1.12  90/09/25  14:08:35  dan
* Added stepsize menu entry and fixed ortho2's to not cut off borders.
*
* Revision 1.11  90/09/25  13:05:34  ethan
* single group command
* thicken by length
*
* Revision 1.10  90/09/21  14:48:58  ethan
* handles user polys
*
* Revision 1.9  90/09/12  19:39:12  ethan
* error messages
*
* Revision 1.8  90/09/10  13:57:47  mike
* error message clear added for load_matis()
*
* Revision 1.7  90/09/07  19:17:31  mike
* event queue changed for window quit
*
* Revision 1.6  90/08/30  13:38:52  dan
* Made new versions of colmenus
*
* Revision 1.5  90/08/30  13:02:38  ethan
* *** empty log message ***
*
```

```
* Revision 1.4  90/08/28  11:04:01  dan
* Changed color menu.
*
* Revision 1.3  90/08/27  20:37:11  ethan
* *** empty log message ***
*
* Revision 1.2  90/08/18  20:14:50  dan
* Color window support and bug fixes
*
* Revision 1.1  90/08/17  18:19:58  dan
* Initial revision
*
*/
```

| | |
|---|---|
| User: | MICRORENTMind |
| Application: | PrintMonitor |
| Document: | soap2iris.c |
| Date: | Wednesday, November 14, 1990 |
| Time: | 8:23:58 PM |
| Printer: | Peace of Mind |

```
/*
** SOAP2IRIS.C
**
** Make IRIS display list from Soap
**
** Copyright 1990, VPL Research
**
$Header: /usr/starch/source/starch/RCS/soap2iris.c,v 2.2 90/10/24 16:58:46 dan Exp $
**
*/

#include <stdio.h>
#include <malloc.h>
#include <string.h>
#include <math.h>
#include <gl/gl.h>
#include "soap.h"
#include "soapxtrn.h"


void        convert_to_iris();
void        iris_do_iris_thang();
void        iris_write_part();
void        iris_write_part_data();
void        iris_do_polylist_thang();
void        iris_do_polygon_thang();
void        iris_do_polymesh();
void        iris_do_connect_mesh();
void        iris_do_cylinder_mesh();
void        iris_do_endcap_thang();
void        iris_do_normal();
void        iris_normal_polygon();
void        xform_relative();
void        rotate_relative_origin();
void        rotate_relative_origins();


/* from BREEZE.C */
extern short eq_epsilon_check();
```

```
extern short ne_epsilon_check();

/* from BREEZE.C */
extern void order_edgelist();
extern void fill_arc_start_stop();
extern void test_line_next();
extern void test_arc_next();

/* from COLOR.C */
extern double           norm_maxval;

/* Generic MATERIAL for all parts */
/* length INCLUDES LMNULL = 15     */
static float generic_material[] = {
   SPECULAR, 0.62, 0.62, 0.62,    /* leave this white always          */
   DIFFUSE, 0.0, 0.0, 0.0,        /* set to color normalized to 0.5   */
   SHININESS, 10.0,               /* relatively shiny...              */
   AMBIENT, 0.0, 0.0, 0.0,        /* set to color normalized to 0.2   */
  LMNULL
};

static short material_index;

/* Put this 36K thing in DATA, not stack... */
static FPoint           meshpoints[MAX_CONNECT * MAX_CONNECT];

/* This has to be a float. */
static float  fnormal[3];

/*---------------------------------------------------------*/
/*
** MAIN CONVERSION WRITE ROUTINE
*/

void convert_to_iris(object_index)
short       object_index;
{

   if (soap_object[object_index].root == PARTNULL)
```

```
            return;

    /* perform an explicit garbage collection          */
    garbage_collect();

    /* check again!                                     */
    if (soap_object[object_index].root == PARTNULL)
            return;

     rotate_relative_origins(soap_object[object_index].root);

    /* initialize material index */
    material_index = 1;

     iris_do_iris_thang(soap_object[object_index].root);
}

/*------------------------------------------------------------*/
void rotate_relative_origins(part)
Part         *part;
{
   Childlist  *childptr;
   short      offset;
   Part       *parent;
   FPoint     relpoint;


   childptr = part->child_top;

   if (childptr != CHILDNULL) {
            offset = 0;
            while (*childptr != PARTNULL) {
              if (offset == LIST_SIZE - 1) {
                        childptr = (Childlist *)*childptr;
                        offset = 0;
                        continue;
              }
               rotate_relative_origins(*childptr);

              ++childptr;
```

```
            ++offset;
        }
  }

  /* if terminal node... */

   rotate_relative_origin(part);
}

/*--------------------------------------------------------------*/
/*
** Swing through the hierarchy.
*/

void iris_do_iris_thang(part)
Part        *part;
{
  short     offset;
  Childlist *childptr;


   iris_write_part(part);

  /* descend hierarchy   */
  /* for all children... */

   childptr = part->child_top;

  if (childptr != CHILDNULL) {
            offset = 0;
            while (*childptr != PARTNULL) {
               if (offset == LIST_SIZE - 1) {
                        childptr = (Childlist *)*childptr;
                        offset = 0;
                        continue;
               }

                 iris_do_iris_thang(*childptr);
```

```
                ++childptr;
                ++offset;
            }
    }
}


/*----------------------------------------------------------*/
/*
**
*/
void iris_write_part(part)
Part            *part;
{
    float   r, g, b;

    /* for NODES with no polygons..                           */
    if (part->poly_top == POLYNULL) {
                return;
    }

    /* part color: normalize to 1.0               */
    /* change material definition to this color   */
    r = (float)part->r / 255.0;
    g = (float)part->g / 255.0;
    b = (float)part->b / 255.0;

    /* set ambient coefficients          */
    /* normalize to 0.2                  */
    generic_material[11] = r / 5.0;
    generic_material[12] = g / 5.0;
    generic_material[13] = b / 5.0;

    /* set diffuse coefficients          */
    /* normalize to 0.5                  */
    generic_material[5] = r / 2.0;
    generic_material[6] = g / 2.0;
    generic_material[7] = b / 2.0;

    lmdef(DEFMATERIAL, material_index, 15, generic_material);
```

```
   lmbind(MATERIAL, material_index);
   ++material_index;

    iris_do_polylist_thang(part,NO,NO);
}


/*-----------------------------------------------------------*/
/*
**
*/
void iris_do_polylist_thang(part, lineflag, shownormal)
Part        *part;
short       lineflag, shownormal;
{
   Polylist  *polyptr;
   short     offset;


   /* go through polylist for part...                          */

  if (part->poly_top != POLYNULL) {
           offset = 0;
           polyptr = part->poly_top;

           while (*polyptr != EDGENULL) {
              if (offset == LIST_SIZE - 1) {
                       polyptr = (Polylist *)*polyptr;
                       offset = 0;
                       continue;
              }
              if (((**polyptr)->status & GEOMASK) == SOAP_ROTSWEEP) {
                       iris_do_polymesh(part, *polyptr,lineflag,shownormal);
              } else if (((**polyptr)->status & GEOMASK) == SOAP_CONNECT ||
                          ((**polyptr)->status & GEOMASK) == SOAP_SWEEP) {
                       iris_do_connect_mesh(part, *polyptr,lineflag,shownormal);
              } else if (((**polyptr)->status & CYLMASK) == SOAP_CYLINDER) {
                       iris_do_cylinder_mesh(part, *polyptr,lineflag,shownormal);
              } else if (((**polyptr)->status & GEOMASK) == SOAP_ENDCAP) {
```

```
                iris_do_endcap_thang(part,lineflag,shownormal);
            } else {
                iris_do_polygon_thang(part, *polyptr, lineflag,shownormal);
            }

            ++polyptr;
            ++offset;
        }
    } /* else no polygons for this part! (NOTHING DISPLAYED) */
}

/*---------------------------------------------------------*/
/*
** SWIVELIZE a MESH.
*/

void iris_do_polymesh(part, edgeptr, lineflag, shownormal)
Part          *part;
Edgelist   *edgeptr;
short          lineflag, shownormal;
{
    short     offset, rowsize, colsize, curoff, i, j;
    short     index1, index2, index3, index4;
    Soap_Point *spptr;
    Soap_Arc *arcptr;
    FPoint    relpoint1, relpoint2, relpoint3, relpoint4;


    /* rows are paths, and columns are shapes..      */
    /* get the size of the mesh...                   */

    arcptr = (Soap_Arc *)*edgeptr;
    colsize = arcptr->stepsize + 1;

    arcptr = (Soap_Arc *)*(edgeptr + 2);
    rowsize = arcptr->stepsize + 1;

    edgeptr += 4;  /* get to start of point information    */
    offset = 4;
    curoff = 0;
```

```
while (*edgeptr != ELEMNULL) {
            if (offset == LIST_SIZE - 1) {
               edgeptr = (Edgelist *)*edgeptr;
               offset = 0;
               continue;
            }

            spptr = (Soap_Point *)*edgeptr;

            meshpoints[curoff].x = spptr->x;
            meshpoints[curoff].y = spptr->y;
            meshpoints[curoff].z = spptr->z;

            xform_relative(&(meshpoints[curoff]), part);

            ++curoff;

            ++edgeptr;
            ++offset;
}

/* now make IRIS polygons */

for (i=0; i<colsize-1; ++i) {
            for (j=0; j<rowsize-1; ++j) {
               if (!lineflag || shownormal) {
                          iris_do_normal(rowsize, i, j);
               }

               if (!lineflag) {
                          bgnpolygon();
                          normal(fnormal);
               } else {
                          RGBcolor(255,255,0);
                          bgnclosedline();
               }

               index1 = i*rowsize + j;
```

```
index2 = i*rowsize + j + 1;
index3 = (i + 1)*rowsize + j + 1;
index4 = (i + 1)*rowsize + j;

/* first rotate, then translate... */

 relpoint1.x = meshpoints[index1].x;
 relpoint2.x = meshpoints[index2].x;
 relpoint3.x = meshpoints[index3].x;
 relpoint4.x = meshpoints[index4].x;

 relpoint1.y = meshpoints[index1].y;
 relpoint2.y = meshpoints[index2].y;
 relpoint3.y = meshpoints[index3].y;
 relpoint4.y = meshpoints[index4].y;

 relpoint1.z = meshpoints[index1].z;
 relpoint2.z = meshpoints[index2].z;
 relpoint3.z = meshpoints[index3].z;
 relpoint4.z = meshpoints[index4].z;

v3d(&relpoint1);
v3d(&relpoint2);
v3d(&relpoint3);
v3d(&relpoint4);

if (!lineflag)
        endpolygon();
else {
        endclosedline();
        if (shownormal) {
            RGBcolor(255,0,0);
            bgnline();
            v3d(&relpoint1);
            relpoint1.x += (fnormal[0] * norm_maxval);
            relpoint1.y += (fnormal[1] * norm_maxval);
            relpoint1.z += (fnormal[2] * norm_maxval);
            v3d(&relpoint1);
           endline();
```

```
                        }
                    }
                }
  }
}

/*------------------------------------------------------*/
/*
**
*/
void iris_do_polygon_thang(part, edgelist_pointer, lineflag, shownormal)
Part          *part;
Edgelist    *edgelist_pointer;
short          lineflag, shownormal;
{
   short      offset, off_top, normcount;
   Element   *elptr;
   FPoint    normlist[200];
   Edgelist  *edge_top;
   FPoint    relpoint1;
   Soap_Point          *spptr;


   /* first skip over the definition.... */
   offset = 0;
   while (*edgelist_pointer != ELEMNULL) {
            if (offset == LIST_SIZE - 1) {
                 edgelist_pointer = (Edgelist *)*edgelist_pointer;
                offset = 0;
                continue;
            }
            /* remember, we've already done a garbage collection,          */
            /* so all data is ACTIVE and valid and beautiful...  */
            elptr = *edgelist_pointer;
            if ((elptr->status & ELEMMASK) == SOAP_POINT)
                break;

            ++edgelist_pointer;
            ++offset;
   }
```

```
edge_top = edgelist_pointer;
off_top = offset;

if (!lineflag || shownormal) {
        normcount = 0;

        while (*edgelist_pointer != ELEMNULL) {
          if (offset == LIST_SIZE - 1) {
                edgelist_pointer = (Edgelist *)*edgelist_pointer;
                offset = 0;
                continue;
          }
          spptr = (Soap_Point *)*edgelist_pointer;

          normlist[normcount].x = spptr->x;
          normlist[normcount].y = spptr->y;
          normlist[normcount].z = spptr->z;

          xform_relative(&(normlist[normcount]),part);

          ++normcount;
          ++edgelist_pointer;
          ++offset;
        }

        iris_normal_polygon(normlist, normcount);
}

if (!lineflag) {
        bgnpolygon();
        normal(fnormal);
} else {
        RGBcolor(255,255,0);
        bgnclosedline();
}

offset = off_top;
```

```
edgelist_pointer = edge_top;

while (*edgelist_pointer != ELEMNULL) {
        if (offset == LIST_SIZE - 1) {
            edgelist_pointer = (Edgelist *)*edgelist_pointer;
            offset = 0;
            continue;
        }

        spptr = (Soap_Point *)*edgelist_pointer;

        relpoint1.x = spptr->x;
        relpoint1.y = spptr->y;
        relpoint1.z = spptr->z;

        xform_relative(&relpoint1,part);

        v3d(&relpoint1);

        ++edgelist_pointer;
        ++offset;
}

if (!lineflag)
        endpolygon();
else {
        endclosedline();
        if (shownormal) {
            RGBcolor(255,0,0);
            bgnline();
            v3d(&relpoint1);
            relpoint1.x += (fnormal[0] * norm_maxval);
            relpoint1.y += (fnormal[1] * norm_maxval);
            relpoint1.z += (fnormal[2] * norm_maxval);
            v3d(&relpoint1);
            endline();
        }
}
}
```

```
/*------------------------------------------------------------*/
/*
** SWIVELIZE a CONNECT MESH.
*/

void iris_do_connect_mesh(part, edgeptr, lineflag, shownormal)
Part          *part;
Edgelist   *edgeptr;
short          lineflag, shownormal;
{
   short      offset, rowsize, colsize, elemcount, curoff, i, j;
   short      index1, index2, index3, index4;
   FPoint     relpoint1, relpoint2, relpoint3, relpoint4;
   Soap_Point          *spptr;
   Soap_Arc *arcptr;


   rowsize = 0;
   offset = 0;
   elemcount = 0;

   while (*edgeptr != ELEMNULL) {
            if (offset == LIST_SIZE - 1) {
               edgeptr = (Edgelist *)*edgeptr;
               offset = 0;
               continue;
            }
            if (((*edgeptr)->status & ELEMMASK) == SOAP_POINT)
               break;

            if (((*edgeptr)->status & ELEMMASK) == SOAP_LINE) {
               rowsize += 2;
            } else if (((*edgeptr)->status & ELEMMASK) == SOAP_ARC) {
               arcptr = (Soap_Arc *)*edgeptr;
               rowsize += arcptr->stepsize + 1;
            }

            ++elemcount;
            ++edgeptr;
```

```
		++offset;
	}

	/* get rid of one or two connect edges not counted in rowsize */
	if (elemcount & 1) {	/* odd means one connect edge		*/
		rowsize -= 2;
		--elemcount;
	} else {			/* even means two connect edges...	*/
		rowsize -= 4;
		elemcount -= 2;
	}


	rowsize = rowsize / 2 - elemcount / 2 + 1;
	colsize = 2;
	curoff = 0;

	/* edgeptr and offset are set to start of point data	*/

	while (*edgeptr != ELEMNULL) {
		if (offset == LIST_SIZE - 1) {
		    edgeptr = (Edgelist *)*edgeptr;
		    offset = 0;
		    continue;
		}

		spptr = (Soap_Point *)*edgeptr;

		meshpoints[curoff].x = spptr->x;
		meshpoints[curoff].y = spptr->y;
		meshpoints[curoff].z = spptr->z;

		xform_relative(&(meshpoints[curoff]),part);

		++curoff;

		++edgeptr;
		++offset;
	}
```

```
/* now make IRIS polygons */

for (i=0; i<colsize-1; ++i) {
          for (j=0; j<rowsize-1; ++j) {
            if (!lineflag || shownormal) {
                      iris_do_normal(rowsize, i, j);
            }

            if (!lineflag) {
                      bgnpolygon();
                      normal(fnormal);
            } else {
                      RGBcolor(255,255,0);
                      bgnclosedline();
            }

            index1 = i*rowsize + j;
            index2 = i*rowsize + j + 1;
            index3 = (i + 1)*rowsize + j + 1;
            index4 = (i + 1)*rowsize + j;

             relpoint1.x = meshpoints[index1].x;
             relpoint2.x = meshpoints[index2].x;
             relpoint3.x = meshpoints[index3].x;
             relpoint4.x = meshpoints[index4].x;

             relpoint1.y = meshpoints[index1].y;
             relpoint2.y = meshpoints[index2].y;
             relpoint3.y = meshpoints[index3].y;
             relpoint4.y = meshpoints[index4].y;

             relpoint1.z = meshpoints[index1].z;
             relpoint2.z = meshpoints[index2].z;
             relpoint3.z = meshpoints[index3].z;
             relpoint4.z = meshpoints[index4].z;

            v3d(&relpoint1);
            v3d(&relpoint2);
            v3d(&relpoint3);
```

```
                v3d(&relpoint4);

                if (!lineflag)
                        endpolygon();
                else {
                        endclosedline();
                        if (shownormal) {
                          RGBcolor(255,0,0);
                          bgnline();
                          v3d(&relpoint1);
                          relpoint1.x += (fnormal[0] * norm_maxval);
                          relpoint1.y += (fnormal[1] * norm_maxval);
                          relpoint1.z += (fnormal[2] * norm_maxval);
                          v3d(&relpoint1);
                          endline();
                        }
                }
            }
  }
}

/*-----------------------------------------------------------*/
/*
** SWIVELIZE a CYLINDER MESH.
*/

void iris_do_cylinder_mesh(part, edgeptr, lineflag, shownormal)
Part            *part;
Edgelist   *edgeptr;
short           lineflag, shownormal;
{
  short      rowsize, colsize, curoff, i, j, element_count, row2;
  short      index1, index2, index3, index4;
  FPoint     relpoint1, relpoint2, relpoint3, relpoint4;
  Soap_Point          *spptr;
  Element   **listptr, **listsave;

  element_count = get_edgelist_element_count(edgeptr);
  --element_count;
  row2 = element_count / 2;
```

```
rowsize = row2;
colsize = 2;

 listptr = get_element_pointer_sequence(edgeptr);
 listsave = listptr;

/* MAY HAVE TO UPDATE SOAP2SWV in this order FOR SWIVEL */
 /* skip over actual cylinder entity...                    */
 ++listptr;

 listptr += element_count - 1;

curoff = 0;

 for (i=element_count; i>row2; --i) {
    spptr = (Soap_Point *)*listptr--;

            meshpoints[curoff].x = spptr->x;
            meshpoints[curoff].y = spptr->y;
            meshpoints[curoff].z = spptr->z;

            xform_relative(&(meshpoints[curoff]),part);

            ++curoff;
}
 listptr = listsave;
 ++listptr;

for (i=0; i<row2; ++i) {
    spptr = (Soap_Point *)*listptr++;

            meshpoints[curoff].x = spptr->x;
            meshpoints[curoff].y = spptr->y;
            meshpoints[curoff].z = spptr->z;

            xform_relative(&(meshpoints[curoff]),part);

            ++curoff;
```

```
}

 free_element_pointer_sequence(listsave);

/* now make IRIS polygons */

for (i=0; i<colsize-1; ++i) {
        for (j=0; j<rowsize-1; ++j) {
          if (!lineflag || shownormal) {
                iris_do_normal(rowsize, i, j);
          }

          if (!lineflag) {
                bgnpolygon();
                normal(fnormal);
          } else {
                RGBcolor(255,255,0);
                bgnclosedline();
          }

          index1 = i*rowsize + j;
          index2 = i*rowsize + j + 1;
          index3 = (i + 1)*rowsize + j + 1;
          index4 = (i + 1)*rowsize + j;

           relpoint1.x = meshpoints[index1].x;
           relpoint2.x = meshpoints[index2].x;
           relpoint3.x = meshpoints[index3].x;
           relpoint4.x = meshpoints[index4].x;

           relpoint1.y = meshpoints[index1].y;
           relpoint2.y = meshpoints[index2].y;
           relpoint3.y = meshpoints[index3].y;
           relpoint4.y = meshpoints[index4].y;

           relpoint1.z = meshpoints[index1].z;
           relpoint2.z = meshpoints[index2].z;
           relpoint3.z = meshpoints[index3].z;
           relpoint4.z = meshpoints[index4].z;
```

```
                v3d(&relpoint1);
                v3d(&relpoint2);
                v3d(&relpoint3);
                v3d(&relpoint4);

                if (!lineflag)
                        endpolygon();
                else {
                        endclosedline();
                        if (shownormal) {
                            RGBcolor(255,0,0);
                            bgnline();
                            v3d(&relpoint1);
                            relpoint1.x += (fnormal[0] * norm_maxval);
                            relpoint1.y += (fnormal[1] * norm_maxval);
                            relpoint1.z += (fnormal[2] * norm_maxval);
                            v3d(&relpoint1);
                            endline();
                        }
                }
            }
    }
}

/*-----------------------------------------------------------------*/
/*
**
*/
void iris_do_endcap_thang(part,lineflag, shownormal)
Part        *part;
short       lineflag, shownormal;
{
    short         offset, capcount, namelen, offtemp;
    Soap_Point             *spptr;
    Edgelist      *edgeptr, *edgetemp;
    FPoint        relpoint1;
    FPoint        normlist[3];
    Soap_Cylinder   *cylptr;
```

```
namelen = strlen(part->nodename);
if (part->nodename[namelen - 1] == '2') {
        edgeptr = *((part->parent)->poly_top);

        /* edgeptr and offset are set to start of point data    */
        cylptr = (Soap_Cylinder *)*edgeptr;

        offset = 1;
        edgeptr += 1;
        capcount = 0;

        while (*edgeptr != ELEMNULL) {
          if (offset == LIST_SIZE - 1) {
                  edgeptr = (Edgelist *)*edgeptr;
                  offset = 0;
                  continue;
          }

          ++edgeptr;
          ++offset;
          if (capcount == cylptr->stepsize) {
                  if (offset == LIST_SIZE - 1) {
                    edgeptr = (Edgelist *)*edgeptr;
                    offset = 0;
                  }
                  break;
          }

          ++capcount;
        }
} else {
        /* edgeptr and offset are set to start of point data    */
        edgeptr = *((part->parent)->poly_top);
        cylptr = (Soap_Cylinder *)*edgeptr;
        offset = 1;
        edgeptr += 1;
}
```

```
capcount = 0;

if (!lineflag || shownormal) {
        /* edgeptr and offset are set to start of point data    */

        normlist[0].x = ((Soap_Point *)*edgeptr)->x;
        normlist[0].y = ((Soap_Point *)*edgeptr)->y;
        normlist[0].z = ((Soap_Point *)*edgeptr)->z;

        xform_relative(&(normlist[0]),part);

        offtemp = offset + 1;
        edgetemp = edgeptr + 1;
        if (offtemp == LIST_SIZE - 1) {
           offtemp = 0;
           edgetemp = (Edgelist *)*edgetemp;
        }
        normlist[1].x = ((Soap_Point *)*(edgetemp))->x;
        normlist[1].y = ((Soap_Point *)*(edgetemp))->y;
        normlist[1].z = ((Soap_Point *)*(edgetemp))->z;

        xform_relative(&(normlist[1]),part);

        ++offtemp;
        ++edgetemp;
        if (offtemp == LIST_SIZE - 1) {
           offtemp = 0;
           edgetemp = (Edgelist *)*edgetemp;
        }
        normlist[2].x = ((Soap_Point *)*(edgetemp))->x;
        normlist[2].y = ((Soap_Point *)*(edgetemp))->y;
        normlist[2].z = ((Soap_Point *)*(edgetemp))->z;

        xform_relative(&(normlist[2]),part);

        iris_normal_polygon(normlist, 3);
}

if (!lineflag) {
```

```
        bgnpolygon();
        normal(fnormal);
} else {
        RGBcolor(255,255,0);
        bgnclosedline();
}

while (*edgeptr != ELEMNULL) {
        if (offset == LIST_SIZE - 1) {
          edgeptr = (Edgelist *)*edgeptr;
          offset = 0;
          continue;
        }

        spptr = (Soap_Point *)*edgeptr;

        relpoint1.x = spptr->x;
        relpoint1.y = spptr->y;
        relpoint1.z = spptr->z;

        xform_relative(&relpoint1,part);

        v3d(&relpoint1);

        if (capcount == cylptr->stepsize - 1)
          break;

        ++edgeptr;
        ++offset;
        ++capcount;
}

if (!lineflag)
        endpolygon();
else {
        endclosedline();
        if (shownormal) {
          RGBcolor(255,0,0);
          bgnline();
```

```
                v3d(&relpoint1);
                relpoint1.x += (fnormal[0] * norm_maxval);
                relpoint1.y += (fnormal[1] * norm_maxval);
                relpoint1.z += (fnormal[2] * norm_maxval);
                v3d(&relpoint1);
               endline();
            }
  }
}

/*-----------------------------------------------------*/
void iris_do_normal(rowsize, i, j)
short        rowsize, i, j;
{
   FPoint p1, p2;
   FPoint pnormal;
   double length;


   p1.x = meshpoints[i * rowsize + j + 1].x
          - meshpoints[i * rowsize + j].x;
   p2.x = meshpoints[(i + 1) * rowsize + j].x
          - meshpoints[i * rowsize + j].x;

   p1.y = meshpoints[i * rowsize + j + 1].y
          - meshpoints[i * rowsize + j].y;
   p2.y = meshpoints[(i + 1) * rowsize + j].y
          - meshpoints[i * rowsize + j].y;

   p1.z = meshpoints[i * rowsize + j + 1].z
          - meshpoints[i * rowsize + j].z;
   p2.z = meshpoints[(i + 1) * rowsize + j].z
          - meshpoints[i * rowsize + j].z;

   pnormal.x = p1.y * p2.z - p1.z * p2.y;
   pnormal.y = -(p1.x * p2.z - p1.z * p2.x);
   pnormal.z = p1.x * p2.y - p1.y * p2.x;

   length = sqrt(pnormal.x * pnormal.x
                  + pnormal.y * pnormal.y
```

```
                    + pnormal.z * pnormal.z);

    pnormal.x /= length;
    pnormal.y /= length;
    pnormal.z /= length;

    fnormal[0] = (float)pnormal.x;
    fnormal[1] = (float)pnormal.y;
    fnormal[2] = (float)pnormal.z;
}

/*------------------------------------------------------------*/
/*
** USE NEWELL'S TECHNIQUE FOR GENERATING A NORMAL...
*/
void iris_normal_polygon(polypoints, pcount)
FPoint     polypoints[];
short      pcount;
{
    short  i, j;
    FPoint pnormal;
    double length, plane_a, plane_b, plane_c, pasq, pbsq, pcsq;


    plane_a = plane_b = plane_c = 0.0;

    for (i=0; i<pcount; ++i) {
            j = (i + 1) % pcount;

            plane_a += (polypoints[i].y - polypoints[j].y)
                         * (polypoints[i].z + polypoints[j].z);
            plane_b += (polypoints[i].z - polypoints[j].z)
                         * (polypoints[i].x + polypoints[j].x);
            plane_c += (polypoints[i].x - polypoints[j].x)
                         * (polypoints[i].y + polypoints[j].y);
    }

    pasq = plane_a * plane_a;
    pbsq = plane_b * plane_b;
```

```
   pcsq = plane_c * plane_c;

   length = sqrt(pasq + pbsq + pcsq);

   pnormal.x = plane_a / length;
   pnormal.y = plane_b / length;
   pnormal.z = plane_c / length;

   fnormal[0] = (float)pnormal.x;
   fnormal[1] = (float)pnormal.y;
   fnormal[2] = (float)pnormal.z;
}

/*-------------------------------------------------------------*/
void xform_relative(relpoint, part)
FPoint      *relpoint;
Part        *part;
{
   double newx,newy,newz;
   double tcos, tsin, degrad;
   double relroll, relyaw, relpitch;
   double reloffx, reloffy, reloffz;
   double rpx, rpy, rpz;
   Part  *uptree;


   degrad = M_PI / 180.0;

   relroll = part->constraint.roll_attitude;
   relyaw = part->constraint.yaw_attitude;
   relpitch = part->constraint.pitch_attitude;

   reloffx = part->constraint.xpos;
   reloffy = part->constraint.ypos;
   reloffz = part->constraint.zpos;

   uptree = part->parent;
   while (uptree != PARTNULL) {
           if (uptree->parent == PARTNULL)
```

```
        break;  /* reached the root */

      relroll += uptree->constraint.roll_attitude;
      relyaw += uptree->constraint.yaw_attitude;
      relpitch += uptree->constraint.pitch_attitude;

      reloffx += uptree->constraint.xpos;
      reloffy += uptree->constraint.ypos;
      reloffz += uptree->constraint.zpos;

      uptree = uptree->parent;
}


/* Add in translation values before rotating... */

rpx = relpoint->x + reloffx;
rpy = relpoint->y + reloffy;
rpz = relpoint->z + reloffz;


/* ABOUT Z */
/* REVERSE TO BE CONSISTENT WITH SWIVEL */
tcos = cos(-relroll * degrad);
tsin = sin(-relroll * degrad);

newx = rpx * tcos - rpy * tsin;
newy = rpx * tsin + rpy * tcos;

rpx = newx;
rpy = newy;

/* ABOUT Y */
tcos = cos(relyaw * degrad);
tsin = sin(relyaw * degrad);

newz = rpz * tcos - rpx * tsin;
newx = rpz * tsin + rpx * tcos;

rpz = newz;
```

```
  rpx = newx;

  /* ABOUT X */
  tcos = cos(relpitch * degrad);
  tsin = sin(relpitch * degrad);

  newy = rpy * tcos - rpz * tsin;
  newz = rpy * tsin + rpz * tcos;

  rpy = newy;
  rpz = newz;

  relpoint->x = rpx;
  relpoint->y = rpy;
  relpoint->z = rpz;

  /* Add in the rotated offset... */
  relpoint->x += part->orgoffset.x;
  relpoint->y += part->orgoffset.y;
  relpoint->z += part->orgoffset.z;
}

/*--------------------------------------------------------------*/
void rotate_relative_origin(part)
Part        *part;
{
  double  newx,newy,newz;
  double  tcos, tsin, degrad;
  double  relorgx, relorgy, relorgz;
  double  toporgx, toporgy, toporgz;
  double  relroll, relyaw, relpitch;
  double  rpx, rpy, rpz;
  Part   *uptree, *toppart, *curpart;
  FPoint  relpoint;
  Part   *rotnode[20];
  short   curnode,i;


  degrad = M_PI / 180.0;
```

```
curnode = 0;

 relorgx = part->relorigin.x;
 relorgy = part->relorigin.y;
 relorgz = part->relorigin.z;

 /* start looking at parent and above */
 uptree = part->parent;
toppart = PARTNULL;

while (uptree != PARTNULL) {
            if (uptree->parent == PARTNULL)
               break;  /* reached the root */

            if (uptree->constraint.yaw_attitude != 0.0 ||
                uptree->constraint.pitch_attitude != 0.0 ||
                uptree->constraint.roll_attitude != 0.0) {
               toppart = uptree;
            }

            relorgx += uptree->relorigin.x;
            relorgy += uptree->relorigin.y;
            relorgz += uptree->relorigin.z;

            uptree = uptree->parent;
}

/* INITIALIZE THIS IN CASE OF NO ROTATIONS!! */
 part->orgoffset.x = relorgx;
 part->orgoffset.y = relorgy;
 part->orgoffset.z = relorgz;

if (toppart == PARTNULL)
            return;          /* no rotations to process for this */


  toporgx = toppart->relorigin.x;
  toporgy = toppart->relorigin.y;
  toporgz = toppart->relorigin.z;
```

```
uptree = toppart->parent;
while (uptree != PARTNULL) {
        if (uptree->parent == PARTNULL)
            break;  /* reached the root */

        toporgx += uptree->relorigin.x;
        toporgy += uptree->relorigin.y;
        toporgz += uptree->relorigin.z;

        uptree = uptree->parent;
}

rotnode[curnode++] = toppart;
toppart->orgoffset.x = toporgx;
toppart->orgoffset.y = toporgy;
toppart->orgoffset.z = toporgz;

relpoint.x = relorgx;
relpoint.y = relorgy;
relpoint.z = relorgz;


/* APPLY ROTATIONS DOWN THE TREE */
while (TRUE) {

        curpart = toppart;

        relroll = toppart->constraint.roll_attitude;
        relpitch = toppart->constraint.pitch_attitude;
        relyaw = toppart->constraint.yaw_attitude;

        rpx = relpoint.x - toporgx;
        rpy = relpoint.y - toporgy;
        rpz = relpoint.z - toporgz;

  /* ABOUT Z */
        /* REVERSE TO BE CONSISTENT WITH SWIVEL */
        tcos = cos(-relroll * degrad);
        tsin = sin(-relroll * degrad);
```

```
newx = rpx * tcos - rpy * tsin;
newy = rpx * tsin + rpy * tcos;

rpx = newx;
rpy = newy;

/* ABOUT Y */
tcos = cos(relyaw * degrad);
tsin = sin(relyaw * degrad);

newz = rpz * tcos - rpx * tsin;
newx = rpz * tsin + rpx * tcos;

rpz = newz;
rpx = newx;

/* ABOUT X */
tcos = cos(relpitch * degrad);
tsin = sin(relpitch * degrad);

newy = rpy * tcos - rpz * tsin;
newz = rpy * tsin + rpz * tcos;

rpy = newy;
rpz = newz;

relpoint.x = rpx + toporgx;
relpoint.y = rpy + toporgy;
relpoint.z = rpz + toporgz;

/* Find next downmost level... */
uptree = part->parent;
toppart = PARTNULL;

while (uptree != curpart) {
  if (uptree->parent == PARTNULL)
        break; /* reached the root */

   if (uptree->constraint.yaw_attitude != 0.0 ||
```

```
            uptree->constraint.pitch_attitude != 0.0 ||
            uptree->constraint.roll_attitude != 0.0) {
            toppart = uptree;
        }

        uptree = uptree->parent;
    }
    if (toppart == PARTNULL) {
        part->orgoffset.x = relpoint.x;
        part->orgoffset.y = relpoint.y;
        part->orgoffset.z = relpoint.z;

        return;
    }

toporgx = toppart->relorigin.x;
toporgy = toppart->relorigin.y;
toporgz = toppart->relorigin.z;

uptree = toppart->parent;
while (uptree != PARTNULL) {
        if (uptree->parent == PARTNULL)
            break;  /* reached the root */

        toporgx += uptree->relorigin.x;
        toporgy += uptree->relorigin.y;
        toporgz += uptree->relorigin.z;

        uptree = uptree->parent;
    }

    for (i=0; i<curnode; ++i) {
        relroll = rotnode[i]->constraint.roll_attitude;
        relpitch = rotnode[i]->constraint.pitch_attitude;
        relyaw = rotnode[i]->constraint.yaw_attitude;

        rpx = toporgx - rotnode[i]->orgoffset.x;
        rpy = toporgy - rotnode[i]->orgoffset.y;
        rpz = toporgz - rotnode[i]->orgoffset.z;
```

```
    /* ABOUT Z */
    /* REVERSE TO BE CONSISTENT WITH SWIVEL */
    tcos = cos(-relroll * degrad);
    tsin = sin(-relroll * degrad);

    newx = rpx * tcos - rpy * tsin;
    newy = rpx * tsin + rpy * tcos;

    rpx = newx;
    rpy = newy;

    /* ABOUT Y */
    tcos = cos(relyaw * degrad);
    tsin = sin(relyaw * degrad);

    newz = rpz * tcos - rpx * tsin;
    newx = rpz * tsin + rpx * tcos;

    rpz = newz;
    rpx = newx;

    /* ABOUT X */
    tcos = cos(relpitch * degrad);
    tsin = sin(relpitch * degrad);

    newy = rpy * tcos - rpz * tsin;
    newz = rpy * tsin + rpz * tcos;

    rpy = newy;
    rpz = newz;

     toporgx = rpx + rotnode[i]->orgoffset.x;
     toporgy = rpy + rotnode[i]->orgoffset.y;
     toporgz = rpz + rotnode[i]->orgoffset.z;
  }

rotnode[curnode++] = toppart;
toppart->orgoffset.x = toporgx;
toppart->orgoffset.y = toporgy;
```

```
        toppart->orgoffset.z = toporgz;
    }
}

/* DO NOT PLACE ANY FUNCTIONS AFTER RCS LOG!
$Log:    soap2iris.c,v $
 * Revision 2.2  90/10/24  16:58:46  dan
 * Fixed endcap bug for cylinders with crashing stepsize
 *
 * Revision 2.1  90/10/05  10:30:05  dan
 * New Rev
 *
 * Revision 1.10  90/09/25  14:11:26  dan
 * New normal computation for polygons. ROTSWEEP type and MASKS
 *
 * Revision 1.9  90/09/21  18:04:51  dan
 * Fixed normals for constrained parts...
 *
 * Revision 1.8  90/09/07  20:15:49  dan
 * Turned down specular reflection
 *
 * Revision 1.7  90/09/07  11:08:19  dan
 * Added translation to Constraints.
 * General clean-up.
 *
 * Revision 1.6  90/09/06  18:09:53  dan
 * Major constraints, MAHN
 *
 * Revision 1.5  90/09/04  15:24:32  dan
 * Initial Rotational Constraints
 *
 * Revision 1.4  90/08/30  13:43:07  dan
 * Massive changes... Draw outlines, normals, new poly, cyls
 *
 * Revision 1.3  90/08/28  11:02:34  dan
 * Put in relative offset code and dual endcaps
 *
 * Revision 1.2  90/08/19  13:28:20  dan
 * Fixed MAJOR bug -- global "product" redefined!!
```

```
*
* Revision 1.1  90/08/17  18:22:33  dan
* Initial revision
*
*/
```

APPENDIX 2

MATIS VIRTUAL REALITY
STARCH
USER'S MANUAL

Version 1.4

Table of Contents

1. INTRODUCTION....1
2. MATIS AND SOAP PRIMITIVES....1
3. SELECTION and GROUPING....1
4. MENU SELECTION....3
  4.1 MATIS MENU....3
  4.2 FILE MENU....5
  4.3 GROUP MENU....6
  4.4 SOAP MENU....11
5. MOUSE BUTTONS....12
6. GENERAL KEYBOARD USAGE....13
7. GROUPING TEXT VIEW KEYBOARD COMMANDS....14
8. FILE LOCATIONS....14
9. ERROR MESSAGES....14
10. KNOWN BUGS....16

Starch User's Manual

1. INTRODUCTION

The Starch editor allows a Matis product to be converted into a Swivel script file. Line and arc entities in the Matis database are converted into Swivel polygon and mesh entities. The Starch editor has been designed to allow a quick conversion cycle for the products of a kitchen.

2. MATIS AND SOAP PRIMITIVES

Matis graphic primitives are defined in Starch as:

| | |
|---|---|
| rectangle | (Four sides, all at 90 deg angles) |
| lines | (One or more connected line segments) |
| knob | (Displayed as a cylinder) |
| \|\| lines | (Parallel lines) |
| polygon | (Three to n sides) |
| arc | (Circular arc segment) |
| column | (A cylinder) |
| grid | (Displayed as a rectangle) |
| pattern | (As defined in Matis database) |
| user poly | (User-specified polygon) |

Soap is the name of the database in Starch used to compute the Swivel polygon and mesh entities. The Matis graphic primitives listed above can be grouped in Soap polygons, sweeps, or wireframes. In addition, Soap polygons can be thickened. The thickness of a Soap wireframe can also be specified.

Any Matis primitive can be converted into a Soap wireframe. However, since wireframes are used mostly for surface detail, most Matis primitives are converted into Soap polygons, which can then be thickened if necessary. Parallel lines should not be converted into a Soap polygon. Convert parallel lines as a Soap wireframe. In addition, unless the Matis "lines" type is part of a selection list defining a closed polygon, the Matis line type alone should not be converted into a Soap polygon.

3. SELECTION and GROUPING

The leftmost mouse button is the selection button. In areas where selection is required, it is the leftmost mouse button which should be used.

Primitive Selection

A Matis primitive can be selected in the Matis Graphic view by pointing to it and clicking the leftmost mouse button. A primitive can be deselected by holding the <Ctrl> key while pressing the leftmost mouse button.

Alternately, a Matis primitive may be selected from the Matis Text view, by moving the cursor over the desired text item and pressing the left mouse button. However, deselection is simply accomplished by clicking on a selected item a second time (without holding the <Ctrl> key). Selecting from the Matis Text view will highlight the corresponding graphic primitive in the Matis Graphic view. Selecting from the Matis Graphic view will highlight the corresponding text item in the Matis Text view.

After selecting primitives, the rightmost mouse button can be used to select a grouping command from the pop-up Group Menu.

Subprimitive Selection

Individual lines which compose the Rectangle, Polygon, and Lines Matis primitive types are called subprimitives. In the Matis Graphic view, subprimitives can be selected by holding <shift> while pressing the left mouse button. Deselection of primitives is accomplished by holding <ctrl><shift> while pressing the left button.

In the Matis Text view, subprimitives can be selected and deselected with subprimitive menus. There is a menu associated with each instance of the three types of primitives mentioned earlier. To see the menu, press the Menu button (right mouse button) while the mouse is over the primitive which contains the subprimitives.

Subprimitive Length

The length of a subprimitive can be displayed to help determine Soap polygon thickness values. To display the length of a subprimitive, select the subprimitive and make sure it is the only thing selected. Only the length of lines and arcs are displayed. The length of an arc is the distance between its endpoints, not the traversing length of the arc.

4. MENU SELECTION

All menu selection is accomplished by pressing and holding the rightmost (third) button on the SGI mouse and moving the mouse to highlight the menu item desired, then letting up on the button. Pressing the third button will bring up either the Matis Menu or the Group Menu depending on which View the cursor resides in at the time:

| | |
|---|---|
| Matis Graphic View | Group Menu |
| Soap View | Matis Menu |
| Matis Text View | Group Menu |
| Groupings Text View | Group Menu |
| Color View | Matis Menu |
| Constraint View | Matis Menu |
| Thickness View | Matis Menu |

Holding <shift> while clicking the right button will bring up the Matis Menu independent of the current position.

4.1 MATIS MENU

The Matis Menu is composed of the following:

Soap Edit

Selecting Soap Edit puts Starch into the Soap polygon editing mode. See section 4.4 for details.

Load Matis

This command displays a dialogue box which enables the user to enter an alphanumeric product name. To enter an index file number instead of a product name, just press <enter>, and a second dialog box will appear.

The corresponding product is then loaded and displayed in the Matis Graphic View and the Matis Text View. If it has been previously converted, a shaded display will also appear in the Soap View, and its groupings will appear in the Groupings Text View.

There is another way besides using the menu item to load a different product. Pressing <F5> will advance to the next product in the Matis database. Similarly, pressing <F6> will step backwards in the Matis database.

To advance forwards and backwards through a Wringer lost and found file (see the Wringer User's Manual for details), Starch can be invoked from the IRIX command line with the name of the lost and found file as an argument. For example, starch A5554A.lf This allows the user to cycle through the products of a kitchen in addition to stepping forwards and backwards through the entire Matis database. The following function keys are used to cycle through the products of a kitchen, but are only useful if a lost and found file has been specified:

<F1> Advance through kitchen products by 1 with conversion.
<F2> Step back through kitchen products by 1 with conversion.
<F3> Advance through kitchen products by 1 with no conversion.
<F4> Step back through kitchen products by 1 with no conversion.

Conversion refers to RB2Swivel/Soap View conversion. If the <F3> and <F4> keys are selected, no shaded view will appear in the Soap View. This allows the user to scan through the products of a kitchen more quickly.

Convert

Selecting Convert will convert the Matis grouping information specified by the user into an RB2Swivel script file and will also generate a shaded display of the product. The shaded display appears in the Soap View.

The RB2Swivel script file name is identical to the current product, and appended with ".SWV". Hence, product A51SK would be converted into an RB2Swivel file named "A51SK.SWV". This file is written to the current swivel directory. The current swivel directory may be changed with the File menu "Directories" option.

File menu ->

Selecting the File menu item causes the File Menu to be displayed next to the Matis Menu. The File Menu is explained in section 4.2.

Group menu ->
Selecting the Group menu option is an indirect way of invoking the Group Menu when the default menu is the Matis Menu. The Group Menu is displayed next to the Matis Menu. The Group Menu is explained in the section 4.3.

Quit
This option returns the user to the IRIX (Unix) operating system.

4.2 FILE MENU
The file menu contains the following menu items:

Load Groupings
Selecting Load Groupings will display a dialog box with the name of the current product as the default. The user may type in a different name if desired. The grouping file is then loaded and displayed in the Grouping Text View. The grouping file includes thickness and constraint information. Currently, reusing a grouping file for a different product should only be done in cases where the primitive lists are nearly identical. This is because when loading a groupings file, groupings are associated by order, not by primitive type.

Save Groupings
After editing a Matis product, its groupings information should be saved using this menu option. If changes are not saved, Starch displays the following prompt:

Save the changes to this product (y or n, <Esc> to cancel)?

Directories->
The Directories menu displays a submenu containing the following menu items:

Set Matis Directory
This menu option allows the user to set the path to the Matis database. The user will be reprompted if an invalid file path has been entered. The default Matis directory is "./matis".

Set Groupings Directory

This menu option allows the user to set the filepath for storing and loading grouping files, as well as for the location of the default groupings name list. The default groupings directory is "./groupings".

Set Swivel Directory

This menu option allows the user to set the filepath for where to store Swivel script (.SWV) files. The default swivel directory is "./swivel".

4.3 GROUP MENU

The Group Menu contains the following menu items:

Group Polygon

This menu item causes the currently selected Matis primitives and subprimitives to be grouped into a polygon. If the definition of the polygon is not planar, it will be grouped as a sweep polygon automatically. If the sweep polygon does not meet the correct sweep criteria, the grouping will be rejected with the following message:

The selected grouping does not form a valid polygon or sweep.

A sweep is defined by two sets of lines and arcs, each element in one set parallel to a mirror image element in the other set, and the sets connected by a single edge describing the thickness. The following diagram illustrates a valid sweep. The left hand image displays an example of what the user specifies. The small arrow indicates the single connecting edge. The right hand image displays the resulting sweep.

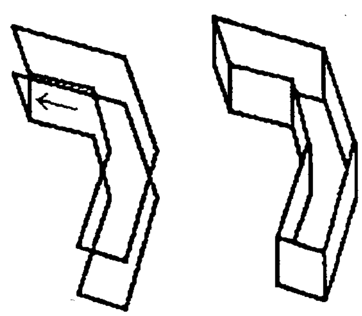

Sweeps may also be created implicitly, as part of a thickened polygon. See the section entitled Thicken Polygon for more details.

Group Wireframe

This menu item causes the currently selected Matis primitives and subprimitives to be grouped into a wireframe part. The thickness of the wireframe can be altered by selecting the group and by using the Thicken Polygon option as described later in this section.

Wireframes do not have to form contiguous polygons since a wireframe is not filled. Instead, each of the subprimitives of a Matis primitive is thickened along two vectors orthogonal to the primitive (in the case of a line), or to the endpoint tangent vector of the primitive (in the case of an arc).

Note that for a single line, the thickening vectors are not guaranteed to be in any particular direction since it cannot be determined which plane the line lies in. However, for multiple lines or lines connected to arcs, the correct orientation can be found due to the extra information provided by the line's neighbors.

Make Polygon

This menu item allows the creation of a "user poly". Starch enters a polygon creation mode in which the user can select the endpoints of a new polygon. This removes the constraint of having to use primitives already defined by Matis.

Arcs can be added to the poly by holding shift and clicking on the end point of the arc. The addition of arcs is tricky, but functional. For example, to specify an arc as the second segment in a polygon, click on the starting point of the poly (point 1 in the illustration below). Next, hold <shift> and click on the first endpont of the arc (point 2). You should see several things happen. First, a line is created connecting the first point of the poly with the first point of the arc. Also, the other endpoint of the arc and the arc itself are added to the poly. Last, a line from the other end of the arc to the start point is created.

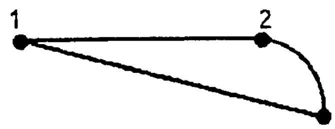

All user polygons are saved out with the groupings file. A user polygon is treated like any other Matis primitive once it is added to the primitive list.

To make drawers, or to help construct polygons with incomplete vertex data, one or more existing edges can be used to extend the existing vertex set of a user polygon. The following Make Polygon submenu items may be used for this purpose:

Close Rectangle
If the fourth vertex of a rectangular polygon is missing, this option will automatically compute the vertex and close the rectangle. Three vertices must already be specified in order for this option to work.

Extend to Rectangle
If two vertices of a rectangular polygon are missing, this option will compute those vertices and close the rectangle. Two vertices must already be specified in order for this option to work. The user must specify an existing edge which corresponds to the direction and length of the finished rectangular polygon. The following message appears:

Pick a line or arc to offset points by (<Esc> to cancel)

The resulting rectangle is highlighted in blue. Press <enter> to finish the user polygon.

Delete Polygon
This menu item is the only way to dispose of a user polygon which is not useful. Simply enter the "user poly" number you wish to delete at the dialog box prompt. The following warning is then displayed:

Deleting a User Poly means I must delete all groupings which use it! Is this OK (y or n)?

When the polygon is deleted, any higher numbered user polys have their numbers lowered.

There is no way to replace the contents or edit the contents of a user polygon. To achieve the same result, simply delete the polygon, then remake it with the desired changes.

Ungroup

A grouped set of Matis primitives may be ungrouped by selecting this option. The group must first be selected in the Grouping Text View by moving the cursor over the text item and pressing the leftmost button of the SGI mouse.

Thicken Polygon

A polygon which has been grouped may be thickened by selecting this menu item. Thickening a polygon forms a solid whose top and bottom faces are identical to the original polygon, except for being offset by some thickness value. These faces are wrapped by a sweep, as explained in the Group Polygon section.

A polygon may be thickened in three directions with respect to its normal vector: positively, negatively, or equally about its center. The direction should generally be obvious by examining the axes, which always extend from the object origin in a positive direction. If this does not help, use trial and error. Try different values for "Height" and "Type" in the Thickness View, and convert to see the result. The current group stays selected during the thickening process.

Instead of specifying a height, another Matis primitive can be used to determine the thickness of the part. After selecting Thicken Polygon, the following message is displayed:

Pick a line or arc to determine length or hit <Esc> to use default.

Simply click on the line or arc defining the thickness. Notice that <u>both the length and the direction</u> of the primitive are used to determine the thickness. If you wish to enter a number instead of using a primitive, press <Esc>.

This method of forming solids should be used as the prevalent method. Previous versions of Starch promoted using sweeps to form most of the polys which thickening forms automatically. Sweeps should now only be used if the solid needs separately named parts (for instance, so that some piece of it can move in virtual reality), or if you don't want the sweep to have endcaps.

Selecting Thicken Polygon for a wireframe group allows the thickness of the wireframe to be specified.

Set Origin

Select this menu item to change the point of rotation of a part. This is necessary only if a part is unconstrained in some way. For instance, a door needs to rotate about one of its edges. Select Set Origin, then click on the edge it will rotate about. The origin will be set to the center of the edge, if a line segment is selected, or will be set to the centerpoint of the defining endcap of a column, if a column in selected.

Name Part

A Part may be named by selecting this menu item. When selected, a list of default part names is provided. A name may be chosen from this list, or a new default part name created. A part name is limited to 20 characters in both Starch and Swivel. The length of the name includes its number, so be careful not to make the names too big. Also keep in mind that Wringer adds extra digits for "same names" in different products.

If no name is selected for a part, it is named 'Object' by default. If a name from the default list is selected (by clicking on it, then pressing <enter>), the default values associated with that name are inherited. These default values include color, constraints, and normal direction. If no name is highlighted, and <enter> is pressed, the user is prompted for a new name. This new name inherits the current part's attributes.

Replace Default

Selecting this menu item allows the user to replace the values associated with an existing name with the values of the currently selected grouping.

Delete Default

Selecting this menu item allows the user to delete one of the default part names from the list. Since a part can currently only be named by adding a name to the default list, the user may wish to create a temporary part name, and then delete it.

4.4 SOAP MENU

The Soap Menu contains the following items:

*NOTE: In Soap Edit mode, one or more groups may be selected from the Groupings Text View. To generate a multi-select, press and hold the <shift> key while selecting groups with the leftmost mouse button. Color, reversals, and stepsize can then be applied to multiple groups.

Get Color

The currently selected group's color will become the current palette color when selecting this option. This color can then be assigned to other groupings by selecting the group(s) and choosing the Set Color option.

Set Color

Use the leftmost mouse button to select a color from the color grid or from the color ramps to the left and at the bottom of the grid. To assign the color, select grouping(s) from the Grouping Text View and choose the Set Color option. See the Tutorial Documentation for more details.

Normal ON / OFF

The normal vector(s) of the currently selected group(s) can be displayed by selecting Normal ON. The normal vector(s) can be turned off by selecting Normal OFF. Normals are not displayed by default.

Reverse

If the normals of the currently selected group(s) are not pointing outwards from their defining face(s), the normals can be reversed by selecting this option. The product is automatically reconverted if the Convert option is set to ON. Otherwise, the user may press <Ctrl C> to convert, or may choose not to convert at all.

Stepsize

This menu item changes the angular increment of the soap representation of arcs and cylinders for the currently selected grouping. The default stepsize is 10 degrees. For knobs, the default stepsize is 60 degrees. The finest resolution available is 2 degrees, and the coarsest available is 90 degrees. Increasing the stepsize for arcs and cylinders is useful for decreasing the number of polygons in the product.

Convert ON/OFF
In order to save time in the Soap Edit mode, especially for larger products, no Soap conversion is performed as the default. <Ctrl C> may be pressed to override this default on a one-off basis. The default may be overridden more permanently by selecting Convert ON. In this case, the product is automatically converted when choosing Reverse or Stepsize.

*NOTE: A group's color may not be applied to all of its Soap parts until a conversion is performed. This is particularly true for Wireframes.

Soap Exit
This option leaves Soap Edit mode and returns to the Matis Menu and Matis View. The color grid is turned off.

5. MOUSE BUTTONS

This section quickly describes what mouse buttons are used for in the various Starch Views. The right mouse button is always the menu button.

Matis Graphic View
The middle mouse button is used to rotate the object in an intuitive way, by moving the mouse up and down and left and right while pushing the middle button. Holding the <x> key while pressing the middle mouse button will rotate the object around the Z-axis.

The leftmost mouse button is used to select Matis primitives.

The middle button may also be used while pressing the <z> key to select a section of the view to zoom in on. Holding the <shift-z> key combination while clicking the middle mouse button will zoom out by a factor of two. Holding the <ctrl-z> key combination and pressing the middle mouse button will zoom out to the initial state.

Matis Text View

The leftmost button is used to select Matis primitives. The right button brings up a menu of subprimitives if appropriate (only certain primitives have subprimitives). The middle button scrolls this view if the primitive list does not fit on one screen.

Grouping Text View

The leftmost mouse button is used to select text items in this view. However, the keyboard is also used to edit the hierarchy of the groupings in this window. These keyboard commands are described in section 7 of this document.

Color, Thickness, and Constraints Views

Items in these views can be selected by pointing to them and clicking the left mouse button. A box will then be drawn around the item which is being edited, and all events are halted until the edit mode is discontinued. At this point the value can be edited. See section 6 for general keyboard usage for editing.

6. GENERAL KEYBOARD USAGE

The following keyboard commands may be used for editing a text field in the color, constraint, or thickness view, or for editing a dialogue box text default.

✓The <backspace> key will remove single characters from the tail of the string.
✓The <ctrl-w> key combination will remove the string entirely.
✓Simply typing at the prompt will also remove any existing string, and will replace it with what is being typed.
✓Pressing <enter> removes the selection box or the dialogue box and sets the item to the entered value.
✓Pressing the <ESC> key will 'escape' from the text editing mode and will reset the item to its previous value.
✓The four arrow keys are used to edit the hierarchy tree, as described in section 7.

The following keyboard commands may be used as a shorthand for various menu items:

✓<ctrl-g> may be pressed to group a polygon. This keyboard command is the same as selecting the Group Polygon menu item.

✓<ctrl-c> may be pressed to convert. This keyboard command is the same as selecting the Convert menu item.

✓<ctrl-t> may be pressed to thicken a polygon. This keyboard command differs from the Thicken Polygon command, however, in that the Thickness View is activated but no prompt for picking a line or arc primitive is generated.

7. GROUPING TEXT VIEW KEYBOARD COMMANDS

The four arrow keys are used to edit the hierarchy tree.

✓The right arrow key makes the currently selected group a child of the nearest group above it which is at the same level (i.e. its nearest upward brother). If it has no upper brothers, then it becomes a child of its nearest downward brother.

✓The left arrow key makes the currently selected group a brother of its father. In other words, it is moved left one level.

✓The up arrow key makes the current group the child of its upper Uncle. In other words, it stays in the same horizontal position, and moves up underneath the nearest group which is at the same level as its father (one horizontal position left).

✓The down arrow key makes the current group the child of its lower Uncle.

8. FILE LOCATIONS

The working directory is the directory from which Starch was invoked. All directories default to the appropriate subdirectory of the working directory. They can be routed to some other location by setting the paths with the File Menu "Directories" menu item.

9. ERROR MESSAGES

User errors are displayed in a popup window. Simply click with the mouse to remove the message once it has been read. Here is a list of the existing error messages:

<u>The selected grouping is concave. Try subdiving it into convex parts.</u>
In order to speed up SGI rendering and to avoid the VGX concave bug, the user is required to form convex polygons. Starch automatically checks for and warns the user about concave polygons.

<u>Unable to write the swivel file. Make sure the swivel directory is in the right place and that you have permission to write to the file.</u>
Specify the correct swivel directory with the File Menu "Directories" option.

<u>A 'column' primitive must be grouped alone.</u>
A column has been grouped with one or more other Matis primitives. Only group one column at a time.

<u>A 'knob' primitive must be grouped alone.</u>
A knob primitive has been grouped with one or more other Matis primitives. Only group one knob primitive at a time.

<u>Groups can only have 40 subprimitives. Try subdividing the group.</u>

<u>The selected grouping does not form a valid polygon or sweep.</u>
A polygon must be planar, and a sweep must follow the rules described in section 4.3.

<u>There is a limit of 100 groups per product. Try using thickening, or sweeps.</u>

<u>File XXXXXX could not be opened. Make sure the groupings directory is in the right place.</u>
The default groupings directory does not exist on your machine, or permissions are wrong. Set a valid groupings directory with the File Menu "Directories" option.

<u>You can only create planar polygons!</u>
User polygons must be planar. Try again.

<u>File XXXXXX could not be opened. Please enter the correct path to the Matis directory.</u>
If your machine does not have the fmpatern file, Starch will not work. Otherwise, enter the correct filepath with the File Menu "Directories" option. If starting Starch, the filepath will be automatically prompted for.

The prefs file could not be saved!
This is probably a permissions problem in the Working directory.

10. KNOWN BUGS
1. Polygons which are concave or non-planar are checked for and rejected. This means that products that have been converted by a previous version of Starch that did not do these checks, may crash the current version when being converted. Use the <F3> function key to read in the products of a kitchen without converting, then look for concave or non-planar polygons and fix them before converting.

Bugs not on this list should be reported.

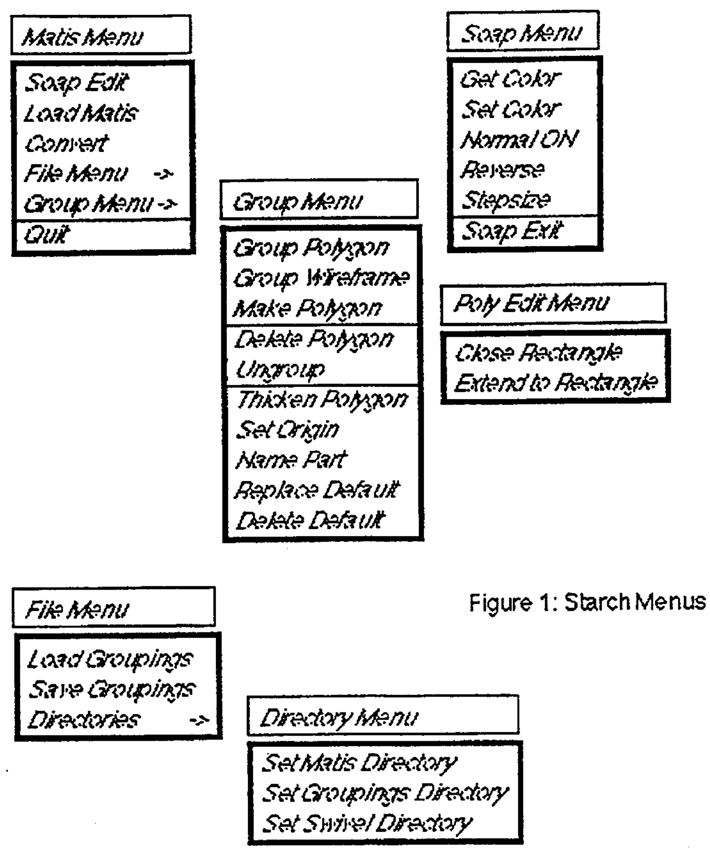
Figure 1: Starch Menus

APPENDIX 3

MATIS VIRTUAL REALITY
WRINGER
USER'S MANUAL

Version 1.3

Table of Contents

1. INTRODUCTION....2
2. COMMAND LINE OPTIONS....2
3. LOST AND FOUND FILE....3
4. PREFERENCES FILE....3
5. COLOR FILE....4
6. WRINGER OUTPUT....4
7. KNOWN BUGS AND DEFICIENCIES....4

WRINGER USER'S MANUAL

1. INTRODUCTION

The Wringer program consolidates the products converted by Starch and Swivel, and the walls described in the MATIS plan file (fmplan). As each wall is created, the products are placed upon it one by one. The script file opens the Swivel binary for the product in question, copies it into the edit buffer, closes the product file, opens the kitchen file, and pastes the product into the kitchen. The location is specified by changing the object's root node position and attitude. The next wall is created, and its products located upon it, and the process is repeated until all walls and located products have been included in the kitchen world.

The output of Wringer is a Swivel script file, named as described below depending on the -n and -m options.

This script file is then transfered to the Mac and read into Swivel, and the kitchen world is created.

2. COMMAND LINE OPTIONS

The Wringer command line format from IRIX is:

```
wringer    [-p(swivel script filepath)] [-f(matis planfile filepath)]
           [-n(plan file index)] [-m(managing number)] [-h(help override)]
```

For example:

```
wringer -p/usr/matis/people/david/scripts -f/usr/plan -n22
```

The Swivel file generated by Wringer is named `PLAN#.SWV`, if the plan was specified using the `-n` index number option -- where `#` is the index number; or `managingID.SWV`, if the plan was specified using the `-m` managing number option to Wringer. For example, a script file generated by specifying the `-n8` option would be named `PLAN8.SWV`. A script file generated by specifying the `-mA4455B` option would be named `A4455B.SWV`.

The swivel script filepath is used to search for Swivel scripts matching those products defined in the MATIS plan file. Products in the plan file with no matching Swivel script will not be included in the final Wringer script. This is a handy way to preview a kitchen before all the located products have been converted to Swivel binary or script files.

The matis planfile filepath is used to read the plan index file and the plan file itself. This only needs to be specified once, as this filepath is unlikely to change, and is stored to a preferences file, as described in section 4.

The `-h` option simply prints out a list of options to the screen.

3. LOST AND FOUND FILE

Each time Wringer is run, a "lost and found" file is created, named `managingID.lf`, where `managingID` is the managing number of the plan being considered. For example, `A44458.lf`. This file is an explicit list of all the products needed for the kitchen in the following format:

```
LOST : A55SK22
FOUND: B19U240Z
FOUND: EL4487GTX
```
etc...

If the product's corresponding Swivel script file cannot be found in the specified script directory, the product is designated as "LOST", otherwise it is "FOUND". The lost and found file should be used as a reference for creating the converted products for the kitchen.

The lost and found file can also be read by the Starch editor, so that the user can cycle through the products of a kitchen in addition to cycling through the products of the entire database.

4. PREFERENCES FILE

The order of command line options does not matter, and if any options are omitted, the preferences file is used as first default, and then the current directory and/or plan index 0 are used as a second default.

Wringer outputs a file named `wringer.prefs`. This file contains four lines containing the most recently selected options. Wringer can be run without any command line arguments if the preferences have been saved from an earlier session. The file format is:

```
/usr/plan/
/usr/starch/swivel/
[Alternately <blankline> or managing number.]
[Alternately <blankline> or plan index number.]
```

If a managing number is specified, no plan index number will appear in the preferences file. If a plan index is specified, then no managing number will appear in the preferences file. If both are specified, the managing number takes priority.

If nothing is specified, and no preferences file exists, the plan referenced by index file entry zero is read by default.

5. COLOR FILE

Wringer will assign a color to all the walls, and separate colors to the floor and the ceiling. The colors should be in an ascii file named `wringer.color` with the following format (edited by the user):

```
Walls     100 200 140
Ceiling   230 100 100
Floor     100 100 255
```

All color values should range from 0 to 255. Colors are in R G B order.

If the file `wringer.color` cannot be found in the directory in which Wringer is being run, all colors default to (200, 200, 200) -- or light grey.

6. WRINGER OUTPUT

Wringer generates a Swivel script file, which can then be read into Swivel on the Macintosh to create the complete kitchen described by the plan file.

If completed swivel files (named identically to the MATIS products they describe) do not exist in the directory from which Swivel has been executed, the Wringer script will terminate. The user must make sure that for all scripts recognized by Wringer in the IRIX environment, a corresponding Swivel binary file exists in the Macintosh environment.

7. KNOWN BUGS AND DEFICIENCIES

The plan with managing number A2941A does not contains lengths and angles for its walls. Wringer will not work without a valid length and valid angle for each wall. Matsushita is responsible for generating valid plan data.

No plans could be found with hanging wall types. The hanging wall type is therefore untested.

APPENDIX 4

MATIS VIRTUAL REALITY TUTORIAL

Version 1.3

Table of Contents

I. INTRODUCTION..........2
II. GETTING STARTED WITH STARCH..........2
III. SETTING FILEPATHS..........3
IV. GROUPING..........4
V. ORIGIN, HIERARCHY, AND CONSTRAINTS..........7
VI. SOAP EDITING..........9
VII. SAVING AND EXITING..........11
VIII. TRANSFER..........12
IX. SWIVEL CONVERSION..........13

MATIS VIRTUAL REALITY TUTORIAL

I. INTRODUCTION

To create a kitchen world, one or more product scripts must be generated by Starch, and one kitchen script must be generated by Wringer. Scripts generated by the Starch editor are read into Swivel and stored out as Swivel binary files. In the case of the script generated by the Wringer program, an entire kitchen is described. The Wringer script performs copy and paste operations on Swivel binary files to form a final kitchen world containing walls, floor and ceiling, head and hand, and located kitchen products.

This document gives a brief explanation of how to convert one MATIS product into a Swivel script file. It also explains how to transfer the script file to the Macintosh, and then how to convert it to a Swivel binary file.

II. GETTING STARTED WITH STARCH

From the current directory, type:

```
starch
```

If the Starch editor cannot find the Matis product file, it will print a warning:

```
File "fmpatern" could not be opened. Please enter the correct
path to the Matis directory.
```

Press the leftmost cursor button to erase the message and to bring up the prompt for the Matis filepath:

```
Matis directory: ./matis
```

To completely replace the existing directory path, simply start typing. Otherwise, type `<backspace>` to selectively replace part of the existing prompt. Type `<enter>` when done. For example:

```
Matis directory: /usr/matis
```

Now, hold down the shift key on the keyboard and press the mouse right button. This will pop the Matis menu onto the screen. Move the cursor to

```
Load Matis
```

and release the mouse button. A dialogue box is displayed with the following prompt:

```
Product name (or <enter>):
```

Type

```
A51SK
```

and press the <Enter> key. Product A51SK (a faucet) is now displayed in the Matis Graphics View and its text components are displayed in the Matis Text View.

*NOTE: When a product is loaded in which has already been partially or fully converted, a "convert" operation is performed so that the shaded soap view may be seen. During this convert, the following message may be displayed:

```
Converting the product . . . . . .
Unable to write the swivel file. Make sure the swivel
directory is in the right place and that you have permission
to write to the file.
```

This message will not appear after setting the filepaths as described in the next section.

III. SETTING FILEPATHS

Select the Matis Menu by pressing `Shift` and the right mouse button. Select

```
File Menu ->
```

and then the

```
Directories->
```

option, and finally, in the Directory Menu, move the cursor to

```
Set Groupings Directory
```

and release the right mouse button. A dialogue box with the current groupings directory appears:

```
Groupings directory: ./groupings
```

If no "groupings" directory exists off of the current directory, change this filepath to a filepath that is valid. For example,

```
Groupings directory: .
```

will change the filepath to the current directory.

Now, make sure that the Swivel directory is correct by following the same procedure outlined for the groupings directory, except for selecting

```
Set Swivel Directory
```

from the Directory Menu instead of selecting Set Groupings Directory. The default Swivel directory is

```
Swivel directory: ./swivel
```

and may be changed if desired.

Directory filepaths only need to be specified once. They are stored in the file `starch.prefs` and read in automatically every time Starch is executed.

IV. GROUPING

In the Matis Text View, move the cursor over

```
column #0
```

at the top of the screen, and press the left mouse button. The column is now selected in both the Matis Graphic and Text Views, and highlighted in cyan. Move the cursor into the Grouping Text View (which is empty) and press and hold the right button. This should produce the Group Menu. Now, still holding the right button, select the

```
Group Polygon
```

menu item by moving the cursor and releasing the mouse button. You may alternately press the `<Ctrl-g>` keyboard combination to group the polygon. Your first grouping is now displayed in the Grouping Text View:

```
<P> Object.0
```

"`Object.0`" is the name of the grouping. "`<P>`" stands for "polygon". A grouping corresponds to a node of the Swivel object hierarchy. A column is considered by Starch as a polygon, not a sweep.

Now, from the Matis Text View, select

```
lines #0
```

by pressing the left mouse button. [NOTE: "lines" indicates one or more line segments. This document will refer to a "lines" as a "polyline".] To make the left (planar) side of the spout arm, rotate the faucet in the Matis Graphic View until the selected polyline is clearly positioned. (Use the middle button. Experiment with the rotation interface for a while to get the feel of it before continuing.)

In the Matis Graphic view, finish off the arm by clicking on the arcs and the upper polyline with the leftmost mouse button. To unselect an entity which has been mistakenly selected, press

```
<Ctrl>
```

and the leftmost mouse button. When the side of the faucet spout is completely specified, press the right menu .button and select:

```
Group Polygon
```

or alternately press the `<Ctrl-g>` keyboard combination. The side of the spout arm is de-highlighted, and

```
<P> Object.1
```

appears in the Grouping Text View. Since the sides of the spout arm are parallel and geometrically symmetric, we can create the rest of the spout by thickening the side polygon that we just specified. Select the polygon by moving the cursor into the Grouping Text View and pressing the leftmost mouse button over `Object.1`. The polygon should then be highlighted in the Matis Graphics View.

Now, select

```
Thicken Polygon
```

from the Group Menu. A message should appear:

```
Pick a line or arc to determine length or hit <Esc> to use
default
```

Pick one of the lines of the base rectangle, in the direction of the length of the cylinder.

You may have to use the Zoom feature to select the length line. (Press the "z" key and the middle mouse button and draw a box around the area to zoom in on. If you miss, press <Shift-z> and the middle mouse button to zoom out again.)

Now, select

```
Convert
```

or press the <Ctrl c> keyboard combination. You will see that a sweep has been automatically created around the top and bottom of the spout arm, and that the opposite side polygon has been created as well.

The Grouping Text View should now read:

```
<P> Object.0
<P> Object.1
```

The Thicken Polygon option is very powerful, and can be used for giving thickness to cabinets, or depth to cabinet shelves.

Now, zoom into the faucet lever area (at the opposite end of the base cylinder from the faucet arm) by pressing the "z" key and the middle mouse button and by drawing a box around the area to zoom in on. If you miss, press <Shift-z> and the middle mouse button to zoom back out, or, if zoomed in more than one level, <Ctrl-z> and the middle mouse button to zoom back to the original level.

Select one thin side of the lever, which is a rectangle, in the Matis Graphic View.

Press <Ctrl-g> to group the polygon.

Now select `Object.2` from the Grouping Text View to make it current, and follow the same procedure as with the spout arm to create the rest of the lever. To recapitulate, select

```
Thicken Polygon
```

and the length line. You may have to zoom in yet another level to select the length line. After selecting, click in the Grouping Text View to deselect the thickened polygon. Select

```
Convert
```

or alternately, press the <Ctrl-c> keyboard combination. A sweep and opposite lever arm polygon are automatically created.

Now, zoom back out by pressing <Ctrl-z> and the middle mouse button. Rotate the faucet until a clear view of the nozzle is found. Select one of the columns of the nozzle, then:

```
Group Polygon
```

Select the other column, and:

```
Group Polygon
```

The group list should now look like:

```
<P> Object.0        [base column]
<P> Object.1        [left faucet arm thickened polygon]
<P> Object.2        [left side lever thickened polygon]
<P> Object.3        [nozzle column 1]
<P> Object.4        [nozzle column 2]
```

V. ORIGIN, HIERARCHY, AND CONSTRAINTS

To allow the faucet arm to swing side to side, an origin must be specified, and then the minimum and maximum constraint values must be set.

First, define the polygon at the base of the faucet arm. This polygon will serve as the parent of all other faucet arm and nozzle elements. Since there is not an explicit polygon at the base, subprimitives of polylines must be selected.

In general, a subprimitive can be selected (for example, a single line of a polyline) by pressing the `<Shift>` key and then the left mouse button. A subprimitive may be deselected by pressing `<Ctrl-Shift>` and pressing the left mouse button. This is important for our next operation.

Zoom in to the base area. Then, press the `<Shift>` key and the left mouse button. A single line has been highlighted. Highlight the rest of the base polygon edges, also using the `<Shift>` key subprimitive selection technique. Then

```
Group Polygon
```

This creates

```
<P> Object.5
```

Now, move into the Grouping Text View and select this object. Then, from the Group Menu,

```
Set Origin
```

This is a general example, so an exact origin location is not necessary. Select any edge of the base polygon. An origin crosshair appears at the midpoint of that edge. Now, make objects 1, 3, and 4 children of object 5. Use the right arrow key <u>in the four-key cluster</u> next to the right-hand `<Ctrl>` key. Select

```
<P> Object.1
```

in the Group Text View. Press the right-arrow key to indent it. It is now a child. Do the same for objects 3 and 4. Now, reselect

```
<P> Object.1
```

and use the down-arrow key to move it below object 5. Object 1 is now a child of object 5. Do the same for objects 3 and 4.

The grouping list should now look like:

```
<P> Object.0            [base column]
<P> Object.2            [left side lever thickened polygon]
<P> Object.5            [faucet arm base plate]
     <P> Object.1       [left faucet arm thickened polygon]
```

```
<P> Object.3          [nozzle column 1]
<P> Object.4          [nozzle column 2]
```

Before continuing, from the Matis Menu, select

```
Convert
```

The faucet will appear in the Soap View, below the Matis Graphics View.

Now, select

```
Object.5
```

from the Group Text View. On the right hand side of the Starch screen, you will notice a CONSTRAINT window. The values inside are the current constraint values for the base polygon. Change the ROLL VAL from 0 to 45. Then

```
Convert
```

Notice how the faucet arm has swung to the left. To swing it the other way, change 45 to -45 and once more select Convert. The faucet arm swings the other way. If these are good min/max bounds for the swinging faucet, set ROLL VAL back to 0, and set ROLL MIN to -45 and ROLL MAX to 45. Finally, toggle the LK (Lock) status to unlocked by pressing the leftmost mouse button with the cursor over the boxed "X". If the roll is not unlocked, there will be no interaction in Body Electric.

Finally, select Convert once more to get the Soap View back to the default zero position, and then from the File Menu,

```
Save Groupings
```

Press <Enter> to the prompt to save the grouping information.

VI. SOAP EDITING

You may have noticed that the base cylinder looks very dark in the Soap View. This is because the polygon normals are backwards. To reverse the direction of the normals, select

```
Soap Edit
```

from the Matis Menu. A color grid replaces the Matis Graphics View in the upper window. Now, from the Groupings Text View, select the grouping that looks dark (Object.0). You will notice that the cylinder is highlighted in yellow. Now select

```
Normal ON
```

You should see a red normal lines displayed around the rim of the cylinder. However, they are all pointing inwards. In the Starch editor, all normals must point outwards from the faces. To speed up work on a large product, conversion is automatically turned off in the soap editing mode. For this demo, we'd like to make automatic conversion the default. To do this, select

```
Convert ON
```

Now, select

```
Reverse
```

The product is automatically reconverted. Now the polygons should not look so dark and the normals should be pointing outwards.

Repeat this process for any other suspicious looking groups. Notice that if a column is selected, normals are displayed for every face of the column. If the column has too many faces, making sure that Object.0 is still selected, choose

```
Stepsize
```

from the Soap Edit menu to change the angular increment (and the resulting number of polygons) of the column. A pop-up menu reads:

```
Enter stepsize: 10
```

Change this value to 45, and press <enter>. The cylinder should now have 8 sides. This function is useful for cutting down the number of polygons in the kitchen, to increase the frame rate.

Color may be applied to a grouping by selecting the grouping from the Grouping Text View, and then by using the leftmost mouse button to select a color from the color grid. Alternately, the <Shift> key may be pressed while selecting from the Group Text View for a multiple group selection.

To apply a color to the entire faucet, press <Shift> while selecting all the groups from top to bottom in the Group Text View. Then, in the color grid window, select the color of your choice. You may select from the grid, or from either of the color ramps**. The current color is displayed in the lower left hand corner of the color window. Notice that the current color's RGB components are displayed in the righthand COLOR view. Finally, select `Set Color` from the Soap Menu. The color in the lower left hand corner of the color window will be applied to the groupings. Alternately, select a grouping and then `Get Color` to set the current color to the color of the selected grouping. Then select another grouping and apply that color with Set Color.

** There are two ramps in the color window. The lefthand vertical ramp is a linear interpolation between the selected grid color and its grid neighbors to the top and to the bottom. The bottom horizontal ramp is a linear interpolation between the selected grid color and its neighbors to the left and to the right.

To exit Soap Edit mode, select

`Soap Exit` from the Soap Menu. The Matis Graphics View reappears.

VII. SAVING AND EXITING

From the Matis Menu, select

`File Menu ->` and then

`Save Groupings`

A dialogue box appears:

`Save groupings file as: A51SK`

"A51SK" is the product name, and is used as a default for the groupings file name. In IRIX, the file is actually named "A51SK.group". Type in a different grouping file name if desired. It is not necessary to type in the ".group" filename extension.

Finally, from the Matis Menu, select:

`Convert`

The Swivel script file is saved as A51SK.SWV. You may exit Starch by selecting

`Quit` from the Matis Menu, or you may edit another product by selecting

`File Menu ->` from the Matis Menu, and then

`Load Matis.`

If you try to quit starch without saving your changes, the following warning prompt appears:

`Save the changes to this product (y, n, <Esc> to cancel)?`

Usually, it's a good idea to always specify "y".

VIII. TRANSFER

Now we have created one or more Swivel scripts that can be transferred to the Macintosh. To do this, start the NCSA Telnet.a7 application on the Macintosh, and log into your IRIS machine. Change directory on the IRIS to the Swivel directory specified in Starch. Then from the Telnet `File` menu, select `Set the Transfer Directory ...` and set the directory to where Swivel script files are kept on the Macintosh.

Then, from the `Network` menu, select

`Send FTP Command`

After the `ftp>` prompt in the IRIS window, type these FTP commands:

```
prompt
mput *.SWV
```

These files will then be transferred to the Macintosh. There is a bug in Telnet which prepends a "./" to every file. In the Finder, from the `View` menu, select `by Name`

Then select each afflicted file in the Swivel folder and delete these characters. This actually doesn't take too much time. (!)

IX. SWIVEL CONVERSION

Double click on the RB2Swivel icon from the Finder. In the File menu (found on the top bar), select `Open Command File` and specify the folder and filename to be read in. For the purposes of our demo, the filename will be

`A51SK.SWV`

Swivel then reads in and converts the script file. The Swivel binary is automatically saved to the current directory by the Swivel script.

No editing in Swivel should be necessary.

After the Swivel binary file is written, exit Swivel by selecting

`Quit` from the File menu entry on the top bar. Alternately, you can select

`Open Command File` to convert the next product.

Swivel binary conversion must be performed for every product of a kitchen. After all products have been converted to their respective binary Swivel files, the Wringer script can be run, and the entire kitchen can be assembled. See the Wringer User's Manual for more information about Wringer.

The Wringer script file is transferred over FTP in the same way products are transferred, except to type at the `ftp>` prompt:

```
put A5511A.SWV
```

instead of using the `prompt` and `mput` commands. The script is read into Swivel using the same Swivel commands. The Swivel kitchen is automatically saved to disk, but the workspace remains on the screen. This way, an ISAAC file can be generated right away. In Swivel, select

```
Export File
```

and

```
Save
```

to write the ISAAC file.

It may be necessary to compress the Swivel binary and ISAAC files to save disk space or to allow these files to be copied to a diskette for backup or transportation purposes.

MATIS VIRTUAL REALITY
RELEASE NOTES

Gold Release

MATIS VIRTUAL REALITY PROJECT
RELEASE NOTES
GOLD SHIP

This release is contained on:

| QTY | Media |
| --- | --- |
| 1 | 1/4-inch 37Mb mag tape |
| 4 | 3.5" Mac diskettes |

The mag tape is a high density 37Mb 1/4 -inch tape written by a high density tape drive on a Personal Iris, using the "tar" program.

The Macintosh 3.5 diskettes are double sided and written by a standard Mac II.

TAR TAPE:
From IRIX, type "`tar -xv`" to copy the contents of the tar tape to directories off of the current directory of your IRIS machine.

Tar Tape #1 of 1:
The directory structure of the root directory `goldrelease` is:

| | |
| --- | --- |
| `./bin` | Starch and Wringer executable. * |
| `./groupings` | Groupings files for sample kitchen are here. *+ |
| `./swivel` | Swivel script files for sample kitchen are here. |
| `./starch` | Starch source and makefile code. |
| `./wringer` | Wringer source and makefile code. |
| `./plan` | Wringer color file and plan script file is here. |

* It is recommended that Starch and Wringer be recompiled for each different IRIS platform.
*+ These are from the plan with managing id A2941A (as specified with the -m option to Wringer).

MAC DISKETTES:
RB2 Swivel Diskette:
Disk 1 of 1: RB2SWIVEL
This diskette contains a compressed copy of `RB2Swivel 1.5.81h3`.
The compressed file is `RB2SWIVEL.sit` and must be decompressed with Stuffit 1.5.1, also on this diskette. This version of Swivel allows for 3072 objects, and is used for all operations.

Swivel Script & Binary Support Files:
Disk 1 of 2: SWIVBIN
This diskette contains the folder GoldBIN, compressed into the file GoldBIN.sit. The compressed file must be decompressed with Stuffit 1.5.1, also on this diskette. The folder GoldBIN contains all of the Swivel binary files for the sample kitchen.

Disk 2 of 2: SWIVSCRIPT
This diskette contains the folder GoldSCRIPT, compressed into the file GoldSCRIPT.sit. The compressed file must be decompressed with Stuffit 1.5.1, also on this diskette. The GoldSCRIPT folder contains the original Swivel script files generated by Starch for the sample kitchen.

KITCHEN PLAN (Swivel binary and Isaac files)
Disk 1 of 1: KITCHEN
This diskette contains files A2941A and A2941A.isaac, compressed into files swv.sit and isaac.sit respectively. The compressed files must be decompressed with Stuffit 1.5.1, also on this diskette. These files are the Swivel binary and isaac files for the sample kitchen. The script file A2941A.SWV is included on the SWIVSCRIPT diskette.

MATIS VIRTUAL REALITY
STATUS REPORT

Version 1.4

Status Report

This document specifies the state of project implementation.

Starch

Matis products are fully readable by Starch.

Groupings Files

- Products can be edited, re-edited, and the grouping information can be reused for nearly identical products.

Swivel Scripts

- Swivel scripts are fully generated as part of the conversion process.

Product Selection

- Products may be selected by supplying a full name or index number, or by using the function keys as described in the Starch User's Manual, Section 4.1.

Default parameter addition

- Group defaults can be inherited when a group is named.

Product Editing

- The Matis Graphic View is up to Spec.
- The Matis Text View is up to Spec. The text view is scrollable, so long primitive lists can be fully viewed or selected.
- The Grouping Process is complete. Polygons are automatically made into *sweeps* if they are nonplanar.
- The Grouping Text view is up to Spec and is scrollable.
- The Color View is up to Spec. Currently colors are specified by RGB values, or interactively with the Soap Edit mode color grid.
- The Thickness View is complete. Polygons can be thickened by numeric or subprimitive input. Widening is achieved with wireframes (see Starch User's Manual, Section 4.3.).
- The Constraints view is up to spec.
- The Segmentation View has been incorporated into Soap Edit mode as a menu item.
- The Conversion (Soap) View is complete.
- A Polygon editor has been added to Starch. This editor allows previously undefined polygons to be created from available endpoints and from the length and direction of available edges. Drawers may now be converted.

Wringer
- This is up to spec. See the Wringer User's Manual.

Body Electric
- The Body Electric interaction is up to spec.

*IMPORTANT NOTES:
- Coplanar polygons cannot be avoided in some thickening situations. Make sure these polygons have the same color and the same normal, and the rendering artifacts will not be noticeable.
- A feature which allows the proper construction of hole polygons is the polygon editor. Starch will allow the construction of a region with a hole if the user specifies convex polygons linking the outer perimeter with the inner hole region.
- The Swivel scripts pass color information directly to Isaac via the Swivel database. Even though products are rendered gray on the Swivel screen, they are displayed with full color by the Isaac application.

MATIS VIRTUAL REALITY
SPECIFICATION

Version 1.1

Table of Contents

1. Project Description.........1
2. The STARCH Editor.........3
 2.1 Product Selection.........3
 2.2 Default Parameter Addition.........3
 2.3 Product Editing.........3
3. The WRINGER World Constructor.........5
 3.1 Kitchen Selection.........5
 3.2 Making a World.........5
4. Body Electric Interaction.........6

What is claimed is:

1. An apparatus for creating a virtual world data base, comprising:

receiving means for receiving first, second and third polygon representations of respective first, second and third virtual objects in a virtual world;

selecting means, coupled to said receiving means, for selecting a first edge of said first virtual object and for selecting a second edge of said second virtual object; and grouping means, coupled to the receiving means and the selecting means, for grouping said first and second virtual objects in the virtual world into a grouped object comprising said first and second virtual objects joined at an intersection of the first and second edges, the grouped object represented by at least one of a three-dimensional and rotatable wireframe object and a three-dimensional and rotatable sweep polygon.

2. The apparatus according to claim 1 further comprising attribute assigning means, coupled to the grouping means, for assigning an attribute to the first and second edges of the first and second virtual objects, the attribute means including hierarchy means for assigning a grouping hierarchy for the first and second virtual objects wherein the second virtual object is assigned as a child object of the first virtual object and wherein an orientation and a position of the child object is calculated relative to the first virtual object.

3. The apparatus according to claim 2 wherein the attribute assigning means further comprises:

origin assigning means for assigning an origin on the first virtual object around which the third virtual object can rotate; and constraint assigning means for assigning a three-dimensional constraint of motion to the the third virtual object to constrain how the third virtual object can rotate with respect to the first virtual object.

4. The apparatus of claim 3, wherein the constraint assigning means comprises means for specifying a minimum angle and a maximum angle that said third virtual object can rotate with respect to said origin.

5. The apparatus according to claim 3 wherein the attribute assigning means further comprises color assigning means for assigning color values to the grouped object.

6. The apparatus according to claim 5 wherein the attribute assigning means further comprises texture assigning means for assigning texture values to the grouped object.

7. The apparatus according to claim 2 further comprising data coupling means, coupled to the grouping means, for coupling real world data to the grouped object.

8. An apparatus for creating a virtual world comprising:

receiving means for receiving first, second and third polygon representations of respective first, second and third virtual objects in a virtual world;

selecting means, coupled to said receiving means, for selecting a first edge of a first virtual object and for selecting a second edge of a second virtual object; and grouping means, coupled to the receiving means and the selecting means, for grouping said first and second virtual objects in the virtual world into a grouped object comprising said first and second virtual objects joined at an intersection of the first and second edges, the grouped object represented by at least one of a three-dimensional and rotatable wireframe object and a three-dimensional and rotatable sweep polygon;

attribute assigning means, coupled to the grouping means, for assigning an attribute to the first and second edges of the first and second virtual objects, the attribute assigning means including:

hierarchy means for assigning a grouping hierarchy for the first and second virtual objects wherein the second virtual object is assigned as a child object of the first virtual object and an orientation and a position of the child object is calculated relative to the first virtual object; and origin assigning means for assigning an origin on the first virtual object around which the third virtual object can rotate; and constraint assigning means for assigning a three-dimensional constraint of motion to the the third virtual object to constrain how the third virtual object can rotate with respect to the first virtual object; and rendering means for rendering the virtual world including the grouped object.

9. The apparatus of claim 8, wherein the constraint assigning means comprises means for specifying a minimum angle and a maximum angle that said third virtual object can rotate with respect to said origin.

* * * * *